US009129319B2

(12) United States Patent
Burton et al.

(10) Patent No.: US 9,129,319 B2
(45) Date of Patent: Sep. 8, 2015

(54) METHODS AND APPARATUS FOR ON-LINE ORDERING

(76) Inventors: Peter A. Burton, Forest Hills, NY (US); Dror Segal, New York, NY (US)

( * ) Notice: Subject to any disclaimer, the term of this patent is extended or adjusted under 35 U.S.C. 154(b) by 860 days.

(21) Appl. No.: 12/798,901

(22) Filed: Apr. 13, 2010

(65) Prior Publication Data

US 2010/0241707 A1 Sep. 23, 2010

Related U.S. Application Data

(63) Continuation of application No. 11/150,824, filed on Jun. 9, 2005, now abandoned.

(51) Int. Cl.
*G06Q 30/06* (2012.01)
*G06Q 30/08* (2012.01)

(52) U.S. Cl.
CPC ............ *G06Q 30/06* (2013.01); *G06Q 30/0625* (2013.01); *G06Q 30/0641* (2013.01); *G06Q 30/0643* (2013.01)

(58) Field of Classification Search
CPC ............................... G06Q 30/06; G06Q 30/08
USPC .................................... 705/26, 27, 26.1, 27.1
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 5,948,040 | A * | 9/1999 | DeLorme et al. | 701/426 |
| 5,991,739 | A * | 11/1999 | Cupps et al. | 705/26.8 |
| 6,480,865 | B1 * | 11/2002 | Lee et al. | 715/234 |

* cited by examiner

*Primary Examiner* — James Zurita
(74) *Attorney, Agent, or Firm* — Myers Wolin, LLC

(57) ABSTRACT

Systems and methods for ordering supplies from suppliers or for other e-commerce activities are described. Standards for placing orders and registering catalog information in a database are described. Systems and methods for placing orders, preprocessing supplier information using geographic information, conducting data searches and analysis locally on user access devices, continuously updating displays of browser frames, tracking orders using accounting codes, placing graphical custom orders, submitting graphical orders to suppliers, placing group orders, reducing risks associated with delinquent accounts receivable, and combinations thereof are described.

6 Claims, 110 Drawing Sheets

4575

```
SELECT CMP_NAME as 'Acme', AV(ORD_TOTAL) as 'Average Order
Size', (SUM(ORD_TOTAL)/DATEDIFF(day, '[textI StartIDate 6/19/00]','
[textIEnd DateIcurrent date]'))*(7/5) as 'Average Daily Total' FROM
ORDERS, COMPANIES, DEPARTMENTS, DEPARTMENT_HAS_CUSTOMERS WHERE
CMP_UID=DPT_CMP_UID AND ORD_CST_UID=DHC_CST_UID AND
DHC_DPT_UID=DPT_UID AND ORD_DEADLINE>='[repeat |0| ]' AND
ORD_DEADLINE<='[repeat |1|]'  AND (ORD_CANCELLED=0 [checkbox|Include
Cancelled OrdersIOR ORD_CANCELLED=1]  GROUP BY CMP_NAME
```

FIG. 92

METHODS AND APPARATUS FOR ON-LINE ORDERING

CROSS REFERENCE TO RELATED APPLICATIONS

This application claims the benefit of U.S. Provisional Patent Application No. 60/191,359, filed Mar. 22, 2000; U.S. Provisional Patent Application No. 60/191,205, filed Mar. 22, 2000; U.S. Provisional Patent Application No. 60/245,503, filed Nov. 3, 2000; U.S. Provisional Patent Application No. 60/245,826, filed Nov. 3, 2000; and [P. A. Burton] U.S. provisional application entitled SYSTEMS AND METHODS FOR USING CODES TO IDENTIFY OR GROUP ORDERS, filed Jan. 2, 2001.

BACKGROUND OF THE INVENTION

This invention relates to electronic commerce ("e-commerce") systems. More particularly, this invention relates to systems and methods for providing suppliers' catalog information to purchasers and providing orders to suppliers.

Electronic commerce systems, such as Internet-based shopping systems, allow purchasers to electronically purchase products and services without having to visit an actual store or supplier facility. Vast quantities of supplier information may be available to purchasers or prospective purchasers via Internet-accessible database servers. Similarly, vast quantities of orders may be placed by users via access devices.

Because of the vast quantity of supplier information available on the Internet, it may be difficult for purchasers to find or identify suppliers that may provide supplies or services that meet the purchasers' needs. For example, purchasers may require that suppliers be located in a selected area, provide certain types of supplies, participate in certain sales promotions, or conform to consumer or industrial standards. Purchasers may also have a need for information related to the suppliers or supplies.

Accordingly, it would be desirable to provide systems and methods for providing purchasers with information about suppliers and supplies that is organized around purchasers' needs and preferences, for receiving orders from purchasers, and for submitting the orders to suppliers.

Existing e-commerce systems that provide on-line ordering services to purchasers may provide on-line access to a limited number of suppliers or to suppliers offering a limited scope of supplies. Existing e-commerce systems may benefit from being able to offer purchasers a larger selection of supplies and a wider range of categories of supplies, but it may be costly to incorporate new catalog information if the new information does not conform to formats and protocols used by the systems. Accordingly, it may be desirable to provide systems and methods for providing existing e-commerce systems with formats and protocols for incorporating catalog information from previously inaccessible suppliers and for placing orders for items and services from those suppliers' catalogs.

Searches for suppliers, supplier-related information, catalog information, or any other type of information may be slowed by processes required to extract information from databases, data transmission delays, and other uncontrollable delays. Accordingly, it may be desirable to provide systems and methods for providing database searching capabilities that reduce interactions with remote database engines.

In some searches, purchasers may desire to find, sort, or group suppliers that conform to certain criteria such as distance from the purchaser, participation in a given sales promotion, provision of a certain brand or line of supplies, or certification by an independent organization (for example, a consumer protection organization). Such a search may be inherently slow because it may require a purchaser to search numerous databases, each of which may cause processing and transmission delays. Searching efficiency may be reduced because each database may require a different search strategy. Accordingly, it may be desirable to provide systems and methods for categorizing information and incorporating it into preprocessing information lists for distribution to and local searching by purchasers. In particular, it would be desirable to provide systems and methods for categorizing suppliers using geographic criteria and providing purchasers with preprocessed supplier information for local searching using an access device.

When an ordering system manages large numbers of orders, it may difficult to "supervise" the progression of an order from initial reception, through internal processing, submission to a supplier, and fulfillment by the supplier. Purchasers, customer service representatives, and suppliers using user access devices may not be able to remotely "view" orders and related information as they enter the system, pass through it, or arrive at a supplier's warehouse without repeatedly downloading, information from a database server. Repeated downloading may be slow, inefficient, and may degrade a viewer's ability to analyze information on the user access device display. Accordingly, it may be desirable to provide systems and methods for continuously updating portions of a display on a user access device without refreshing the entire display.

Sometimes, organizations may have systems for tracking expenses incurred while providing services to individuals, clients, or other organizations. When members of organizations (e.g., employees of a firm or company) order supplies or services on line in connection with, it may be difficult to track orders placed by a given member. This shortcoming may lead to losses in efficiency or abuses of the system. Accordingly, it may be desirable to provide systems and methods of identifying or tracking orders placed in connection with a particular activity, function, client, or individual.

Some customizable items and supplies may be purchased using e-commerce systems. When purchasers select items and customized features for the items, it may be difficult for a user to envision how the item would appear as modified by the customization features. One solution is to display a different version of the item for each customization feature. The number of versions required increases rapidly as the number of possible options for the item increases. It may be cumbersome or impossible to provide different stock displays showing every possible combination of options for a given feature. Accordingly, it may be desirable to provide systems and methods for "virtual assembly" of a customized item that receive item and option selections from on-line purchasers and dynamically illustrate items, as modified by any selected options, at each stage of the customization or assembly process.

When orders for customized items are submitted to suppliers for fulfillment, it is sometimes necessary to describe the item as customized using text. Items with multiple customized features or with customized features that overlap or intermingle with each other, such as the toppings of a pizza, may be difficult to describe. Such items may be difficult for a supplier to create or assemble in accordance with a description even if the description is accurate. Accordingly, it may be desirable to provide systems and methods for automatically providing suppliers with graphically simplified illustrations of customized items (e.g., an "exploded view" of the linkages in an automobile transmission system).

When a prospective purchaser desires to participate with other prospective purchasers in ordering supplies or services via an e-commerce system, the prospective purchaser may need to perform a number of tasks. Necessary tasks may include informing the others about a prospective ordering event, providing them with information about suppliers or suppliers' catalogs, polling them for selections of suppliers or items, assembling all of the selections into a single order, submitting the order to a selected supplier, and following up on the fulfillment of the individual portions of the order. Accordingly, it would be desirable to provide systems and methods that automate some or all of the tasks that are necessary for using an e-commerce system to initiate, assemble, submit, and monitor a single consolidated order that includes orders from several different individuals or sources.

When an e-commerce system is used to generate sales for suppliers by facilitating sales to purchasers, an e-commerce system provider may receive commissions in compensation for facilitating sales. An e-commerce provider may facilitate sales for a large number of suppliers. There may be a risk that some of the suppliers will not pay due commissions. It may be costly to reduce the risk by researching the credit-worthiness of suppliers or taking measures to coerce payments from delinquent suppliers. Accordingly, it may be desirable to provide systems and methods for automatically increasing the probability, at the time an order is placed with an e-commerce system, that commissions will be paid.

SUMMARY OF THE INVENTION

Systems and methods of the present invention may provide to consumers or other types of users web pages, electronic catalogs, or other displays and may receive user selections for purchasing goods and services. The selections may be received in the form of orders. Orders may then be transmitted to suppliers for fulfillment.

Ordering web sites may be provided for receiving electronic indications of the user selections. Orders may be received from independent ordering sites. To facilitate information exchange with independent sites, some embodiments of the invention may provide independent sites with standards and protocols necessary for viewing catalog information and submitting orders in accordance with the invention. Catalog information may be provided to standard-compliant independent sites and orders may be received from them.

Systems and methods may be provided for providing users with information, which may include catalog information, ordering information, or any other type of information, by downloading data objects, which may be compressed, into users' access devices, e.g., web browsers. Data and processing functions may be downloaded to provide users with specialized capabilities, including decompressing compressed data. Processing functions may include functions for locally searching, sorting, grouping, browsing, and performing other data manipulation or calculation tasks. Processing functions for presenting data or search results to users via an access device display may be provided. A variety of presentation functions may be provided to present different forms of data to users and receive a variety of forms of user indications from users.

In some embodiments, systems and methods for continuously updating a user access device display without refreshing an entire active web page may be provided. Data may be downloaded into a user's access device and stored, for example, in a first browser frame. Functions may be provided for displaying data in the first frame and selectively replacing portions of the data. A second browser frame, which may be a hidden frame, may be periodically refreshed with data from a server. Data from the second browser frame may be selected using the functions and inserted into the first frame for display. Continuously updated displays of web pages may be used for monitoring the status of data values that may change frequently such as a number of outstanding orders in a queue, values of commodities or securities, or values of properties measured by a laboratory instrument.

In some embodiments, systems and methods for selecting prospective suppliers for users may be provided. A geographic region surrounding or including a user's location may be determined and suppliers located inside the region may be presented to the user. The borders of the region may defined to insure that presented suppliers will be located within a preselected distance from the user.

Some embodiments may identify a user within a geodetic zone including the user's location, and present the user with a preprocessed list of suppliers that are associated with the zone. Suppliers may be associated with a zone for a variety of reasons, including, but not limited to, convenience, marketing, or distribution priorities. Suppliers may offer delivery service to some, all, or none of the zone. The user may be provided with indications that a supplier does or does not deliver to the user's location based on geometric or cartographic analyses that may be performed by a central processing engine.

When a supplier offers delivery to only part of the zone, and it is uncertain if the user's location falls into the delivery portion of the zone or the non-delivery portion of the zone, cartographic or geometric data and functions may be downloaded to the user's access device. These data and functions may automatically determine in which portion of the zone the user is located. Providing preprocessed lists and local computation functions for suppliers having undetermined delivery service may reduce database response times without reducing the amount of information provided to the user.

Some embodiments may provide systems and methods for identifying, tracking, grouping, or sorting orders using accounting codes. Organizations or groups of users may desire to keep track of orders placed by group member users for accounting, auditing, billing, and reporting purposes. For example, an employee (user) may "expense" a business meal to a company (group) client.

Some embodiments may receive indications from users that an order is complete and that the user is ready to make payment arrangements. Accounting codes may be received and stored as part order information that may define the order. When the codes are received, the user may be presented with information about group policies or rules governing the use of accounting codes or ordering in general. Received codes may be checked for validity and proper usage under group rules. If invalid codes are received, or if rules are violated, users and administrative users of groups may be warned or notified. After any validation processes are performed, the order may be accepted, stored, and submitted to a supplier.

Administrative users representing a user group may be provided with report generation tools to generate reports regarding orders and ordering practices of the group's member users. Reports may be stratified, sorted, or grouped by elements of order information, which may include accounting codes, user names, supplies ordered, amount paid, and other order information.

Some embodiments may provide systems and methods for receiving graphical custom orders. Graphical custom orders may include orders for customizable items in which a user selects an item and then graphically selects a customization feature or option with which to modify the selected item. Accordingly, an indication of an item may be received and a graphical representation of the item may be displayed on the user's access device.

In some embodiments, user indications to divide the selected item into portions may be received and the graphical representation modified accordingly. In some embodiments, graphical representations of optional features may be presented to the user to prompt the user to select an option. User indications of selected options may be received. User indications of one or more portions to be modified may be received. The graphical representation of the item or any portions may be displayed as modified by the selected option or options.

An indication that the order is complete may be received and the graphical representation of the modified item may be transformed into a final state of completion (e.g., it may be displayed as "cooked" or "assembled"). The selected item and modifications may be submitted to a supplier.

In some embodiments, an order or a graphical custom order may be sent to a supplier in a graphical form that may facilitate order fulfillment. For example, a pizza order submitted to a restaurant may illustrate the pizza using discs or sections of discs to show the required distribution for each topping. Textual order information may be transmitted to the supplier with the graphical order information.

Some embodiments may provide systems and methods for avoiding the risk of bad debt. When a user purchases an item or service from a supplier, the purchase may be facilitated by an ordering service. The ordering service may receive a commission from the supplier, but there is a risk that the supplier may not pay the commission or may pay it late.

Some embodiments may receive from a user an order that includes payment information corresponding to a given payment method (e.g., credit card, cash, house account, etc.). If payment by credit card is indicated, a supplier's claim for payment from the user's financial institution may be trapped instead of forwarding it to the supplier. The trapped claim may be presented directly to the financial institution and corresponding funds may be received. An amount corresponding to the sale reduced by any commission, any receivable funds from other orders purchased (for example, using non-trappable payment methods), or any associated service charges may be remitted to the supplier. Systems and methods for defraying costs due to financial institution service charges may be provided.

BRIEF DESCRIPTIONS OF DRAWINGS

Further features of the invention, its nature and various advantages will be more apparent from the following detailed description of the preferred embodiments taken in conjunction with the accompanying drawings, in which.

Figure 18:
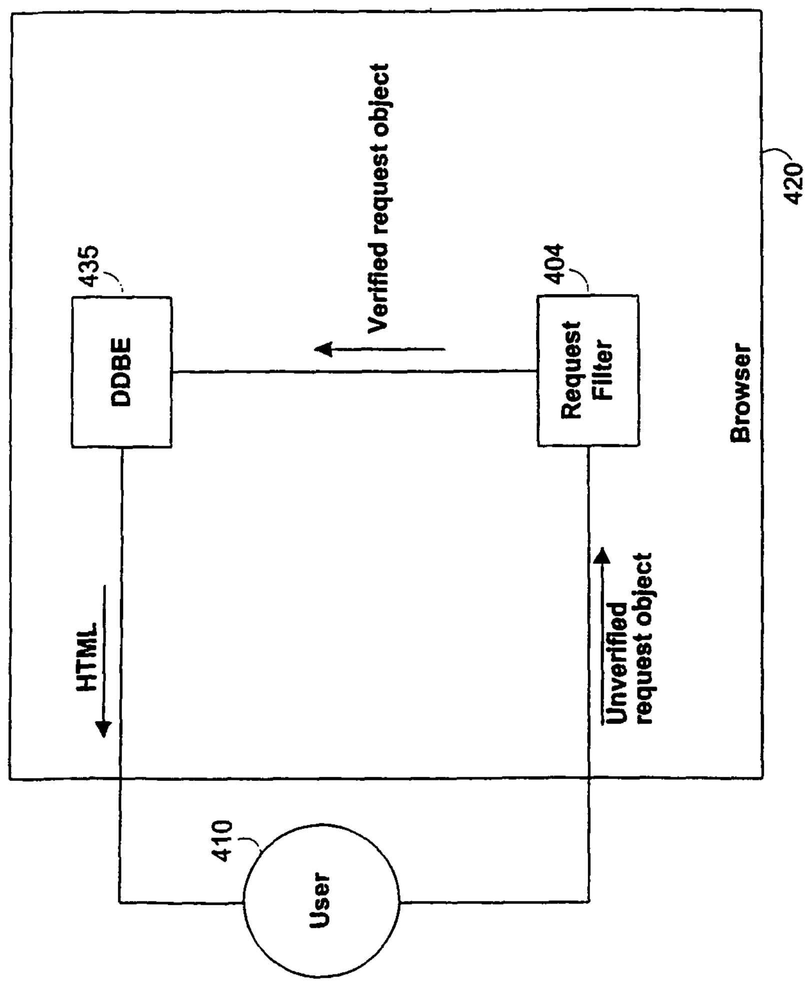
FIG. 18 is an illustrative data flow diagram of a distributed database engine while processing data in accordance with some embodiments of the present invention.
Figure 18A:
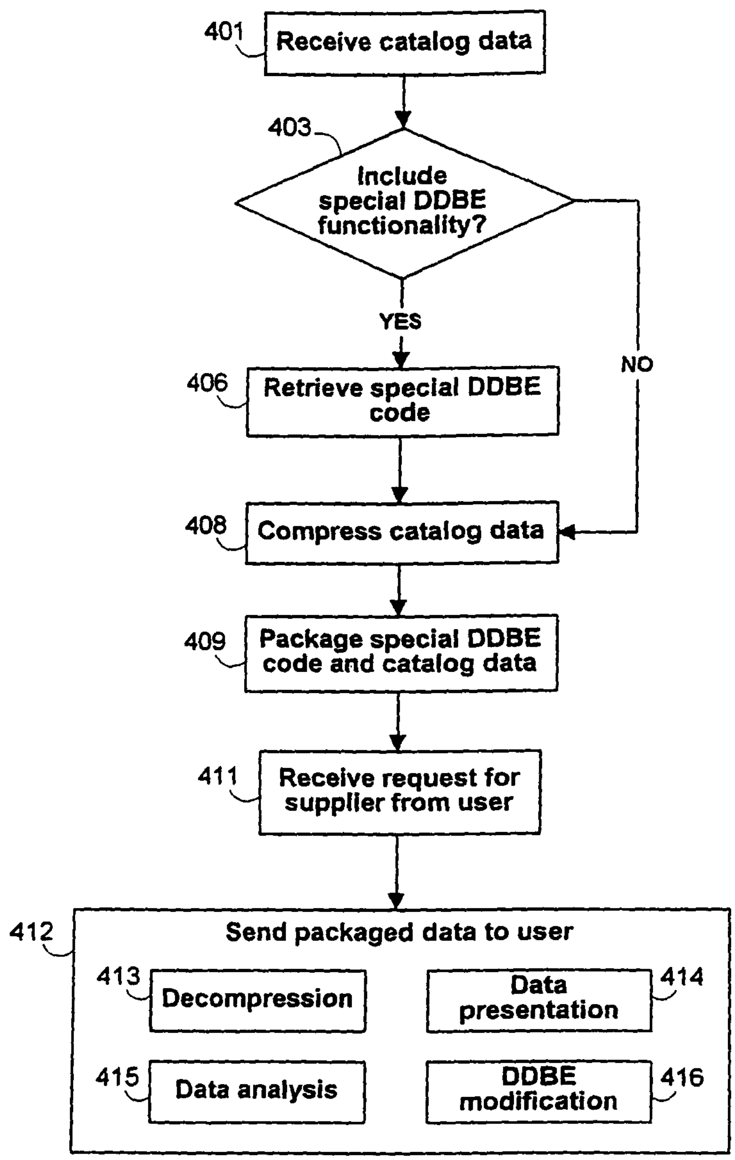

FIG. 18*a* is a generalized flowchart of steps involved in providing data and functionality to a user in accordance with some embodiments of the present invention.

Figure 19:
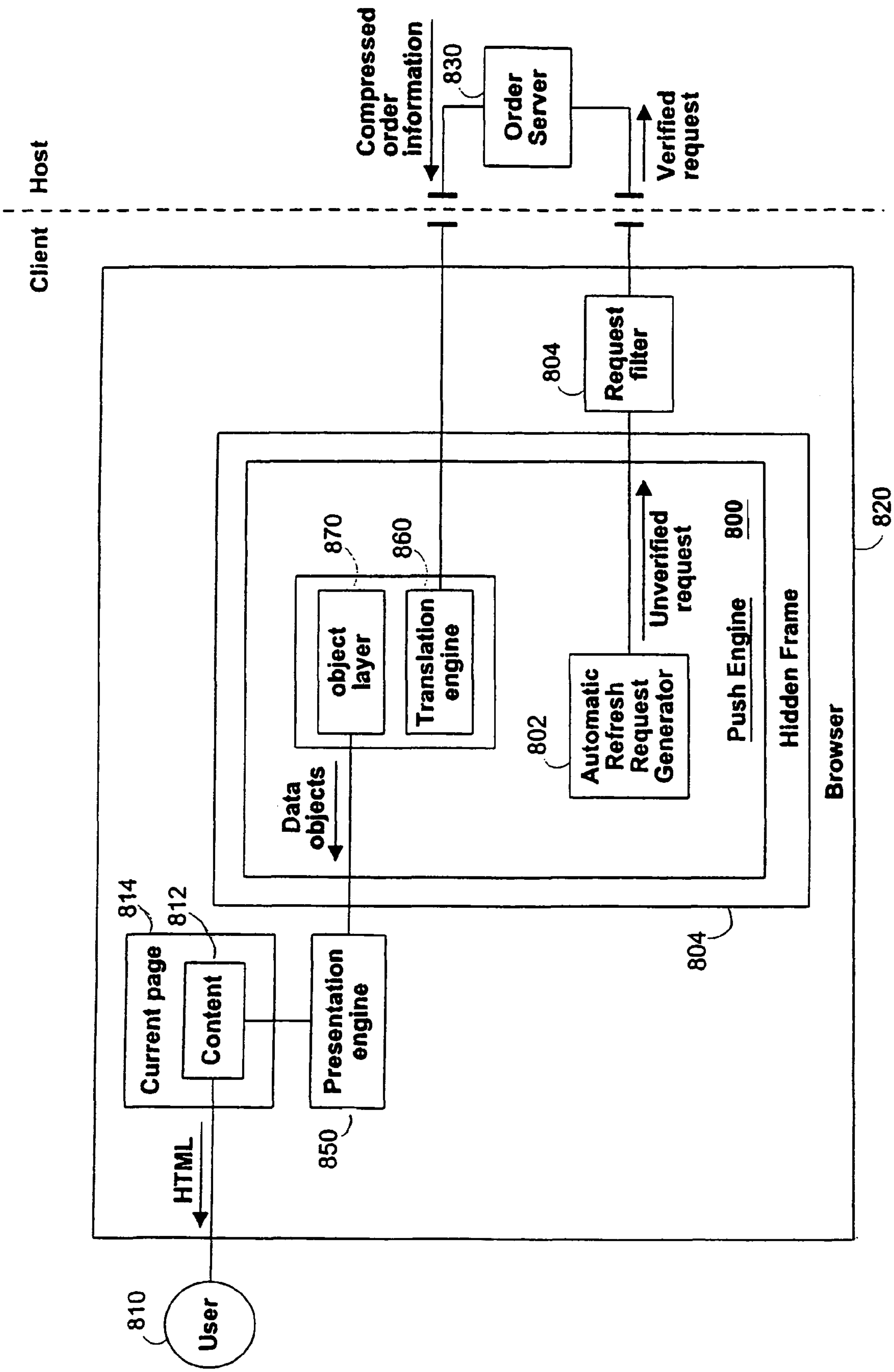

FIG. 19 is a generalized block and data flow diagram of a push engine that has been installed in the browser of a user in accordance with some embodiments of the present invention.

Figure 20:
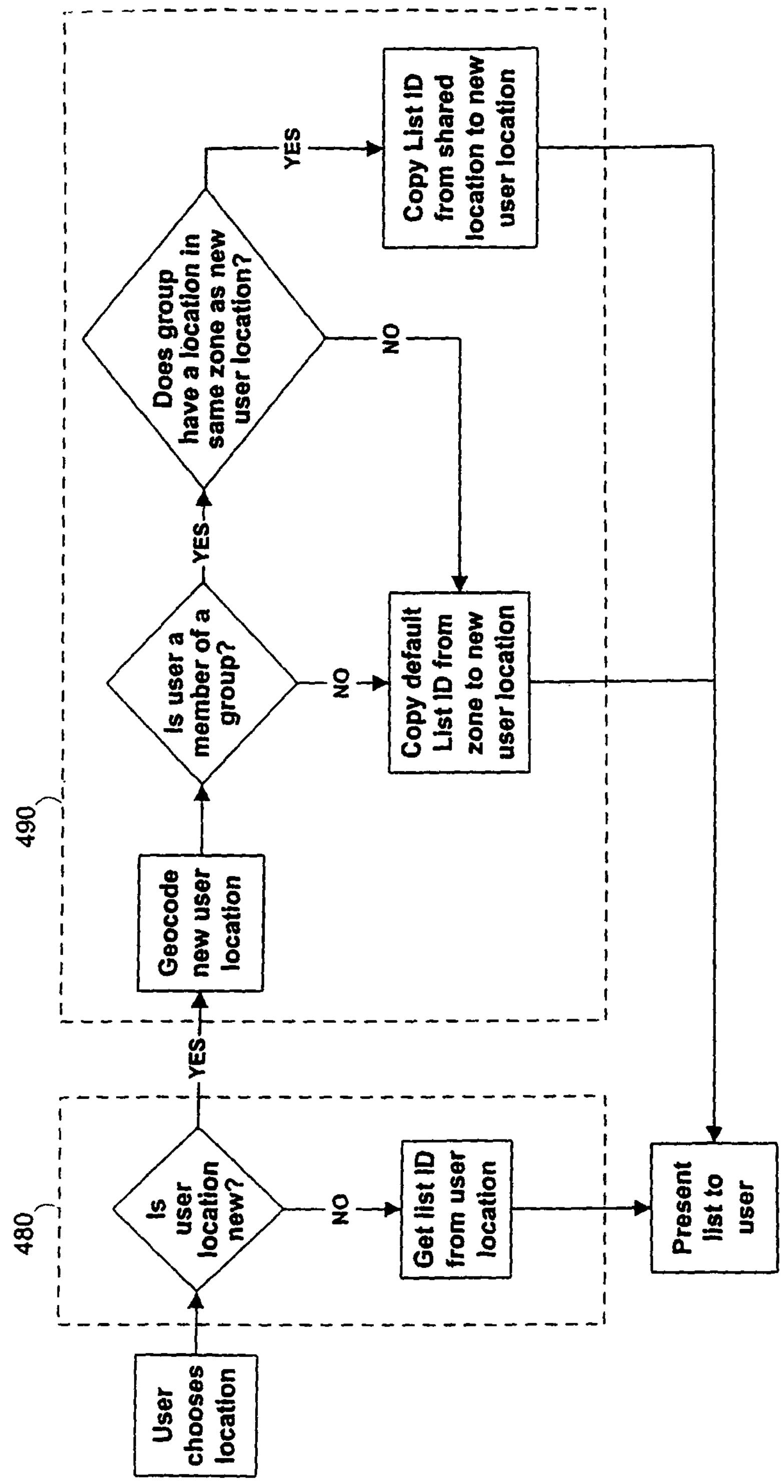

FIG. 20 is a generalized flowchart of steps involved in presenting a user with a list based on geographic location in accordance with some embodiments of the present invention.

Figure 21:
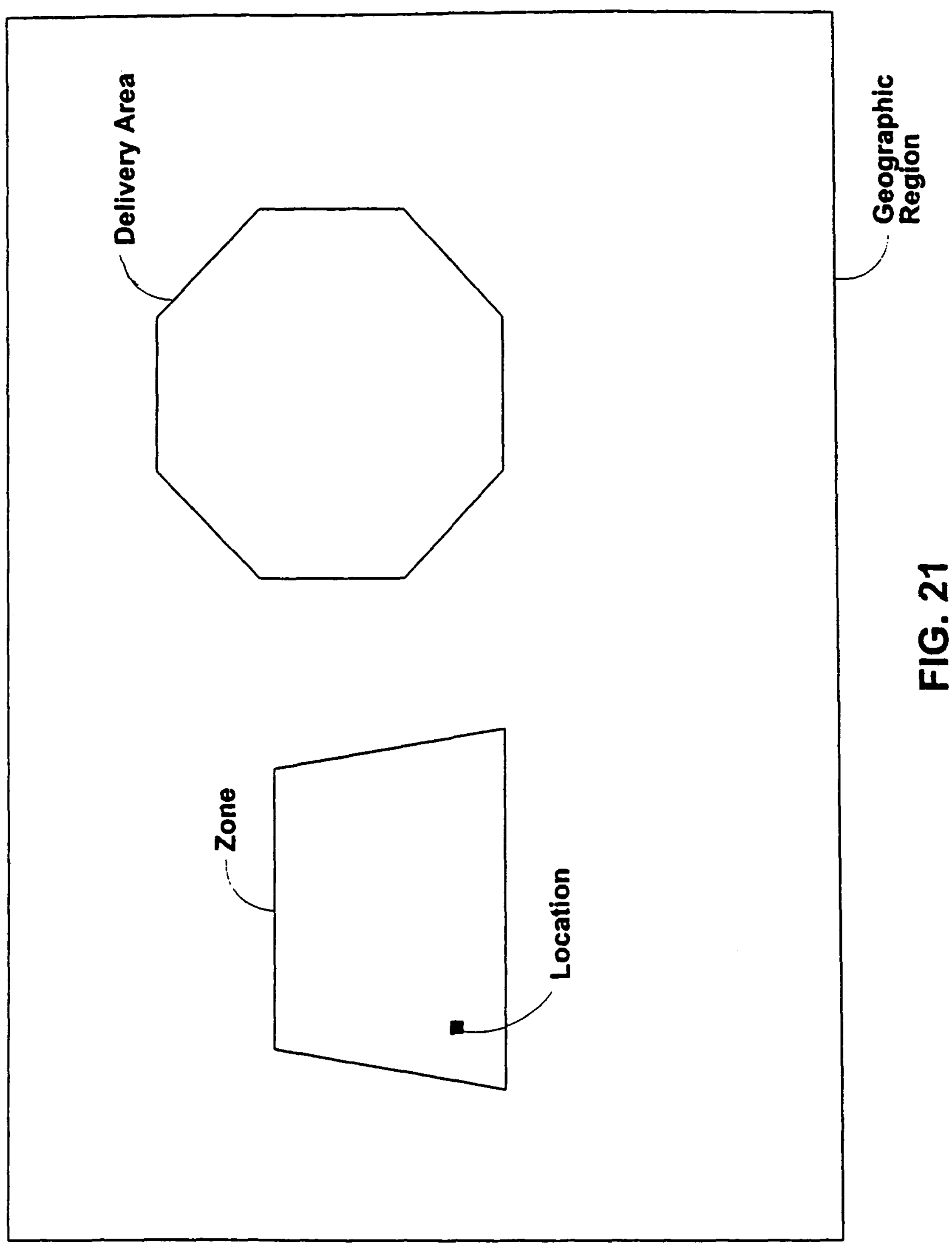
Figure 22:
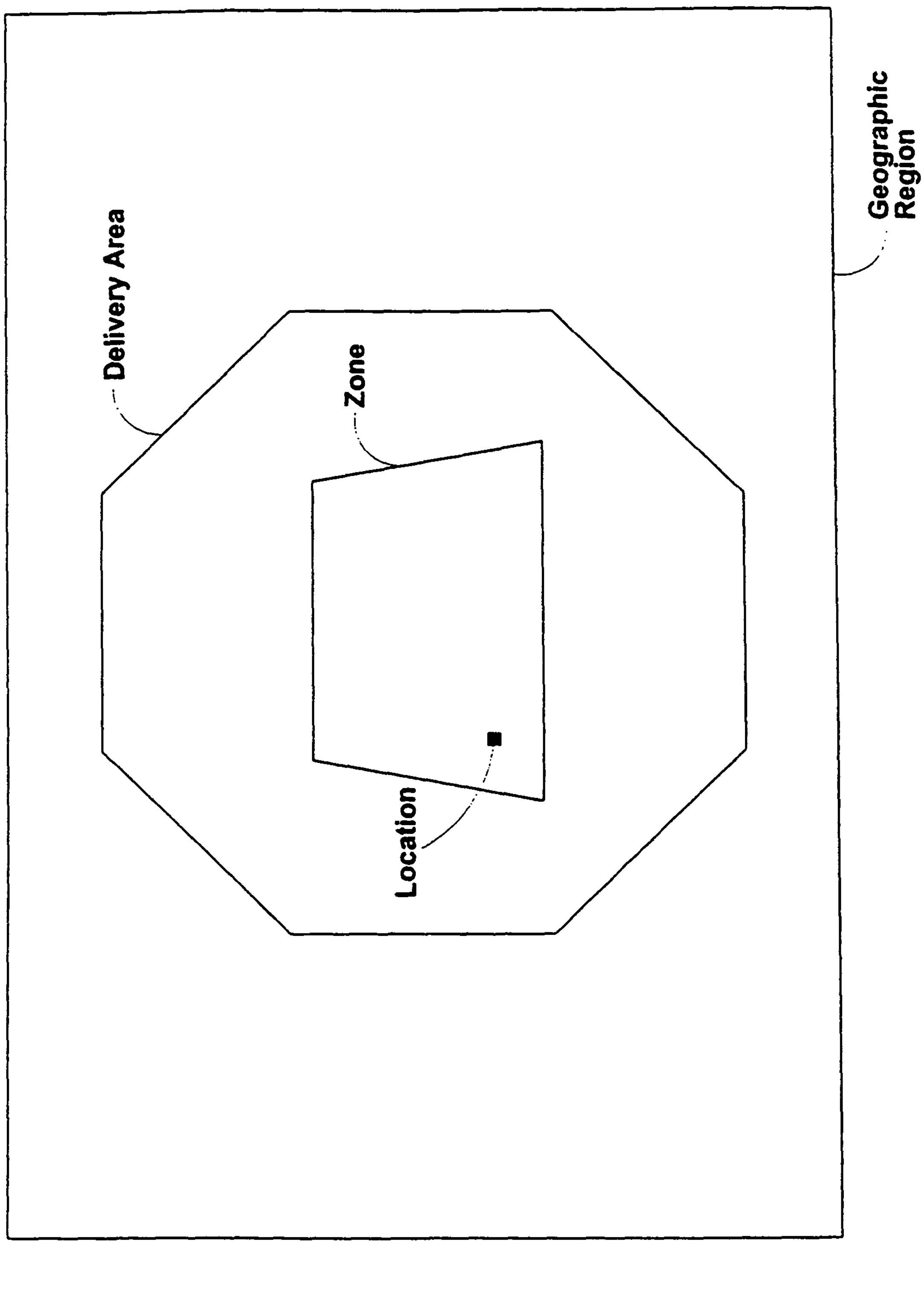
Figure 23:
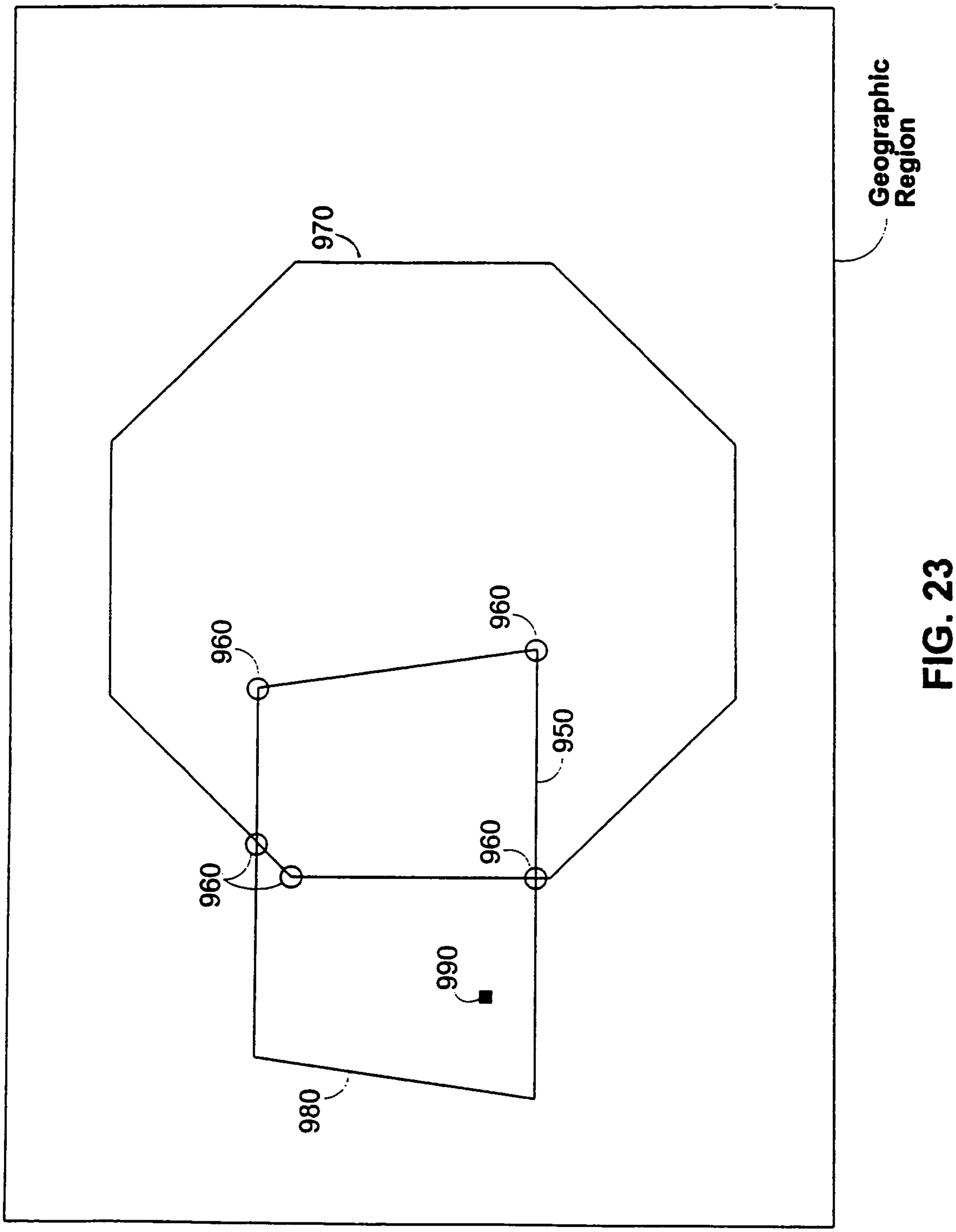

FIGS. 21, 22, and 23 show illustrative examples of relationships between zones and supplier delivery areas in accordance with some embodiments of the present invention.

Figure 24:
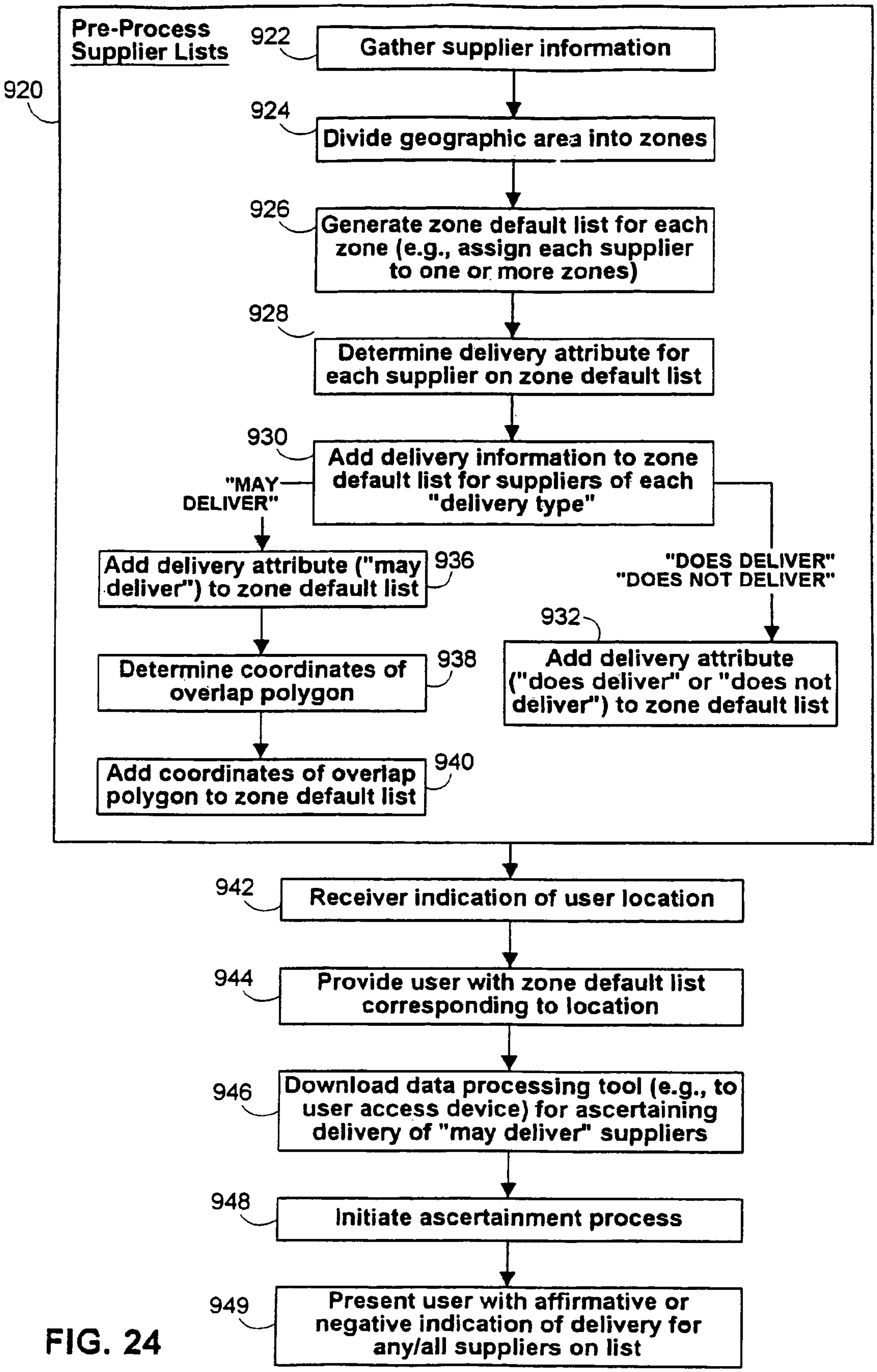

FIG. 24 is a generalized flowchart of steps involved in a geozoning process in accordance with some embodiments of the present invention.

Figure 25:
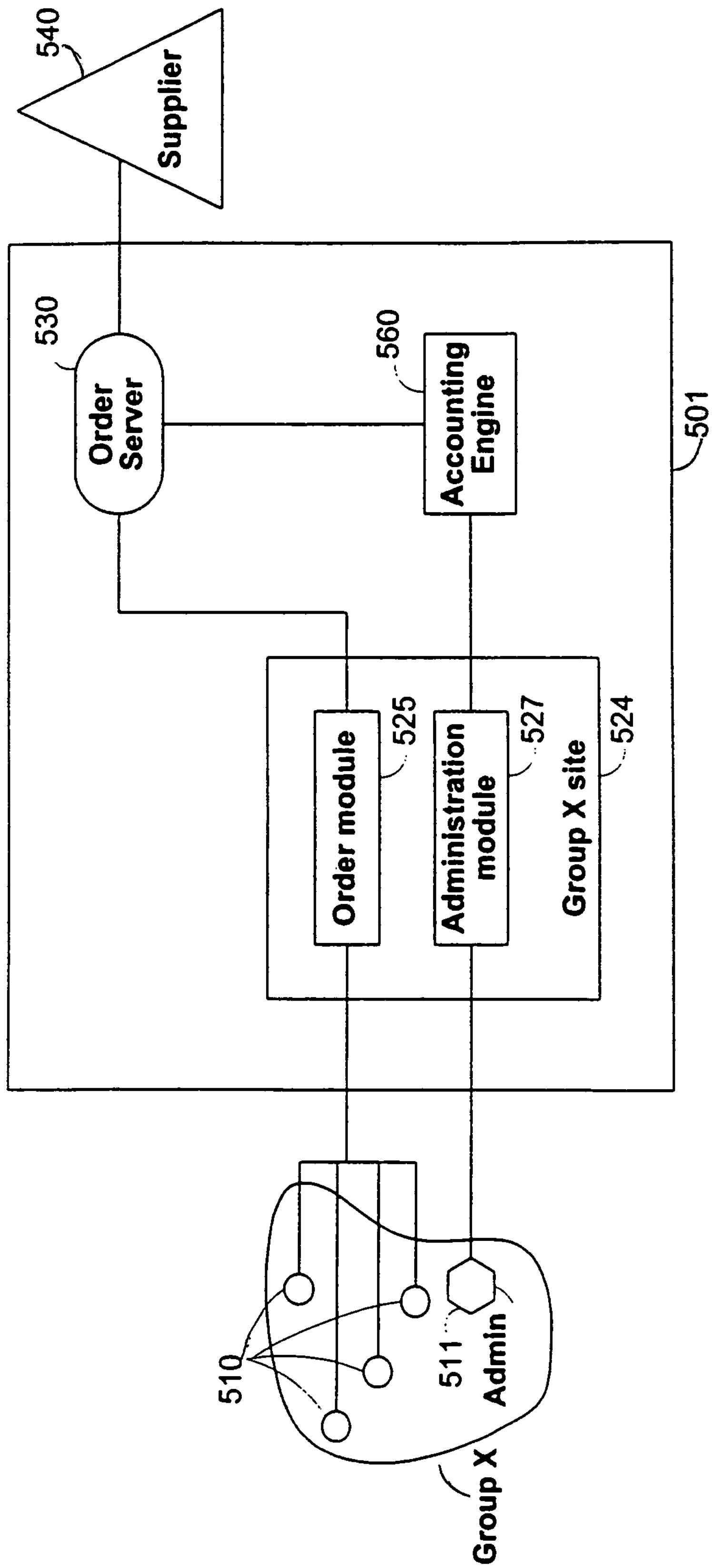

FIG. 25 illustrates a portion of a system for providing accounting code features in accordance with some embodiments of the present invention.

Figure 26:
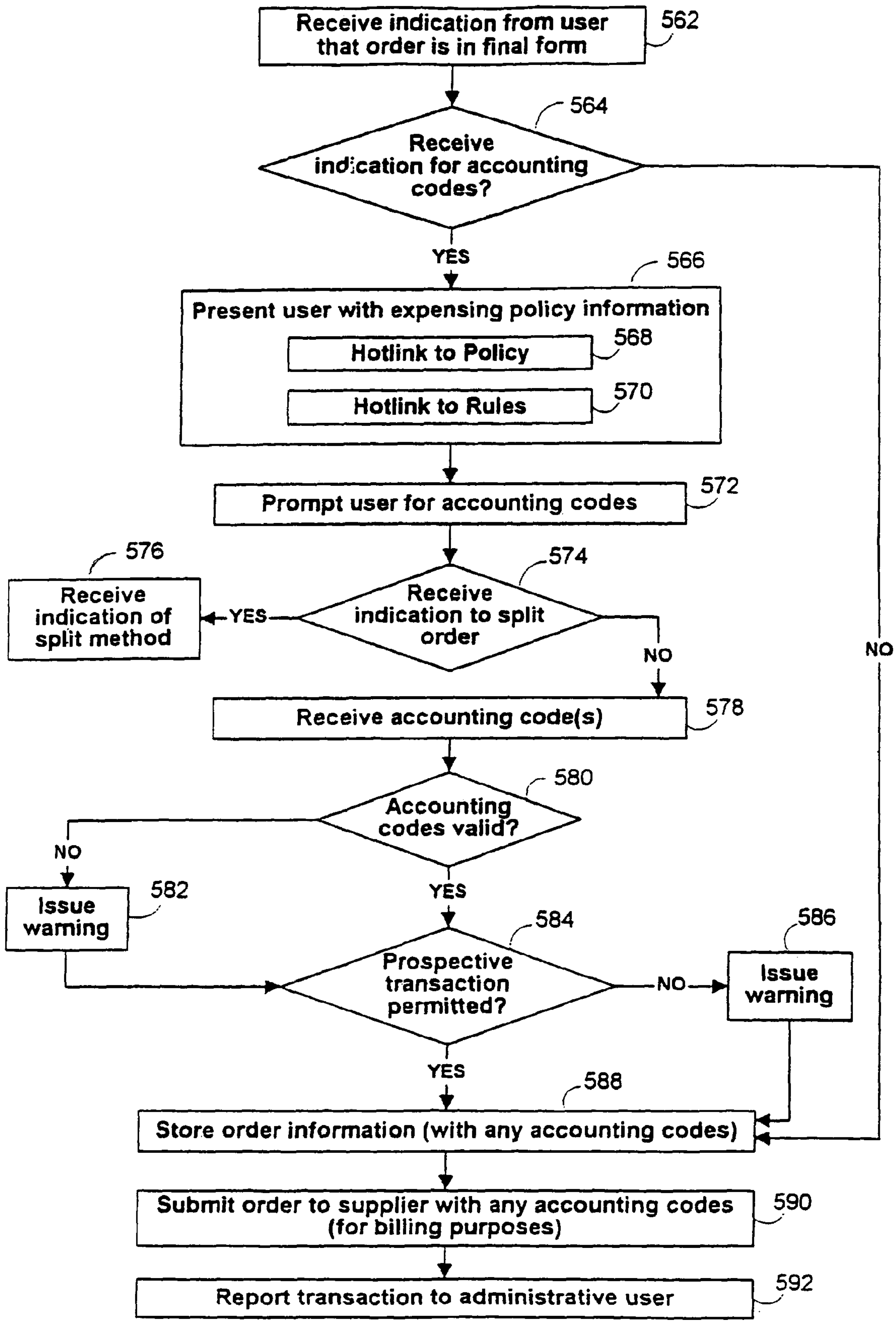

FIG. 26 is a generalized flowchart showing a process for using accounting codes in accordance with some embodiments of the present invention.

Figure 27:
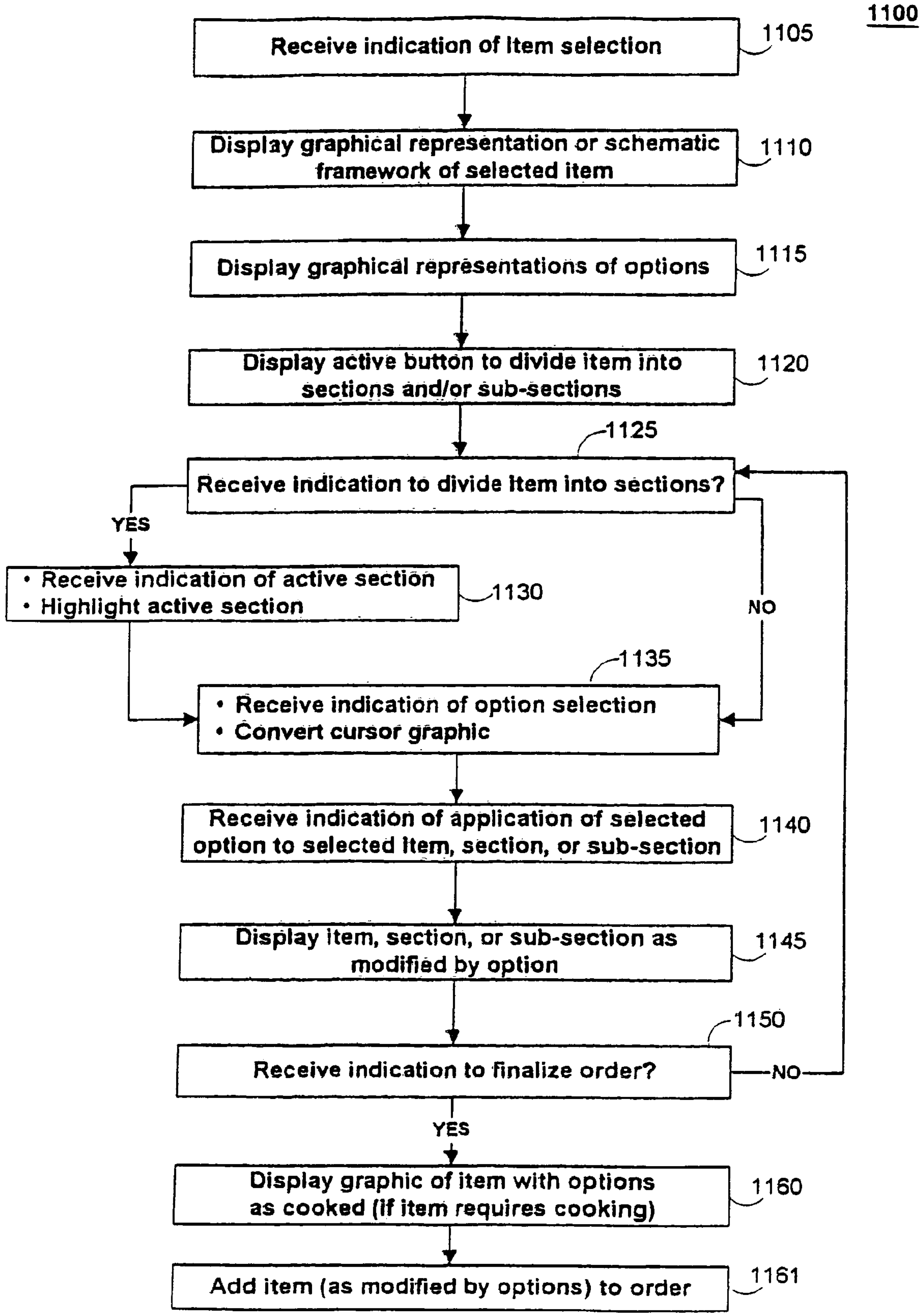

FIG. 27 is a generalized flowchart of steps involved in a graphical custom ordering process in accordance with some embodiments of the present invention.

Figure 28:
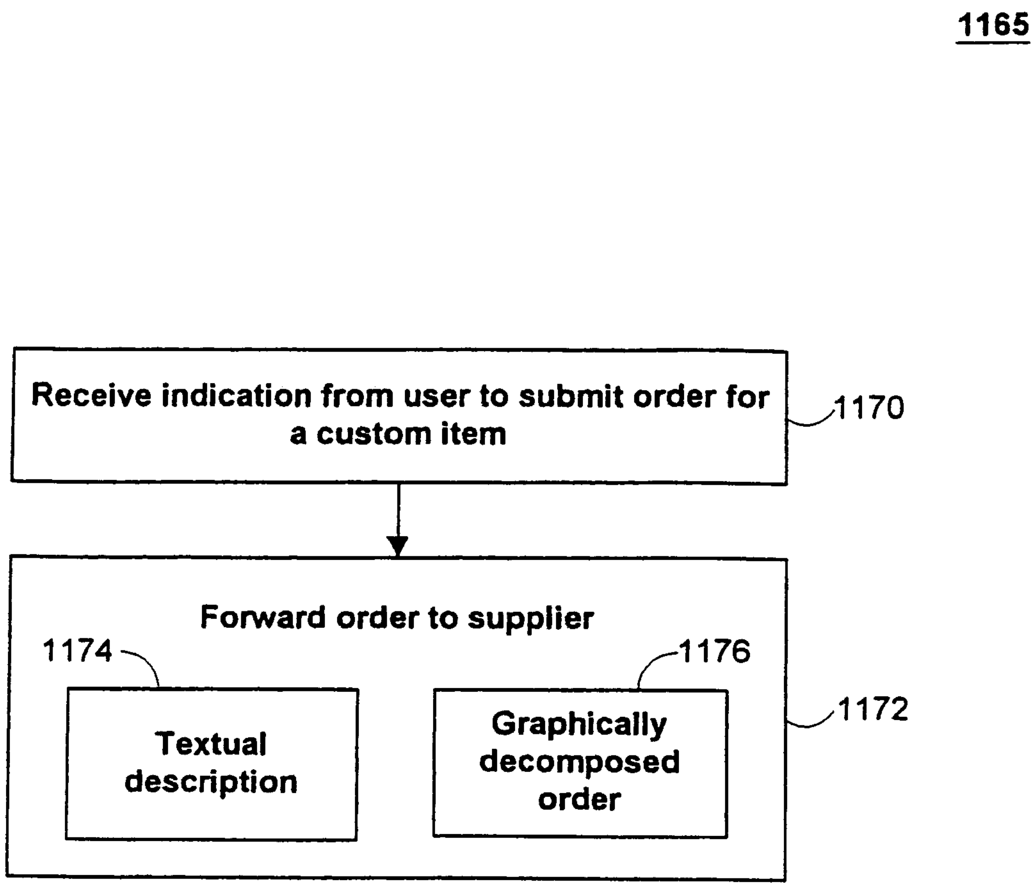

FIG. 28 is a generalized flowchart of steps involved in a graphical order decomposition process in accordance with some embodiments of the present invention.

Figure 29:
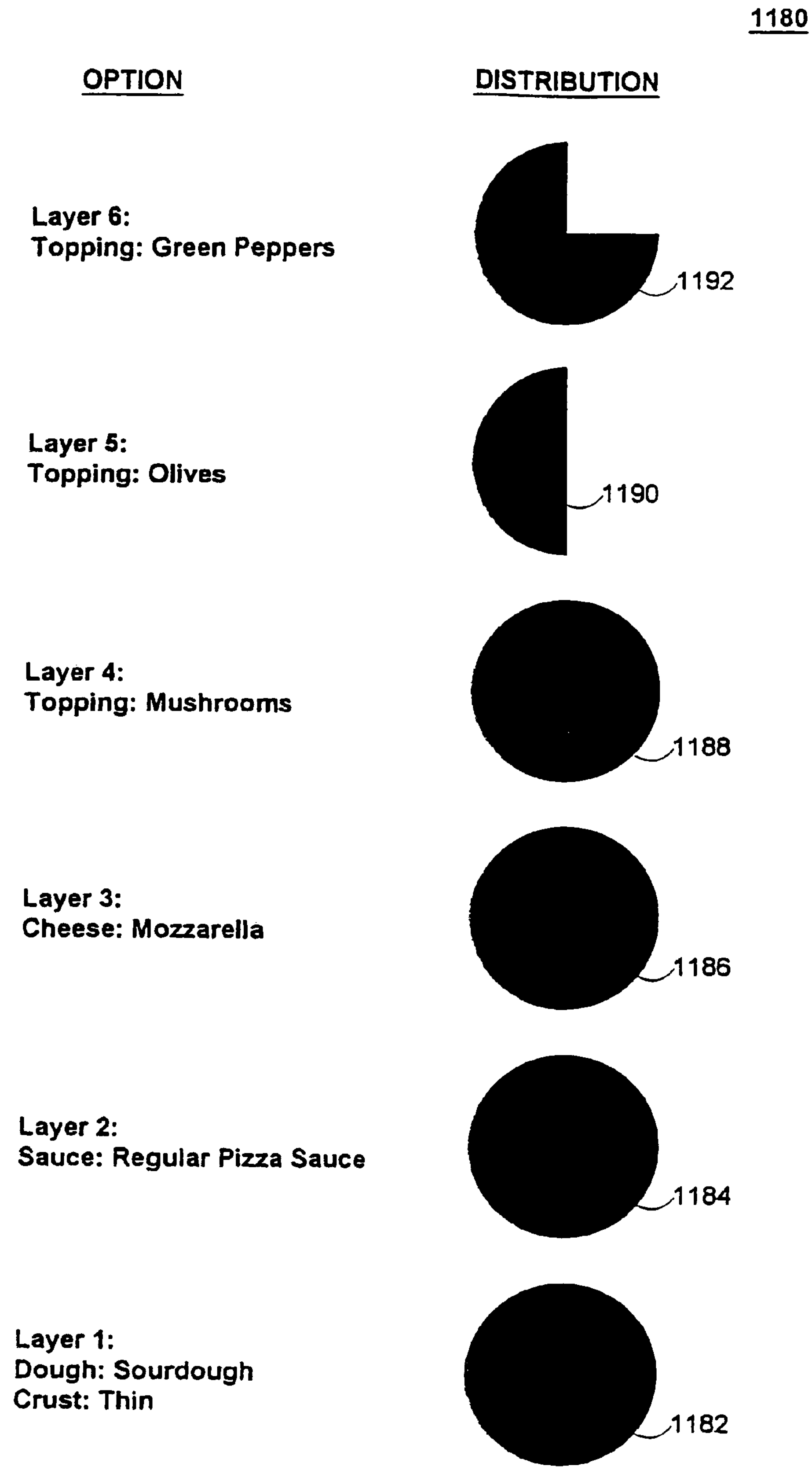

FIG. 29 is a graphical representation of a possible graphical order decomposition in accordance with some embodiments of the present invention.

Figure 30:
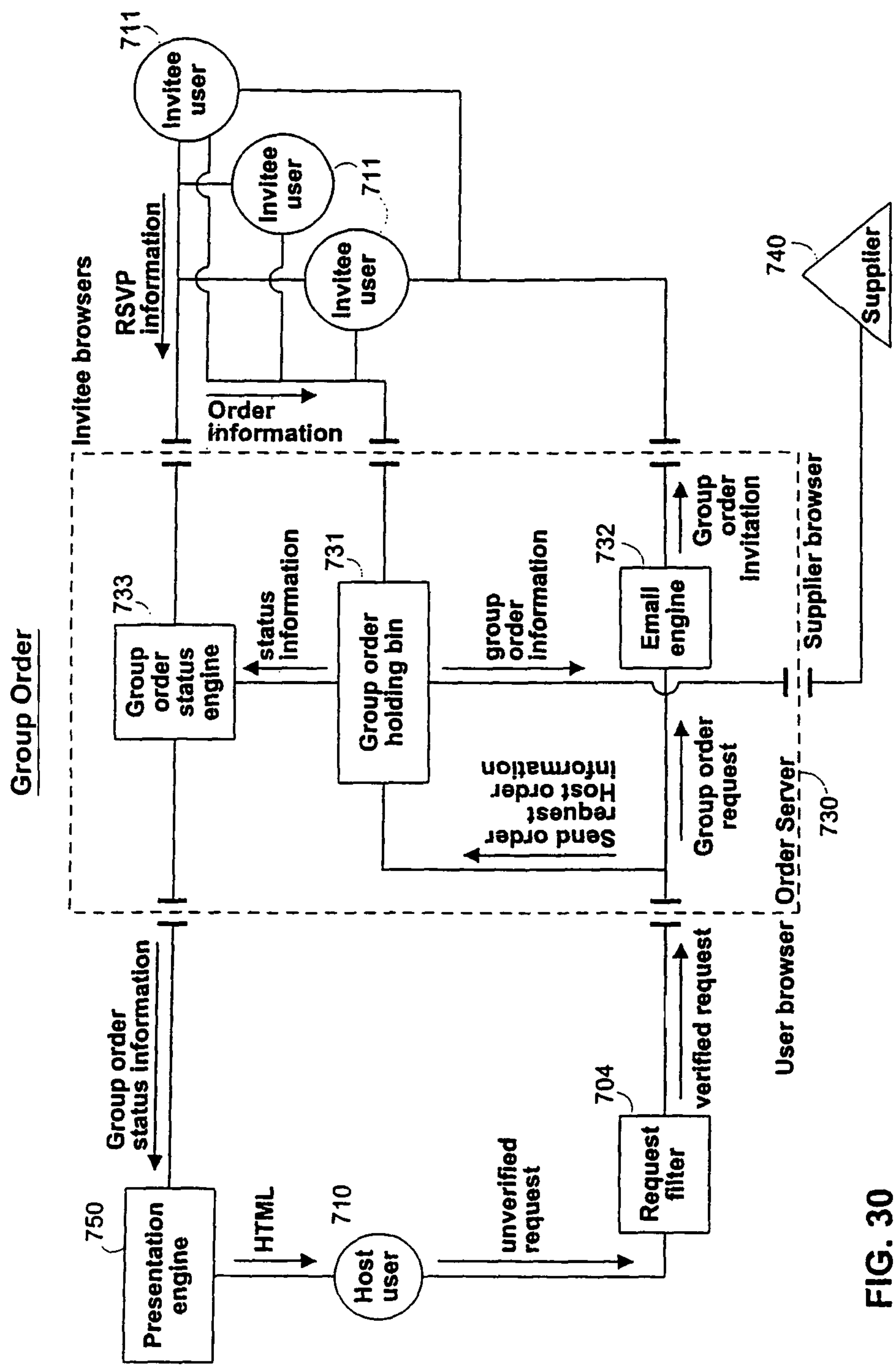

FIG. 30 is a generalized block and data flow diagram representing a group ordering process in accordance with some embodiments of the present invention.

Figure 31:
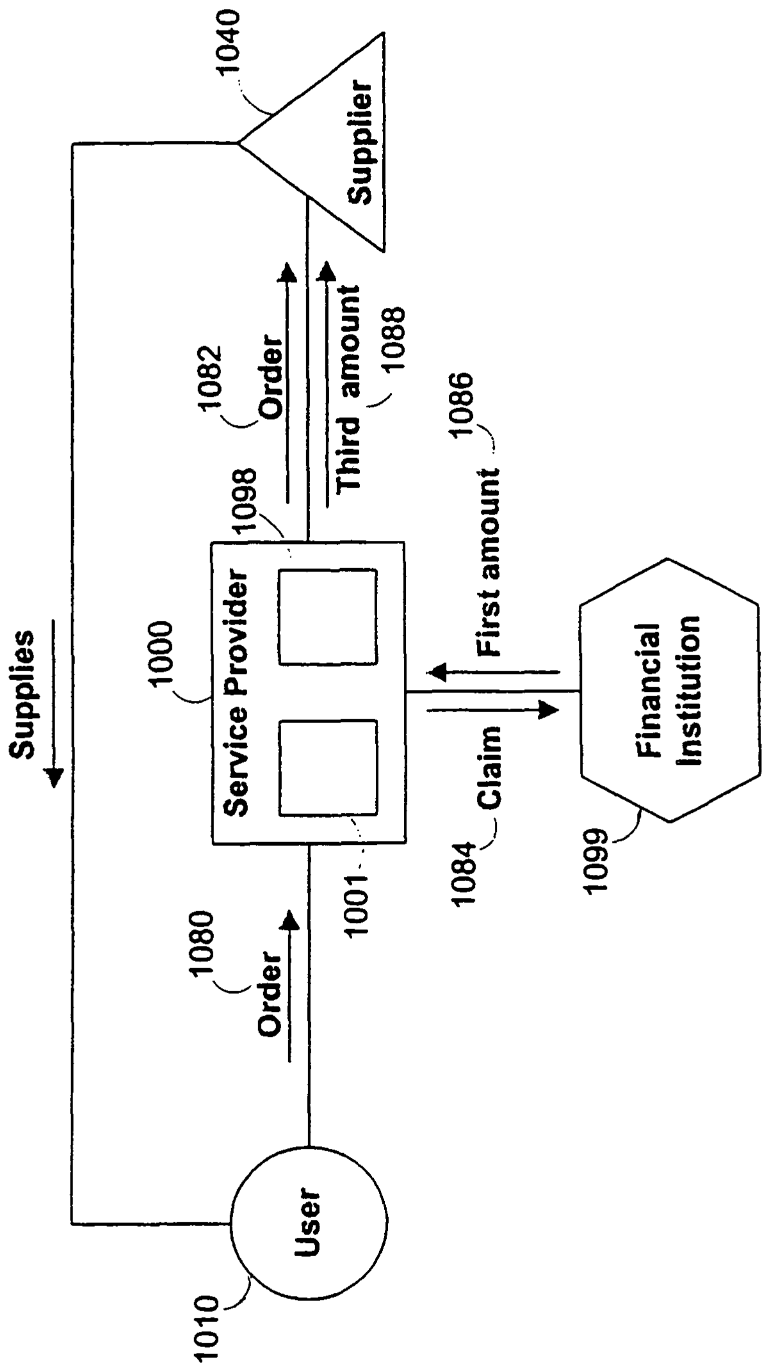

FIG. 31 illustrates a portion of a system for providing credit card pricing features in accordance with some embodiments of the present invention.

Figure 32:
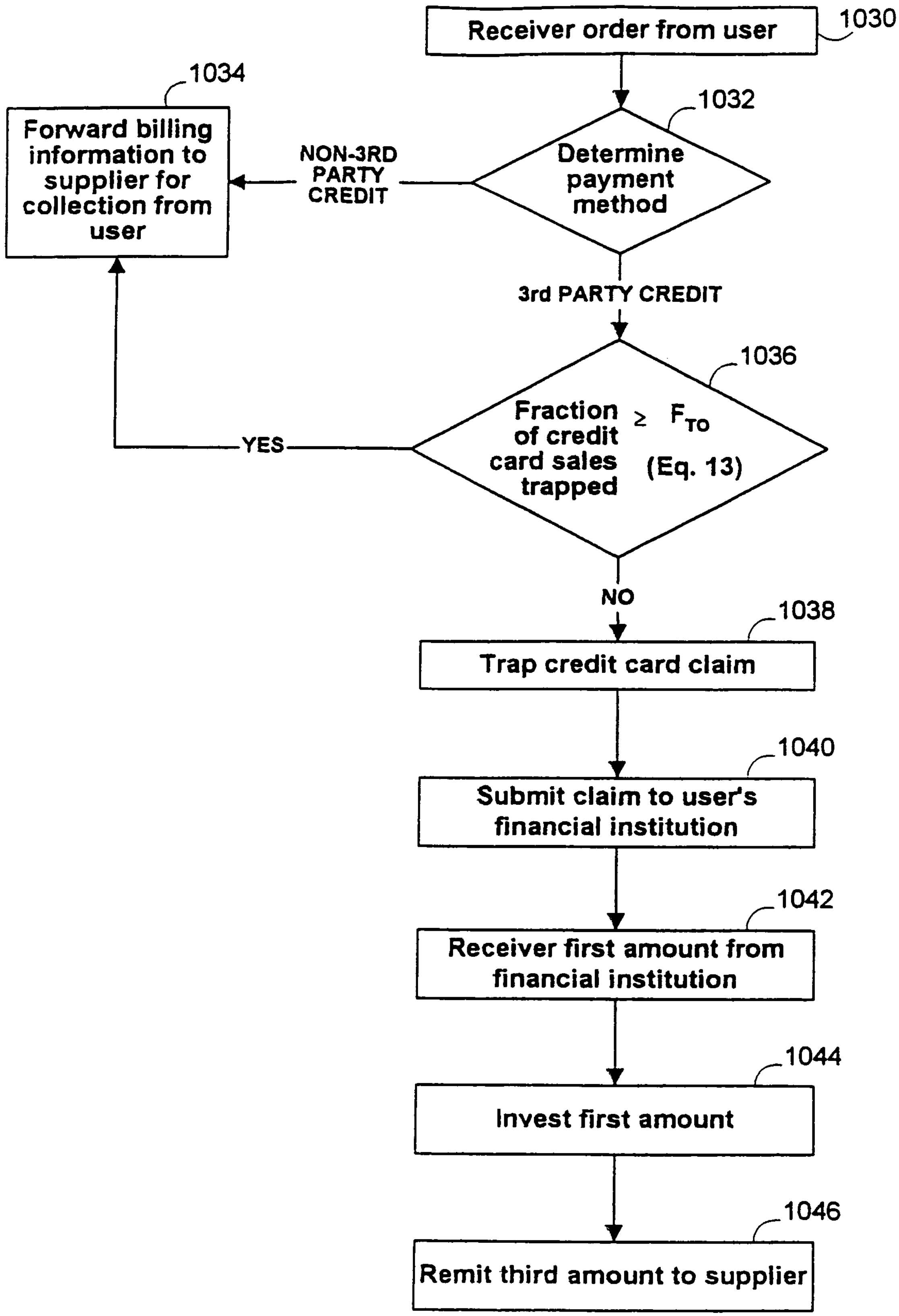

FIG. 32 is a generalized flow chart showing processes for using credit card pricing features in accordance with some embodiments of the present invention.

Figure 33:
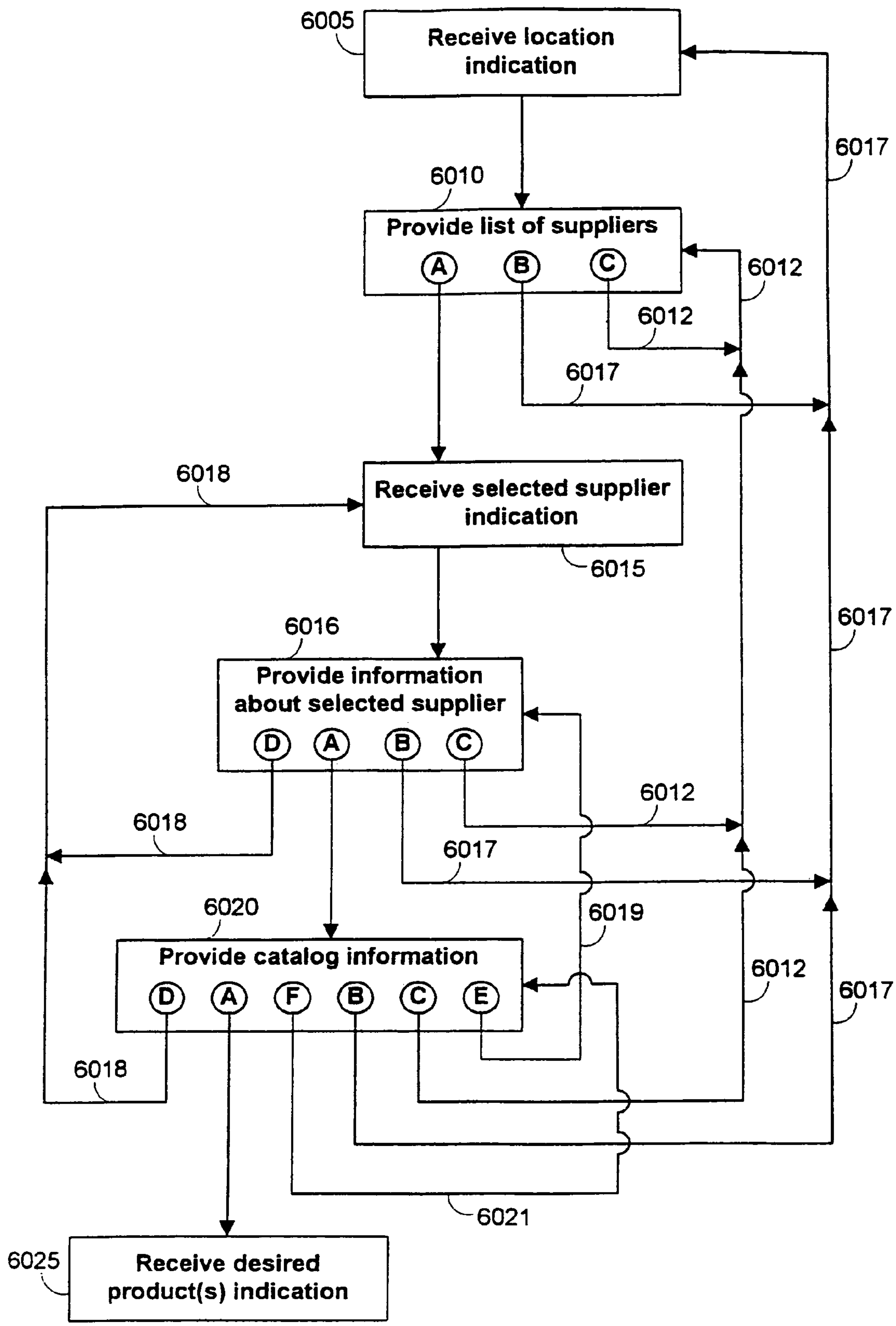

FIG. 33 is a generalized flowchart of steps involved in the ordering process in accordance with some embodiments of the present invention.

Figure 34:
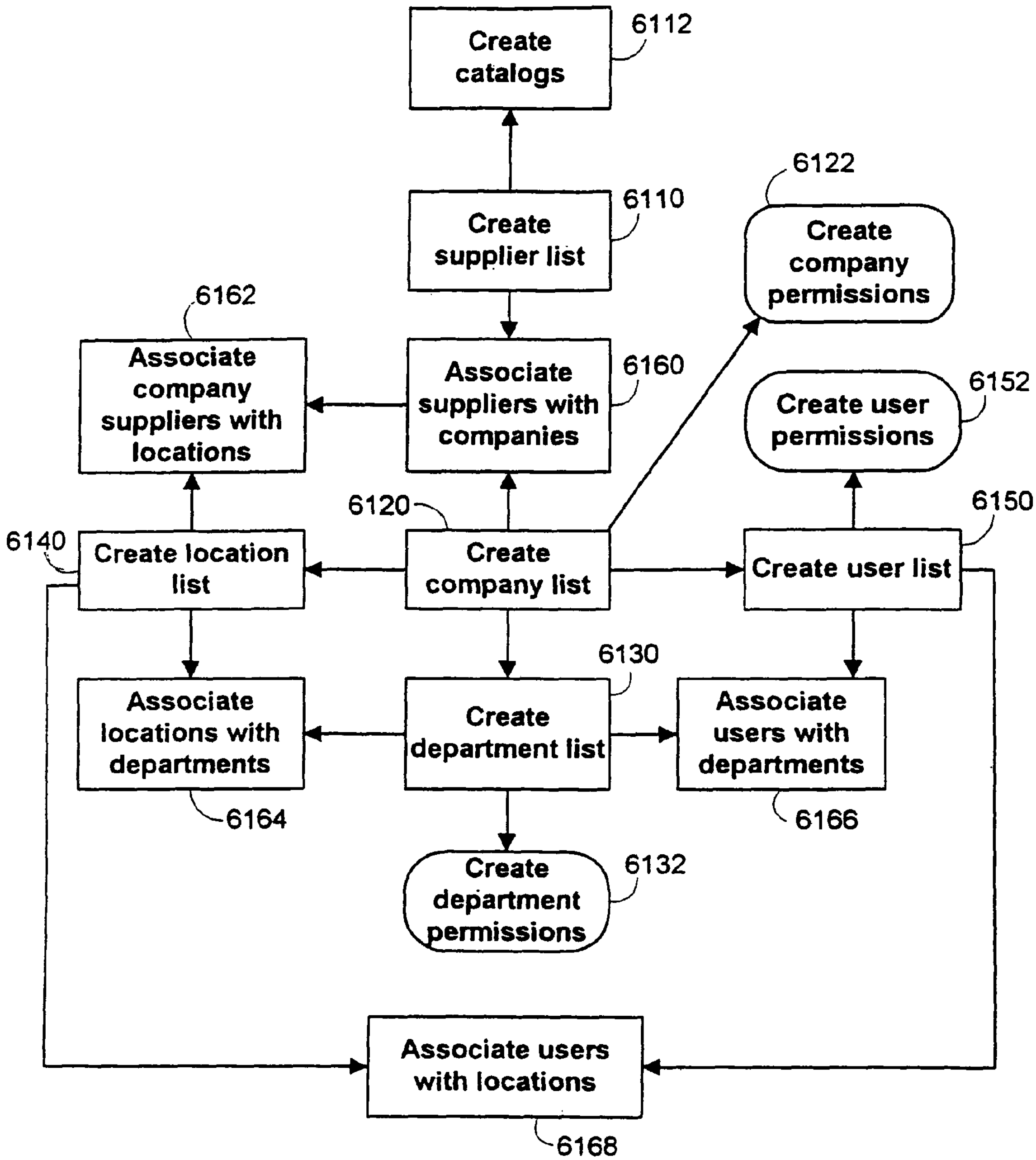

FIG. 34 is a generalized flowchart of steps involved in allowing users to access the system in accordance with some embodiments of the present invention.

Figure 35:
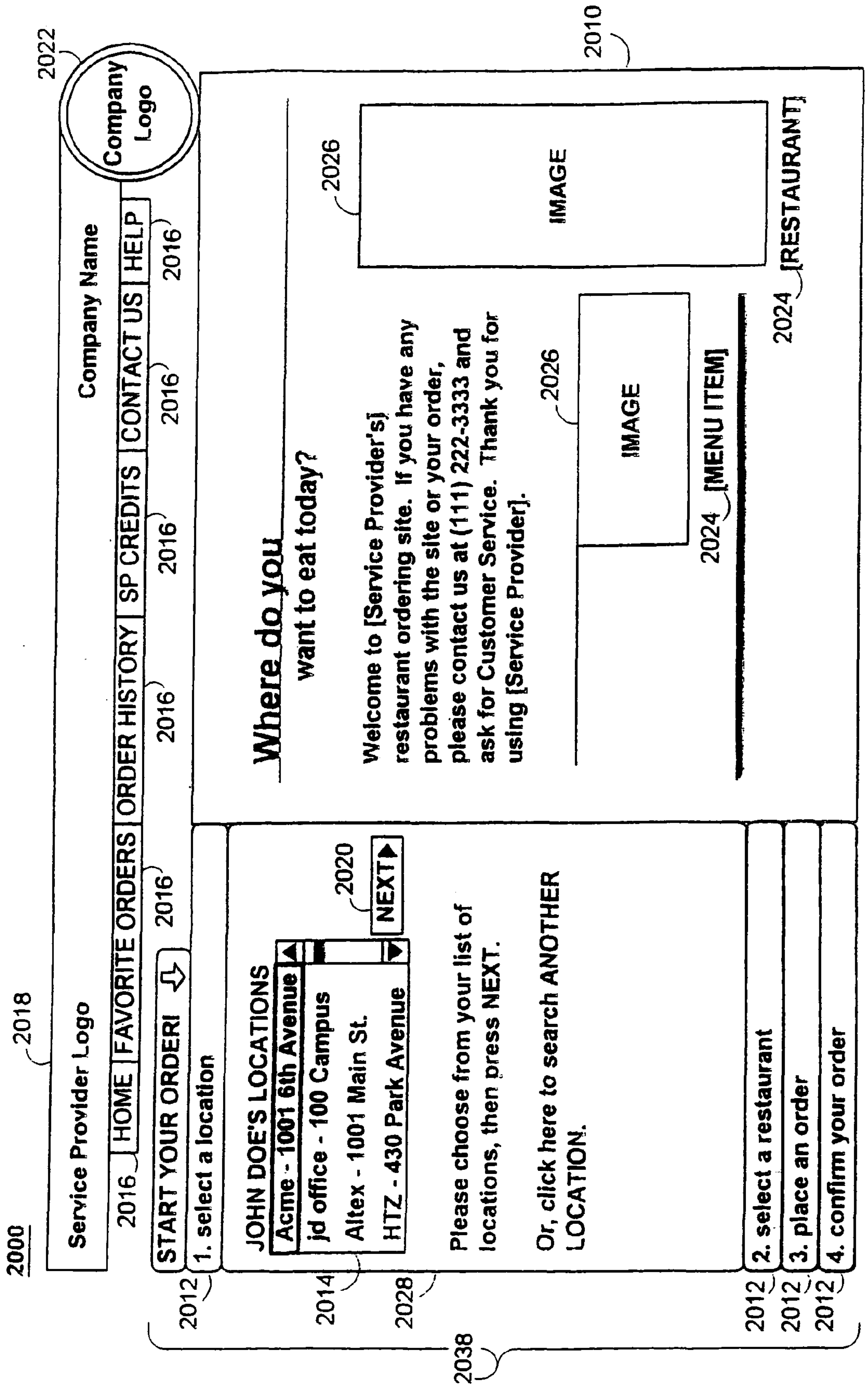

FIG. 35 shows an illustrative display for showing users one or more locations and allowing and receiving indications of locations in accordance with some embodiments of the present invention.

Figure 36:
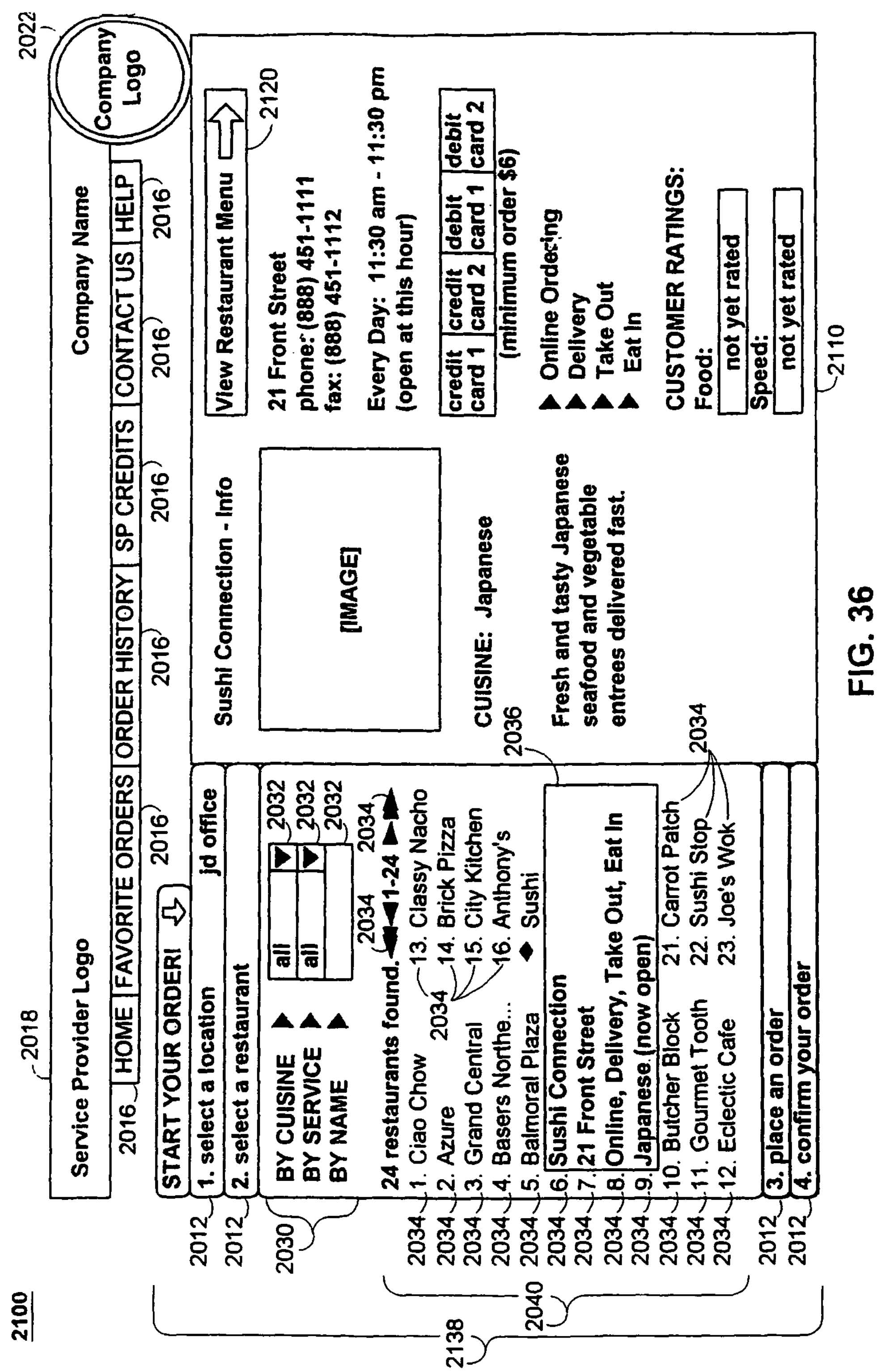

FIG. 36 shows an illustrative display that may be used to show users a list of suppliers and information pertaining to the suppliers. FIG. 36 may allow the system to receive indications of preferred suppliers in accordance with some embodiments of the present invention.

Figure 37:
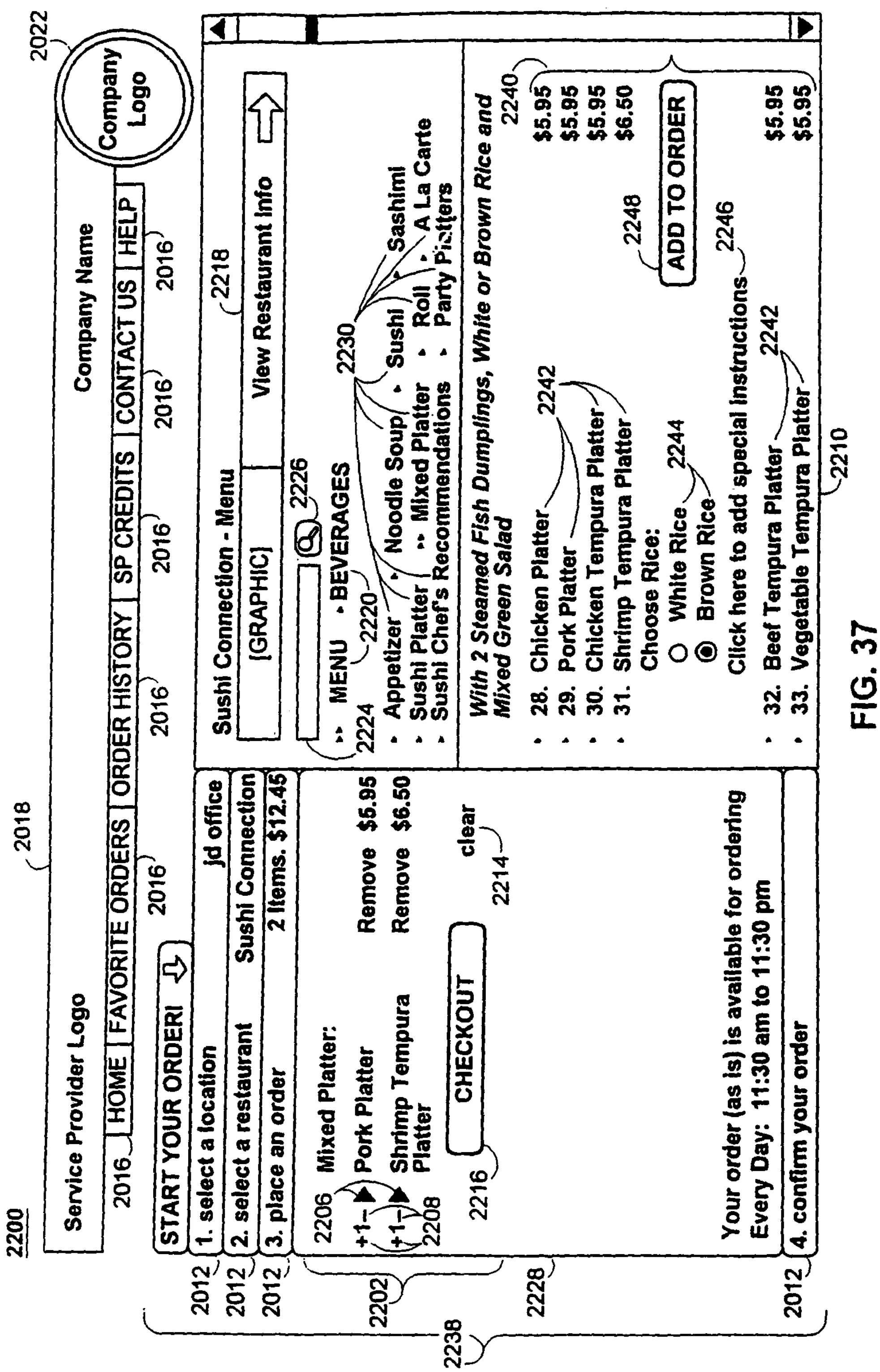

FIG. 37 shows an illustrative display that may be used to show users a supplier catalog and to accept user indications of desired products in accordance with some embodiments of the present invention.

Figure 38:
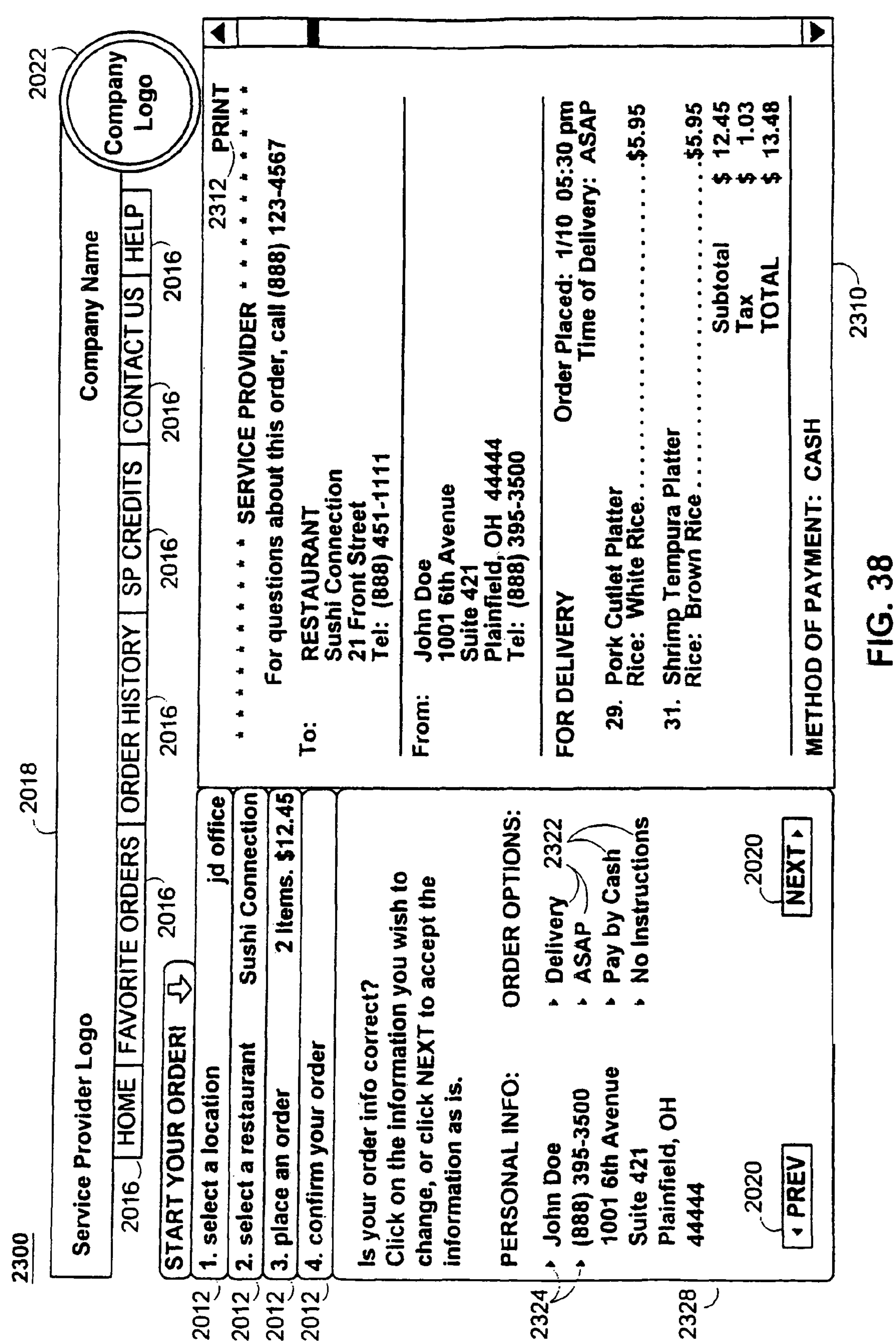

FIG. 38 shows an illustrative display that may be used to show users order information and accept user indications of ordering preferences in accordance with some embodiments of the present invention.

Figure 39:
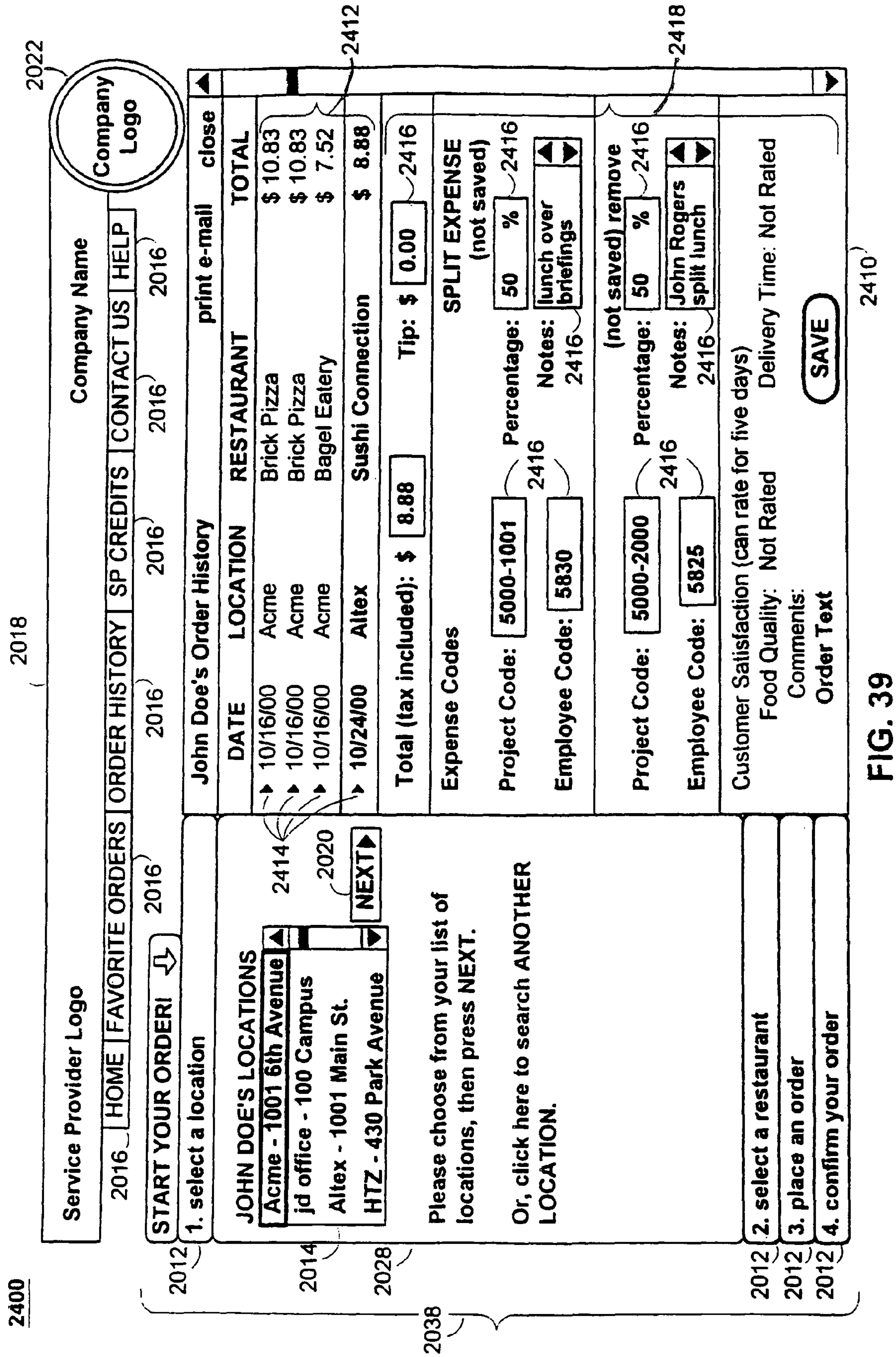

FIG. 39 shows an illustrative display that may be used to show users information about past orders, receive accounting data, and receive user indications of location in accordance with some embodiments of the present invention.

Figure 40:
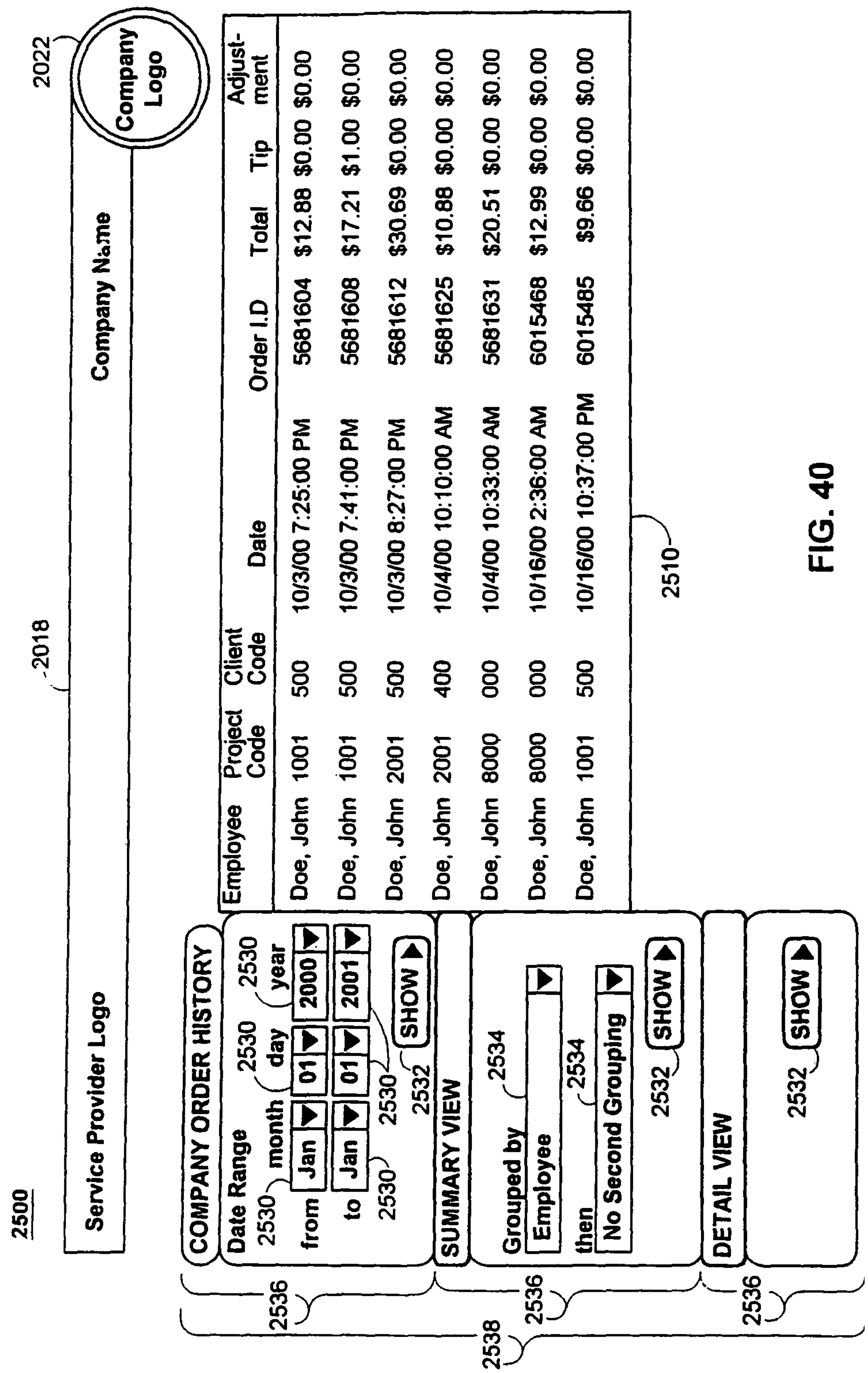

FIG. 40 shows an illustrative display that may be used to show users past order and/or accounting data. It may be used to allow the system to receive user indications of desired methods of sorting the data that it displays in accordance with some embodiments of the present invention.

Figure 41:
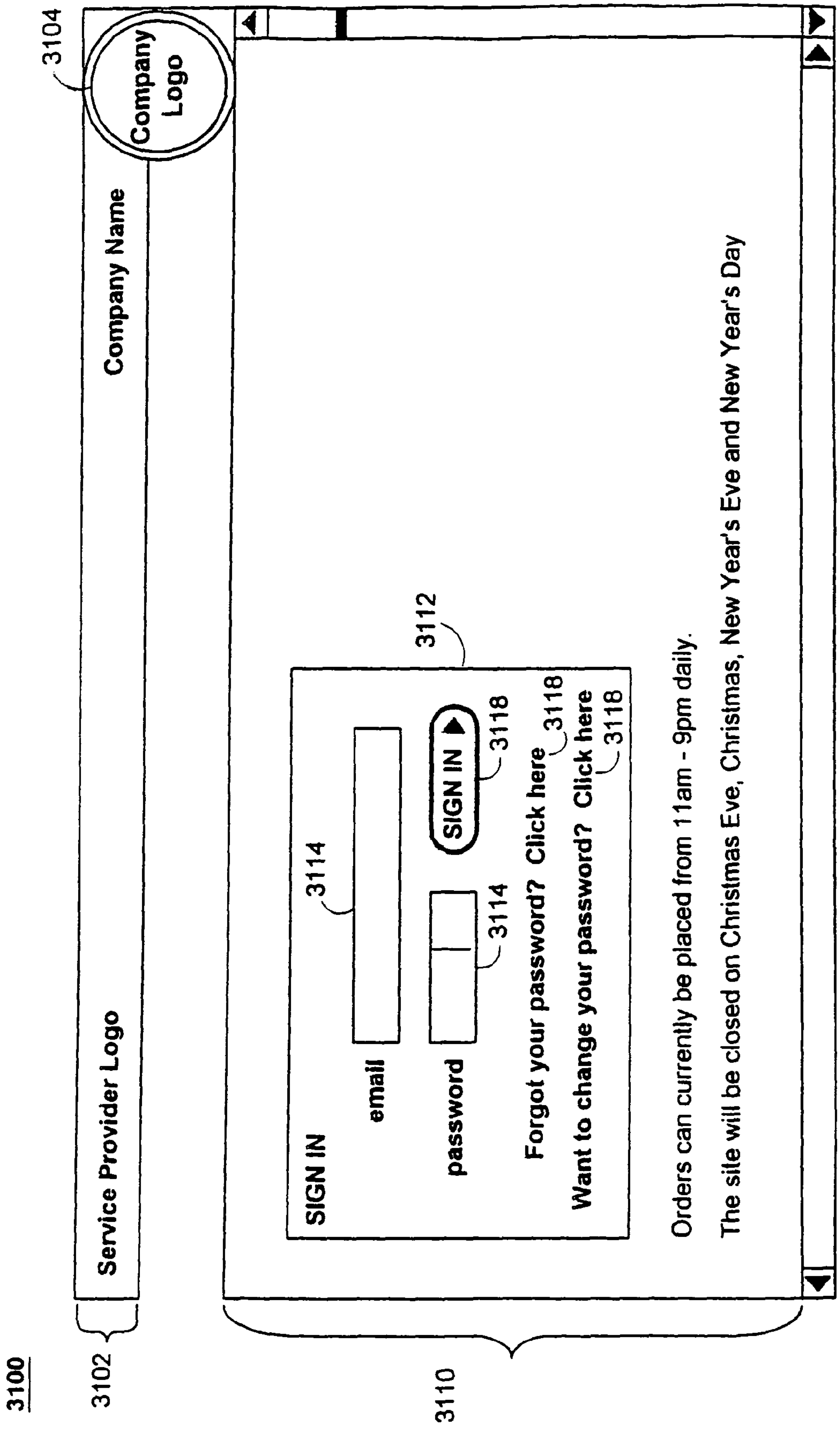
Figure 42:
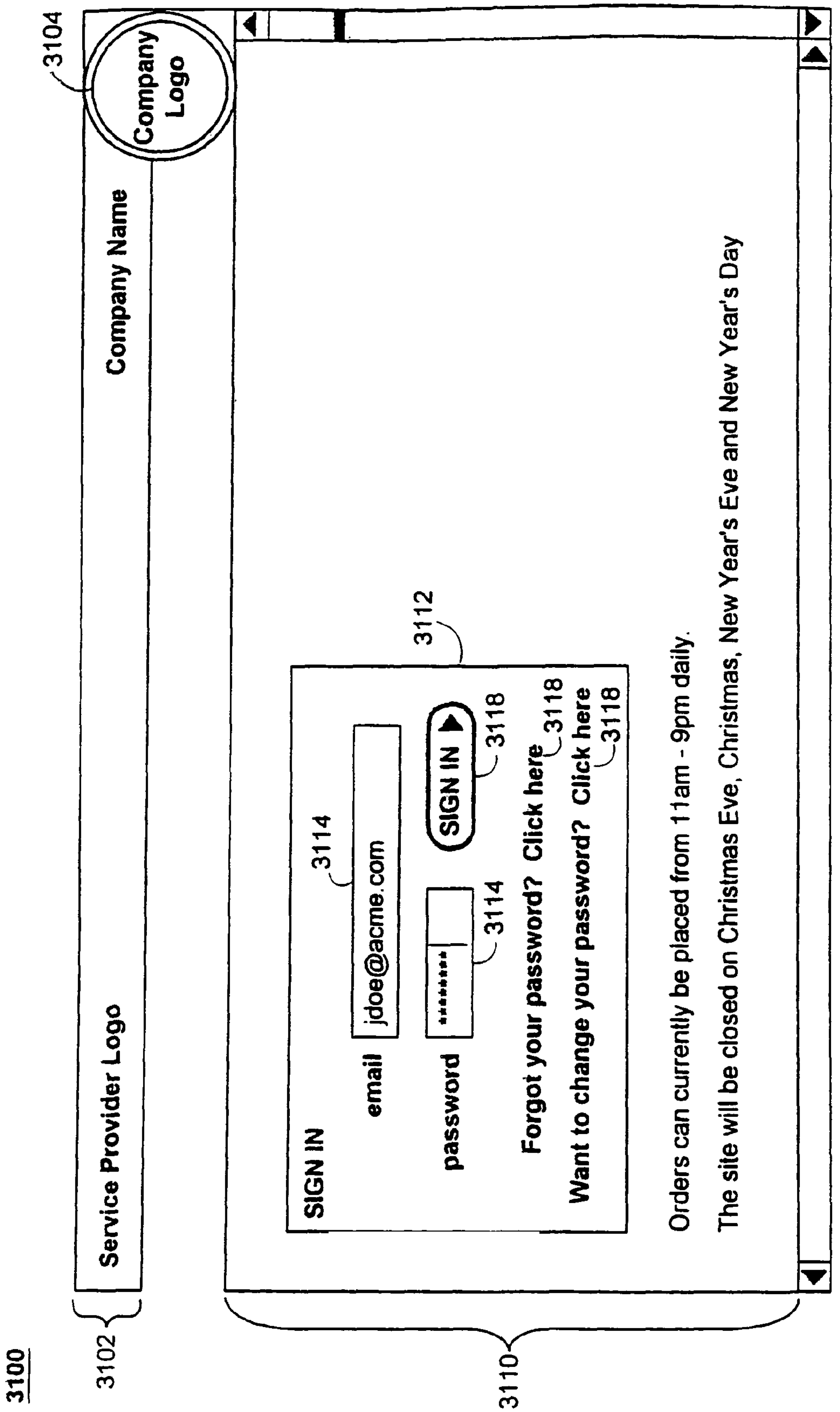

FIGS. 41 and 42 show illustrative displays that may be used by a user to login to the system in accordance with some embodiments of the present invention.

Figure 43:
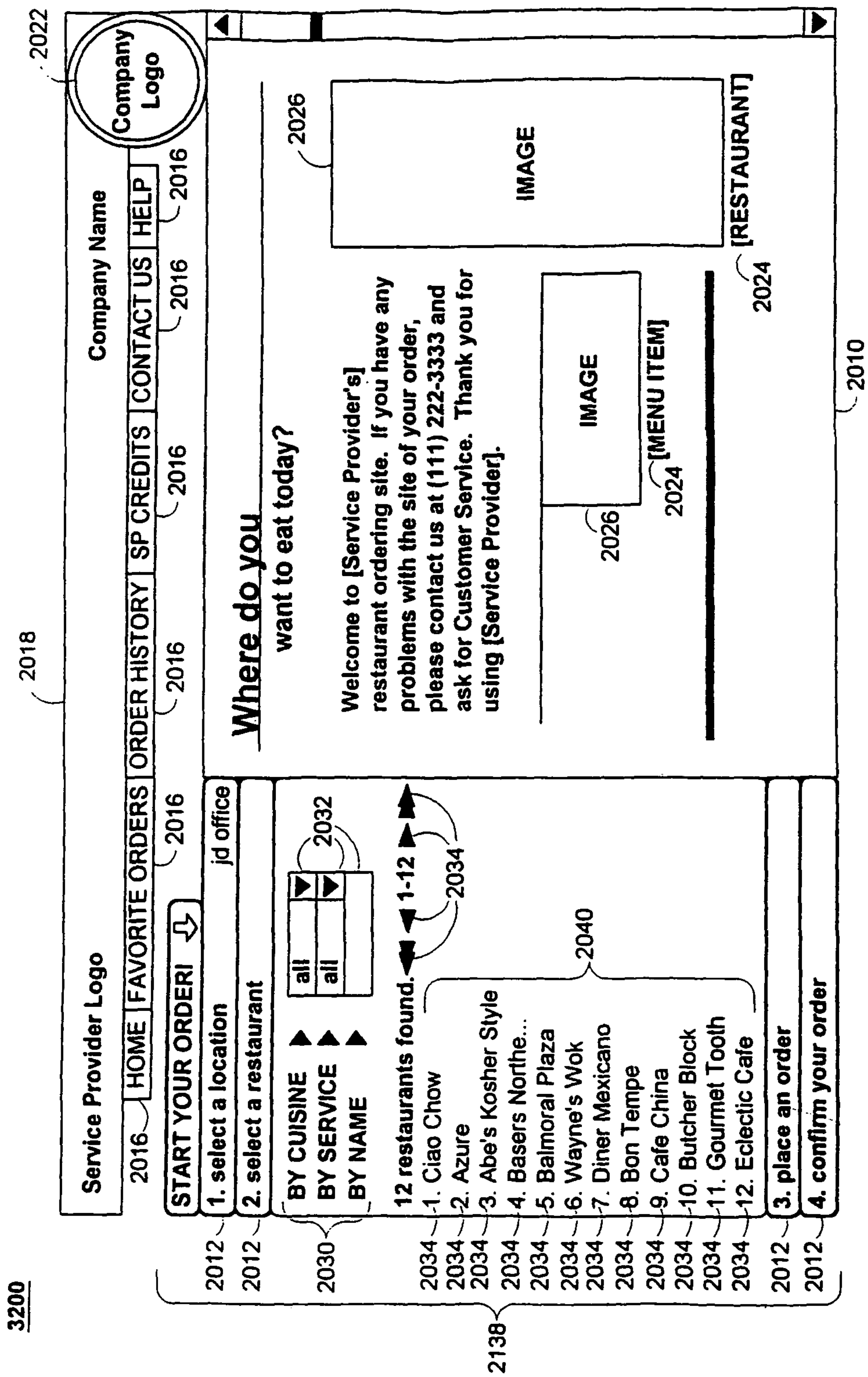
Figure 44:
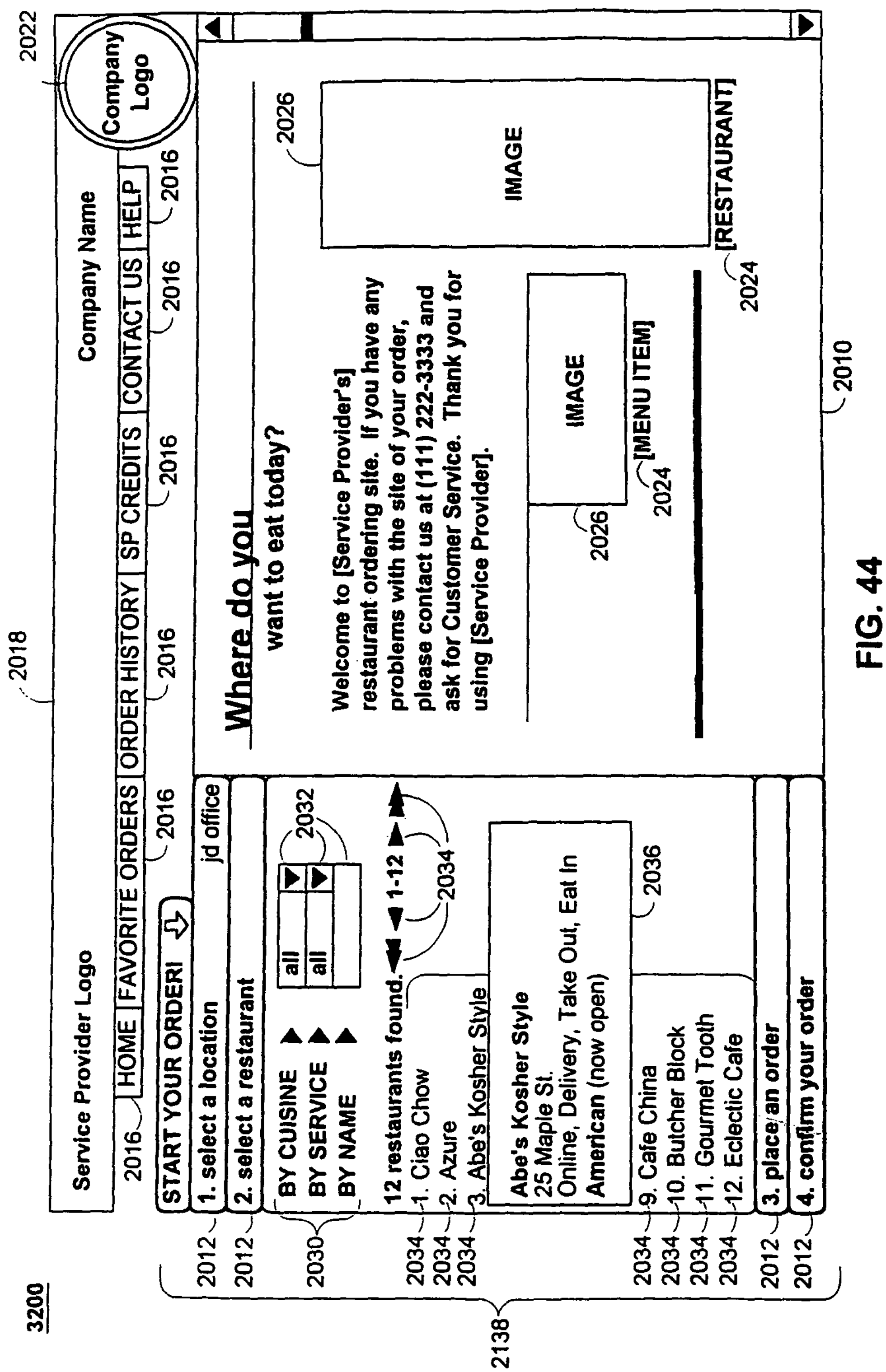
Figure 45:
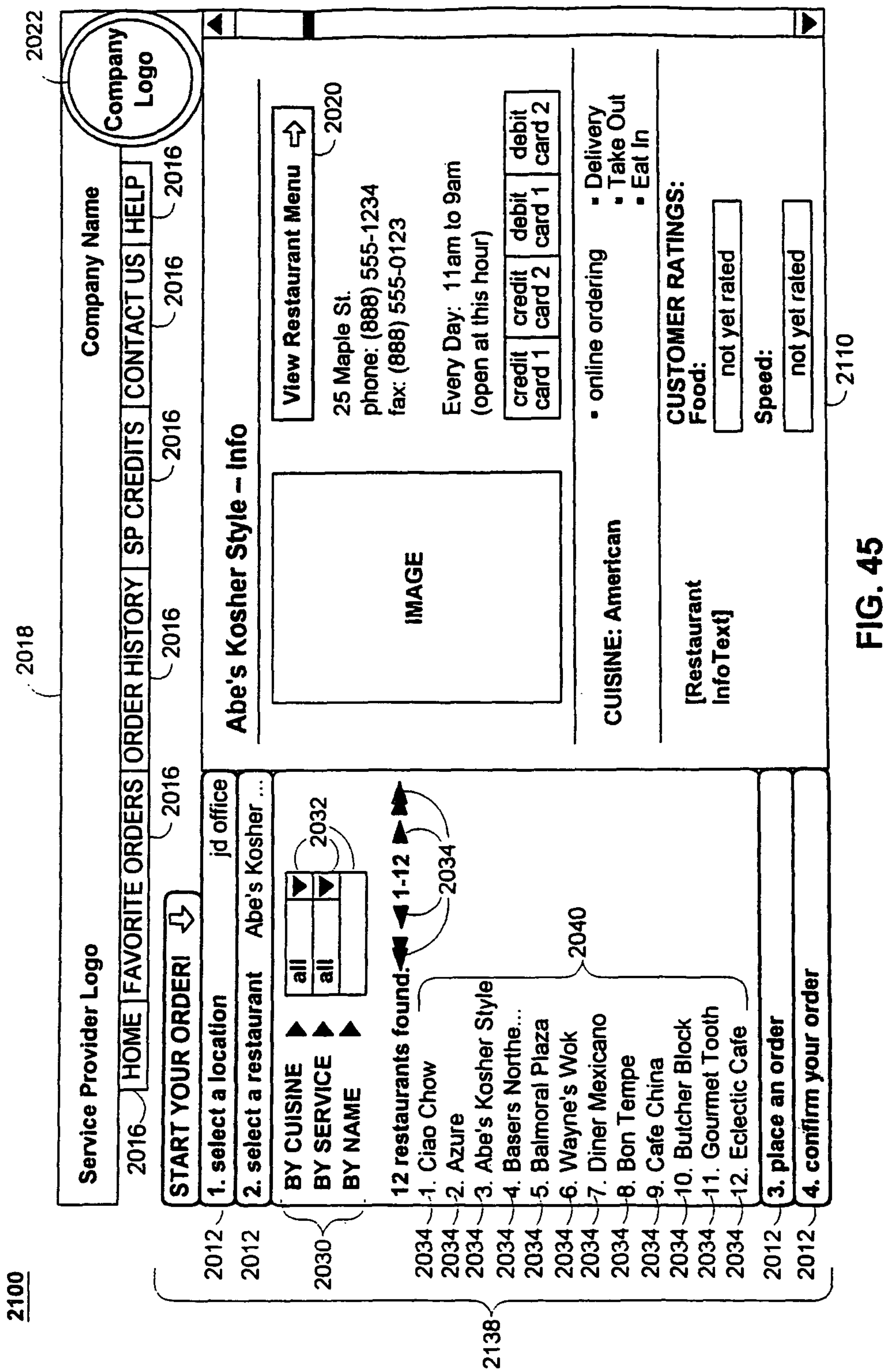

FIGS. 43, 44, and 45 show illustrative displays that may be used to display information about suppliers, display a list of suppliers, and/or allow the system to receive user indications of preferred suppliers in accordance with some embodiments of the present invention.

FIGS. 46, 47, 48, and 50 show illustrative displays that may be used to display catalog information, display a list of suppliers, allow the system to receive user indications of preferred suppliers, and/or allow the system to receive user indications of desired products in accordance with some embodiments of the present invention.

FIGS. 49, 51, 52, and 53 show illustrative displays that may be used to display catalog information, display desired products, allow the system to receive user indications of desired products, and allow the system to receive indications of a desire to complete an order in accordance with some embodiments of the present invention.

FIGS. 54, 55, 56, 57, 58, 59, 60, 61, 62, and 63 show illustrative displays that may be used to display order information, display choices of order options, and allow the system to receive indications of a desire to change ordering options in accordance with some embodiments of the present invention.

Figure 64:
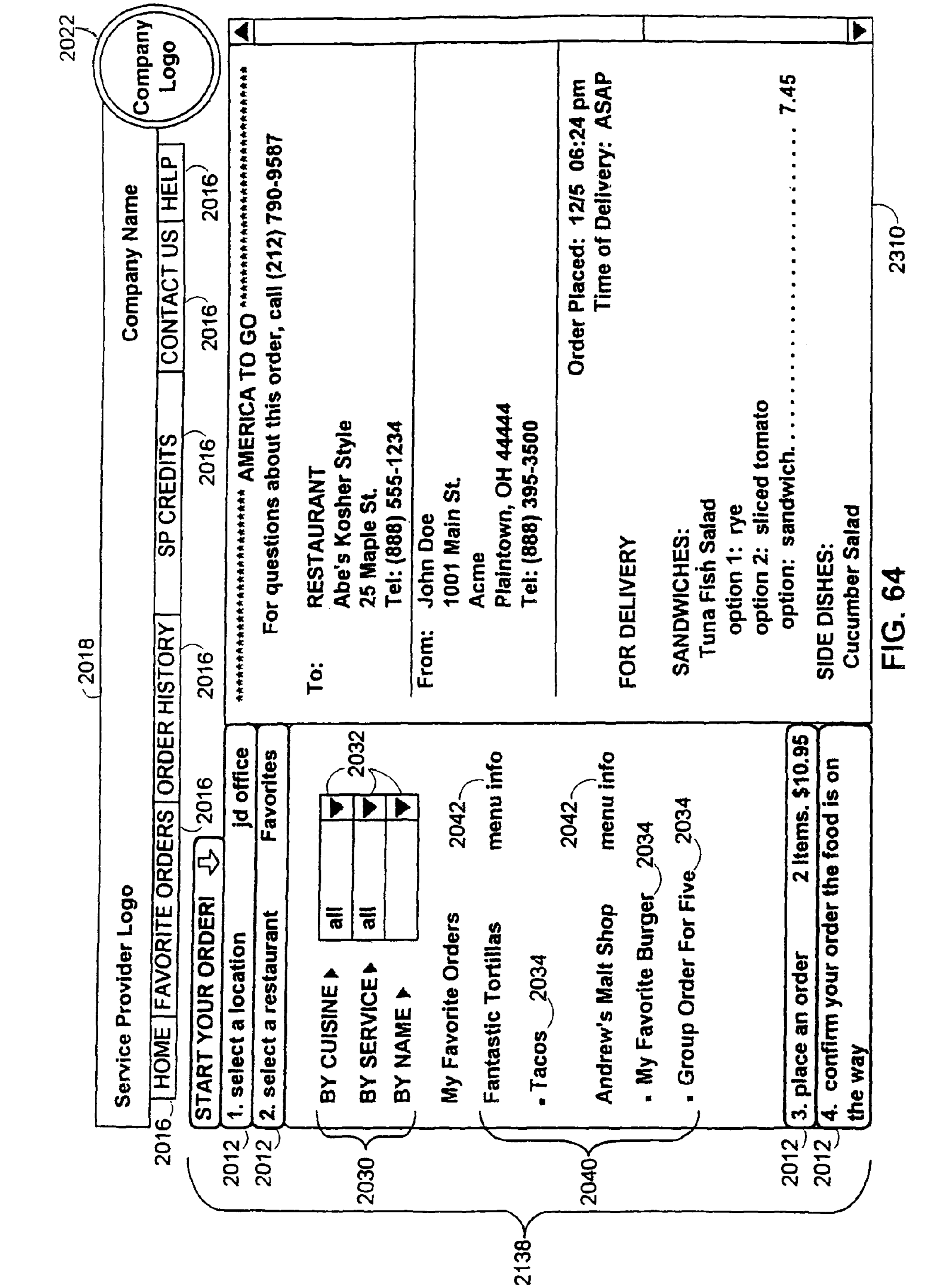

FIG. 64 shows an illustrative display that may be used to display order information, display favorite past orders, and allow the system to receive indications of a desire to reuse a past order in accordance with some embodiments of the present invention.

Figure 65:
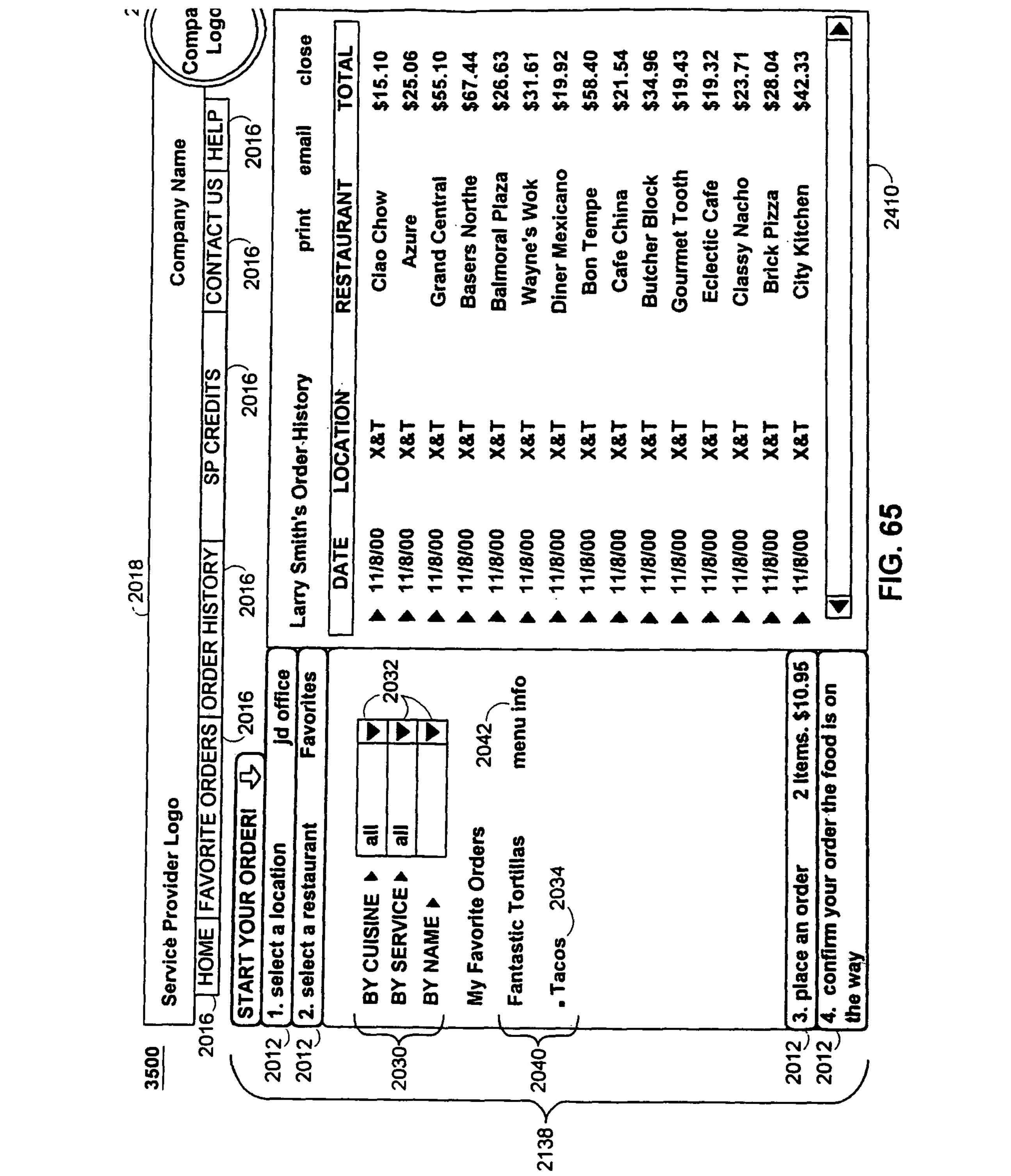

FIG. 65 shows an illustrative display that may be used to display past order information, display favorite past orders, and allow the system to receive indications of a desire to reuse a past order in accordance with some embodiments of the present invention.

Figure 66:
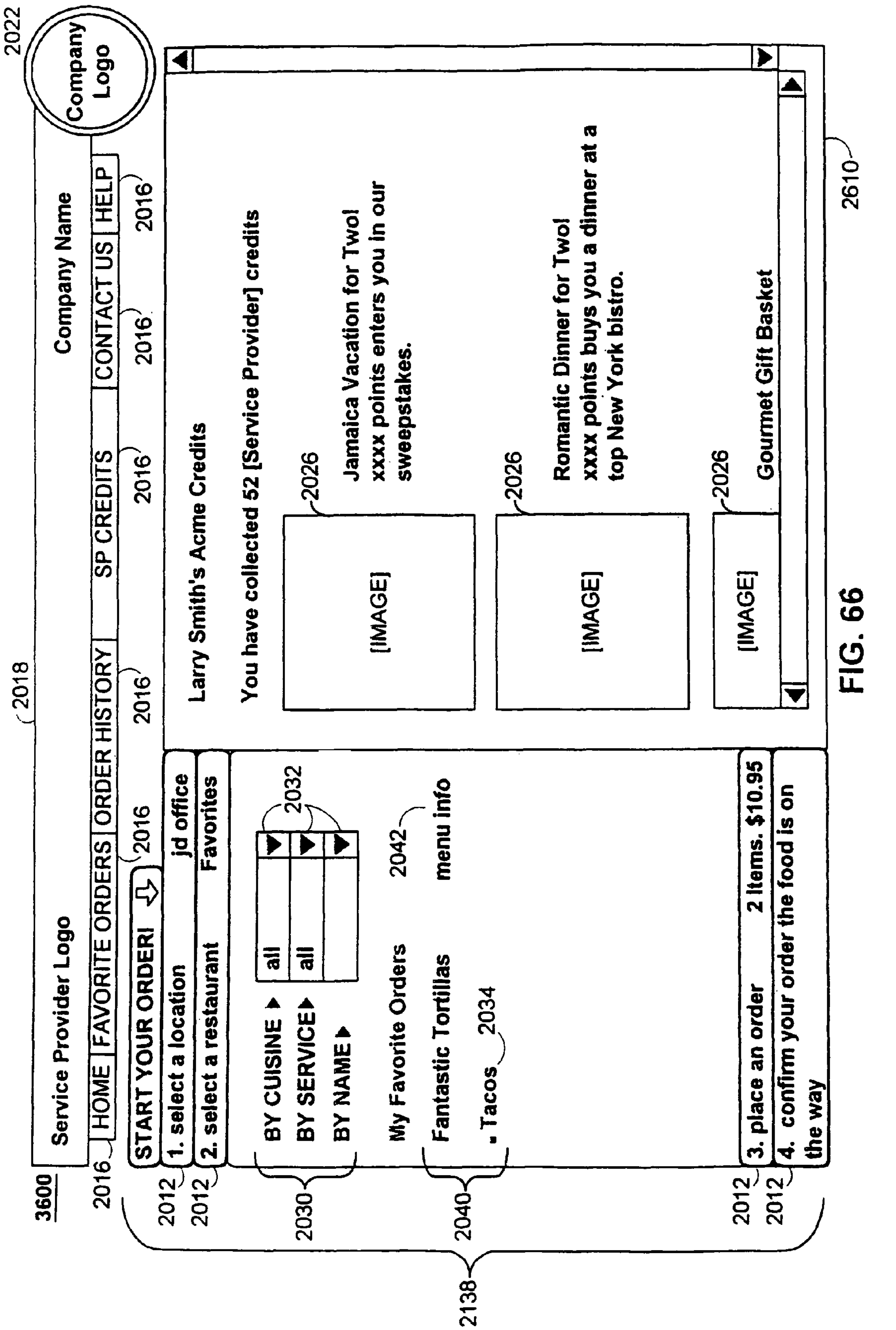

FIG. 66 shows an illustrative display that may be used to display past order information, display promotions, and allow the system to receive indications of a desire to reuse a past order in accordance with some embodiments of the present invention.

Figure 67:
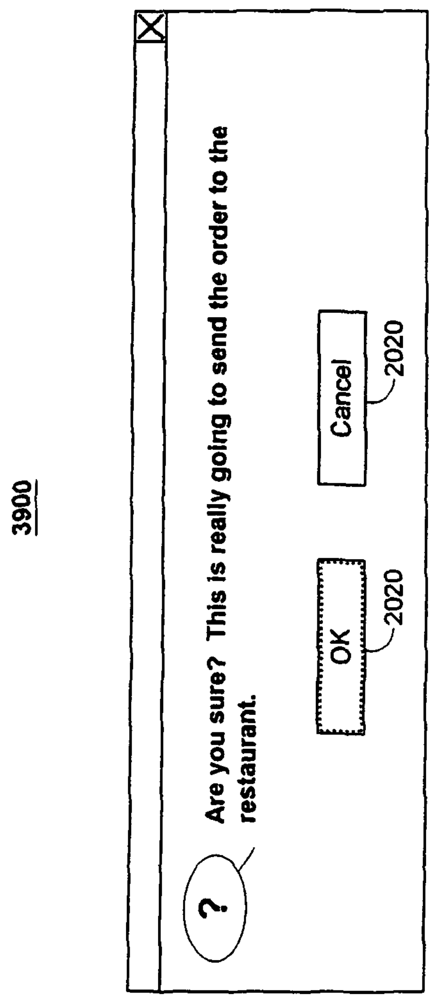

FIG. 67 shows an illustrative display that may be used to receive confirmations or negations of prior indications in accordance with some embodiments of the present invention.

Figure 68:
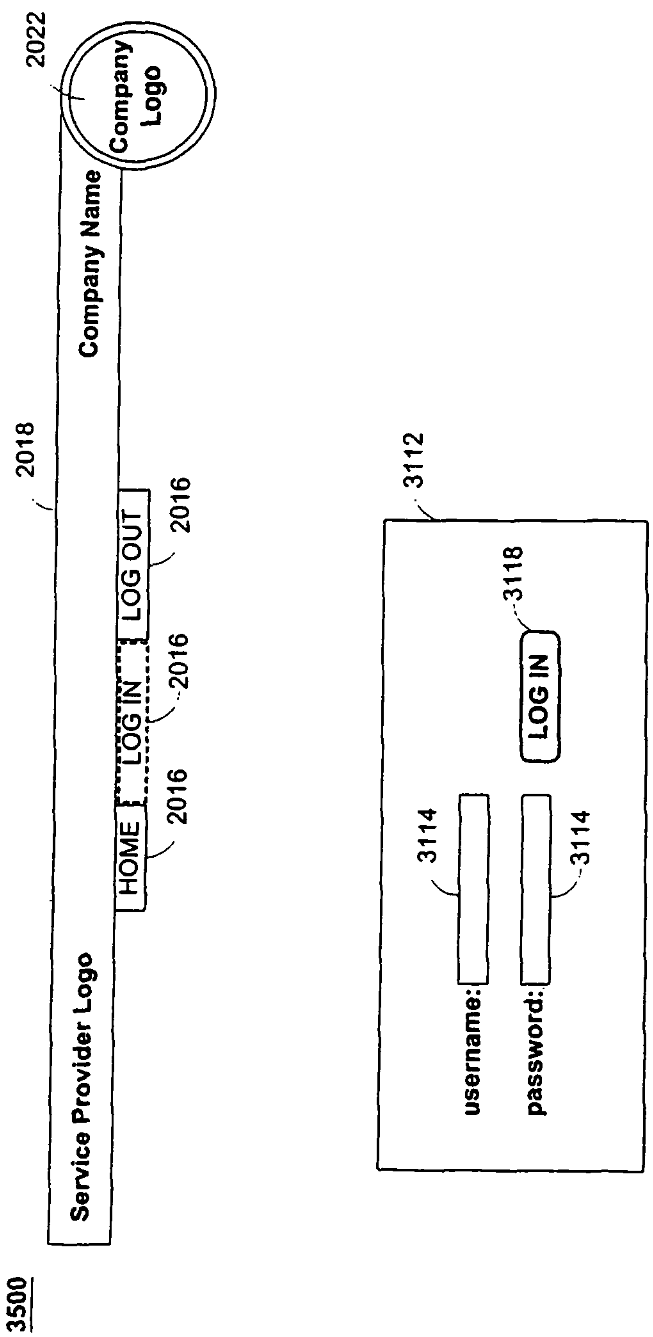

FIG. 68 shows an illustrative display that may be used by an administrative user to login to the system in accordance with some embodiments of the present invention.

Figure 69:
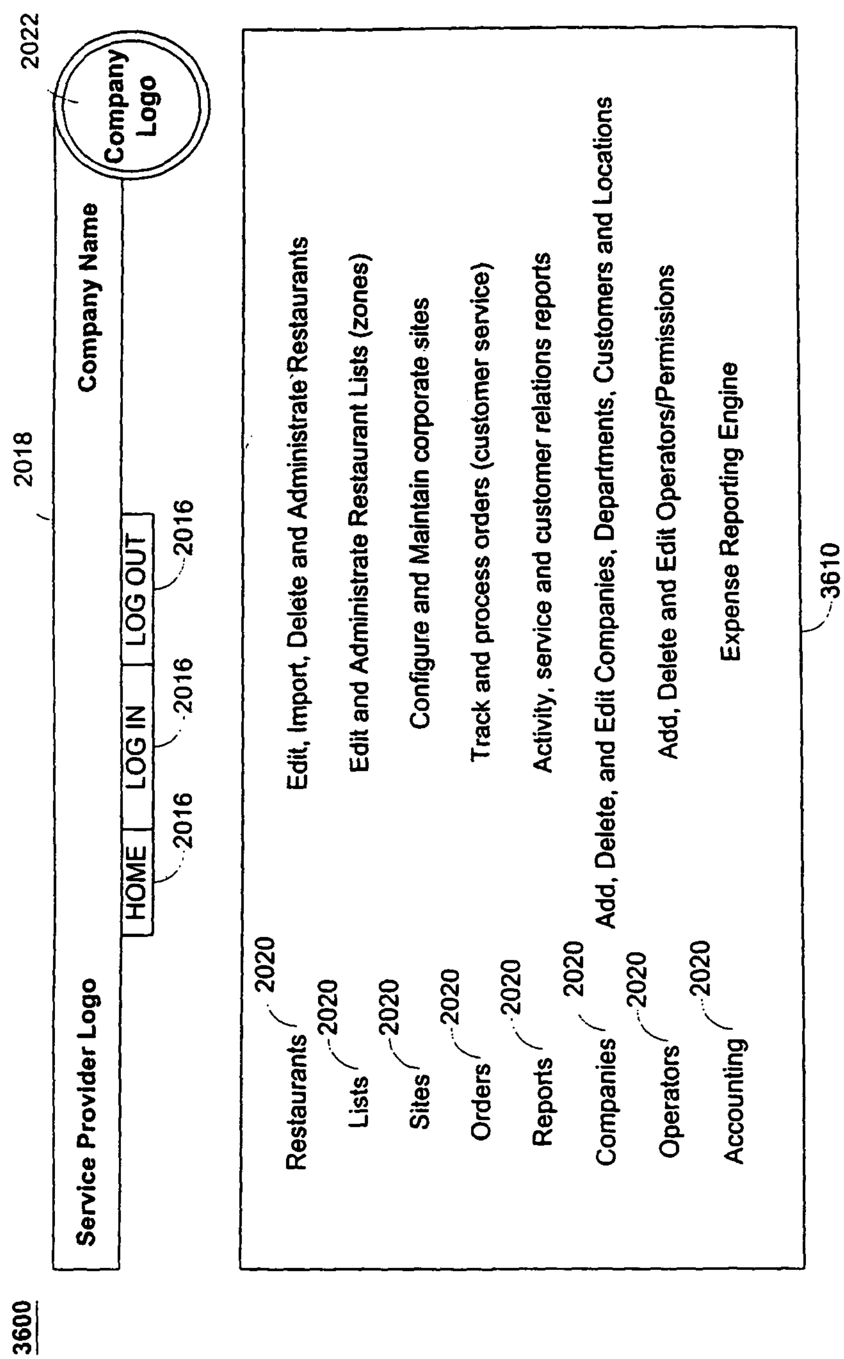

FIG. 69 shows an illustrative display that may be used to display a selection menu and allow the system to receive indications related to the menu in accordance with some embodiments of the present invention.

Figure 70:
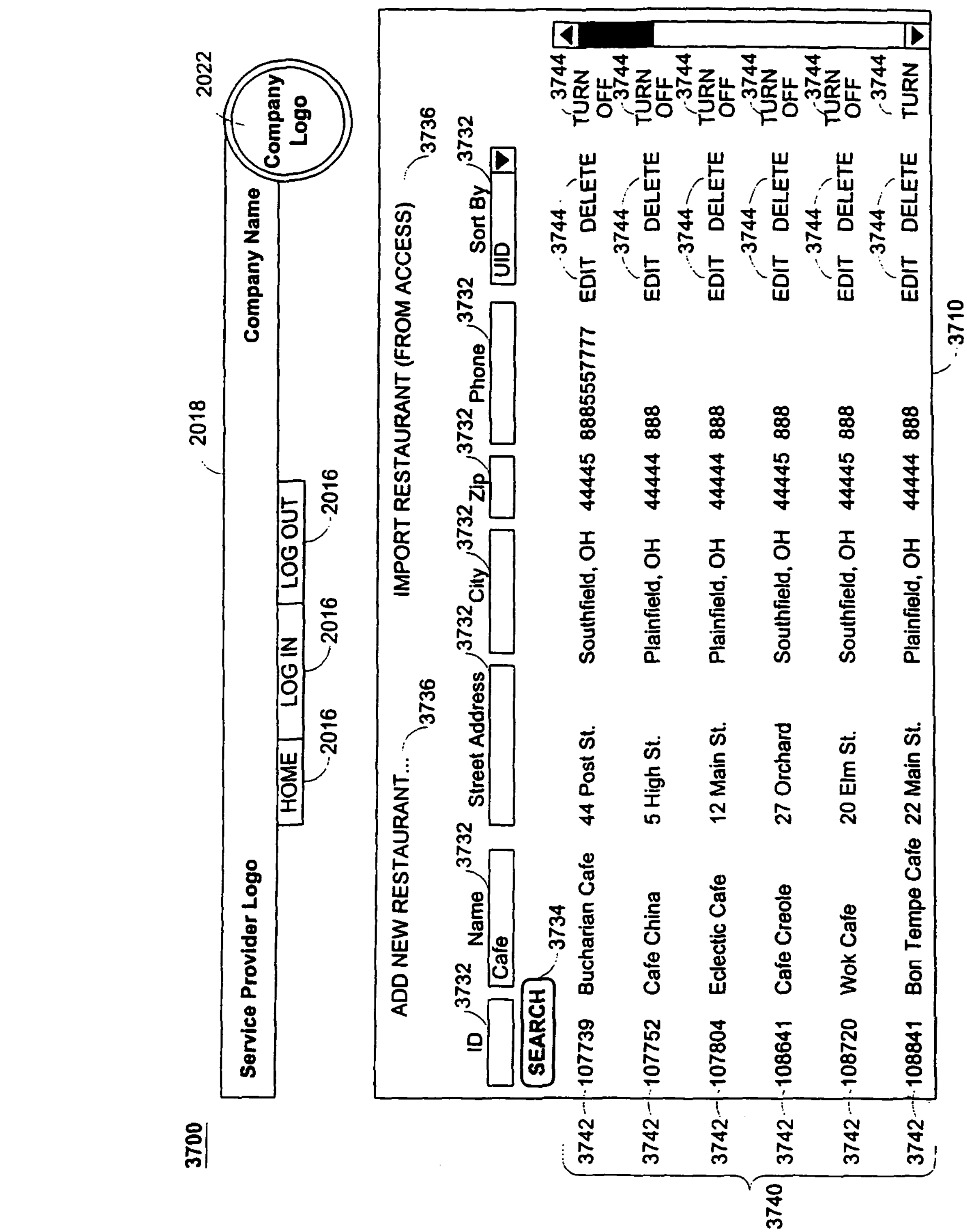

FIG. 70 shows an illustrative display that may be used to display supplier information and allow the system to receive indications regarding suppliers to be added to the system in accordance with some embodiments of the present invention.

FIGS. 71, 72, 73 and 74 show an illustrative displays that may be used to allow the system to receive indications regarding suppliers to be added to the system in accordance with some embodiments of the present invention.

Figure 75:
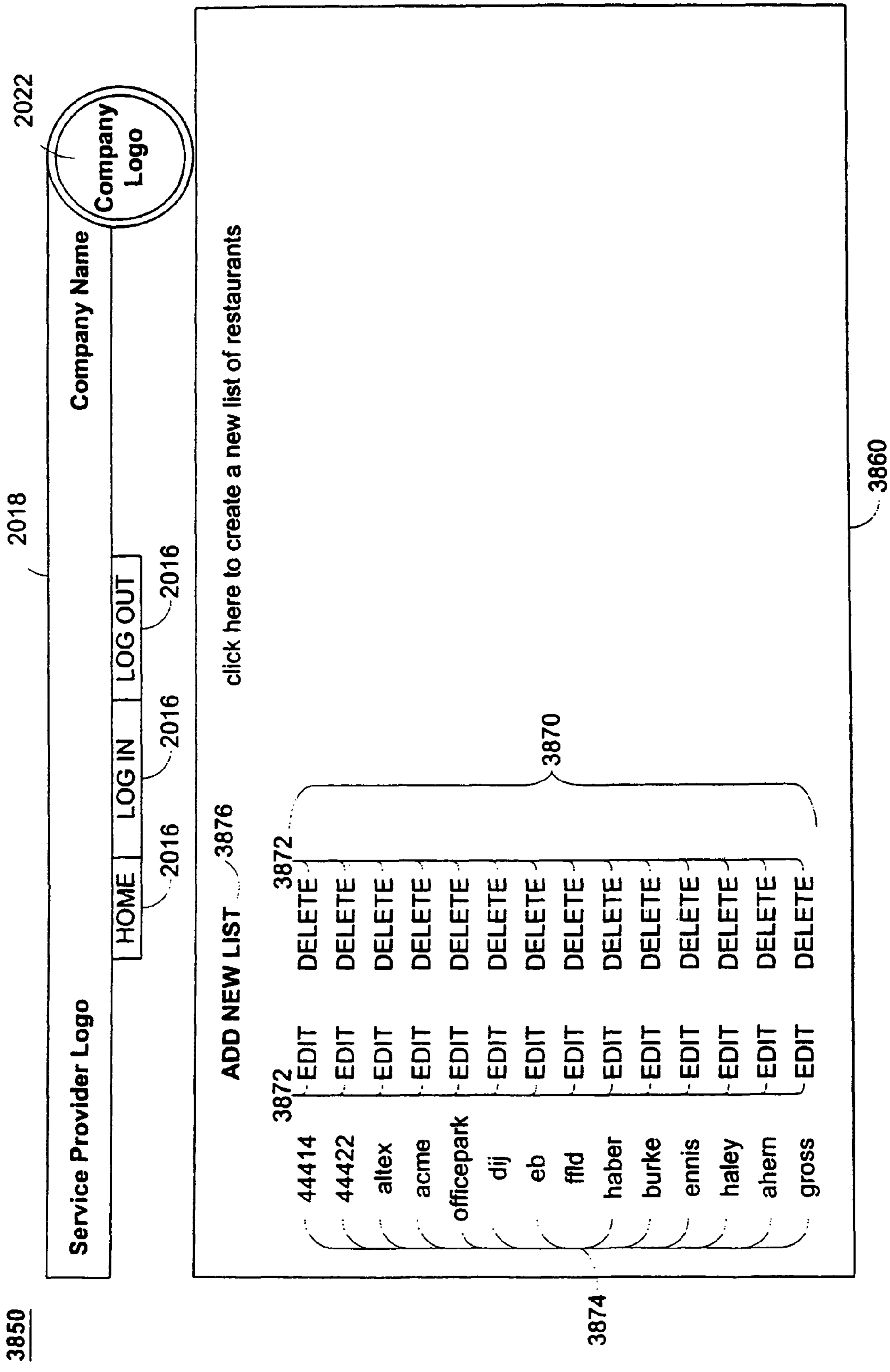

FIG. 75 shows an illustrative display that may be used to display a list of suppliers and allow the system to receive indications regarding changes to supplier data in accordance with some embodiments of the present invention.

Figure 76:
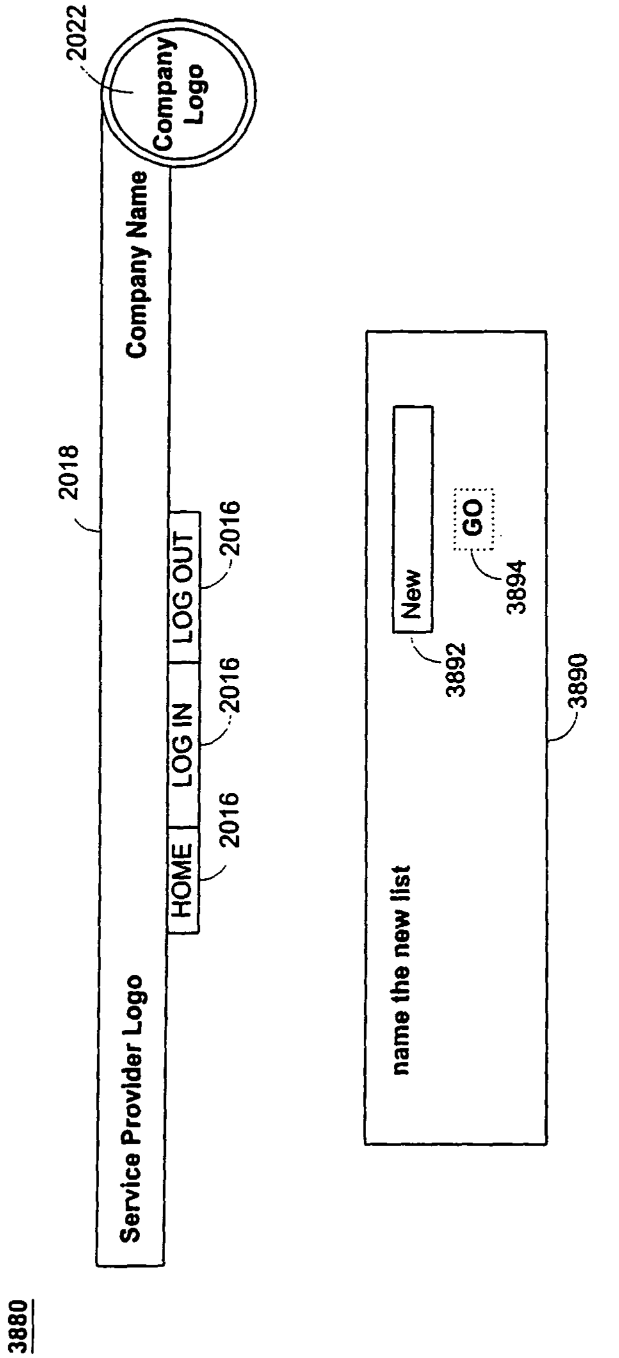

FIG. 76 shows an illustrative display that may be used to allow the system to receive indications regarding lists to be added to the system in accordance with some embodiments of the present invention.

Figure 77:
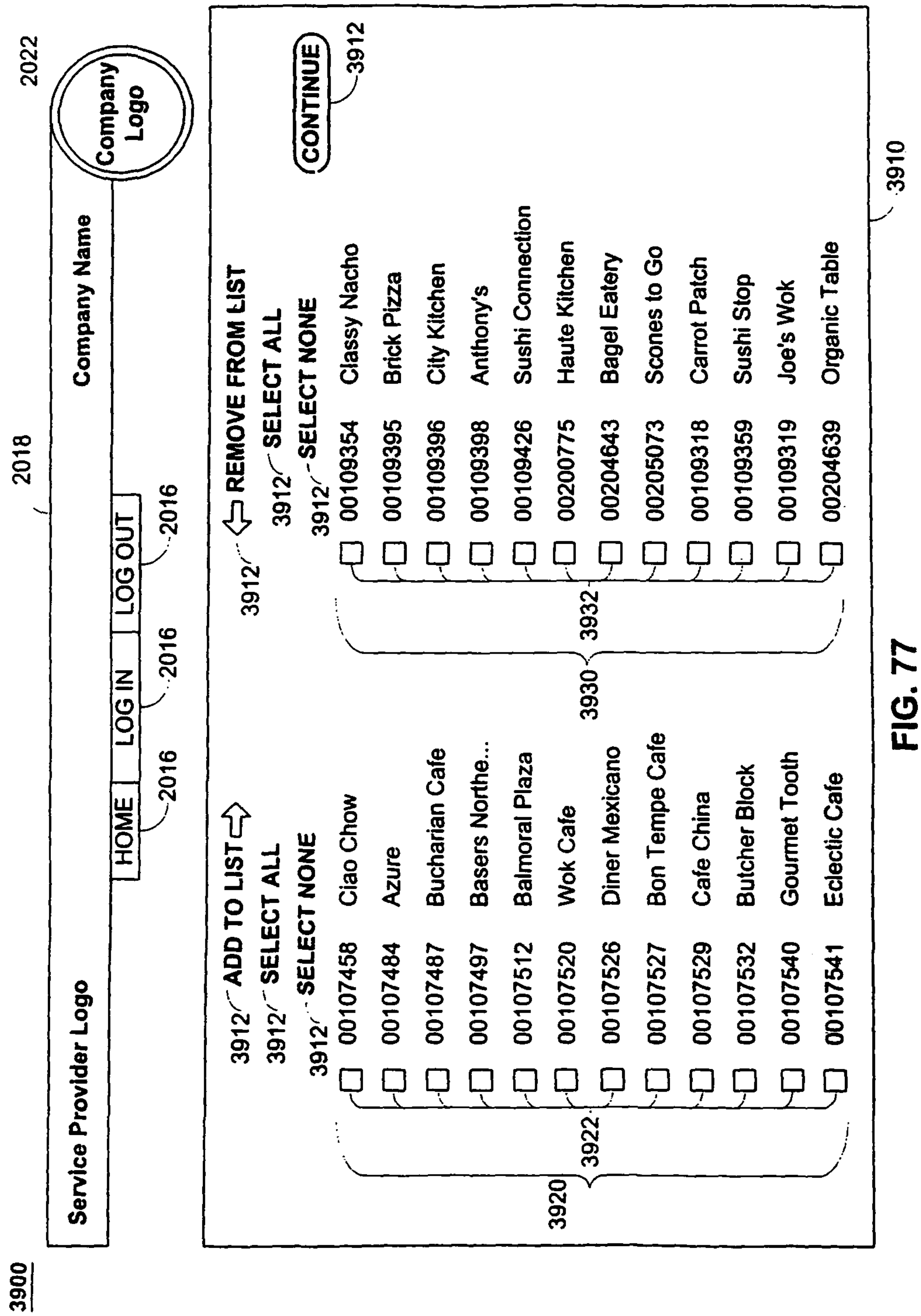

FIG. 77 shows an illustrative display that may be used to display lists of suppliers and allow the system to receive indications regarding supplier list changes in accordance with some embodiments of the present invention.

Figure 78:
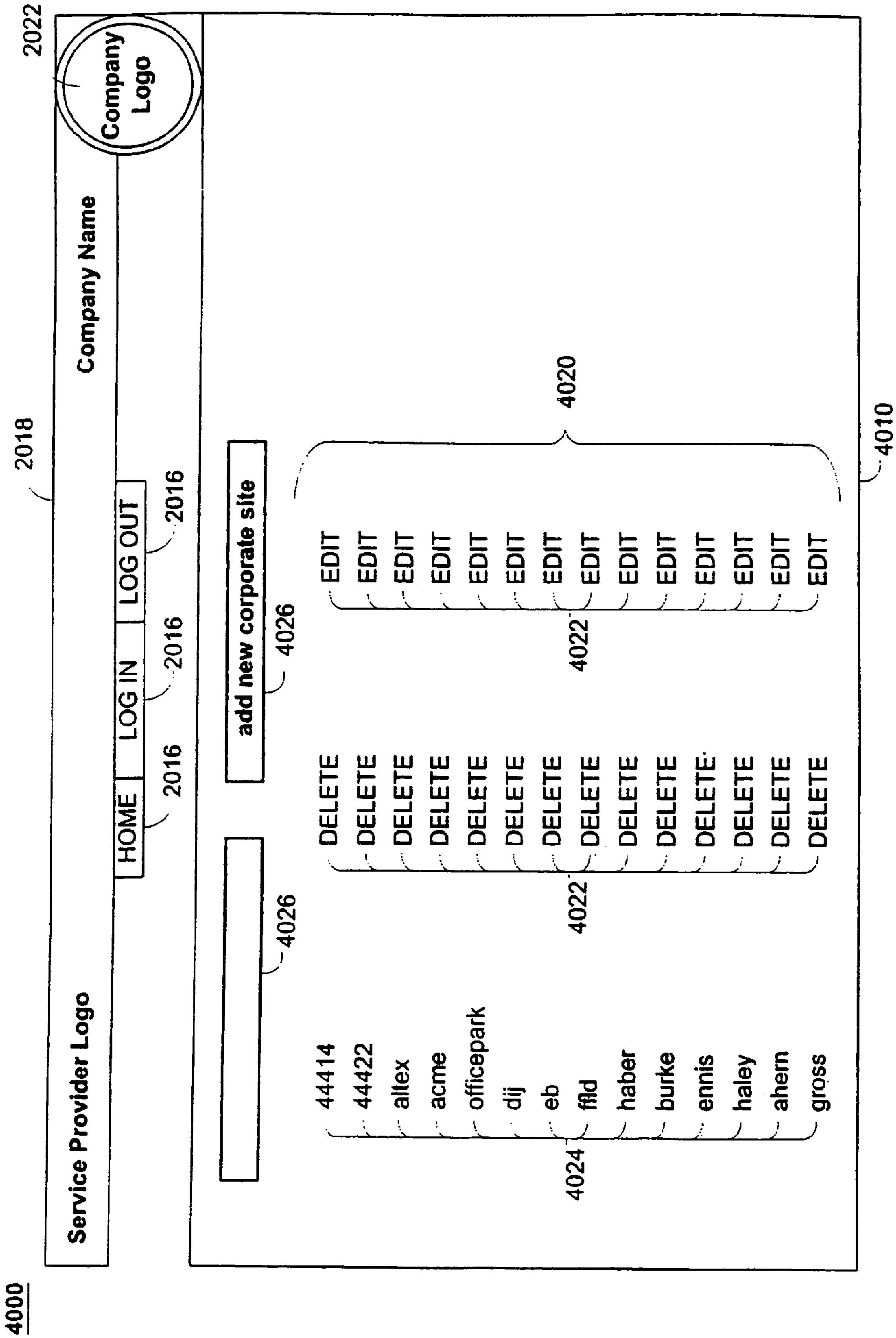

FIG. 78 shows an illustrative display that may be used to display a list of companies and allow the system to receive indications regarding changes to supplier data in accordance with some embodiments of the present invention.

Figure 79:
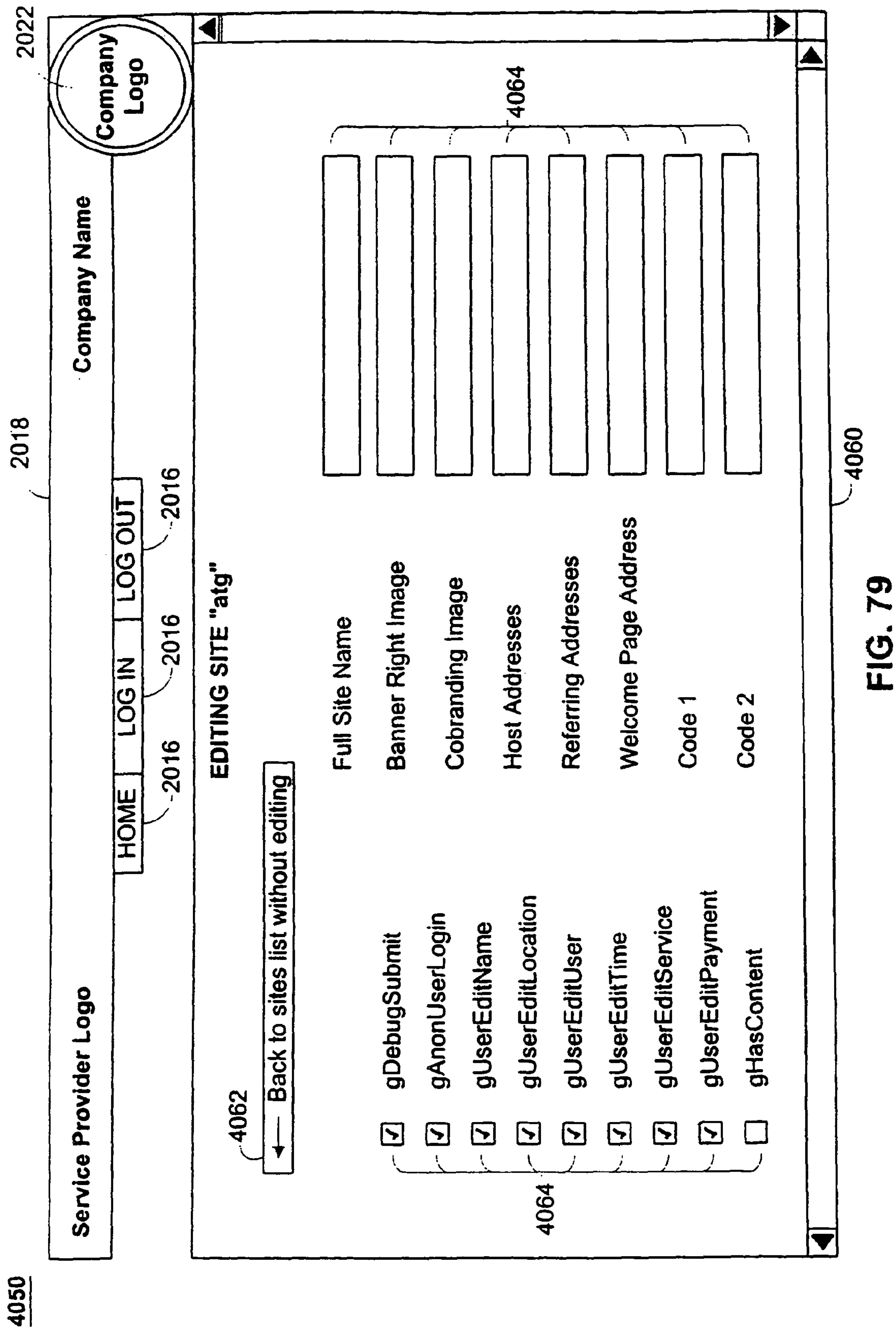
Figure 80:
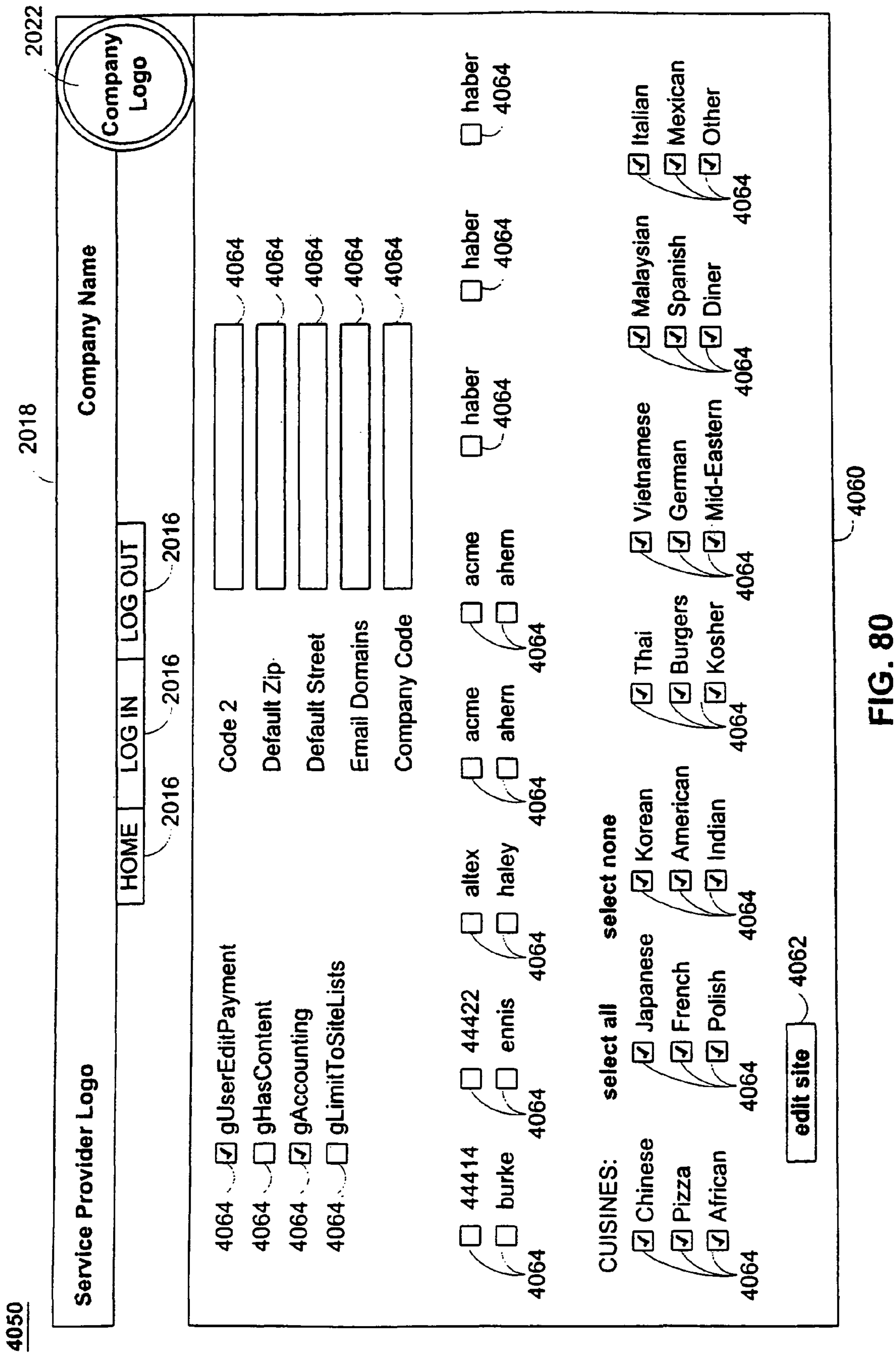

FIGS. 79 and 80 show illustrative displays that may be used to allow the system to receive indications regarding companies to be added to the system in accordance with some embodiments of the present invention.

FIGS. 81, 82, 83, and 84 show illustrative displays that may be used to display customer service data and allow the system to receive indications regarding customer service activity in accordance with some embodiments of the present invention.

Figure 85:
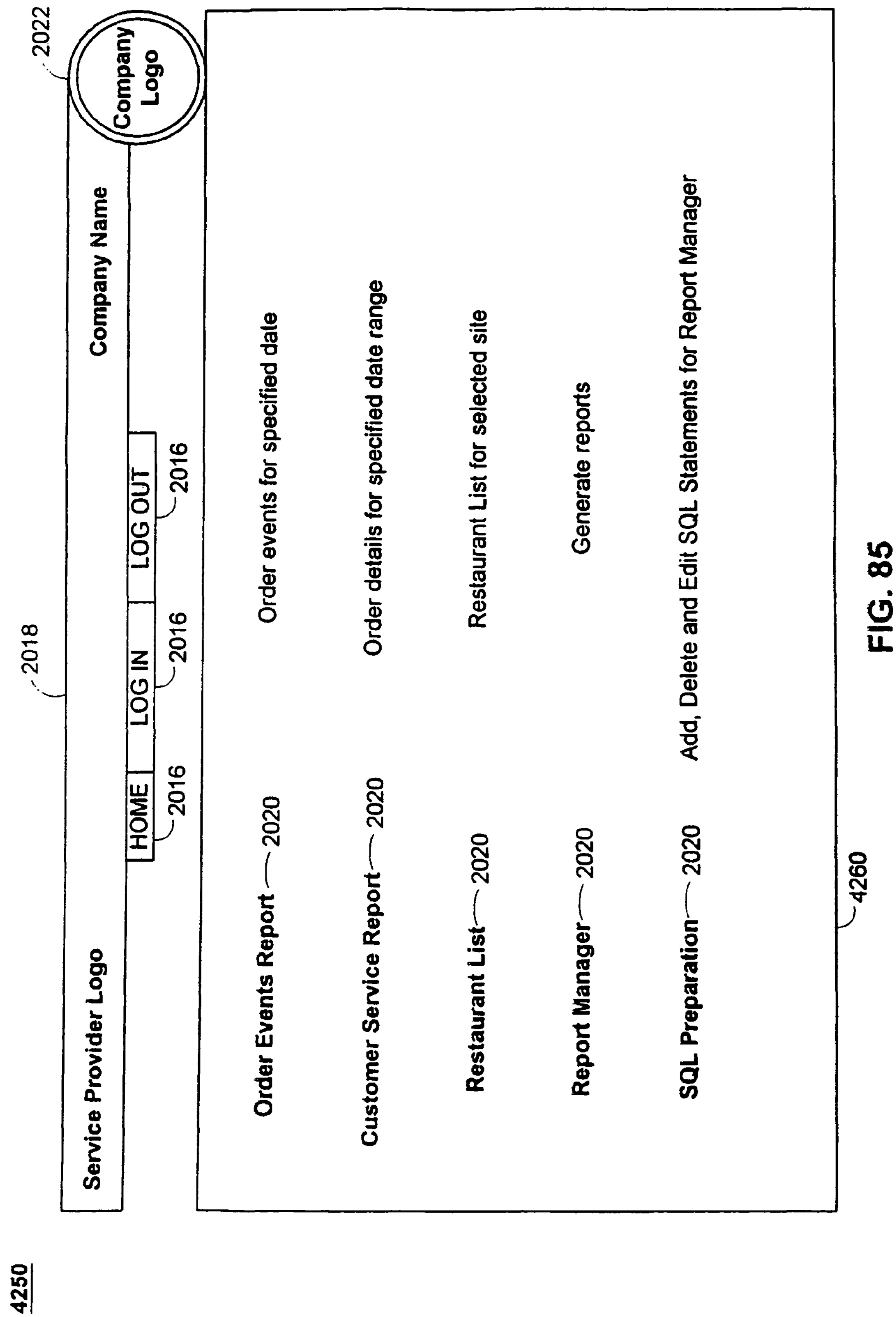

FIG. 85 shows an illustrative display that may be used to display a selection menu and allow the system to receive indications related to the menu in accordance with some embodiments of the present invention.

Figure 86:
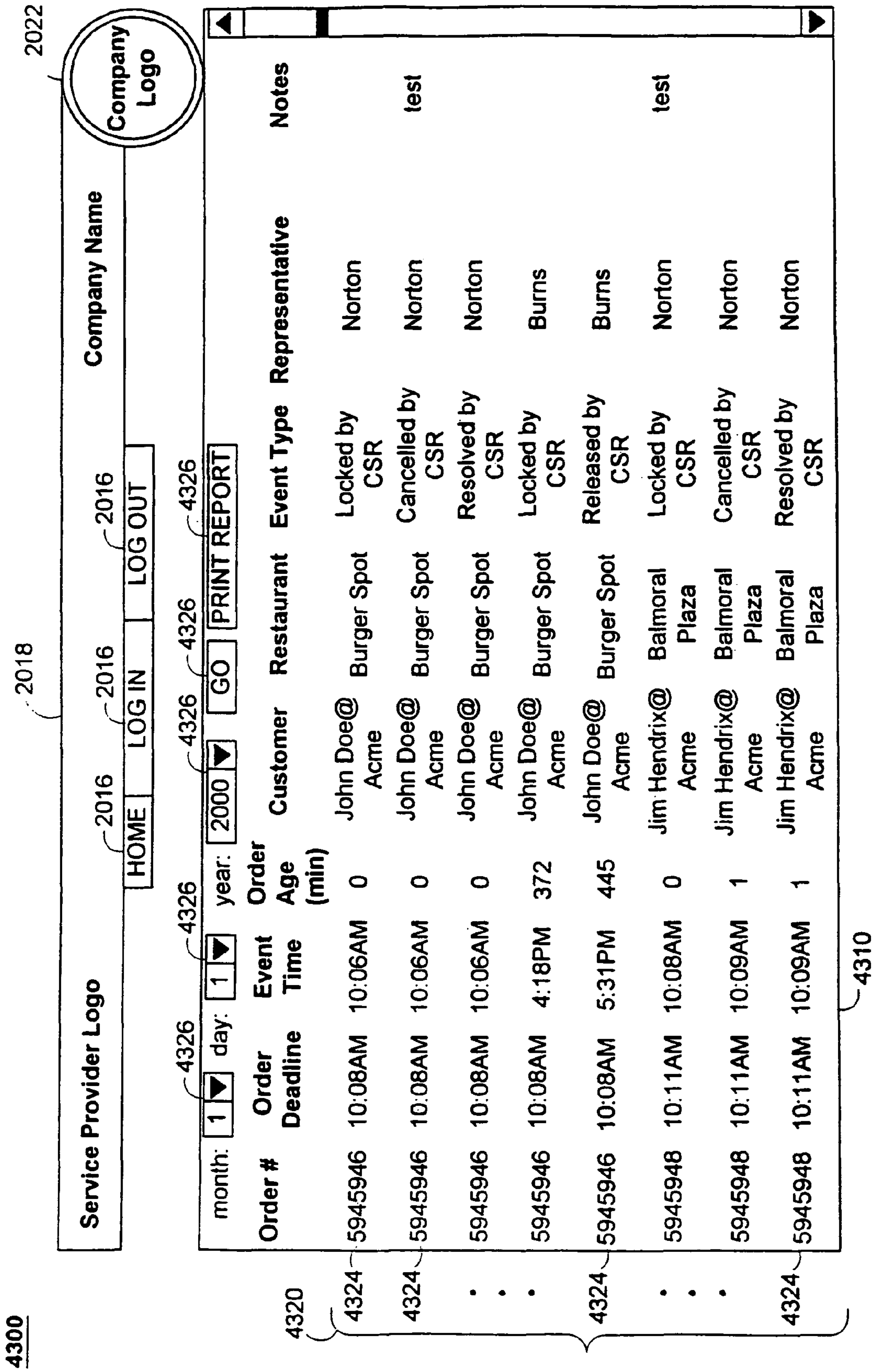
Figure 87:
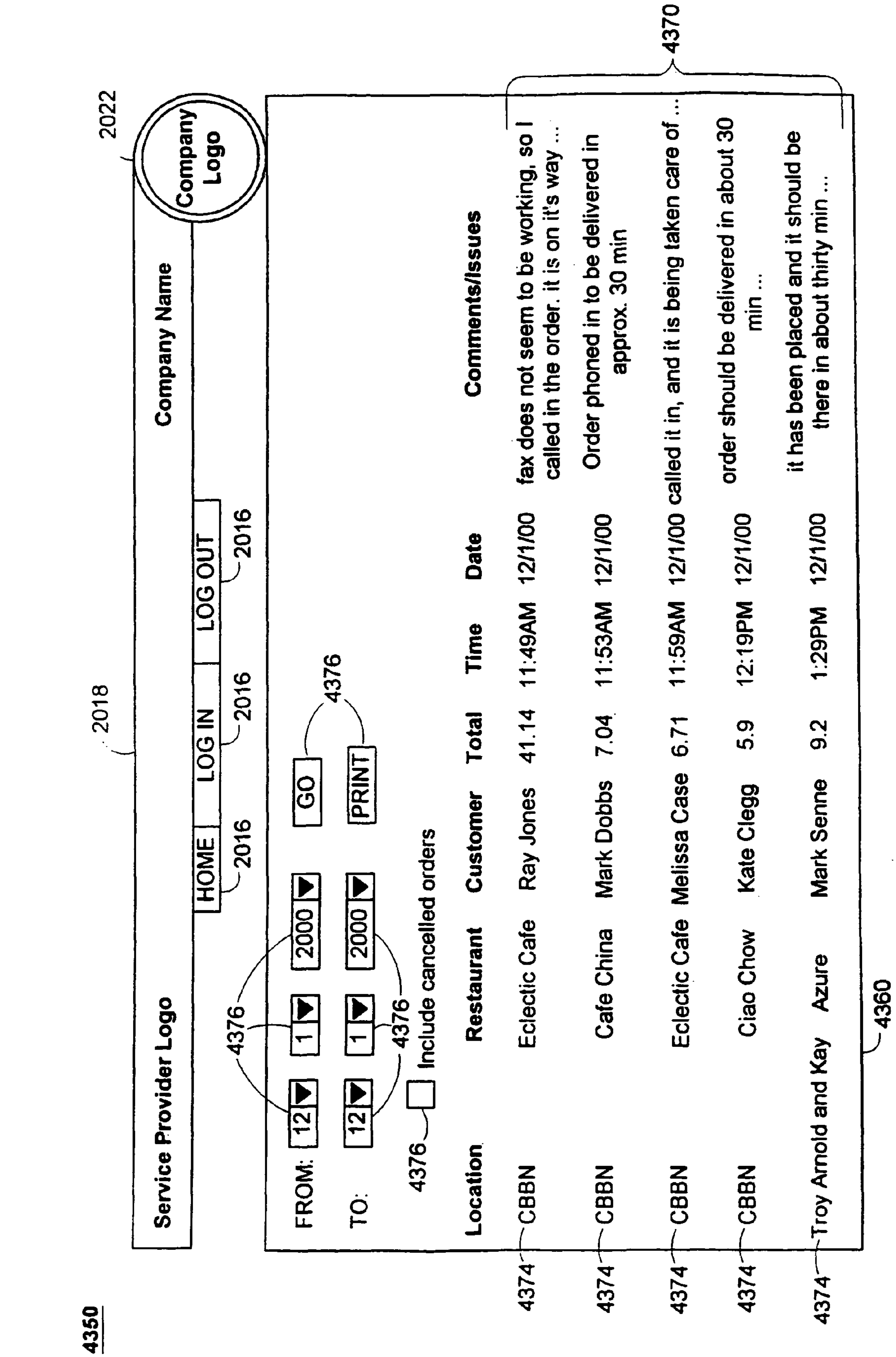

FIGS. 86 and 87 show illustrative displays that may be used to display order information and allow the system to receive indications for limiting the data displayed in accordance with some embodiments of the present invention.

Figure 88:
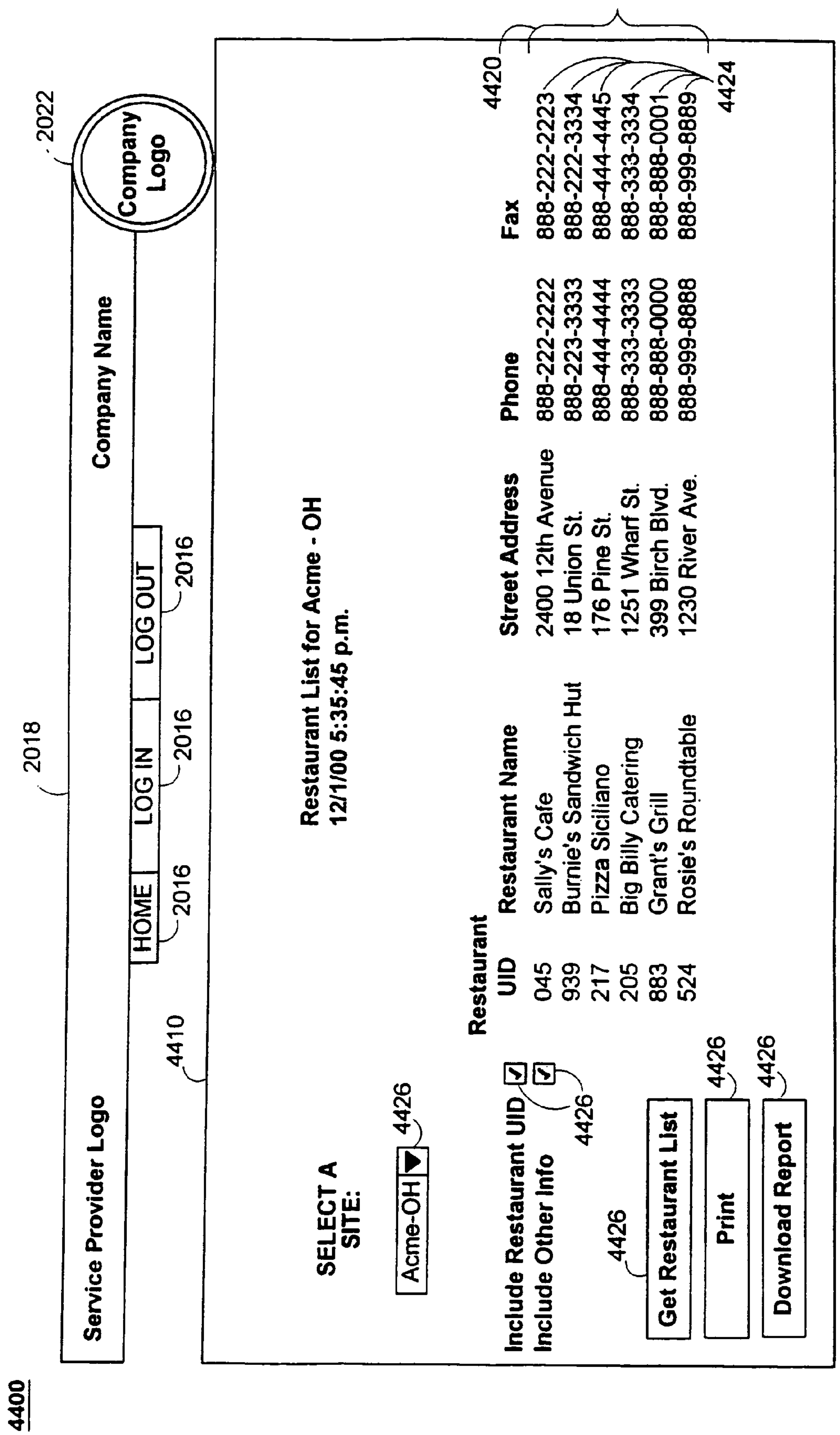

FIG. 88 shows an illustrative display that may be used to show a list of suppliers in accordance with some embodiments of the present invention.

Figure 89:
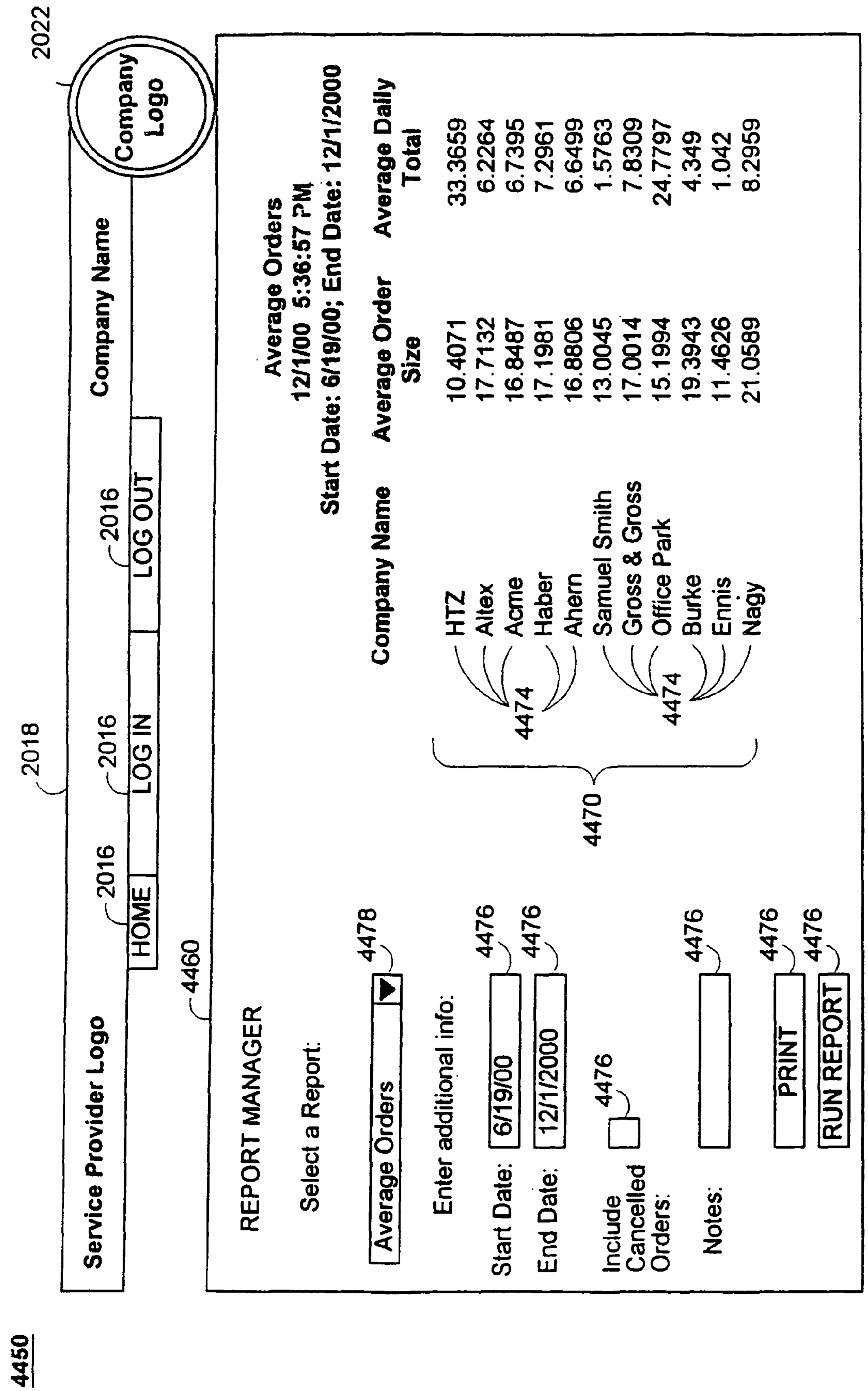

FIG. 89 shows an illustrative display that may be used to show a list of order data in accordance with some embodiments of the present invention.

Figure 90:
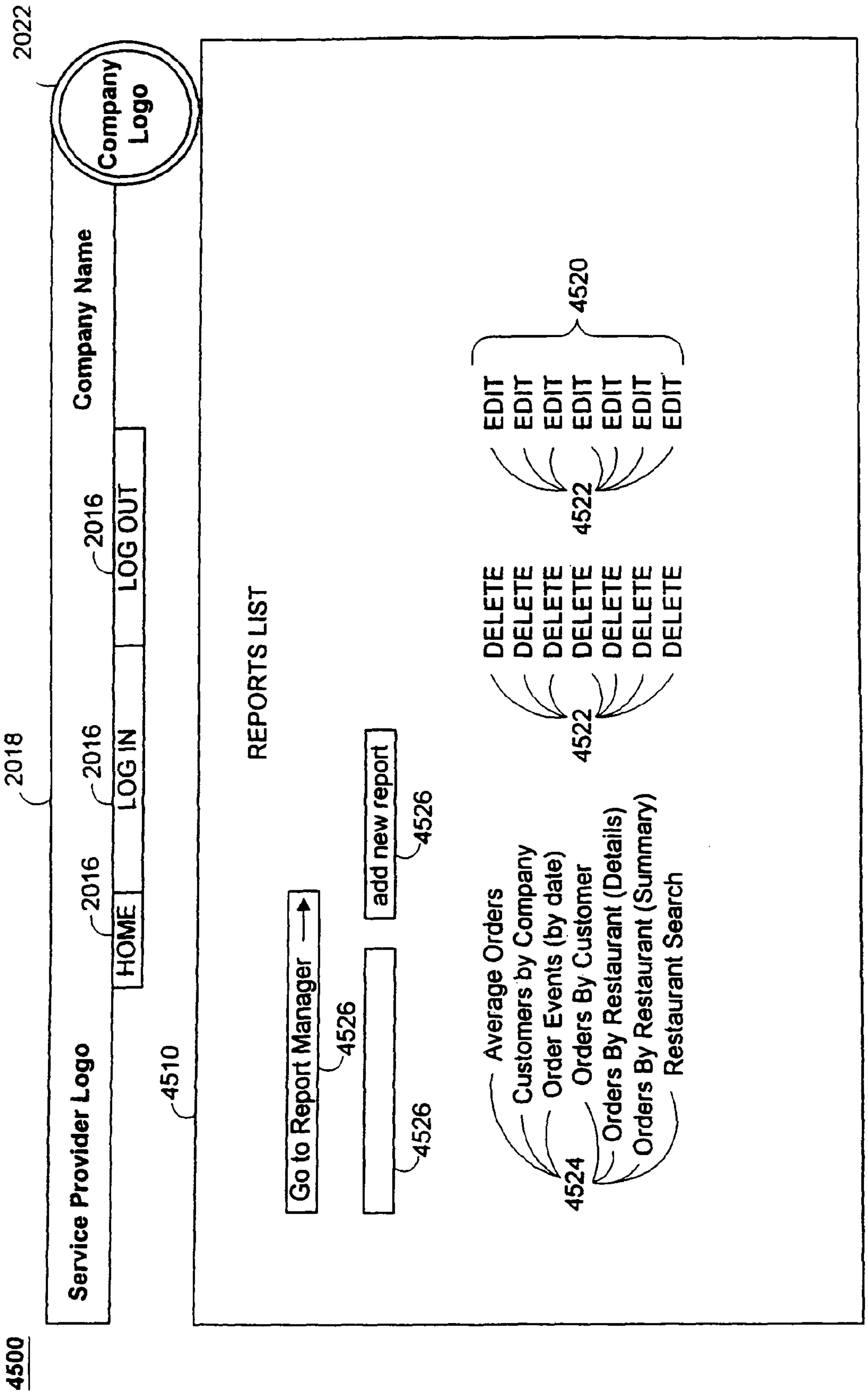

FIG. 90 shows an illustrative display that may be used to show a list of available reporting tools in accordance with some embodiments of the present invention.

Figure 91:
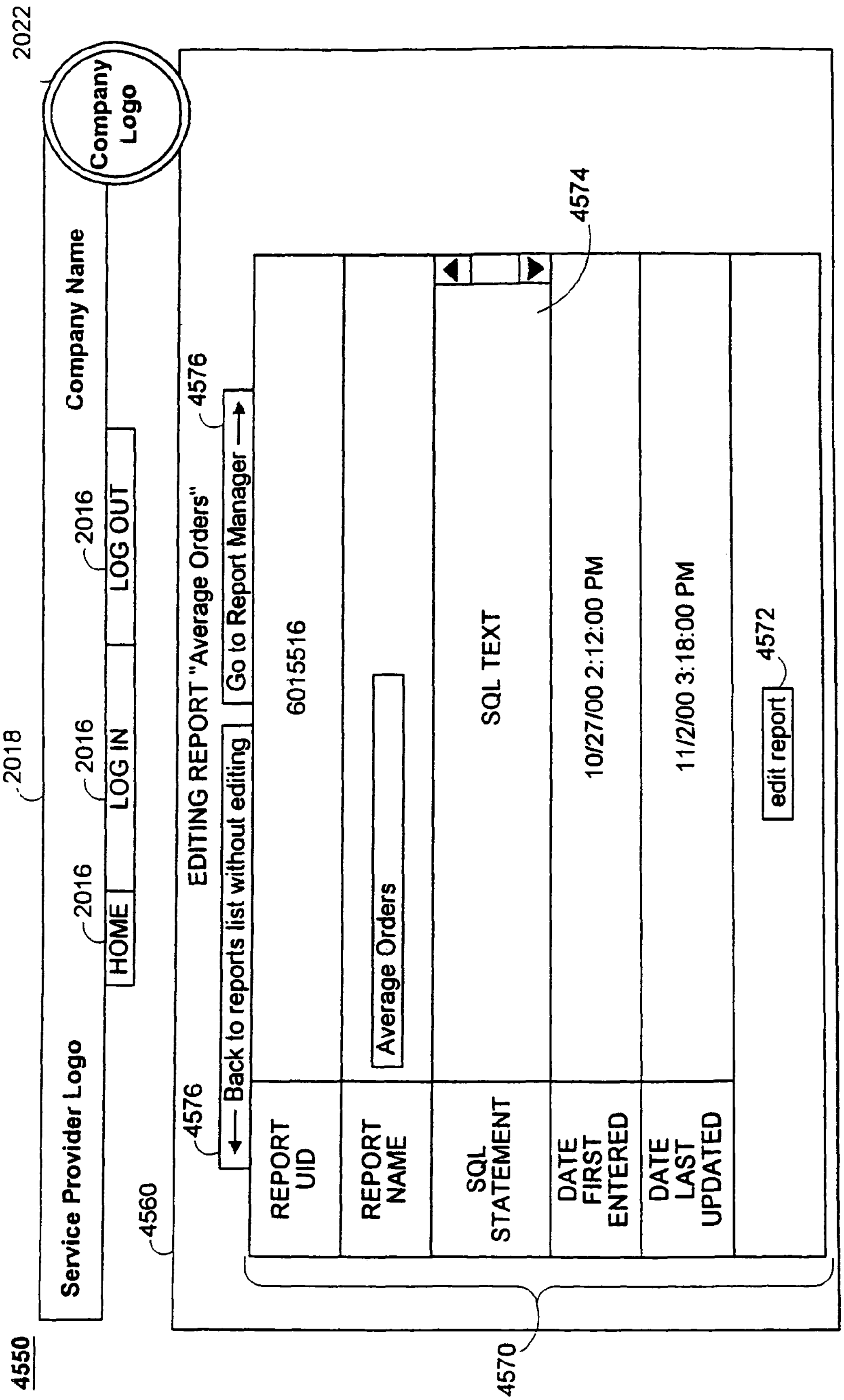

FIG. 91 shows an illustrative display that may be used to show a data regarding a reporting tool in accordance with some embodiments of the present invention.

FIG. 92 shows a sample SQL query in accordance with some embodiments of the present invention.

Figure 93:
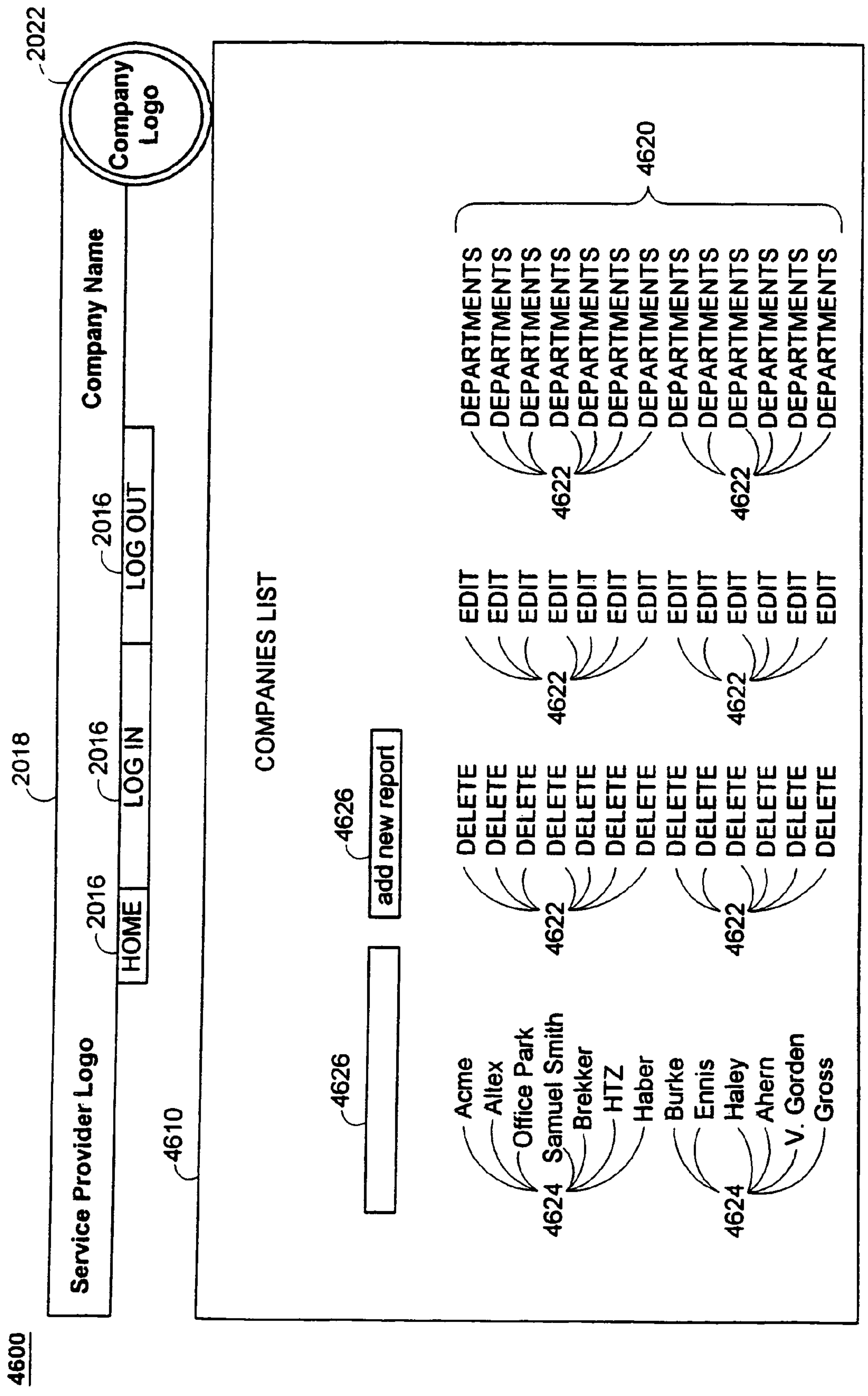

FIG. 93 shows an illustrative display that may be used to show a list of companies in accordance with some embodiments of the present invention.

Figure 94:
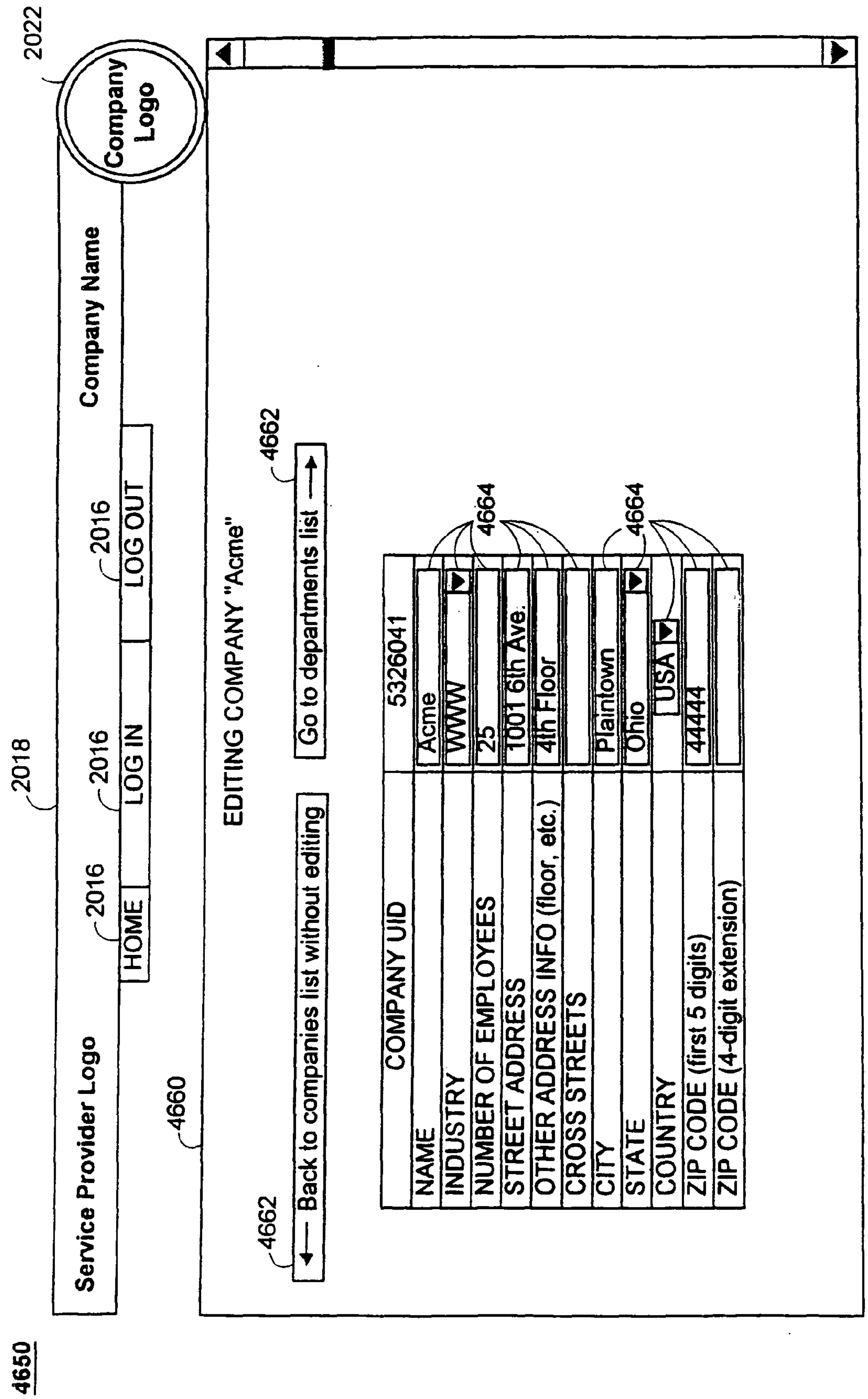
Figure 95:
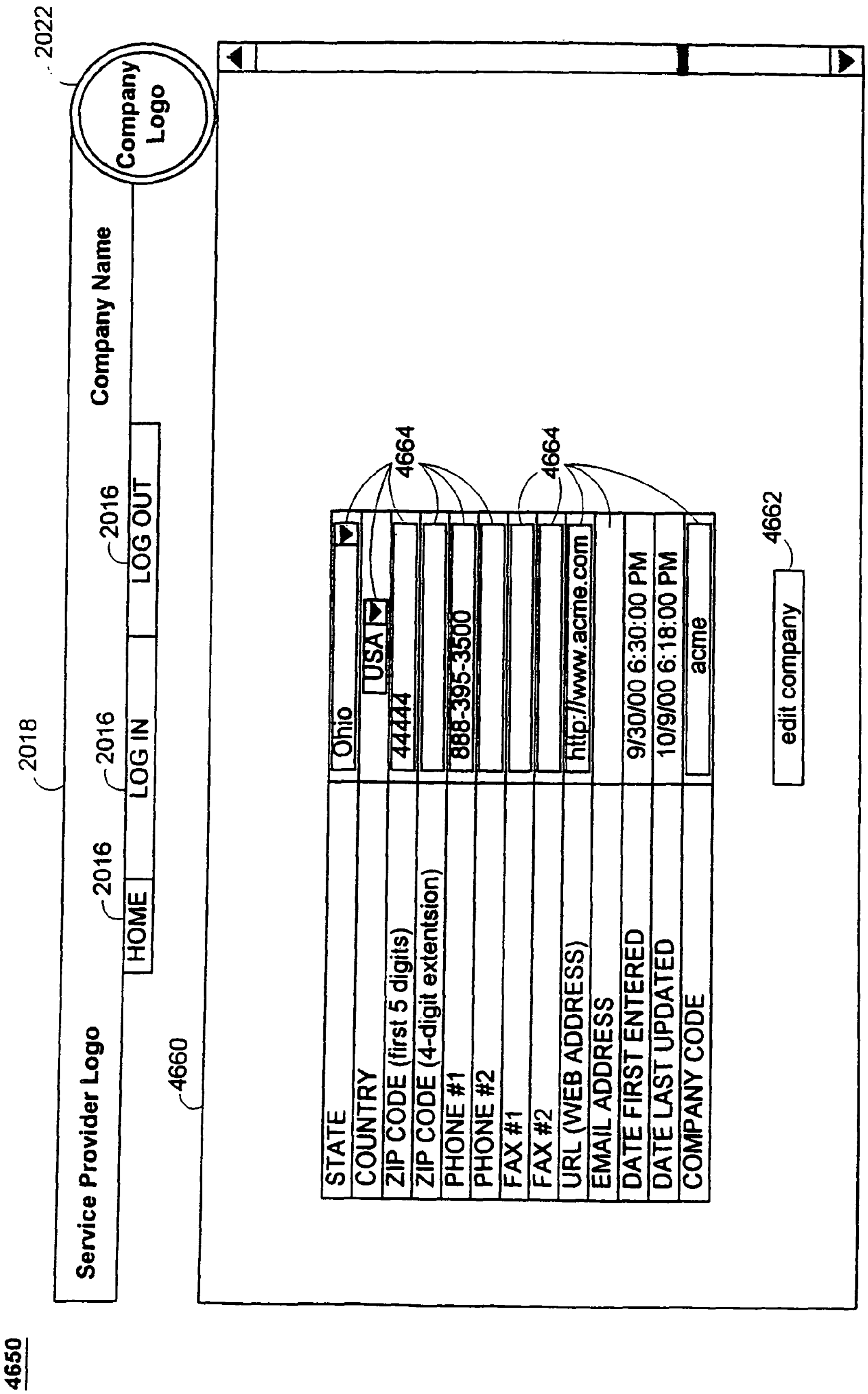

FIGS. 94 and 95 show illustrative displays that may be used to allow the system to receive indications regarding changes to company data in accordance with some embodiments of the present invention.

Figure 96:
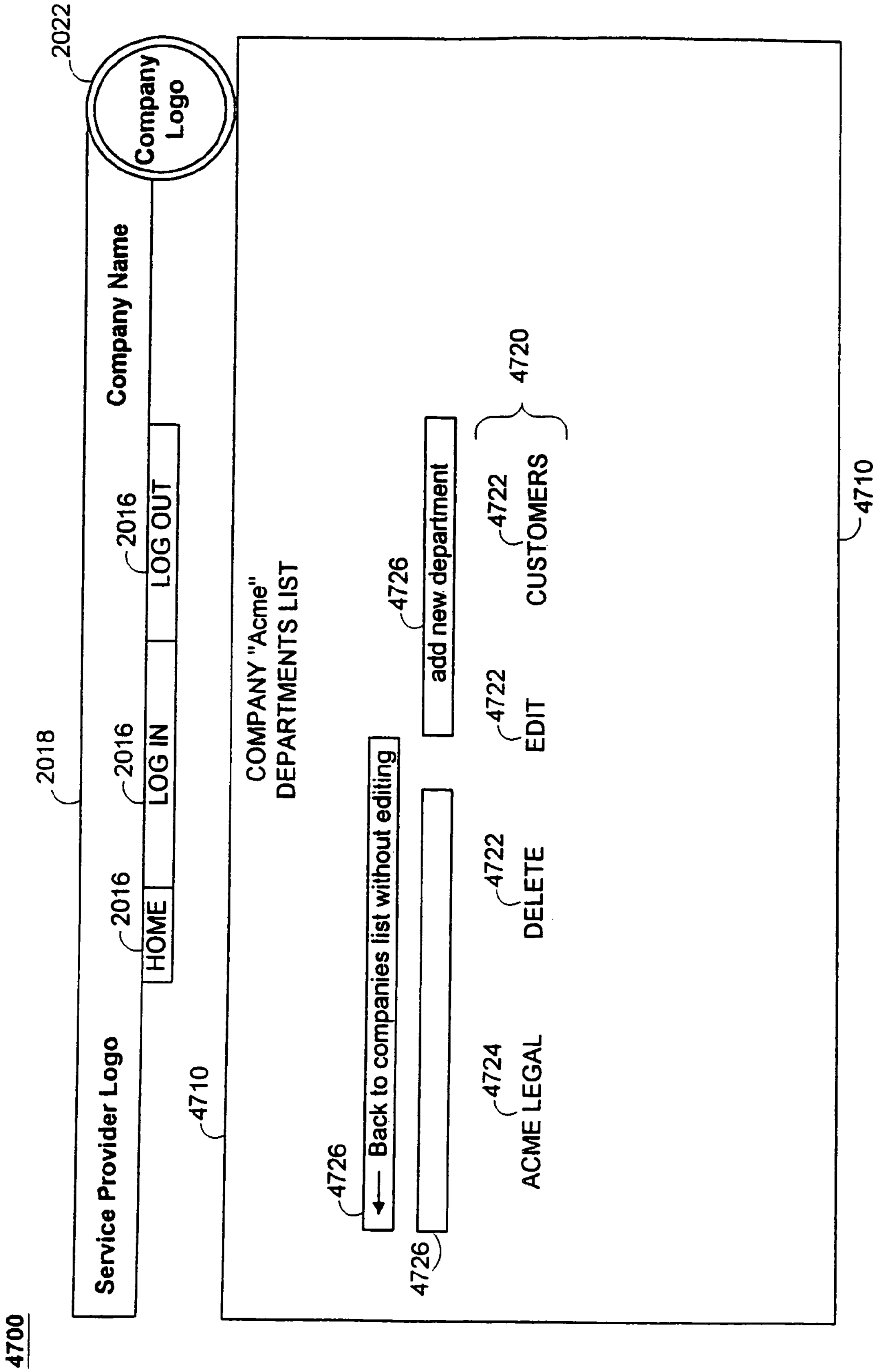

FIG. 96 shows an illustrative display that may be used to display a list of departments and allow the system to receive indications regarding changes to department data in accordance with some embodiments of the present invention.

Figure 97:
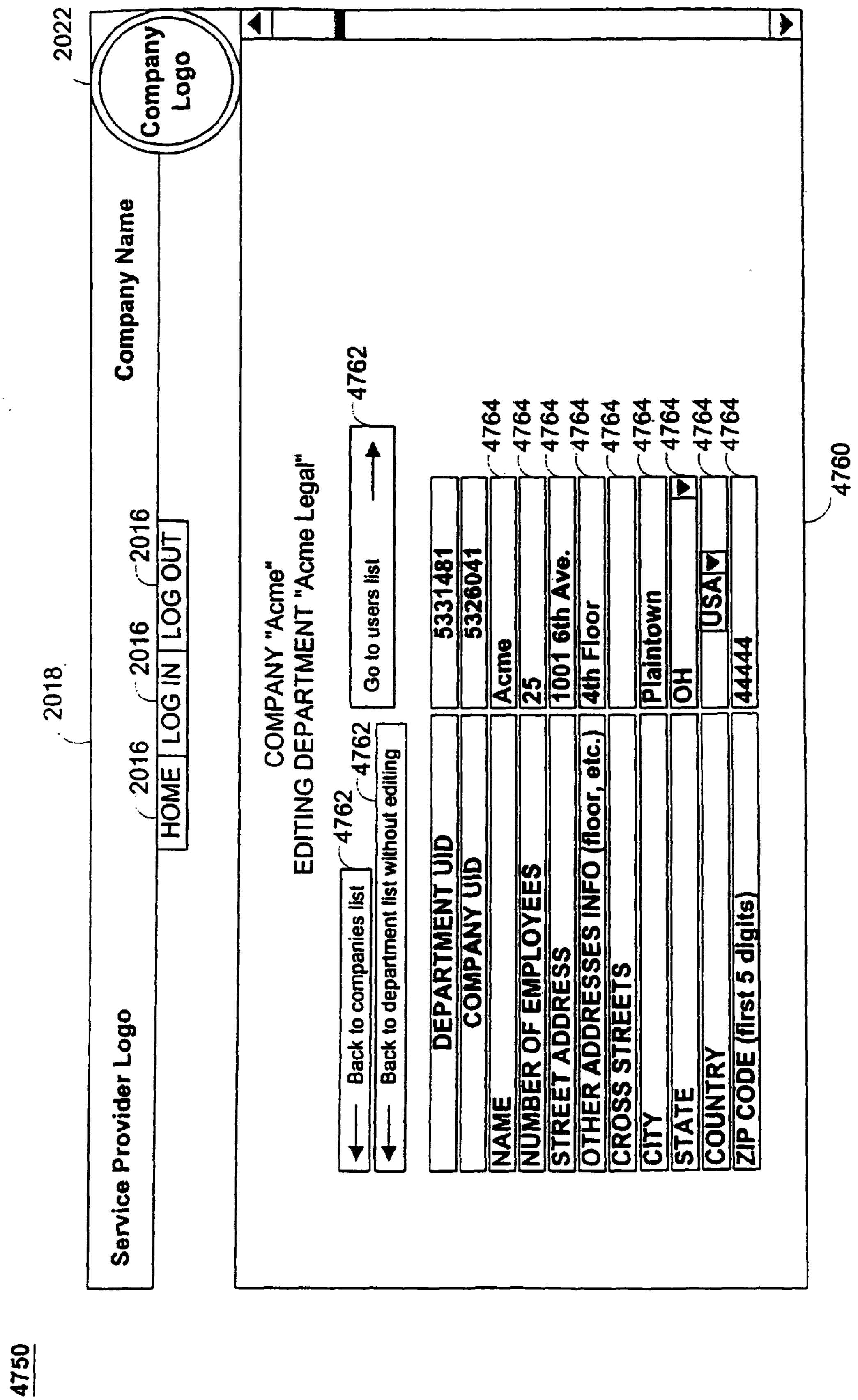
Figure 98:
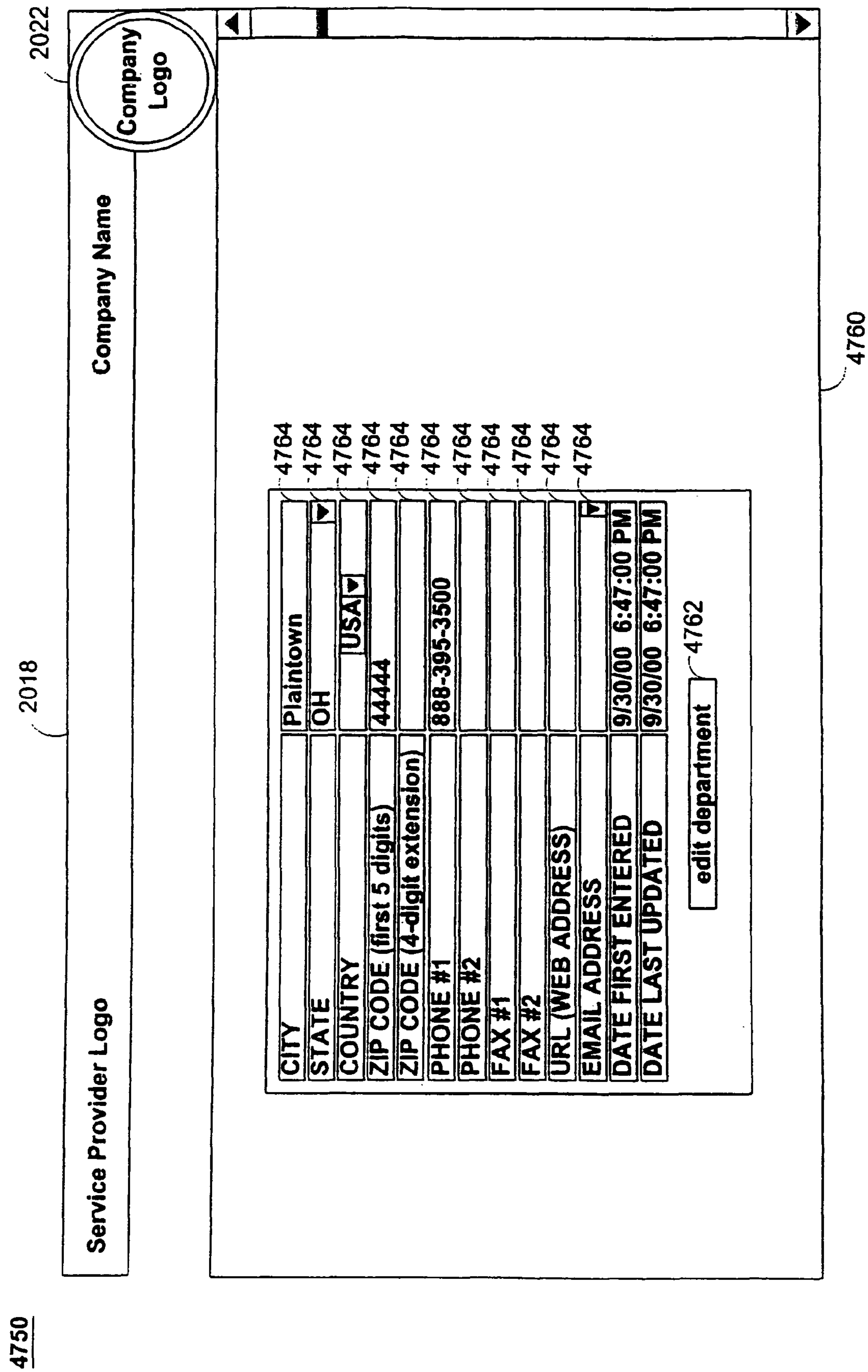

FIGS. 97 and 98 show illustrative displays that may be used to allow the system to receive indications regarding changes to department data in accordance with some embodiments of the present invention.

Figure 99:
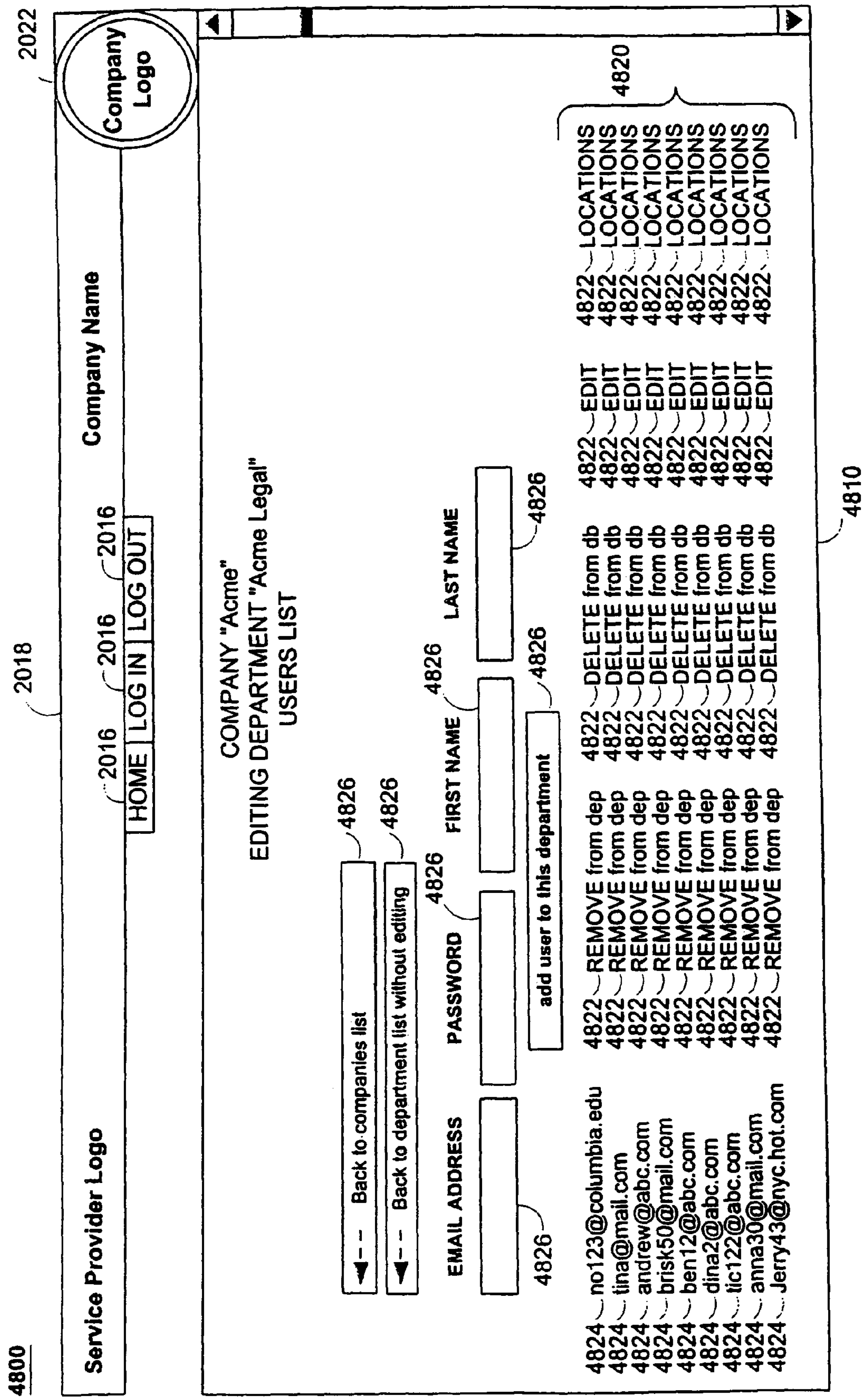

FIG. 99 shows an illustrative display that may be used to display a list of users and allow the system to receive indications regarding changes to user data in accordance with some embodiments of the present invention.

Figure 100:
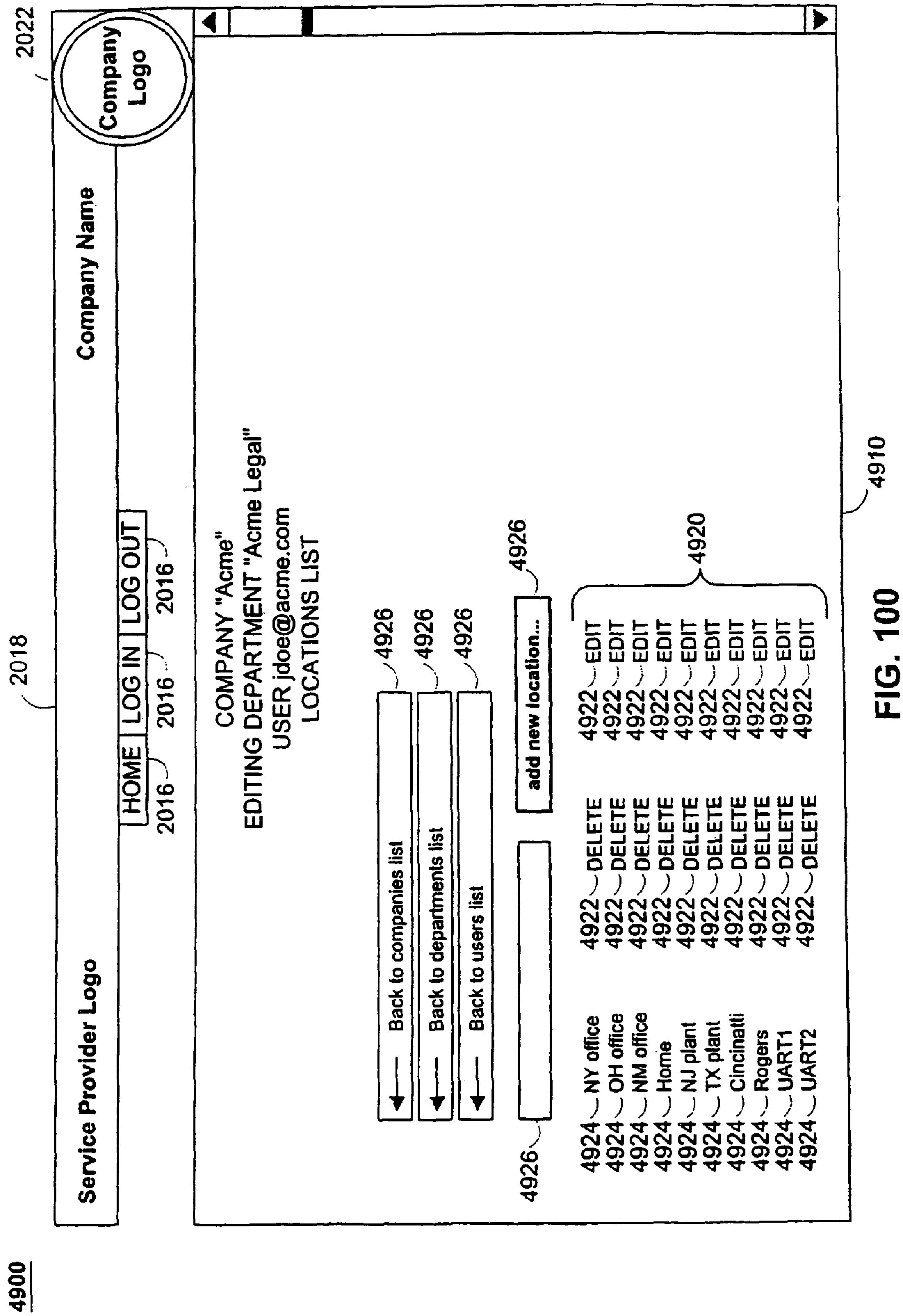

FIG. 100 shows an illustrative display that may be used to display a list of locations and allow the system to receive indications regarding changes to location data in accordance with some embodiments of the present invention.

Figure 101:
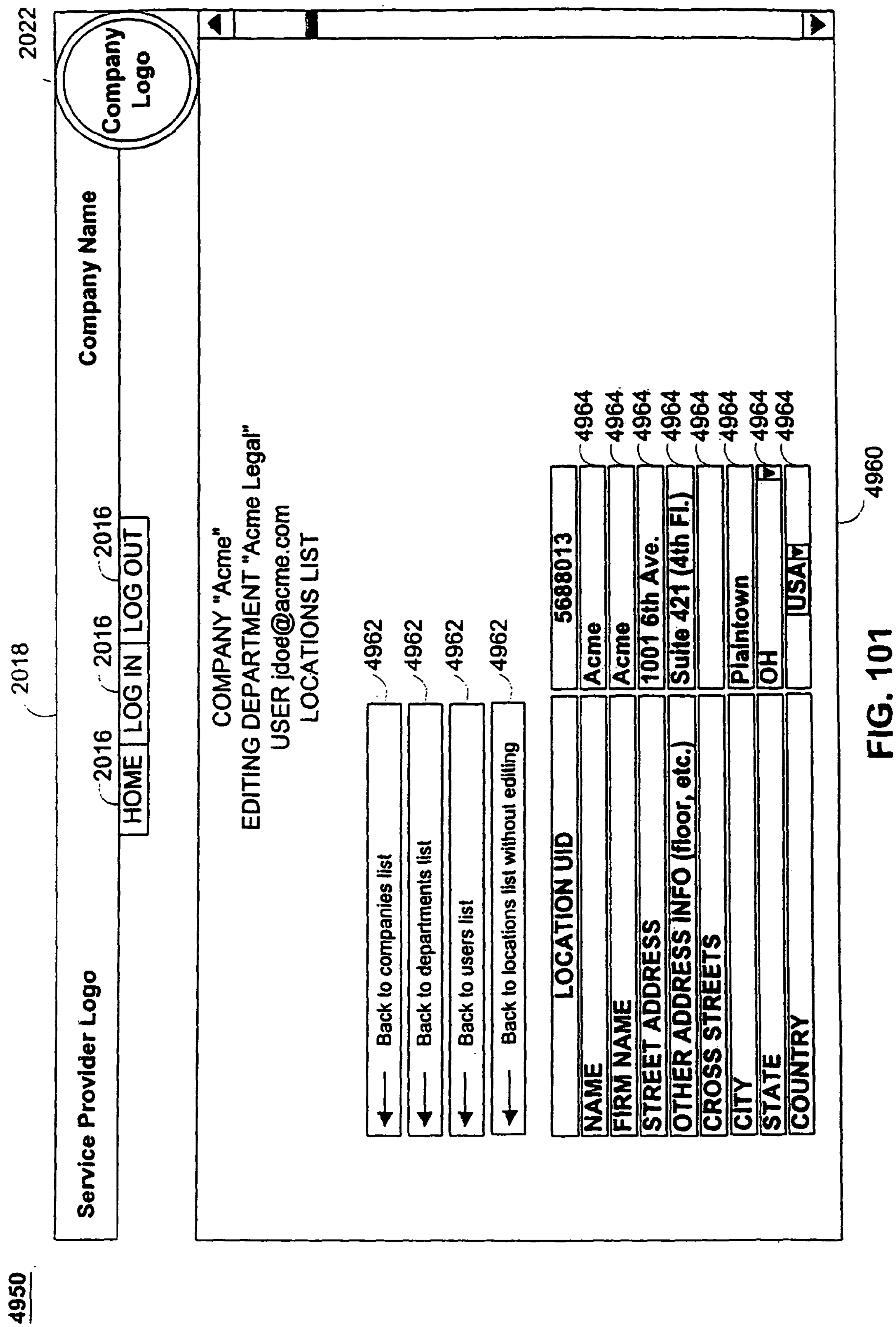
Figure 102:
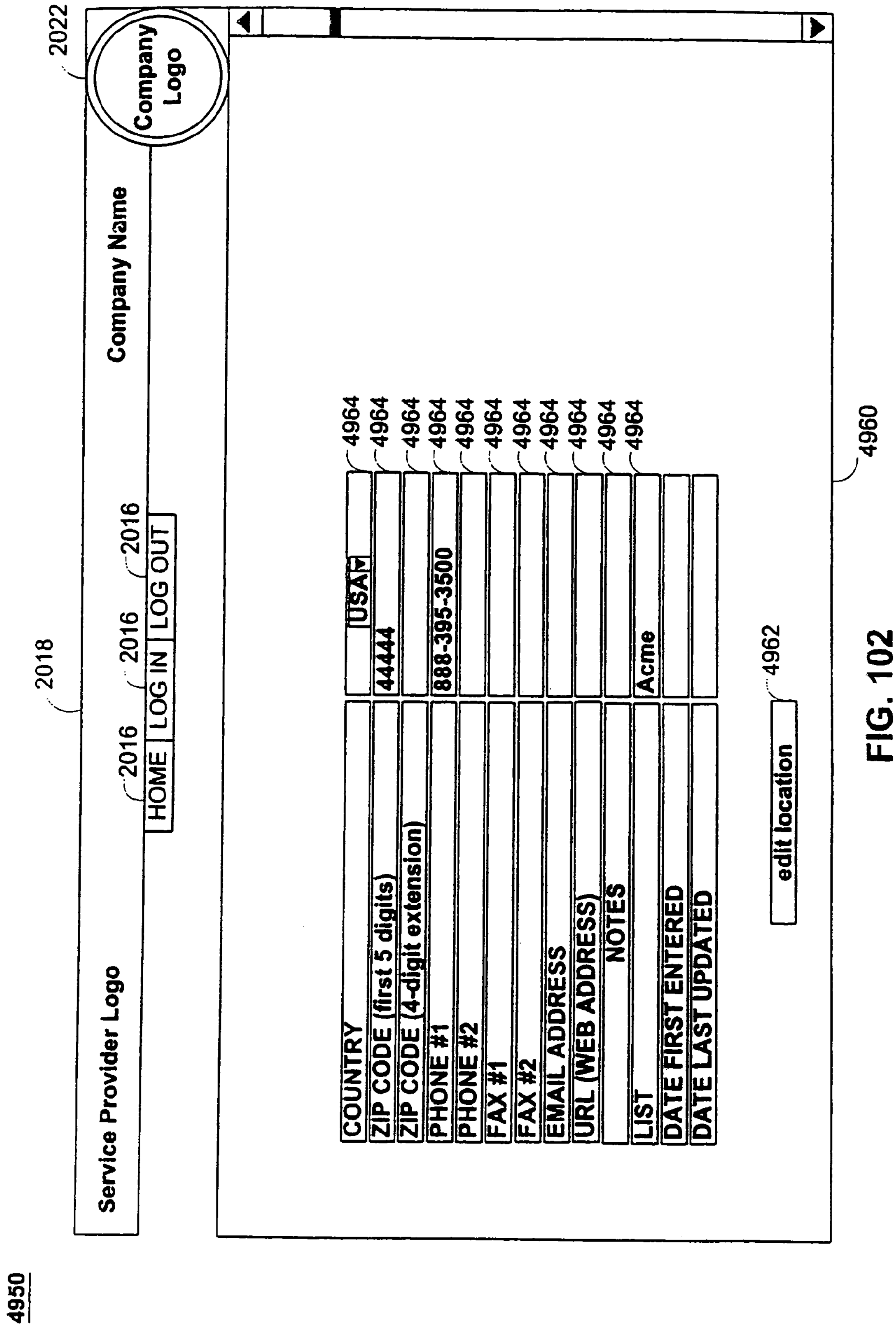

FIGS. 101 and 102 show illustrative displays that may be used to allow the system to receive indications regarding changes to location data in accordance with some embodiments of the present invention.

Figure 103:
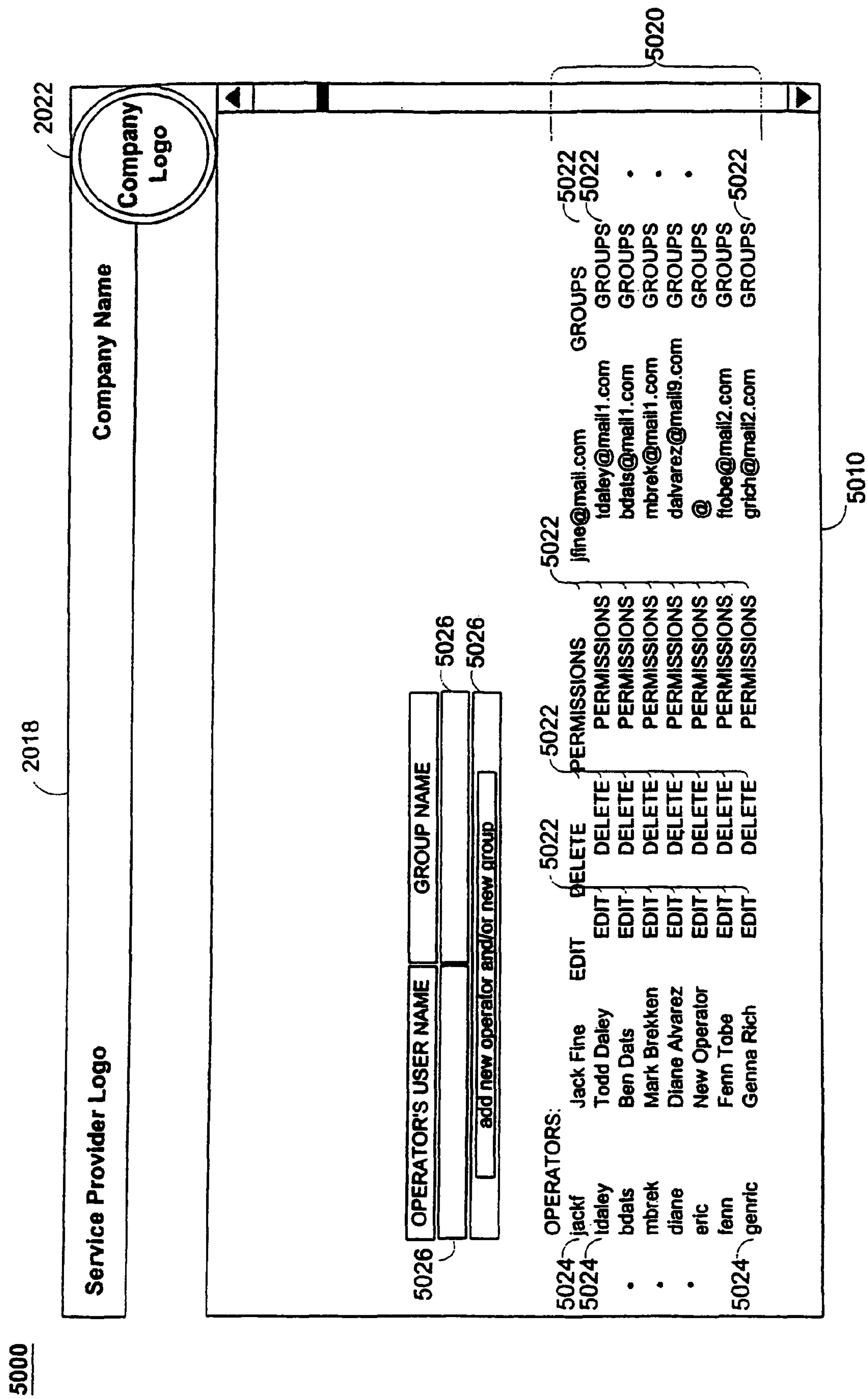

FIG. 103 shows an illustrative display that may be used to display a list of administrative users and allow the system to receive indications regarding changes to administrative user data in accordance with some embodiments of the present invention.

Figure 104:
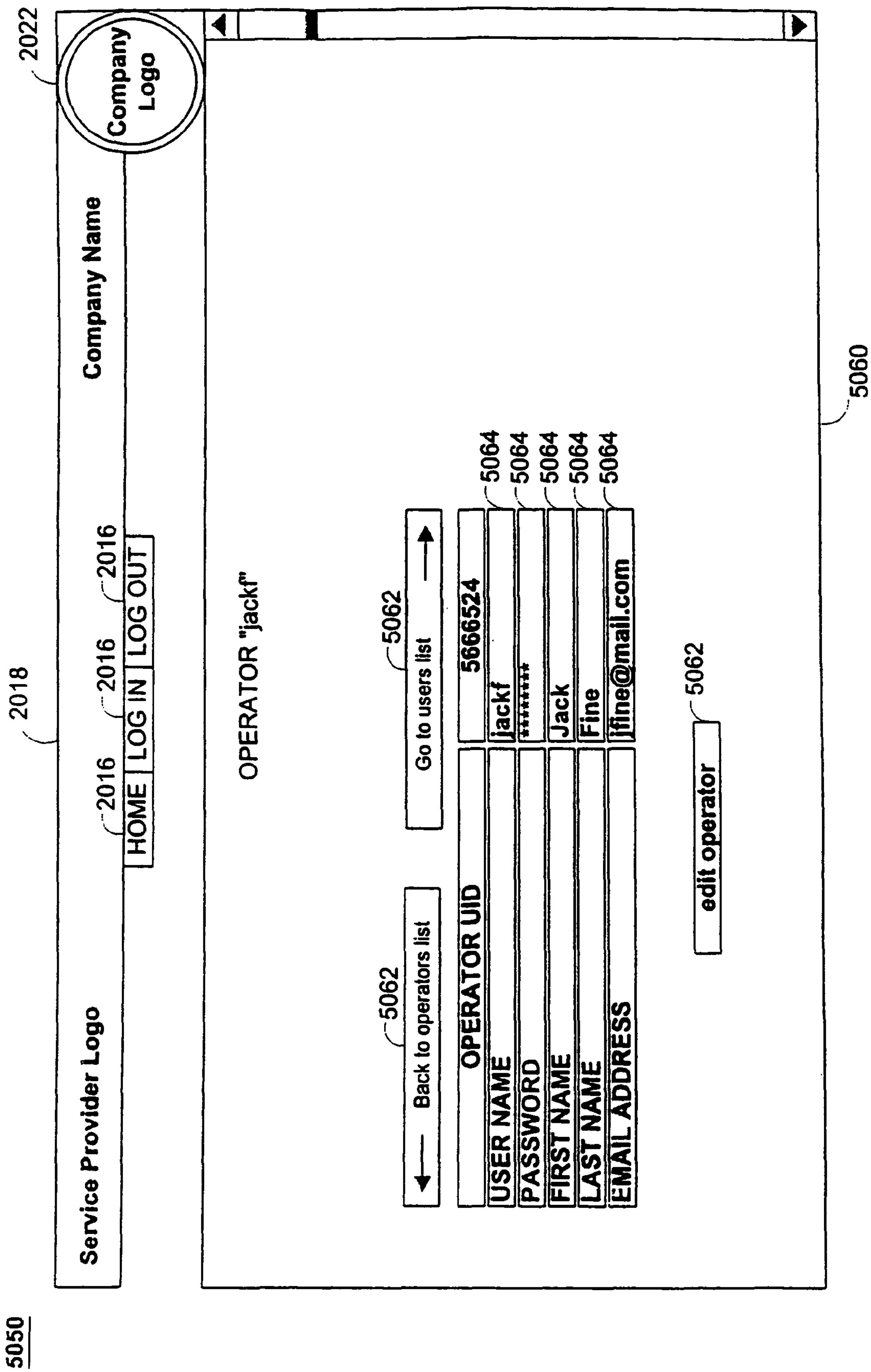
Figure 105:
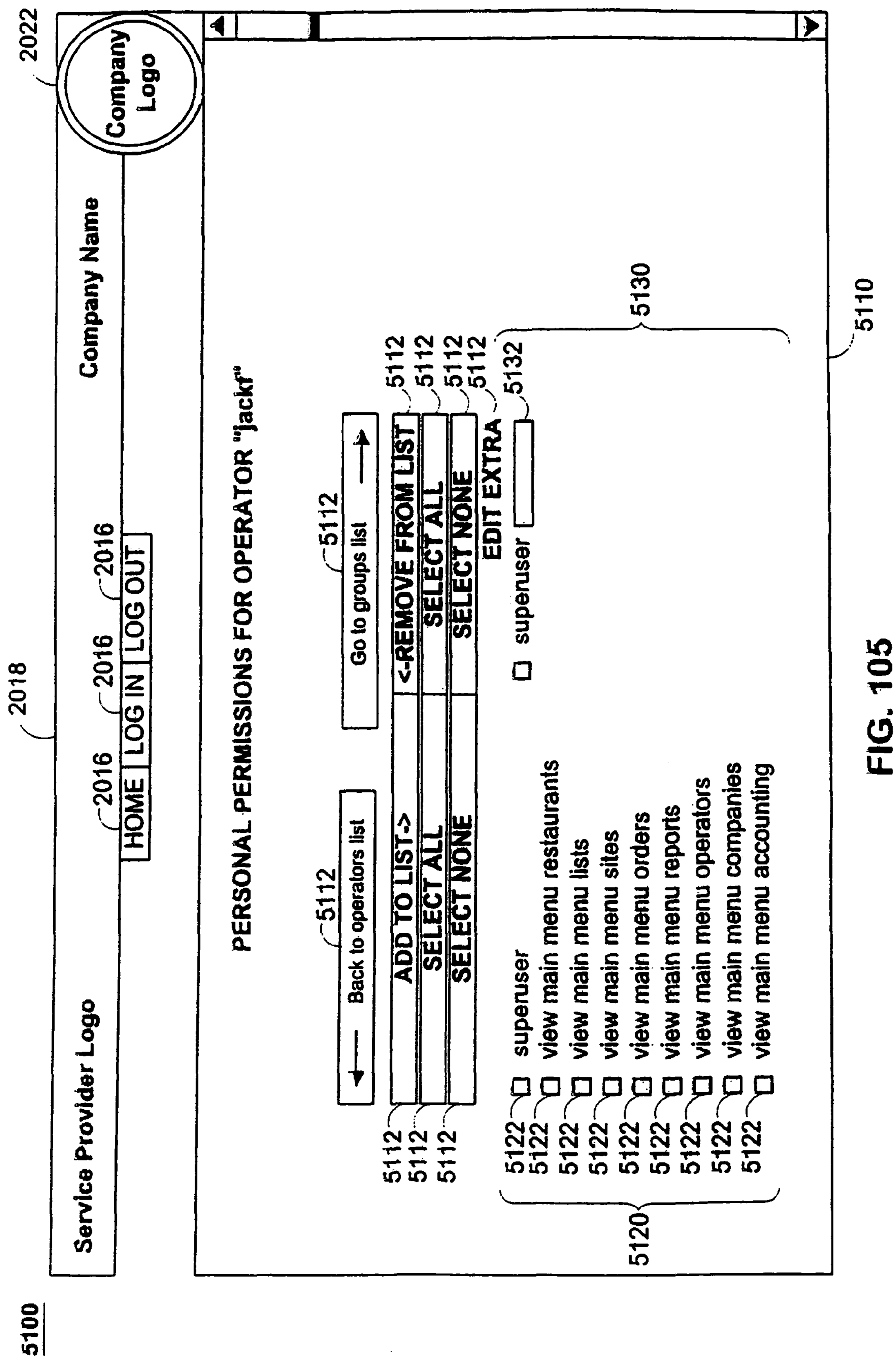
Figure 106:
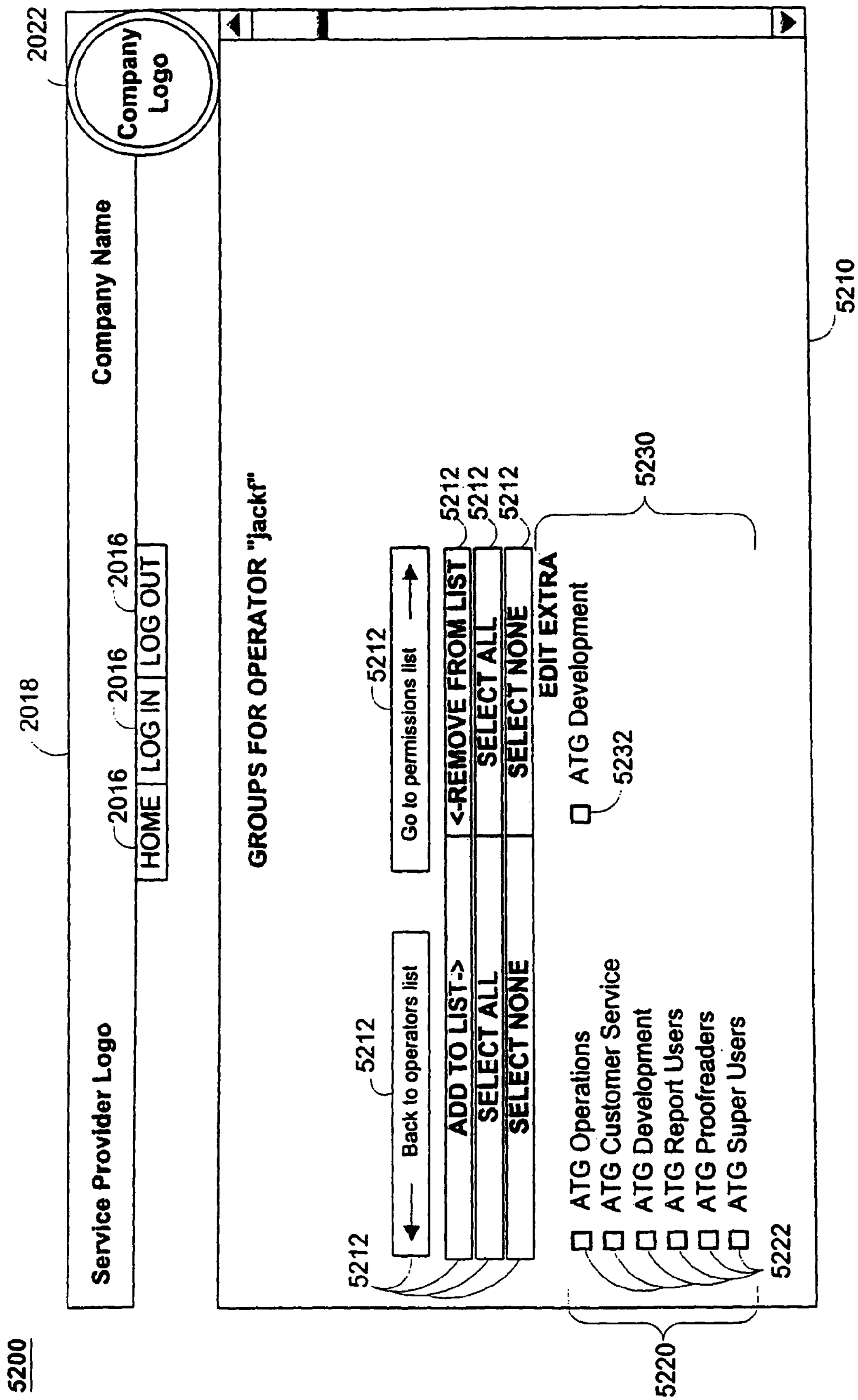

FIGS. 104, 105 and 106 show illustrative displays that may be used to allow the system to receive indications regarding changes to administrative user data in accordance with some embodiments of the present invention.

Figure 107:
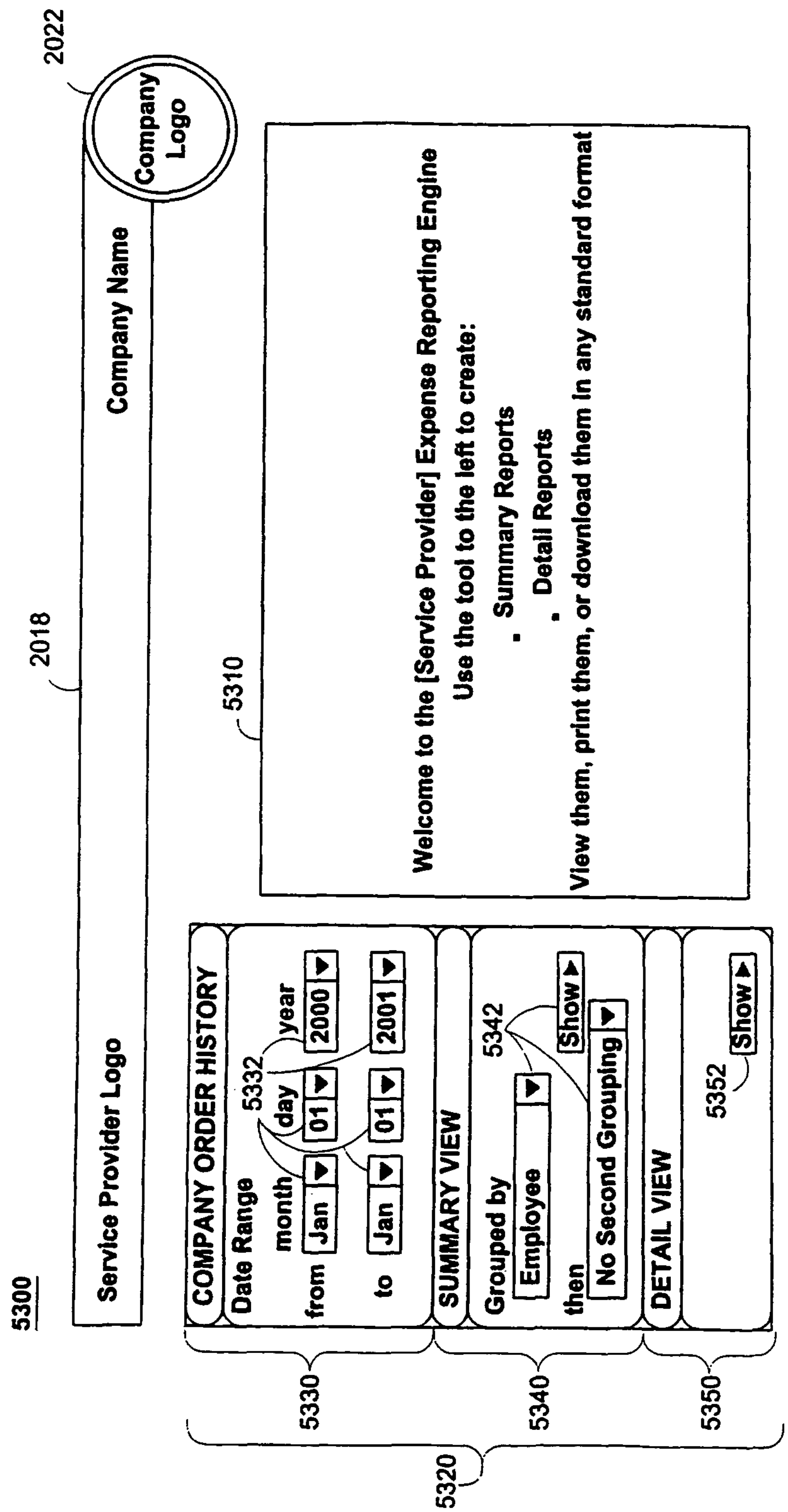
Figure 108:
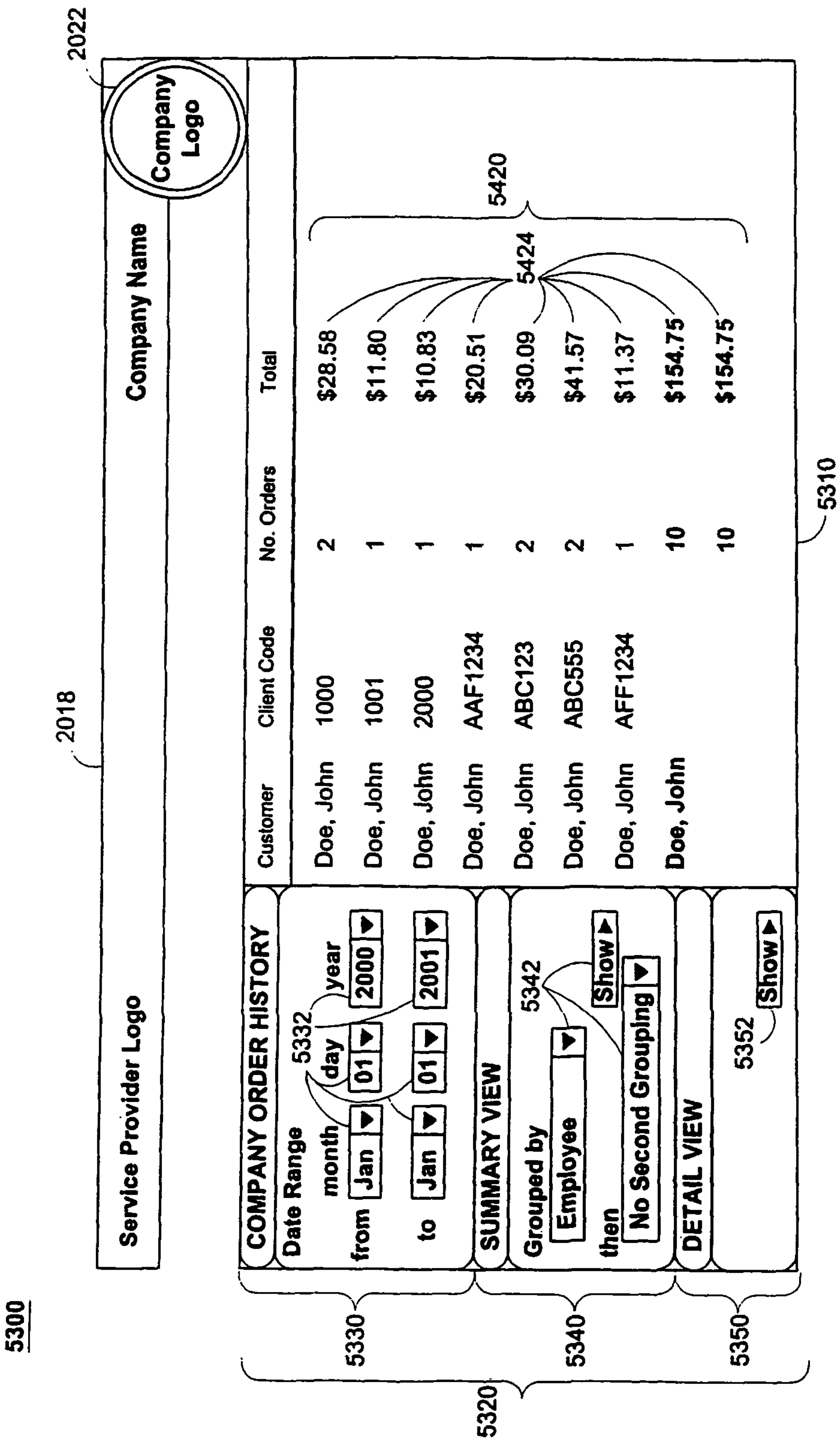
Figure 109:
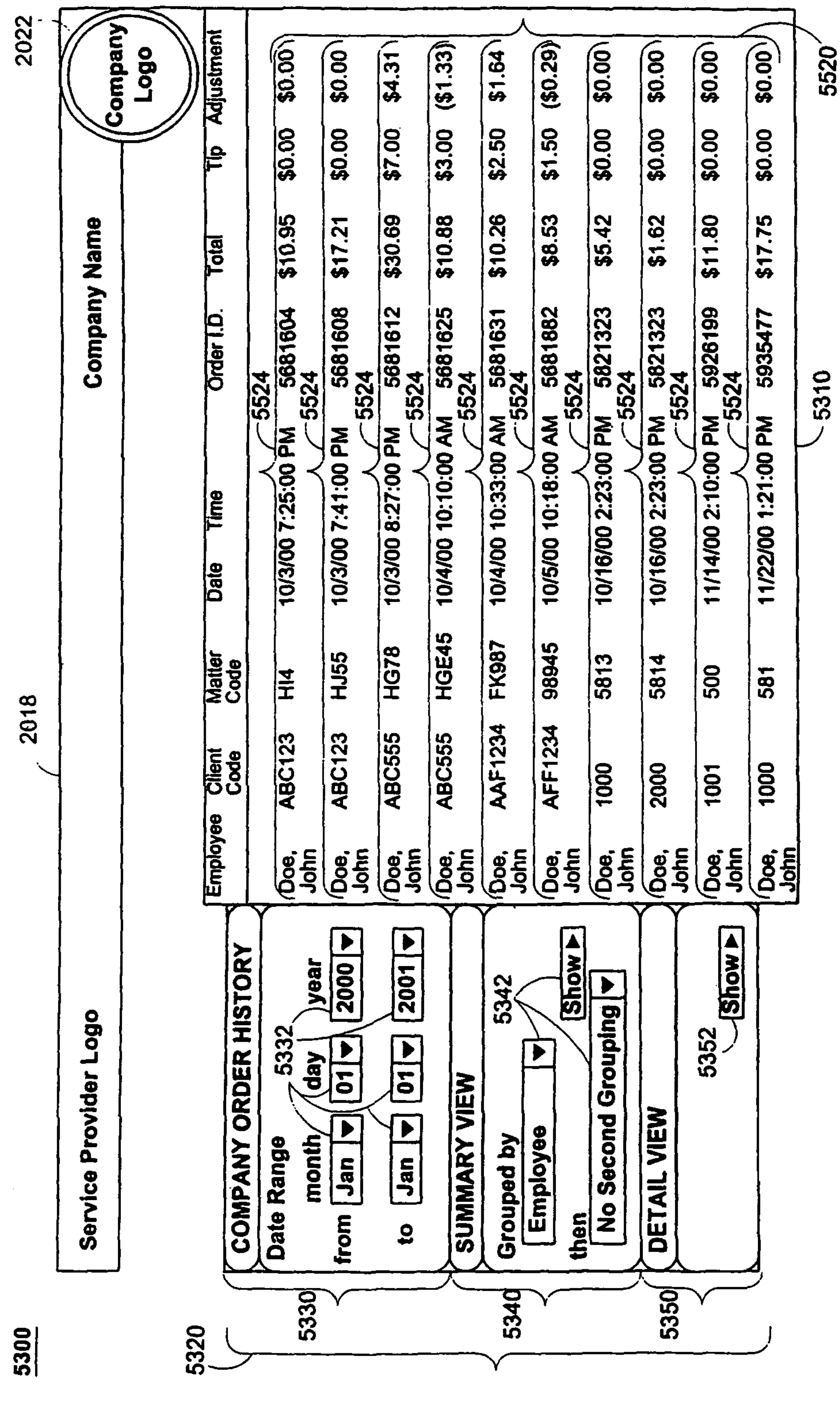

FIGS. 107, 108, and 109 show illustrative displays that may be used to display past order data and allow the system to receive indications regarding which past orders to display data about in accordance with some embodiments of the present invention.

DETAILED DESCRIPTION OF THE INVENTION

General Ordering

The present invention may be implemented using any systems or methods suitable for supporting electronic communications over any suitable communications network. Some embodiments may provide for conveying an order from a user to a supplier, conveying catalog information from a supplier to a user, or performing electronic transactions via an electronic communication network. Users may input orders or other transactions using an access device in communication with the network. For purposes of the descriptions herein, suppliers may be businesses, individuals, or organizations. Suppliers may include retail buyers, retail sellers, wholesale buyers, wholesale sellers, restaurants, securities brokers, stores, providers of services or any other business entity or individual.

Some embodiments may be implemented, for example, using non-on-line client/server or peer-to-peer based approaches. In other embodiments, web-based or on-line approaches may be used. If desired, a combination of these approaches may be used. Illustrative on-line and non-on-line based arrangements for an e-commerce system are shown in FIGS. 1 and 2, respectively.

Figure 1:
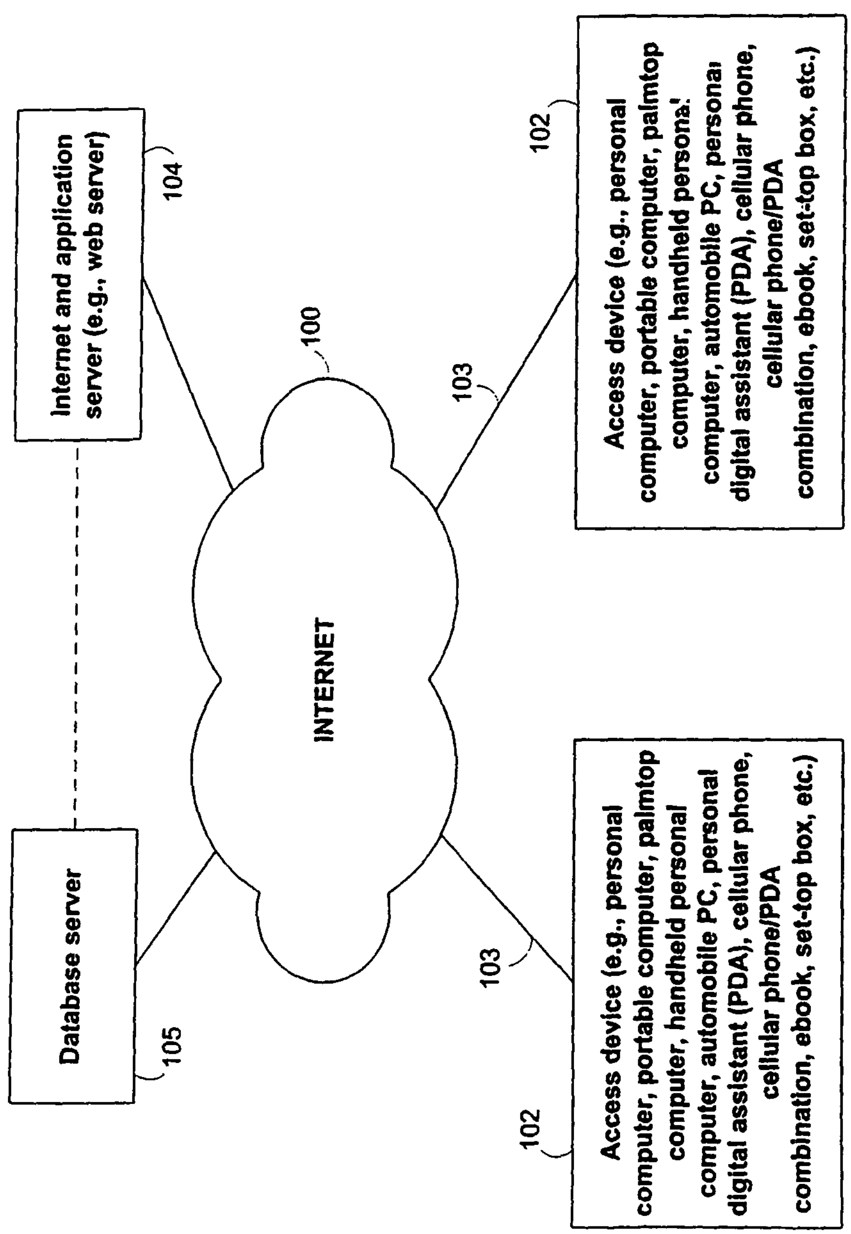
FIGS. 1 and 2 illustrate on-line and non-on-line arrangements, respectively, for an e-commerce system, in accordance with the present invention.
Figure 2:
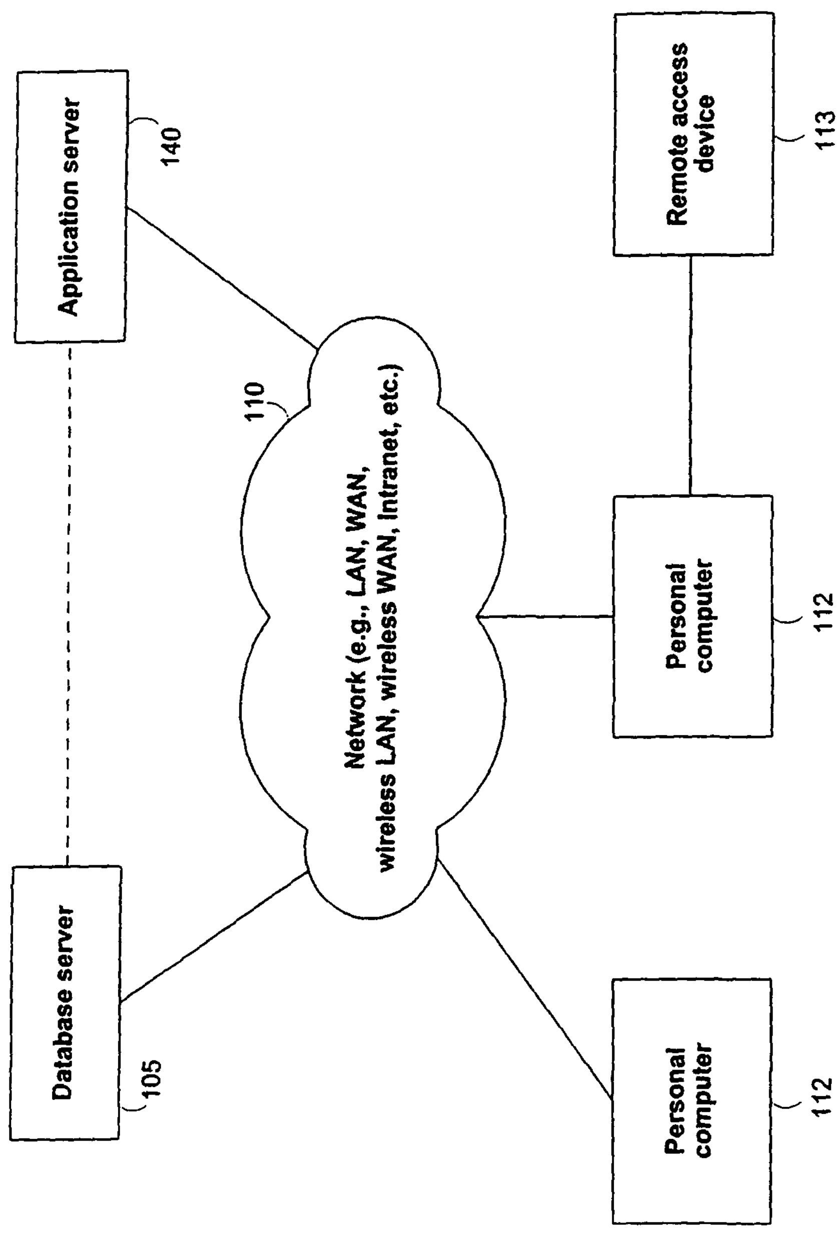

In the illustrative on-line arrangement of FIG. 1 access devices 102 may be connected via links 103 to Internet 100. Access devices 102 may include any device or combination of devices suitable for providing Internet access to a user of the system. Access devices may include, for example, any suitable personal computer (PC), portable computer (e.g., a notebook computer), palmtop computer, handheld personal computer (H/PC), automobile PC, personal digital assistant (PDA), Internet-enabled cellular phone, combined cellular phone and PDA, ebook, set-top box (e.g., a Web TV enabled set-top box), or other device suitable for providing Internet access.

Internet and application server 104 may be any server suitable for providing on-line access to an e-commerce web site. Internet and application server 104 may, for example, provide one or more pages to access devices 102 using one or more suitable protocols (e.g., the HyperText Transfer Protocol (HTTP) and Transmission Control Protocol/Internet Protocol (TCP/IP)). The pages may be defined using, for example, any suitable markup language (e.g., HyperText Markup Language (HTML), Dynamic HyperText Markup Language (DHTML), pages defined using the Extensible Markup Language (XML), JavaServer Pages (JSP), Active Server Pages (ASP), or any other suitable approaches). The pages may include scripts, computer code, or subsets of computer code, that define mini-programs (e.g., Perl scripts, Java applets, Enterprise JavaBeans (EJB), or any other suitable approaches). The system may be designed using suitable modular approaches such as, for example, Java 2 Platform—Enterprise Edition (J2EE), Component Object Model (COM), Distributed Component Object Model (DCOM), or any other suitable approach.

Internet and application server 104 may run a database engine suitable for maintaining a database of user, order, supplier, or catalog information such as, for example, Microsoft SQL Server, Oracle 8i, or any other suitable database engine. Internet and application server 104 may run Microsoft Internet Information Server. In practice, features of Internet and application server 104 may be integrated into a single server, or may be distributed across multiple servers that are interconnected via Internet 100.

Links 103 may include any transmission medium suitable for providing Internet access to access devices 102. Links 103 may include, for example, a dial-up telephone line, a computer network or Internet link, an infrared link, a radio frequency link, a satellite link, a digital subscriber line link (e.g., a DSL link), a cable TV link, a DOCSIS link, or any other suitable transmission link or suitable combination of such links. Different links 103 may be of different types depending on, for example, the particular type of access devices 102.

Any protocol or protocol stack suitable for supporting communications between access devices 102 and Internet and application server 104 over links 103 based on the particular device 102 and link 103 may be used. For example, Ethernet, Token Group, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), wireless application protocol (WAP), serial line Internet protocol (SLIP), point to point protocol (PPP), Transmission Control Protocol/Internet Protocol (TCP/IP), Sequenced Packet Exchange and Internetwork Packet Exchange (SPX/FPX) protocols, or any other suitable protocol or combination of protocols may be used.

FIG. 2 shows another illustrative arrangement for the e-commerce system of the present invention. Network 110 may be any suitable wire-based, fiber-based, or wireless local area network (LAN), wide area network (WAN), intranet, or other suitable network. Personal computers, and their interconnection via networks, are well known. Personal computers 112 may run suitable e-mail, HTTP, or other clients and client applications for providing users with access to the features of the system. In still another suitable approach, personal computers 112 may run suitable Internet browsers to provide users with access to the Internet via an Internet server (not shown). If desired, one or more personal computers 112 may be accessed by remote access device 113 to provide remote access to users to the system. Remote access device 130 may be any suitable device, such as a personal computer, personal digital assistant, cellular phone, or other device with remote access capabilities.

Database server 105 of FIGS. 1 and 2 may be any computer-based system suitable for maintaining a database of user, order, supplier, or catalog information. In particular, database server 105 may store attributes of users and suppliers, orders, order-related information, and catalog information. Database server 105 may run a database engine suitable for maintaining a database of item information such as, for example, Microsoft SQL Server, Oracle 8i, or any other suitable database engine. Database server 105 is shown as being connected to server 104 via Internet 100 and server 114 via network 110. In practice, database server 105 may be connected to server 104 or server 114 using a direct communications link. The features of database server 105 may be provided using a single server, distributed across multiple servers, or integrated into server 104 or server 114.

Figure 3:
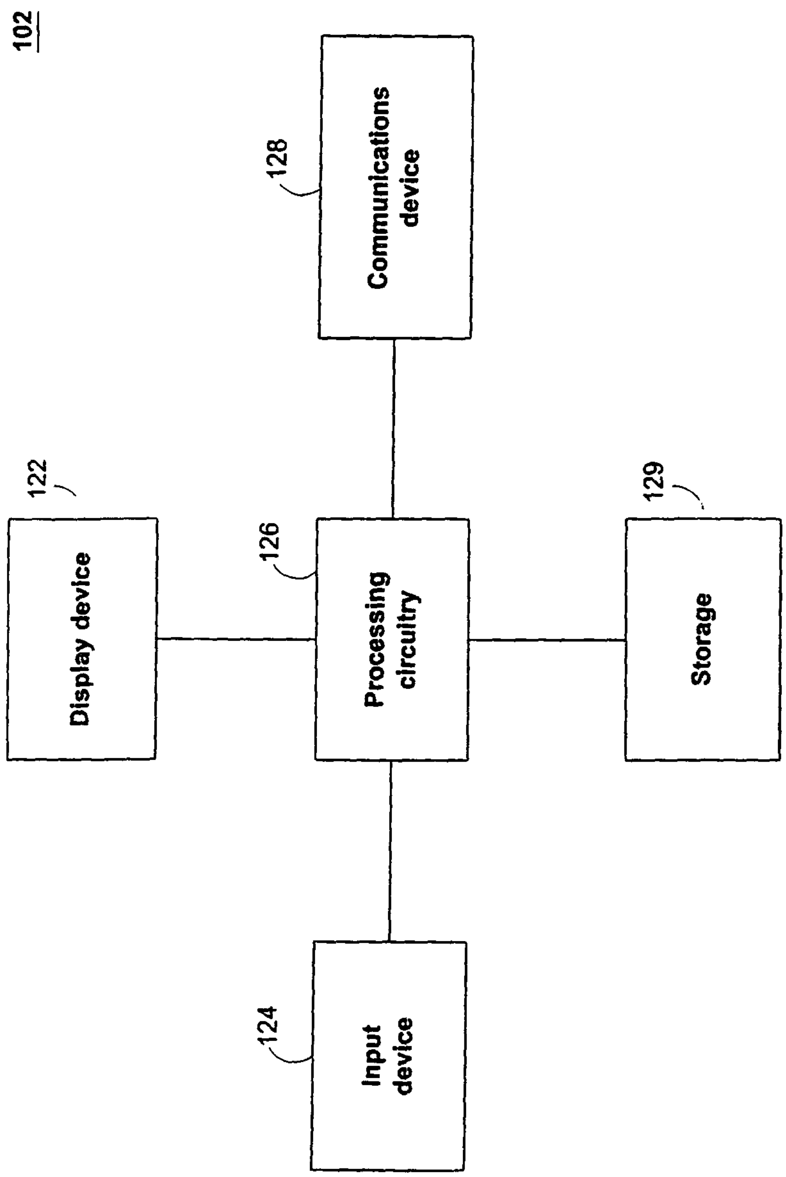
FIG. 3 illustrates an arrangement for the access devices of FIG. 1, in accordance with some embodiments of the present invention.

FIG. 3 shows an illustrative, generalized arrangement for the access devices 102 of FIG. 1. Access devices 102 may have, for example, user input device 124, processing circuitry 126, communications device 128, storage 129, and display device 122. User input device 124 may be any suitable input device. User input device 124 may include, for, example, a pointing device, keyboard, touch-pad, touch screen, pen stylus, voice recognition system, mouse, trackball, or any other suitable user input device. Processing circuitry 126 may include any suitable processor, such an Intel Pentium® microprocessor, and other suitable circuitry (e.g., input/output (I/O) circuitry, direct memory access (DMA) circuitry, etc.). Communications device 128 may be any device suitable for supporting communications over links 103. Communications device 128 may include, for example, a modem (e.g., any suitable analog or digital standard, cable, or cellular modem), network interface card (e.g., an Ethernet card, token group card, etc.), wireless transceiver (e.g., an infrared, radio, or other suitable analog or digital transceiver), or other suitable communications device. Storage 129 may be any suitable memory, storage device, or combination thereof, such as RAM, ROM, flash memory, a hard disk drive, etc. Display device 122 may include, for example, a cathode ray tube (CRT) monitor, liquid crystal display (LCD), voice synthesis processor and speaker, or any other suitable user output device. Users, suppliers, and any ordering system personnel may interact with system 101 using an access device such as access devices 102 or a personal computer such as personal computer 112.

Figure 4:
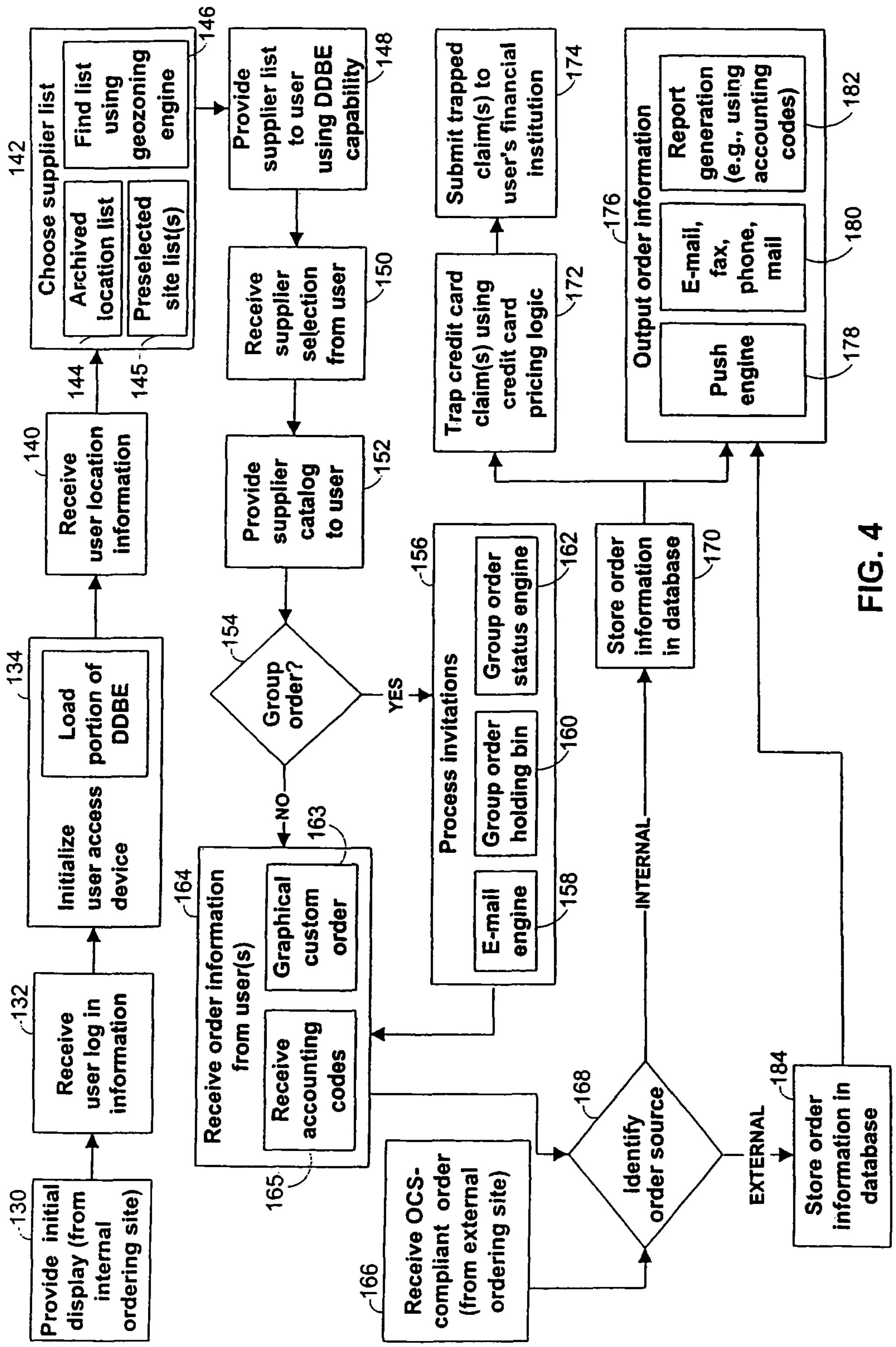
FIG. 4 is a generalized flowchart showing a possible flow of interactions between users and the system.

FIG. 4 shows a general flowchart of illustrative steps involved in operating some embodiments of the e-commerce system of the present invention. The steps shown in FIG. 4 are only illustrative and may be performed in any suitable order. In practice, there may be additional steps or some of the steps may be deleted. Some of the steps shown in FIG. 4 involve providing users with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. In an on-line arrangement, access device 102, for example, may be used to run client-based applications, such as a web browser. In non-on-line arrangements, personal computer 112, for example, may run client-based applications.

Other steps illustrated in FIG. 4 may involve additional processing, such as searching, grouping, calculating, generating e-mail, receiving and assembling order information, ordering, communicating with other systems, or other types of processing. In on-line arrangements (as shown in FIG. 1), such processing may be performed by, for example, access device 102, Internet and application server 104, or database server 105, depending on, for example, the processing and storage capabilities of access device 102, the chosen implementation for the markup language documents used, the processing requirements of such operations, or other factors. In non-on-line arrangements (as shown in FIG. 2), such processing may be performed by personal computer 112, remote access device 113, application server 140, database server 105, or distributed among peer applications, depending on the chosen system implementation and the processing requirements of such operations.

For clarity, the following discussion will describe the steps shown in FIG. 4 as being performed by "the system," which is intended to include any suitable e-commerce system, such as, for example, any non-on-line or on-line arrangement suitable for performing the steps. The system may receive orders from internal ordering sites or external ordering sites. Internal sites may be maintained by the system using Internet and application server 104 or application server 114 (as shown in FIGS. 1 and 2, respectively). External sites may be maintained independently from the system, but may submit orders that comply with standards determined by the system.

When a user places an order using an internal ordering site, the system may provide an initial display for at step 130. The initial display, and any subsequent displays, may correspond to any preselected themes, preferences, or requirements associated with the ordering site. Themes, preferences, or requirements may be determined by the system or by a group of users. The initial display may provide users with opportunities to log in (step 132), or may provide users with access to other system features. In some embodiments, users may be required to log in by, for example, entering a user name and a password. In other embodiments, users may not be required to log in to access the features of the system.

In step 134, the system may initialize the user's access device by loading portions of a distributed database engine into the access device browser, for example. The distributed database engine includes, in part, a presentation engine for driving a graphical user interface (sometimes referred to hereinafter as "GUI") and a translation engine for decompressing data that are to be received from the system.

In step 140, the system may receive an indication of the user's location. The location is a geographic place where the user is located or where the user desires to receive or receive delivery of ordered supplies. The system may provide the user with a list of suppliers that are close to the user's location for convenience, economy, or any other reason.

In step 142, the system may choose a list to provide to the user. The list may include suppliers that correspond to preselected preferences associated with the ordering site through which the user entered the system (145). Alternatively, the system may provide the user with a list that corresponds to the user's location. If the system may provide a list known from prior transactions to correspond to the user's location (archived location list 144), or it may use a geozoning engine (146) to map the user's location into geographic coordinates and retrieve or generate a list of suppliers corresponding to those coordinates.

In steps 148 and 150, the user may select a supplier and the system may receive an indication of the selection. In step 152, the system may provide a catalog from the selected supplier to the user. In step 154, the system may receive an indication that the user desires to place a group order. If so, the user is referred to as a host user and the system may generate, distribute, and manage invitations to other users (hereinafter, "invitees") to gather order information from the members of a group. Group orders may be processed using e-mail engine 158 for distributing invitations, group order holding bin 160 for receiving and holding orders from members of the group, and group order status engine 162 for monitoring the status of orders and invitations and providing status information to the host user. If no group order is requested, step 156 may be skipped.

In step 164, the system may receive order information from the user. (In the case of a group order, the system may already have ordering information, for example, in group ordering bin 160). When the system receives order information, it may receive accounting codes 165 for accounting and reporting purposes. Accounting codes may be especially useful if the user is a member of a group that monitors ordering activity of its member users. Graphical custom order 163 may provide methods of receiving order information in step 164 that involve manipulating graphical representations of items and customized features on a user's display, such as display device 122.

In step 168, the system may receive orders from ordering sites external to the system provided that the site is approved for ordering from the system and that the order complies with an open catalog standard (hereinafter, "OCS") that may be defined and distributed by the system. Internal orders may be stored in a database in step 170. When the system is compensated by suppliers in the form of a commission in connection with a sale of supplies to a user, the system may selectively trap credit card claims using credit card pricing logic (step 172). Trapped credit card claims may be submitted to the user's financial institution. When the financial institution remits funds to the system, the system can transfer the funds, less commission due, to the supplier.

In step 176 order information may be output. Order information may be output to a supplier by any communications device or link, including e-mail, fax, phone, or mail (180). Order information may be output to authorized users, including administrative users of a user group, in the form of reports that may be generated in connection with accounting codes or user attributes (182). Push engine 178 may be used to provide a continuous display of order information at various stages of the ordering process to authorized users (e.g., customer service representatives). For example, different authorized users of push engine 178 may have permission to view orders in different stages of the process or orders from different users or user groups.

When the source of an order is an OCS-compliant external site, orders may be stored in an order information database (step 184) as in the case of orders from internal sites. OCS-compliant external orders may be output in step 176 in a manner similar to the output of internal orders. In some embodiments, OCS-compliant sites may not need credit card pricing logic (172) since suppliers may have financial arrangements with the OCS-compliant external sites that are independent of the system. In some embodiments, step 172 may follow step 184.

Some embodiments of the present invention may provide users with locally searchable supplier information, catalog information, or a combination thereof. The information may be transferred to the user's access device and searched, for example, in a browser, using specialized functions that may be supplied by the ordering service. A user may browse or search the information and perform various functions locally, thereby transferring the processing burden of these functions from the server to the client device.

Supplier information may include, but is not limited to, name information, address information, service information, hours of operation information, catalog information, critique information, parking information, and any other information that may be relevant to a user's decision to order from a given supplier. These types of information are generic and may be suitable for many different types of suppliers. In some embodiments, supplier information may include information suitable to a specific type of supplier. For example, when a supplier is a food supplier, relevant supplier information may include cuisine information, delivery information, take-out information, hours of operation information, menu information, attire information, atmosphere information, and restaurant review information. A supplier information data set may include graphical information so that a user can view the appearance of the supplier's facilities, supplies, or personnel.

Users may be prompted for their location (e.g., address, Zip code, or other indication of location). In some embodiments, a special data set of supplier information may be selected or generated that includes suppliers within a predetermined distance from the user.

After providing the supplier information, a request from the user to view a catalog from one of the suppliers may be received. The ordering service may provide the user with a locally searchable and browsable data set comprising catalog information Catalog information for a given item may include, for example, name information, identification number information (including any relevant model number or SKU number), size information, color information, material information, inventory information (including indications of whether or what quantity of an item is stocked), customization information (including optional features, extra features, or personalization information). These types of information may be suitable for many different types of suppliers. In some embodiments, catalog information may include information suitable for a specific type of supplier.

For example, when a supplier is a food supplier, catalog information may include entree information, side dish information, beverage information, dessert information, special item or entree information, catering information (including information regarding availability and pricing of catering services), and grocery information (including information about packaged foods, produce, meat, and other grocery supplies). Catalog information may include graphical or video information (e.g., TIFF files, GIF files, JPG files, MPEG files, bitmaps, or any other suitable graphic or video files) so that a user can view, for example, the appearance of the supplier's facilities, supplies, or personnel.

An order, which may include, for example, one or more items, one or more options or customized features, one or more services, or one Or more payment methods selected from the supplier's catalog, may be received from the user. The order may be stored in a database and the order or related information is transmitted to the supplier selected by the user.

Figure 5:
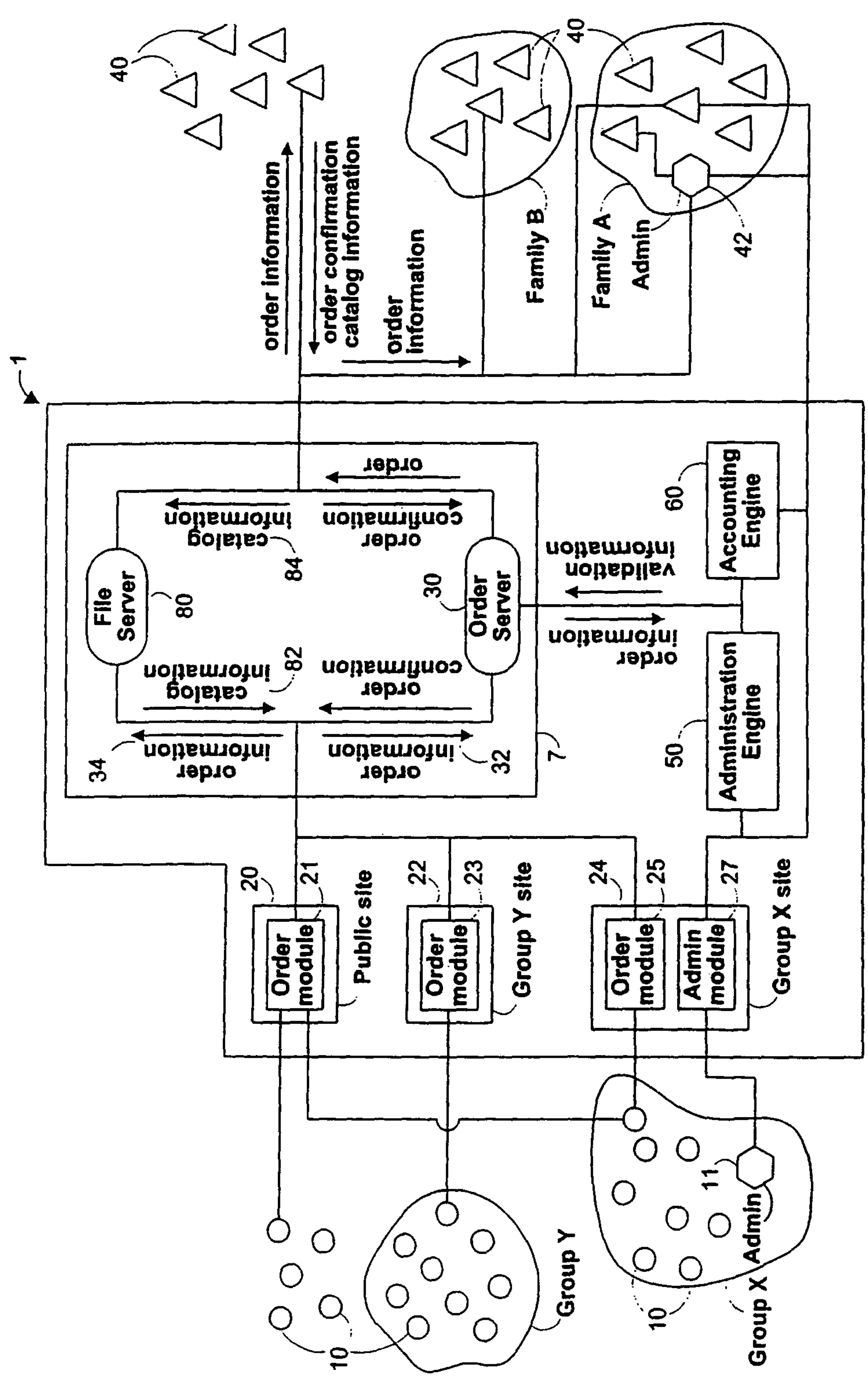
FIG. 5 illustrates an ordering system in accordance with some embodiments of the present invention.

FIG. 5 shows illustrative ordering system 1 in accordance with some embodiments of the present invention. Ordering system 1, including server module 7 may be driven by any of the apparatus illustrated in FIGS. 1 and 2. In particular, in some on-line embodiments, for file serving, searching, storing, grouping, calculating, and other necessary function of system 1 or server module 7 may be provided by Internet and application server 104, database server 105, or a combination thereof. User 10 and suppliers 40 may interact with ordering system 1 using access devices, such as devices shown in FIGS. 1 and 2. Ordering system 1 may receive orders for items, merchandise, or services (hereinafter, "supplies") from users 10 through order sites, such as order site 20. Order sites may have order engines (hereinafter, "order modules") that may present supplier information, catalog information, and order-related content to users and receive user selections regarding the presented information, assemble orders, and transmit orders and related information to order server 30. Order server 30 may pass order information to suppliers 40. Suppliers 40 may provide catalog information to system 1. Order information may be passed through secure internal interface 18 to administration engine 50 and accounting engine 60.

Some order sites may provide users with order-related content. The order-related content for a given site may be keyed to cuisine, location, business promotion, or any other theme or interest. Order site may require that users have permission to order from the sites. For example, public site 20 may be open to users 10 from the general public. Order module 21 in order site 20 may receive order information from users 10 and transmit order information to order server 30. Public sites may be provided by a service provider to facilitate or promote the sale services or products provided by a given supplier or family of suppliers or for any other reason.

Order sites may provide users with the ability to order supplies from suppliers that may be selected for each site according to a variety of supplier characteristics or site requirements. For example, a site may provide a user with the ability to order from suppliers that are located in a given area or whose supplies meet preset site criteria, which may be related to site content or business interests.

Groups of users that have common interests, business, or accounting requirements may be given common permissions to order from a group order site. For example, order site 22, provided with order module 23 is a group site for Group Y of users 10. Site 22 may be restricted to use only by users 10 who are members of Group Y. Site 22 is an unadministered group site, because Group Y does not include an administrative user. Unadministered group sites may be suitable for organizations such as colleges and universities, clubs, associations, unions, companies, or interest groups that may benefit from consolidating orders and gaining access to preselected suppliers.

Order site 24 may be an administrated site for Group X of users 10. Order module 25 may provide special content and ordering features to members of Group X. Group X may include one or more administrative users, such as administrative user 11. Administrative user 11 may have permission to access administration module 27 of site 24. Administration module 27 may be used to add, delete, or edit content or features provided by order module 25.

Administrative user 11 may use administrative module 27 to add, delete, edit, and manage user information for Group X users and general Group, X information that may be stored by administration engine 50. User information may include identification, permission, location information, and any other information relating to Group X users. Group X information may include supplier selections, accounting codes, house account information, billing information, and any other information related to customized use of system 1 by Group X users.

Accounting engine 60 may receive order information from order server 30 in connection with orders placed by members of Group X. For example, administrative user 11 may generate reports detailing orders (including, e.g, items ordered, order costs, and billing particulars) placed by a given user or user subgroup. Administrative user 11 may use accounting engine 60 to receive and analyze order information. An administered site, such as site 24, may be used by companies, firms, divisions, departments, partnerships, associations, agencies, subsidiaries, or any other organization or sub-organizational unit or entity.

Suppliers 40 may be organized into families such as Family A and Family B for convenience or economy. Suppliers 40 that are members of Family A, for example, may share common catalog information. For example, one joint catalog may be registered in file server 80 while more than one of users 40 in Family A may be capable of fulfilling an order from the joint catalog. A user 10 placing an order from system 1 for an item in a Family A catalog may therefore be able to receive delivery of merchandise from any supplier in Family A. The determination of which supplier 40 within Family A actually fulfills the order may be made based on proximity, inventory, or the preference of user 10.

In this example, Family A further includes administrative supplier 42. Administrative supplier 42 may be an individual or group of individuals appointed to provide catalog information to system 1 and manage orders received from system 1. System 1 may provide administrative supplier 42 with tools for submitting Family A catalog information to file server 80, editing or managing Family A catalog information in file server 80, or implementing rules that determine which of suppliers 40 in Family A may fulfill a given order from a user 10. An administered family, such as Family A, may be used by companies, firms, divisions, departments, partnerships, associations, agencies, subsidiaries, or any other organizations or sub-organizational units or entities that may benefit from the ability to manage one or more joint catalogs or from access to family information from accounting engine 60.

Family B is an example of an unadministered supplier family. Unadministered supplier families may be used by companies, firms, divisions, departments, partnerships, associations, agencies, subsidiaries, or any other organizations or sub-organizational unit or entities that may benefit from the convenience or economy of sharing a common catalog, but for whom the functions of an administrative supplier 42 are unnecessary.

Open Catalog Standard

Some embodiments of the invention may transfer catalog information, order information, or other suitable transaction information between end users (e.g., consumers) and remote computers (e.g., suppliers) using standard data formats. In some of these embodiments, an open standard, such as an Open Catalog Standard ("OCS"), is generally represented in steps 166, 168, and 176 of FIG. 4. In accordance with embodiments of the invention having OCS features, an ordering service may provide standard data formats for receiving orders for supplies, submitting orders to suppliers, receiving catalog information from suppliers, and transmitting catalog information to users.

In accordance with some embodiments of the invention, an ordering system may receive, process, index, compress, and/or store catalog information from a plurality of vendors or suppliers. The ordering system may provide an OCS to enable users to view the catalog information, interpret, or translate compressed or encoded catalog information.

Some embodiments may provide users with standard data formats for creating and submitting orders. A user, which may be an independent ordering site, may be qualified or certified by the ordering service as an authorized or approved user. Certification, authorization, or approval may involve due diligence, auditing, or other measures for ascertaining creditworthiness, technical compliance, data quality control or assurance, and data freshness. The ordering service may require, in addition to certification and compliance with ordering standards, that a user present a password or an encrypted key. In some embodiments, keys may be provided to users upon initial approval. Users may include keys in an HTTP header or any packet of data transferred with a recognized protocol. Some embodiments may receive encrypted transmissions of orders or catalog information.

Additionally, the ordering service may provide an approved user or ordering site with permission and any codes necessary to request updated catalog information from a given supplier.

Figure 6:
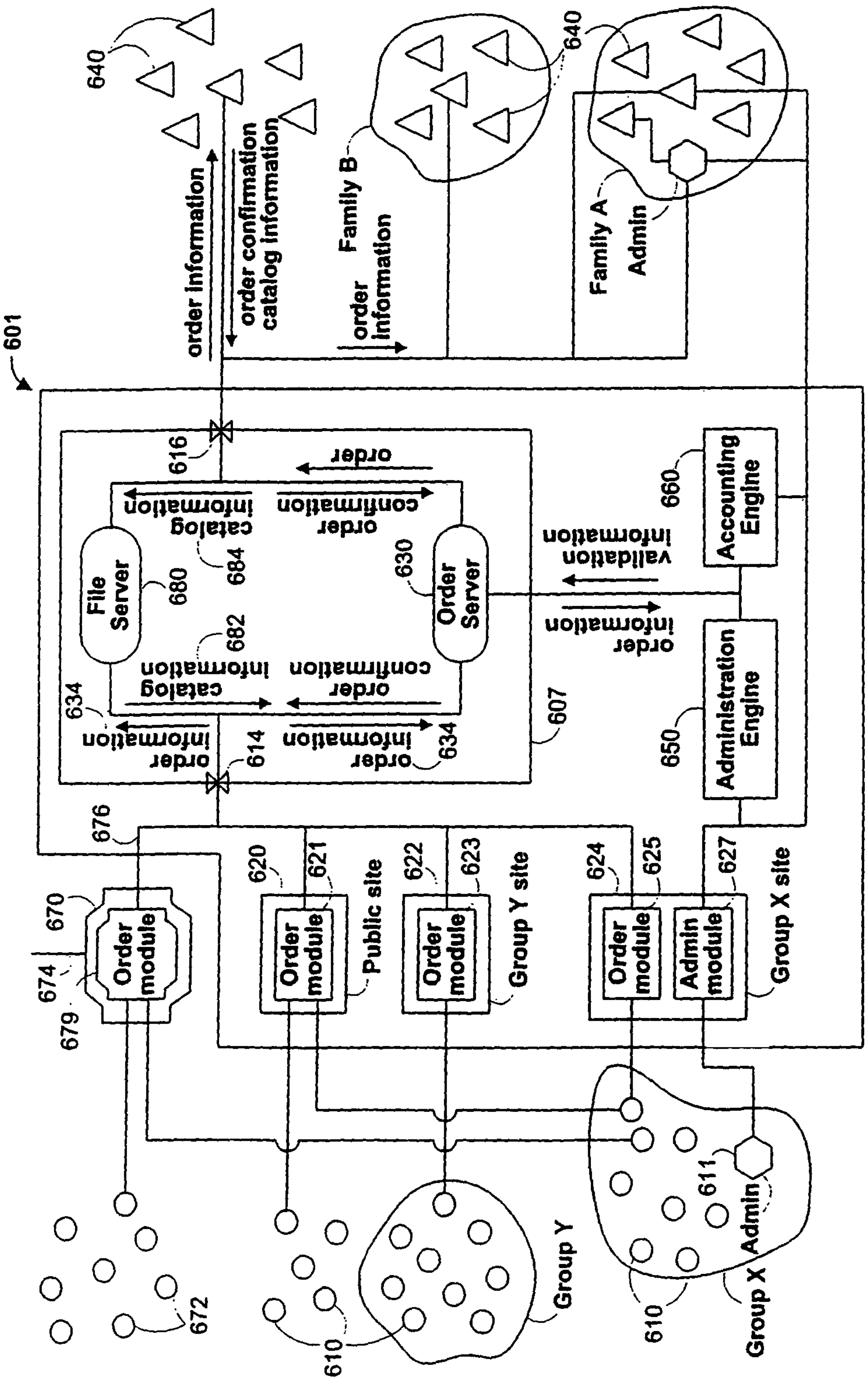
FIGS. 6 and 7 are illustrative data flow diagrams showing interactions between various parts of the open catalog system in accordance with some embodiments of the present invention.

FIG. 6 shows illustrative server module 607 integrated into ordering system 601 with secure interfaces 614 and 616. Server module 607 may transfer order information from ordering web sites such as sites 620, 622, and 624 to suppliers 640 in a manner generally similar to that of server module 7 shown in FIG. 5. Ordering web sites 620, 622, and 624 may be internal to system 601. Users 610 and administrative users, such as user 611, may have the benefits of administrative engine 650 and accounting engine 660, which are analogous to administration engine 50 and accounting engine 60 of FIG. 5, as described above.

The addition of secure interface 614 may enable server module 607 to provide ordering services to external ordering sites, such as external ordering site 670, that are outside of ordering system 601.

Site 676 may receive orders from external users 672, using, for example, external order module 679. Order module 79 may be of any design or architecture, including designs or architectures that differ from those of internal sites, such as sites 620, 622, 624, or any other internal sites that may be included in system 601.

In some embodiments, external site 670 may be provided with permission, protocols, or standards necessary to submit orders to system 601, for example, along path 676. External users 672 may be identifiable or completely anonymous to system 601. System 601 may treat orders received from users 672 as if they originate at ordering site 670 (although suppliers 640 may ship, deliver, or otherwise provide services and supplies directly to users 672). Billing procedures, used in connection with internal sites, including credit card pricing methods (discussed below), may be used in connection with receipt of OCS orders from external sites (not shown in FIG. 4). Although administrative engine 650 and accounting engine 660 are shown communicating with server module 607, the functions of these engines may be reserved for users 610 ordering through internal sites.

Figure 7:
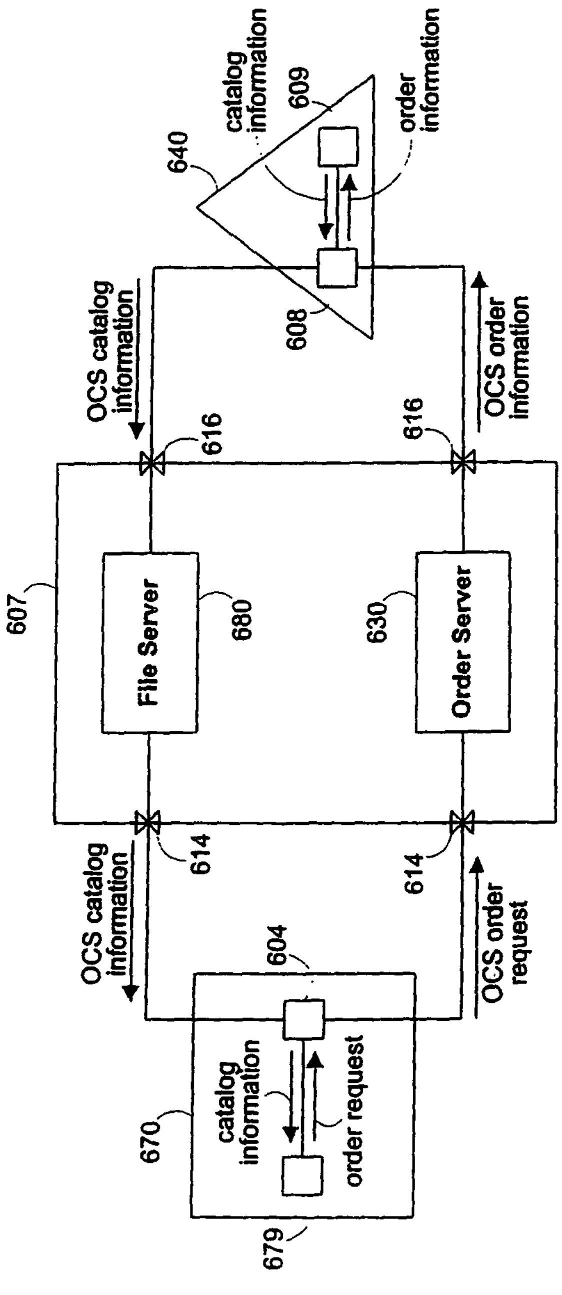

FIG. 7 is an illustrative data-flow diagram showing the use of an OCS-based ordering module and associated elements. FIG. 7 shows that external ordering site 670, which includes external ordering module 679, may be equipped with filter 604 for translating order requests and order-related requests into a form that may be compatible with the requirements of order server 630. Filter 604 may include an application programming interface and OCS requirements or explanations of OCS requirements. For example order server 630 may require that external orders use HTTP-based protocols (e.g., HTTP or S-HTTP), be coded using a suitable markup language (e.g., SGML or DHTML, or defined in accordance with a meta language, such as XML), or structure order requests according to any OCS format determined and controlled by a service provider in connection with server module 607.

Supplier 640 may be provided with filter 608 that supplier 640 can use to translate OCS order information into a format compatible with information system 609 of supplier 640. Filter 608 may include an application programming interface and OCS requirements or explanations of OCS requirements. Filter 608 may translate catalog information from the format of information system 609 to OCS catalog information for uploading to file server 680.

External ordering site 670 may request catalog information from server module 607 and receive OCS catalog information from file server 680. Filter 604 may translate OCS catalog information into a catalog information format used by server module 679.

Secure interface 614 may accept only OCS order requests accompanied by an encrypted key. Secure interface 614 may require that the encrypted key be received from an approved external ordering site.

Distributed Database Engine

Some embodiments of the present invention may include a distributed database engine (hereinafter, referred to as "DDBE"). In some of the embodiments, this feature is generally represented in steps 134, 148, and 182 of FIG. 4. The DDBE may distribute searching, sorting, grouping, translation, or other processes from a centralized database or database server to a user access device. Some embodiments of the DDBE are described in U.S. Provisional Patent Application No. 60/245,503, filed Nov. 3, 2000, which is hereby incorporated herein in its entirety.

Features of some embodiments of the DDBE involve providing users with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. In an on-line arrangement, access device 102 (as shown in FIG. 1), for example, may be used to run client-based applications. In non-on-line arrangements, personal computer 112 (as shown in FIG. 2), for example, may be used to run client-based applications.

Other features of the DDBE may involve additional processing, such as searching, sorting, grouping, calculating, exchanging information and processing code, or other types of processing. In on-line arrangements (as shown in FIG. 1), such processing may be performed by access device 102, Internet and application server 104, or database server 105, depending on, for example, the processing and storage capabilities of access device 102, the chosen implementation for the markup language documents used, the processing requirements of such operations, or other factors. In non-online arrangements (as shown in FIG. 2), such processing may be performed by personal computer 112, remote access device 113, application server 140, database server 105, or distributed among peer applications, depending on the chosen system implementation and the processing requirements of such operations.

The DDBE may be used, however, for any data having any type of information content. For example, data content may include catalog information, financial information, reference information, bibliographic information, accounting information, scientific information, medical information, genetic information, cartographic information, industrial process information, forensic information, sporting information, leisure and travel information, news information, entertainment information, or any other type of suitable information.

For the sake of simplicity and not of limitation, the DDBE will be illustrated herein in the context of an Internet-based system for providing restaurant information and opportunities to order food on-line. In particular, this feature will be illustrated using the example of providing restaurant information and ordering services to prospective customers.

A server may provide files from a database and provide any necessary searching functionality to a user's access device. A user may obtain search results from a local search in milliseconds. In some architectures, the interaction between a web server (or a front end type of server) and the database server from which the web server receives data is usually a significant bottleneck in the flow of data to user access devices. In this distributed database engine feature, for the placement of a given order, the database is preferably hit only twice: once when the user logs in and once when the user orders. The web server is preferably hit only three times: once when the user is "located" (as discussed below), once when the user selects a restaurant menu, and once when the user orders.

Figure 8:
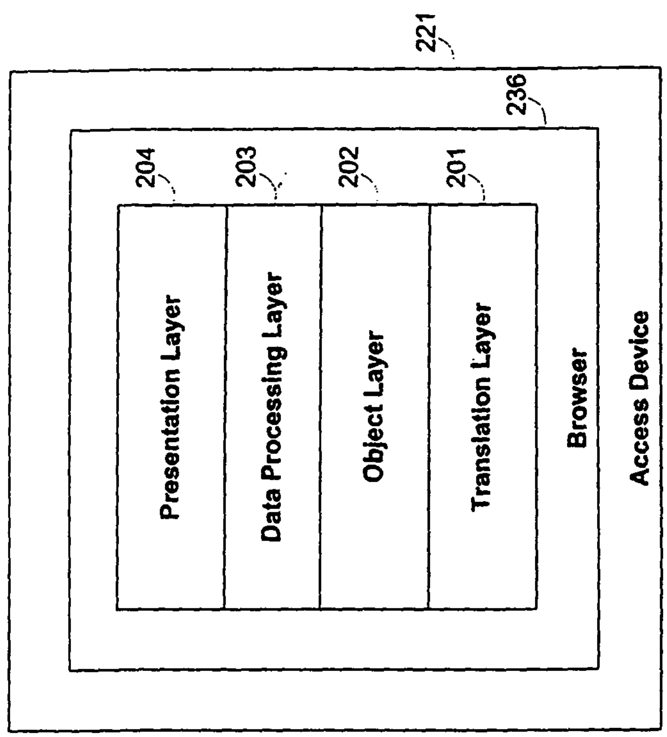
FIG. 8 is a generalized block diagram of a system architecture that may be used as part of the system in accordance with some embodiments of the present invention.

FIG. 8 illustrates multiple layers of processes that code may be loaded into browser 236 or another client application of user access device 221. The code for these layers may be downloaded from a server to browser 236. Translation layer 201 may be loaded for data compression and decompression. Object layer 202 may be loaded in browser 236 to store data objects or other data structures that correspond to data resident in database server 105 of FIG. 1.

Presentation layer 204 may be loaded to present data to a user and receive selections and instructions from a user. Data processing layer 203 may be loaded to provide, for example: (a) search functions that extract data from the object layer and route data to the presentation layer; and (b) analysis functions that receive presentation layer instructions for analyzing object layer objects or search results. It will be appreciated that additional layers of code may be loaded into an access device browser as necessary.

Figure 9:
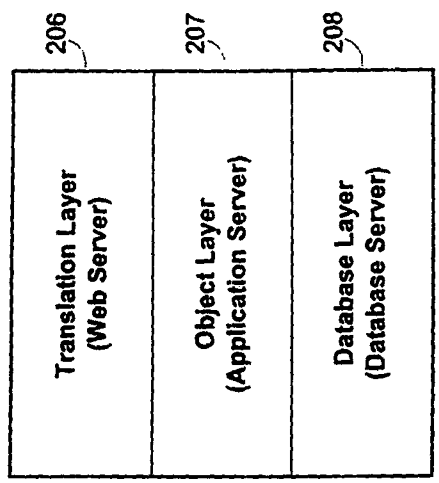
FIG. 9 is a generalized block diagram of a back-end system architecture in accordance with some embodiments of the present invention.

FIG. 9 shows an example of back end process layering. Compression and decompression may be carried out in translation layer 206, which may correspond to Internet and application server 104 (shown in FIG. 1). FIG. 9 also shows object layer 207, which may be resident in Internet and application server 104 (shown in FIG. 1). Object layer 207 may include data objects that correspond to data that may be included in database layer 208, which may reside in database engine 105 (shown in FIG. 1).

Data and processing techniques involving data exchange, sorting, grouping, searching, compressing, decompressing, presenting, or other processes in accordance with some embodiments of the DDBE will be illustrated in the context of organizing and distributing restaurant information to a user.

A restaurant information database may be assembled by collecting and codifying restaurant information. Restaurant information has fields, or elements, that may include, but are not limited to, restaurant name information, restaurant address information, restaurant cuisine information, restaurant services information (such as delivery or take-out services), restaurant hours information, restaurant menu information, restaurant attire information, restaurant parking information, restaurant location information, restaurant atmosphere information, restaurant review information, restaurant other information, or any suitable combination thereof.

The restaurant information database (or other database suitable to the chosen embodiment) may be grouped into logical groupings. For example, restaurants may be grouped by geographical locations. Accordingly, users can "locate" themselves (identify their location) and the database server may limit the transferred data, possibly upon the web server's request, to a group containing restaurant information that is relevant to the customer location. Restaurant information for each of the relevant restaurants may be processed or preprocessed into highly optimized text files, usable for searching, summarizing, and grouping. Processing or preprocessing may occur before logical grouping, after logical grouping, or both.

Figure 10:
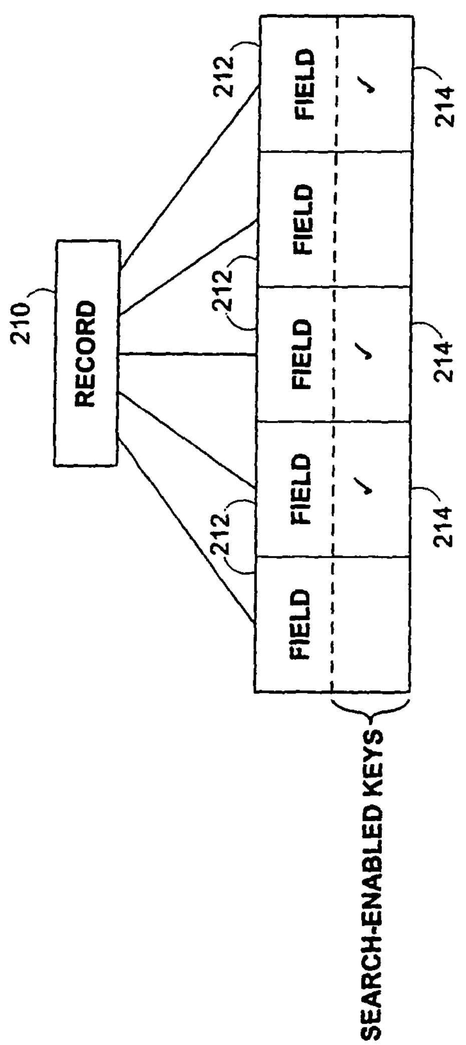
FIG. 10 is a generalized block diagram of record fields within an illustrative database in accordance with some embodiments of the present invention.

FIG. 10 shows a generalized example of restaurant information record fields that may include fields 212. Fields 212 may include searchable fields 214, which may be none, some, or all of fields of 212. A user may use fields 214 to search among data objects in a browser. Fields 214 may be fields that are chosen by a provider of the ordering system and made available to users. Fields 212 may be presented to the user in the form of summary information that may be viewed by a user after a search is performed.

Figure 11:
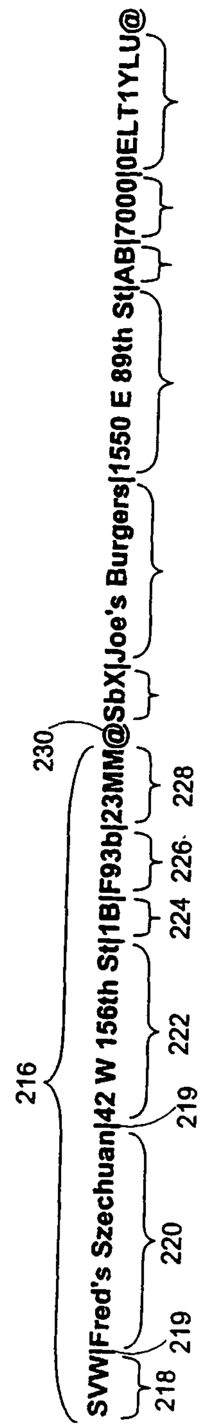
FIG. 11 shows an illustrative example of a compressed data stream in accordance with some embodiments of the present invention.

In some embodiments of the invention, data may be stored, compressed, or downloaded to a user's browser in binary format. In some embodiments of the invention, data may be stored, compressed, or downloaded to a user's browser in text format. FIG. 11 shows an illustrative example of data record 216 in a compressed text format. Record 216 may correspond to an individual restaurant and may include reference number 218, restaurant name 220, restaurant street address 222, cuisine identifier 224, restaurant attributes 226, hours of operation information 228, field delimiter 219, and record delimiters 230. As shown in FIG. 11, fields such as reference number 218, cuisine identifier 224, restaurant attributes 226, and hours of operation 228 may be stored (and transmitted) in base 62 digits. Record 216 may include variable width fields (e.g., restaurant name) and fixed width fields (e.g., a fixed number of characters indicating cuisine). Variable width fields (VWFs) may be delimited by field delimiters such as field delimiters 219. Fixed width fields (FWFs) may be grouped logically together to avoid the need for delimiters between those fields.

When a field includes multiple attributes, the multiple attributes may be represented using bit masks. For example, a field containing restaurant services information may need to include more than one service. Accordingly, each service may be assigned a digit in a binary structure. To represent multiple services simultaneously, the sum of the digits corresponding to each of the included services may be included in the restaurant services field. For example, if eat-in=1, take-out=2, delivery=4, and on-line ordering=8, then (eat-in and take-out and on-line ordering)=11. For example, restaurant attributes field 226 may include 4 base-62 digits. The first may represent services offered, the second may represent average meal price, and the third and fourth may represent attributes such as non-smoking, romantic, or kosher.

Multi-digit integers, such as a large (or potentially large) bit masks or reference numbers may be converted into base-62 digits. Base-62 digits are obtained using the 26 upper case alphabetical characters, the 26 lower case alphabetical characters, and the 10 1-digit numbers. Together, these 62 characters can be used to represent the numbers 0 to 61 (or, alternatively, 1 to 62). Base-62 may be useful in Internet based approaches because these characters are typically not reserved by standard browsers or programming languages.

Base-62 numbers may be converted to base-10 by using a one-dimensional array consisting of 62 elements. Each element of the array contains one of the 62 base-62 characters (as described above). The elements of the array, maintained in a standard order to enable consistent conversions, may associate each base-62 digit with the base-10 value corresponding to the position of the base-62 digit in the array. Accordingly, each digit of a given base-62 number may be read and converted to base-10 value using the array. The base-10 values resulting from the conversion of the individual base-62 digits are summed to arrive at the base-10 number corresponding to the original base-62 number. The conversion from base-62 to base-10 may be achieved using a formula such as:

$$N_{10}=\Sigma_{i=0\ to\ I-1}\{A(D_i)\times 62^i\},$$

where $D_i$ is the ith digit in a base-62 number of length I, and $A(D_i)$ gives the base-10 value of the position of $D_i$ in the 62 element array. The same method may be used to convert from any base-N, where N is an arbitrary integer.

Hours of operation information 228 may include hours of operation of a restaurant for each day of the week and may be further optimized. Each day of the week may be viewed separately by a user, but days whose hours match the hours of other days may be grouped together. For example, hours of operation field 228 (also referred to as a "TimeDef") may contain information such as "M,W,F 10:30 a.m. to 8:00 p.m. The restaurant hours information may then be represented with a bit mask (e.g., 1=Sunday, 2=Monday, 4=Tuesday, etc.). Bit masks of days having like hours may be summed and converted to base-62. Using the present invention, most groups of days having like hours can be represented using one character (and may never require more than two).

Hours may be generalized, or rounded, to the most appropriate half-hour. Half-hour rounding is accurate enough for the general search by a user (actual restaurant hours of operation may be viewable in the form of summary information). For search purposes, one base-62 digit may be used to represent the starting half hour for any day or group of days. (Only 48 digits are required to represent the 48 half-hours in a 24 hour day.)

An additional base-62 digit may be used to represent the duration of hours of operation. Duration may be included in restaurant hours information (and, therefore, in TimeDef). As a result of the aforementioned compression methods, restaurant hours information for an entire week may be represented using 3 to 12 characters (usually, no more than 8 characters are required). Also, using a preliminary search function, which may operate automatically in the user's browser, restaurants may automatically be labeled as open or closed before the user has even selected a search criterion.

In some embodiments of the DDBE, data and functions (for example, JavaScript functions) may be organized using data structures. Data structures that may be used in connection with some embodiments of the DDBE may include, but are not limited to, data objects that represent (1) a system engine for holding "state" variables of an entire ordering process, including values of data objects that follow; (2) a user; (3) a location (e.g., a fixed place from which a user places an order or receives delivery); (4) hours of operation; (5) cuisine or other inventory attributes; (6) a supplier list (e.g., of records of restaurants or other suppliers); (7) a restaurant or other supplier; (8) a menu or catalog; (9) a category (e.g., subset of a menu or catalog); (10) an item (e.g., a menu item or catalog item); (11) a group of options, an option, an extra, or any other customization feature; and (12) a payment method or payment (e.g., cash, credit card, house account, and/or requisite purchaser information).

Data structures may include, for example, request data structures for requesting transmission of a given type of data from a host server, command data structures for initiating a data process in a given layer locally or in the host server, and any other structures necessary for data processing and exchange.

Data structures may include search and analysis functions for local database searching and browsing. Search functions may encoded; for example, in JavaScript in the script library.

Data structures may be stored in the browser in the form of data objects that form an object layer. Data structures may be stored encoded in the main browser page, searched or browsed locally, and exchanged with a host server as necessary for selection and submission of an order.

Search results may be dynamically presented to the customer using the presentation layer. The presentation layer may contain drawing functions utilizing DHTML or other presentation logic such as that available from Macromedia, Inc., of San Francisco, Calif., under the name Macromedia® Flash™.

A user may select items and options from a restaurant to form an order. Order information may be gathered in a text format and maintained in the local browser until the customer submits an order, e.g., by clicking on a Submit Button.

When an order is submitted, it may be passed as a single string to the web server with suitable compression. An application server may then process the order by communicating order information to the restaurant and may return confirmation information or other follow-up information to the user.

Figure 12:
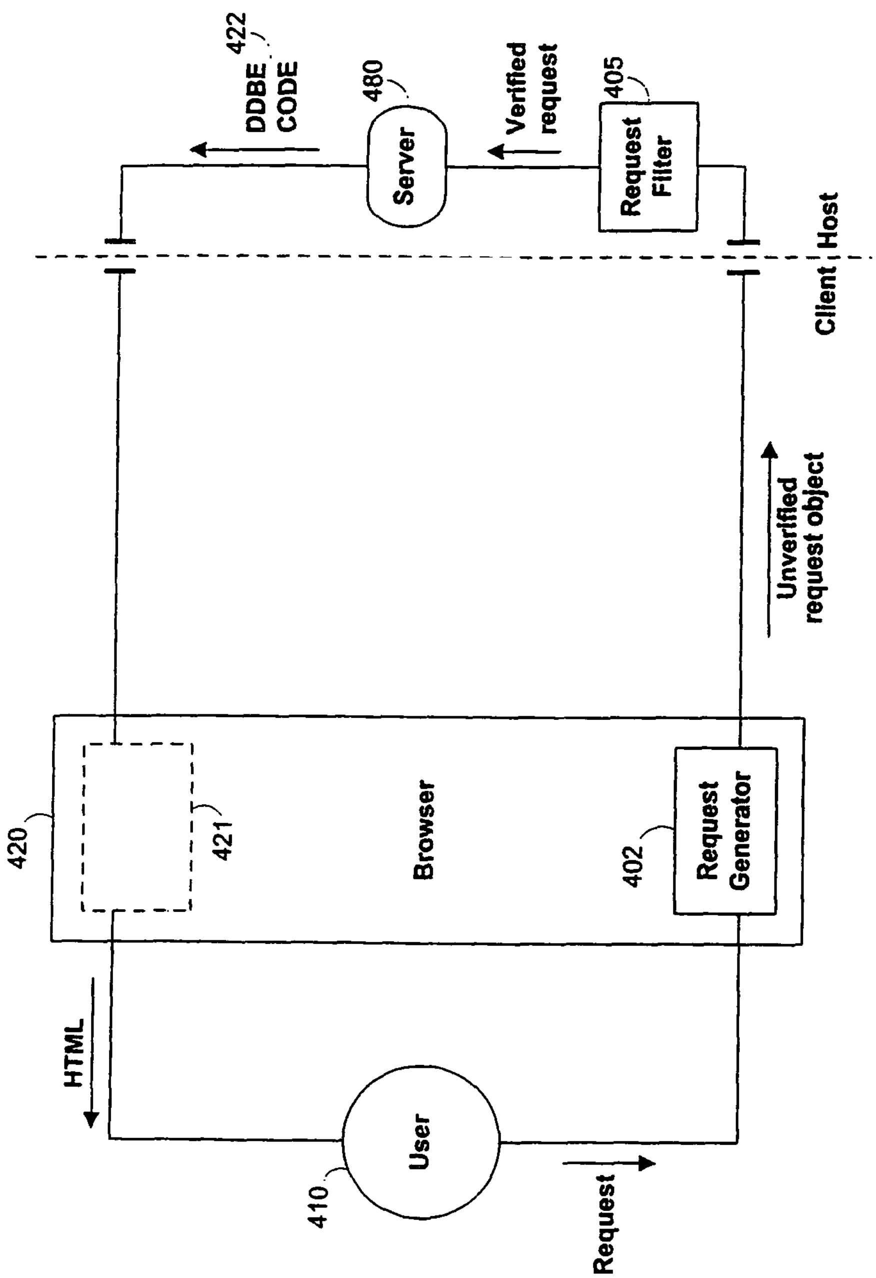
FIG. 12 is an illustrative data flow diagram whereby a distributed database engine may be sent to a remote user in accordance with some embodiments of the present invention.

FIG. 12 shows browser 420 when user 410 initially logs onto an ordering system, such as system 1 (as shown in FIG. 5). Browser 420 may initially include empty frame 421. At login, a request may be sent by user 410 to request generator 402 of browser 420. Request generator 402, which may be a built-in browser feature, may transmit an unverified request object to request filter 405. Request filter 405 may determine that user 410 has just logged in and that a DDBE should be installed in frame 421. Request filter 405 may then transmit a verified request for installation of a DDBE to server 480. Accordingly, server 480 may then transmit DDBE code 422 to frame 421 in browser 420. As shown in FIG. 12, user 410 may receive HTML, or data in any other suitable format, as necessary for the log-in or ordering processes.

Figure 13:
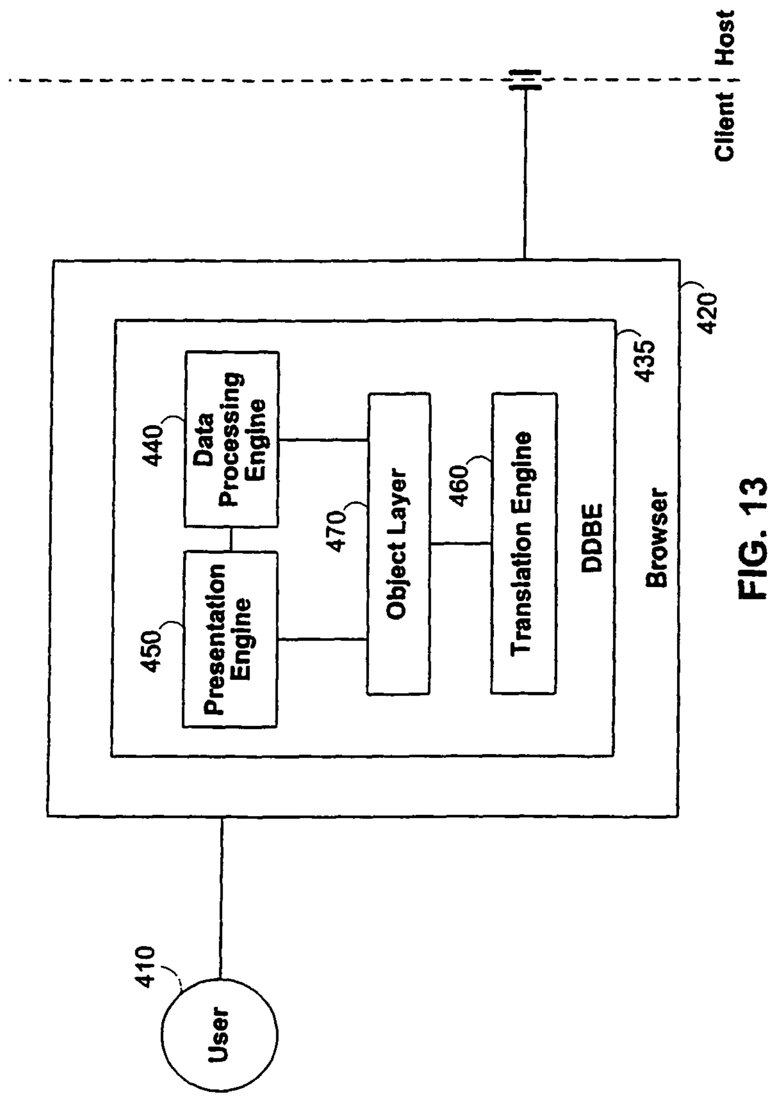
FIG. 13 is a generalized block diagram of a distributed database engine that has been received by a remote user in accordance with some embodiments of the present invention.

FIG. 13 is an illustrative example of DDBE 435 after it has been installed in frame 421 (as shown in FIG. 12). DDBE 435 may include translation engine 460 for decompressing compressed data from a server; object later 470, which may be populated by data and browser-resident functions decompressed by translation engine 460; data processing engine 440 for searching, sorting, grouping, and otherwise manipulating data objects in object layer 470; and presentation engine 450, for presenting readable text and graphics to user 410 and for receiving data from user 410.

Figure 14:
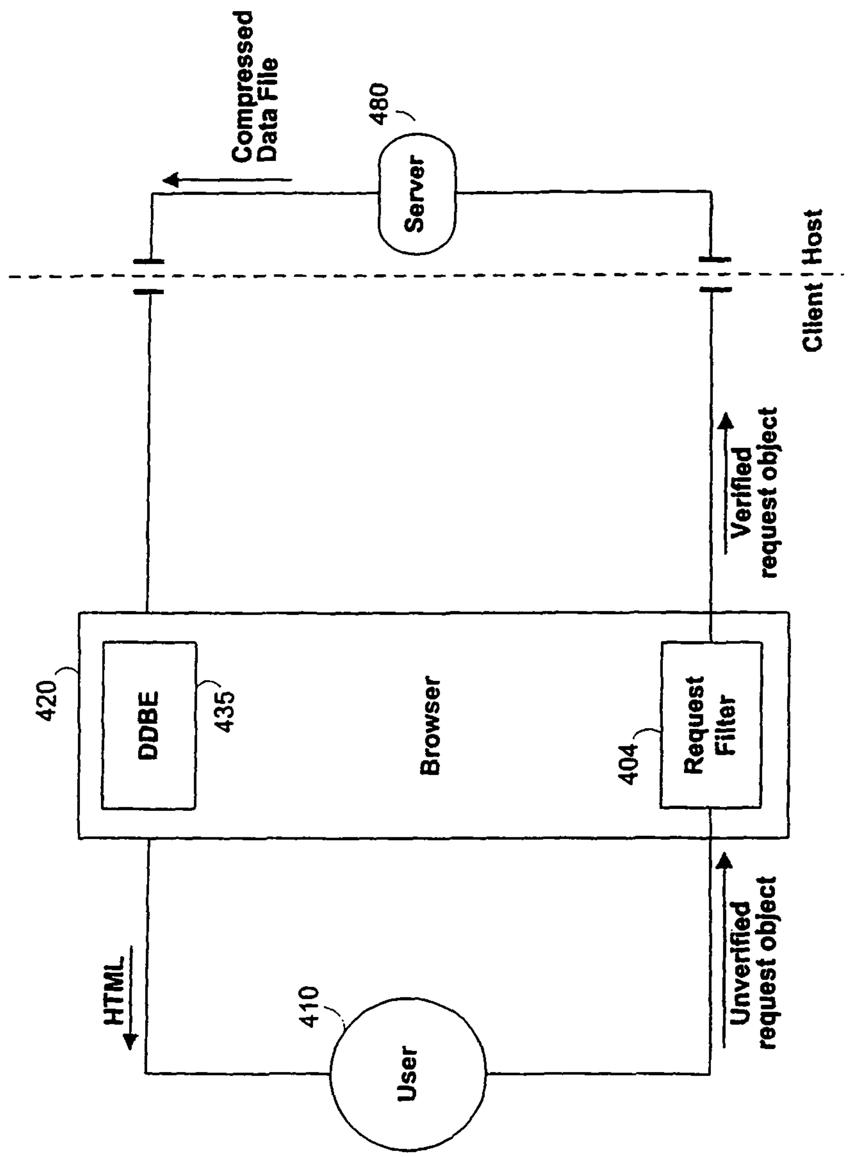
FIG. 14 is an illustrative data flow diagram wherein a distributed database engine has been sent to a remote user in accordance with some embodiments of the present invention.
Figure 15:
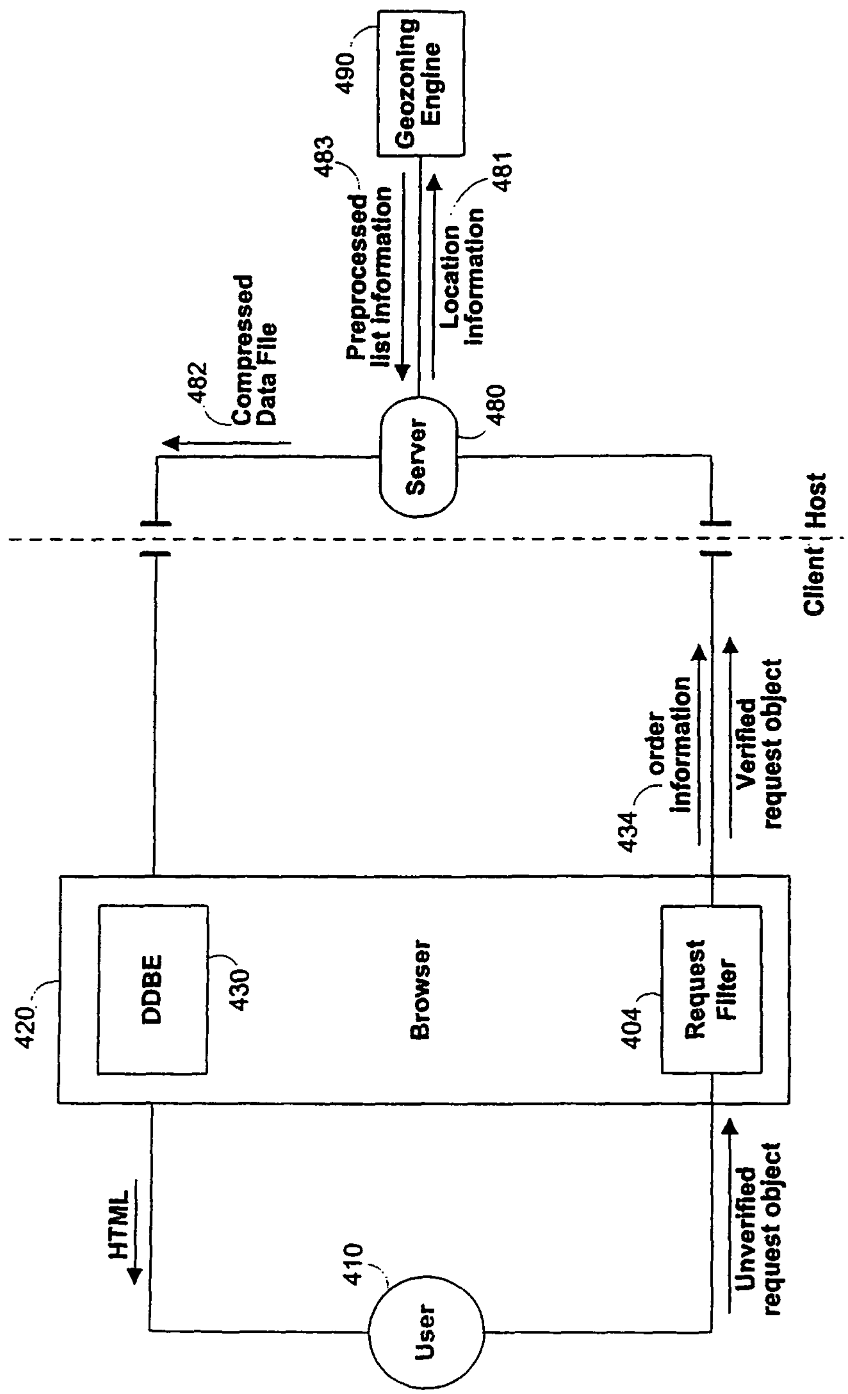
FIG. 15 is an illustrative data flow diagram wherein geographic information is used to select files to be downloaded to a distributed database engine in accordance with some embodiments of the present invention.

FIG. 14 shows DDBE 435 installed in browser 420. User 410 may select a location to receive delivery of an order. When a location is selected, an unverified request object corresponding to a request for a list of suppliers may be received by request filter 404. Request filter 404 may generate a verified request object that has any formatting or ordering process state variable values that file server may require to return an appropriate list of suppliers to user 410. If user 410 submits a location that is known to server 480, file server 410 may return a list corresponding to the location. If the location is unknown to server 480, a new list may be generated by geozoning engine 490 (as shown in FIG. 15 and discussed in greater detail below). A compressed data file, such as data compressed data file 482 may be transmitted to DDBE 435 for decompression, any desired local analysis, and presentation to user 410.

Figure 16:
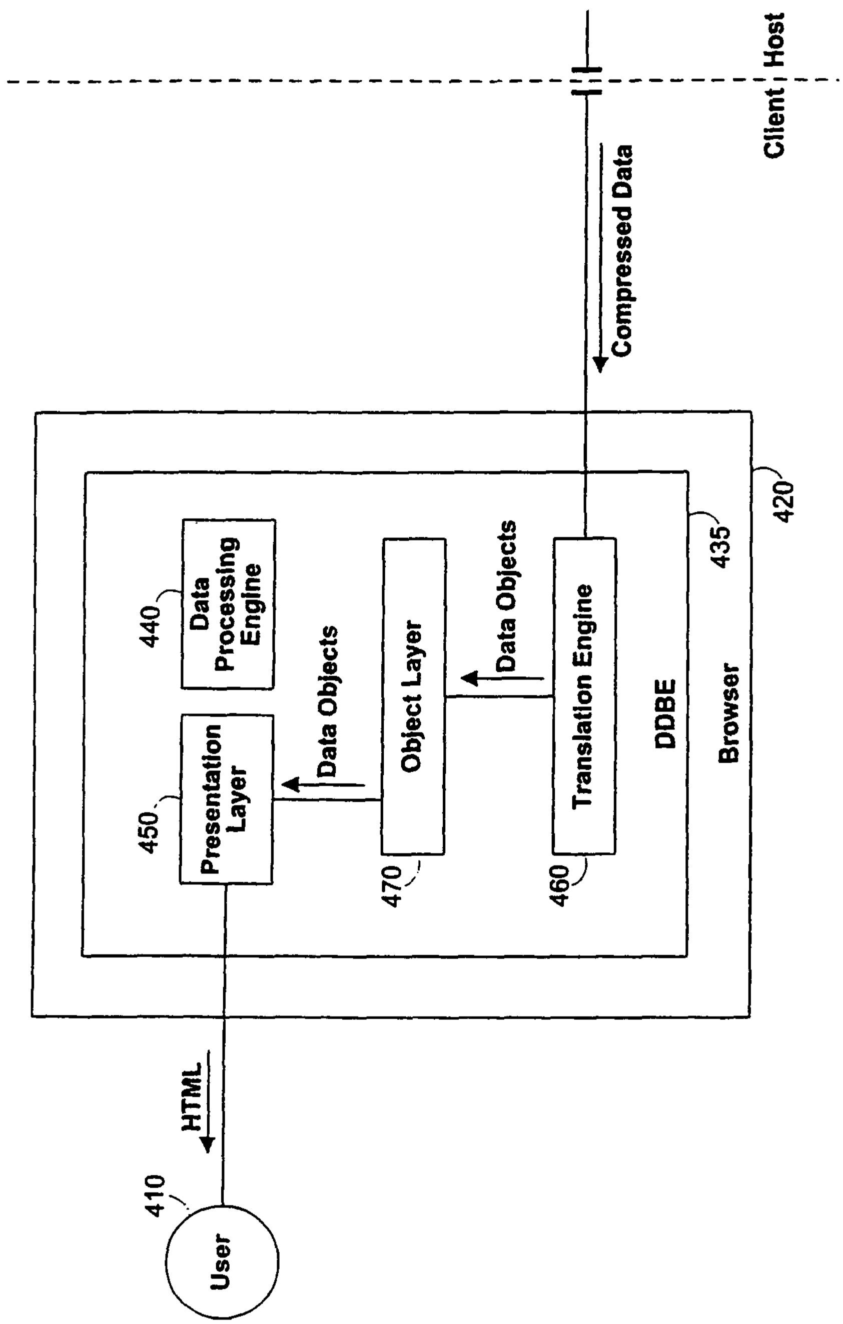
FIG. 16 is a generalized block and data flow diagram of a distributed database engine that has been received by a user in accordance with some embodiments of the present invention.

FIG. 16 is a general illustration of DDBE 435 in a data presentation mode. Compressed data may be received and uncompressed by translation engine 460 and retrieved, as necessary, by presentation engine 450 for presentation to user 410. Data processing engine 440 is shown disconnected from presentation layer 450 and object layer 470, but may be active in the presentation process. For example, data processing engine 440 may provide user 410 with interactive functions for selecting and manipulating data objects. Data processing engine 440 may provide system functions to presentation layer 450 that may be necessary for data presentation.

Figure 17:
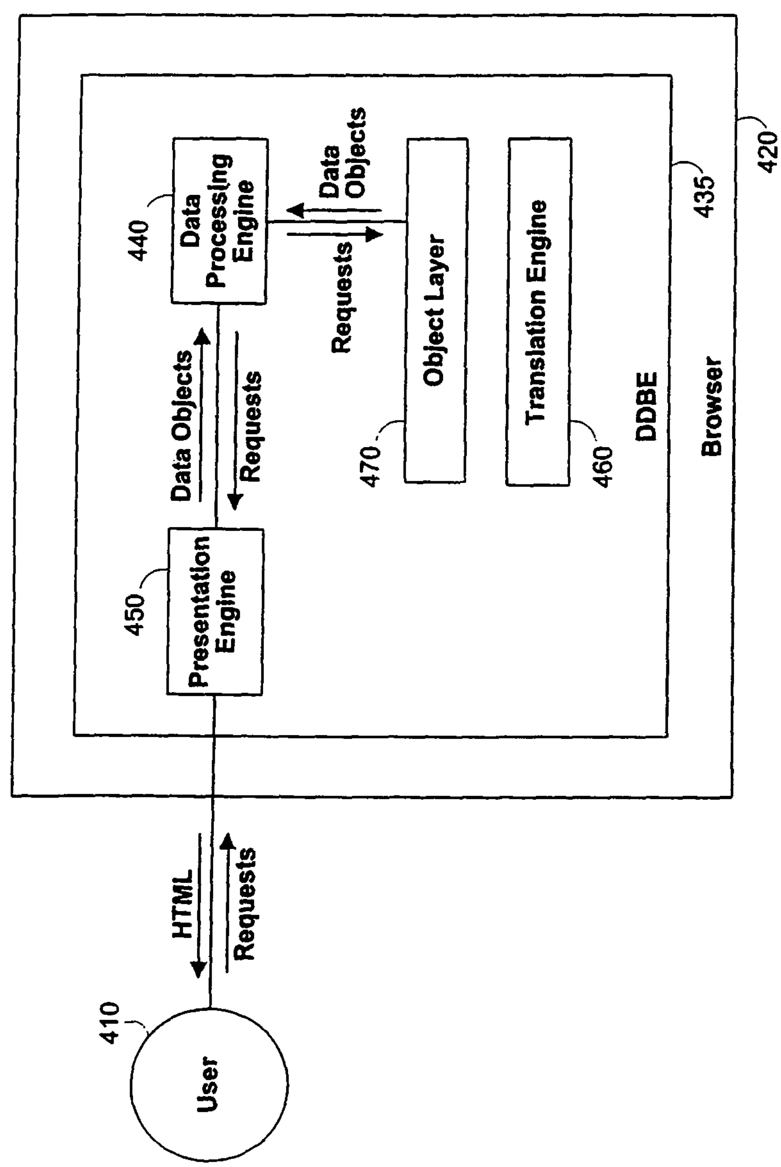
FIG. 17 is a generalized block and data flow diagram of a distributed database engine that has been received by and is in use by a user in accordance with some embodiments of the present invention.

FIG. 17 is a general illustration of DDBE 435 in a data analysis mode. Data processing engine 440 may retrieve, sort, search, group, or otherwise analyze data objects in object layer 470. The data objects may then be presented to user 410 through presentation engine 450. FIG. 17 also shows that user 410 may provide requests to data processing engine 440 using presentation engine 450.

FIG. 18 is an illustrative example of data flow when DDBE 435 is in a data analysis mode, as shown in FIG. 18. User 410 may submit requests for data analysis or presentation (e.g., a search command) to request filter 404. Request filter 404 may provide DDBE 435 with a request for analysis that is readable by presentation engine 450. No client/host interface is shown in FIG. 18 to emphasize that in at least the data analysis mode, there may be no need to transmit user-generated requests or commands to a remote or central server. Conversely, there may be no need to transfer data or search results from a central server.

In some embodiments of the DDBE, special functions that modify, delete, or replace the features or capabilities of the DDBE may be loaded as necessary. Referring, for example, to FIG. 13, functions may be downloaded to alter the functionality of presentation engine 450, data processing engine 440, or translation engine 460. In some of these embodiments, data in other parts of the object structure, including, for example object layer 470 (FIG. 13), may be manipulated. For example, a line of code (for example, in JavaScript) that references a particular object in the object layer and changes the value of one or more object attributes may be downloaded.

In some embodiments of the DDBE, compressed data, (for example, compressed data files or compressed data as shown in FIGS. 14-16) may include, or be packaged together with, functions that are selected or preselected to provide functionality related to the compressed data or a request for the data originating from the user, the user's browser, or the user's access device. For example, compressed data including information about a restaurant and its menu may be packaged together with a function for drawing the menu that differs from a DDBE default menu drawing function that was previously loaded in the browser. This type of function may be used, for example, when all members of a chain of restaurants are required to use a standard menu display.

In some embodiments, this feature of the DDBE may be used to provide different user interface features or capabilities. For example, specialized presentation layer functions may be downloaded to provide displays and data entry tools for Group Ordering or Graphical Custom Orders, as discussed below.

FIG. 18*a* shows a flowchart of illustrative steps involved in implementing some features of the of the DDBE that may include providing a user with data and accompanying specialized functions for modifying DDBE functionality. The steps shown in FIG. 18*a* are only illustrative and may be performed in any suitable order. In practice, there may be additional steps or some of the steps may be deleted. For Clarity, the following discussion will describe the steps shown in FIG. 18*a* as being performed by "the system," which is intended to include any suitable e-commerce system, such as, for example, any non-on-line or on-line arrangement suitable for performing the steps.

In step 401, the system may receive catalog data from suppliers and input the catalog data into a database. In step 403, one or more special functions may be identified for providing specialized presentation, analysis, or other special features, or for setting values of structures in a DDBE object layer. If no specialized DDBE functionality is desired, the process may skip to step 408. If specialized DDBE functionality is desired, required specialized DDBE code may be retrieved from a database or input from any other suitable source in step 406. In step 408, the catalog data may be compressed. In step 409, compressed catalog data may be packaged with any special DDBE code for transmission to the DDBE of a user's browser. On receipt of a request for supplier information from a user (step 411), the packaged data and code may be downloaded to the user's browser (step 412). The downloaded code may provide DDBE functionality related, for example, to DDBE processes 413 (data decompression or translation), 414 (data presentation), 415 (data analysis). The downloaded code may also modify the ways processes 413-415 interact with each other (DDBE modification 416).

Push Engine

In some embodiments, the invention may provide systems and methods for selectively replacing content in a display of a web page that is displayed by a user access device. In some of the embodiments, this feature is generally represented in step 178 of FIG. 4. The display may be driven by a browser that presents the web page to a user. The content of the display may be replaced by data from a server in communication with the access device via an electronic communication network.

The server may provide data (destined to replace content of the display) to the browser for storage in a frame of the browser. The data may be provided in the format of a web page. The frame may be a hidden frame. Subsequently, selected portions of the display content may be replaced with data from the hidden frame without requiring a viewable page refresh. Periodically, the frame, using any commonly available browser refresh function, may poll the server for updated data. Browser-resident functions may be provided by the server to selectively replace display content with fresh data from the hidden frame. These functions may form the core of a "Push Engine" for updating the display. A similar push engine is described in U.S. Provisional Patent Application No. 60/191,205, filed Mar. 22, 2000, which is hereby incorporated herein in its entirety.

In some embodiments of the invention that include the Push Engine, the user may be substantially continuously provided with current information provided by an ordering system without interruption by a viewable page refresh. The Push Engine may be used to display order information, which may include any data relevant to an order, including, but not limited to information about the order originator, the supplier or intended supplier, the item or services ordered, billing information, and order processing information. Any data generated by an order originator, a supplier, any other system user, or the ordering system itself may be displayed using the Push Engine.

In certain embodiments, it may be desirable to permit a given user to view only limited information. For example, the Push Engine may be used as an order tracker for use by an order originating user. After placing an order using the system, an order originating user may use the Push Engine to substantially continuously observe the status of the order. The order originator may be limited to viewing only information related to the content of the order (e.g., particulars of the items or services ordered) or the status of the order (e.g., "received by supplier" or "order delivery in progress").

The Push Engine may be used by a supplier to receive orders. For example, the Push Engine may provide warehouse personnel with real-time displays of orders to improve order fulfillment efficiency. As another example, the Push Engine may be used in the kitchen of a restaurant to provide workers with order information as soon as the restaurant receives it. In these examples, suppliers may be permitted to view only the order information required for fulfillment, for example, item numbers, quantities required, and delivery methods. Supplier accounting personnel may be permitted to see billing information in addition to order content information.

Additionally, the Push Engine may be used by a customer service representative for overseeing the progress of an order in connection with assisting customers and solving order processing problems. A customer service representative may need to view a broader scope of data than an order originating user or a supplier.

FIG. 19 shows an illustrative push engine 800 in browser 820 of a user access device. User 810 may view content 812 of current page 814. Content 812 may include markup language script, such as HTML, for displaying data on a display (not shown) that may be viewed by user 810. Presentation engine 850 may generate content 812 using data objects that may be received or retrieved from object layer 870 in push engine 800. Presentation engine 850 may include functions, which may be written in Javascript or any other suitable scripting language, that may selectively replace portions of content 812 without requiring a complete display refresh.

Push engine 800 may include automatic refresh request generator 802, which may include a built-in automatic refresh function of browser 820. Automatic refresh request generator 802 may generate an unverified request for a frame refresh for hidden frame 804. The unverified request may be passed through request filter 804 to generate a verified request that may include any browser state variables, push engine state variables (which may include current data frame URLs, permission levels for user 810, or any other information necessary to specify the required information or data format), or order server variables that may be necessary for order server 830 to process the request.

Order server 830 may continuously receive updated order information from an order database server (e.g., database server 105 shown in FIG. 1) that provides data from an order database (not shown). The order database may include records from every order received from an ordering system, such as system 1 shown in FIG. 1. Therefore, when order server 830 receives a verified request from push engine 800, order server 830 may fulfill the request by sending current data back to push engine 800.

Translation engine 860 in push engine 800 may receive compressed data from order server 830 and decompress the compressed data into data objects that may fill object layer 870. Presentation engine 850 may selectively replace portions of content 812 with data from object layer 870. This may generate a display that has portions that may appear to be dynamically updated.

In some embodiments, features of push engine 800 may be modified by downloading specialized functions to browser 804 from a server (not shown) that may be linked to order server 830. For example, presentation engine 850, object layer 870, and translation engine 860 may be modified using downloaded functions in accordance with principles of the DDBE described above.

Figure 81:
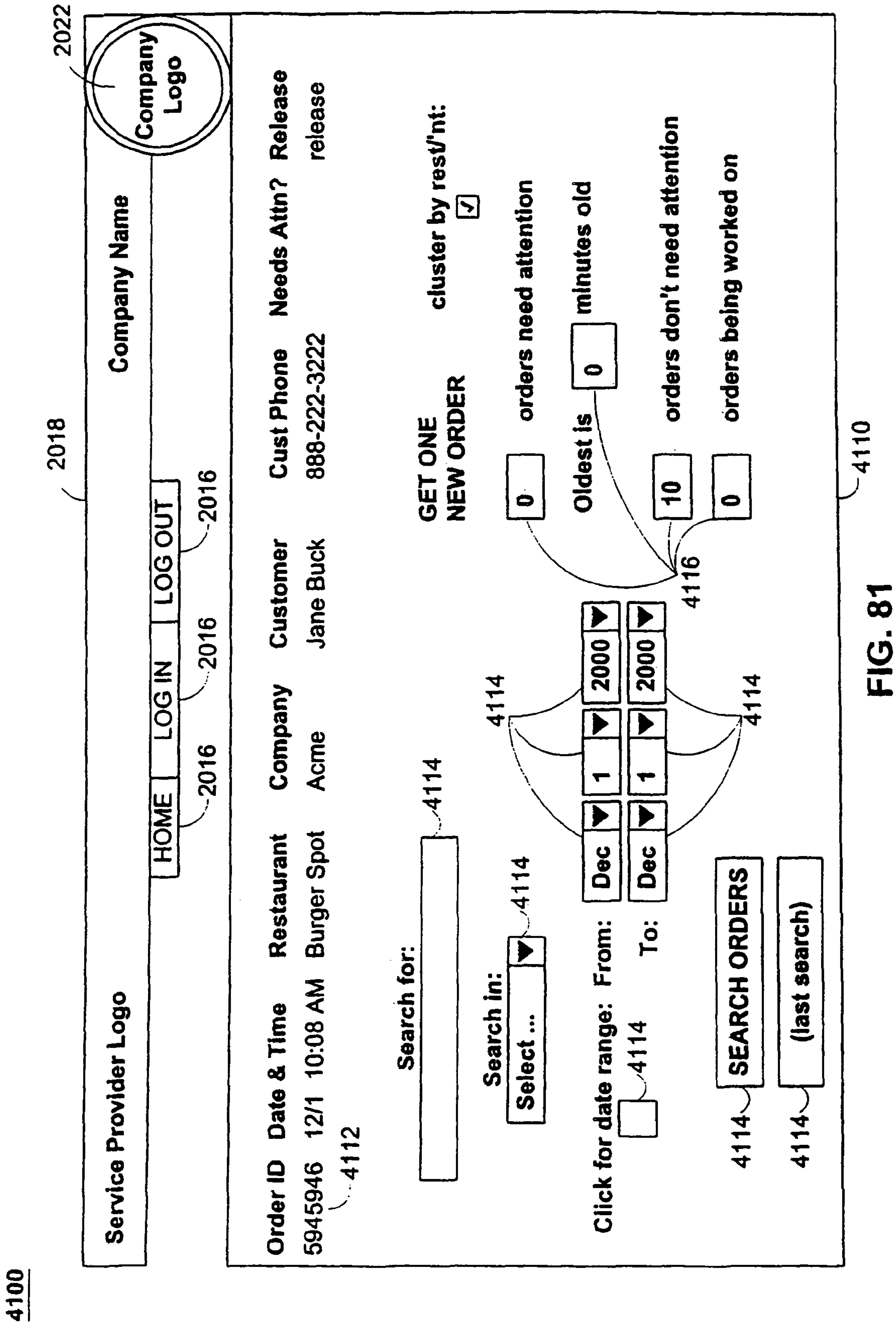

FIG. 81 is an illustrative display that may be created by push engine 800. Content 812 includes fixed content, such as various search mechanisms, and dynamic content, such as attention item 4112 and counter display features 4116. For example, one counter display feature 4116 shows a number of orders received by order database server 105 (shown in FIG. 1) that require the attention of user 810, who may be a customer service representative. As the number of orders requiring attention changes, only the number in one of the counter display features 4116 may be updated using push engine 800. The fixed search mechanisms may remain unchanged and may be displayed continuously.

Geozoning System

Some embodiments may select suppliers according to the locations of a user and prospective suppliers. In some of the embodiments, this feature is generally represented in steps 146 of FIG. 4. In some approaches, geographical areas may be divided into regions. A supplier inside or on the border of the region associated with a user's location can be identified and presented to the user. The borders of the region may be selected to exclude suppliers that are located more than a preselected distance from the user's location. The preselected distance may be selected based on convenience to the user or the supplier. The preselected distance may be chosen to include a suitable number of suppliers from which the user may choose.

Borders may be selected to conform to defined areas of a given economic market, state, city, county, range and township area, municipality, neighborhood, borough, or region bounded by a given roadway, river, or other cartographic feature. Suppliers may be presented to the user in a list arranged in order of ascending or descending distance from the user.

Locations of users, addresses of suppliers, and borders of regions may be defined using latitude and longitude or other geodetic coordinates. ("Coordinates" will be used hereinafter to refer to latitude and longitude.) After a region is defined, suppliers whose coordinates fall within the region may be selected and presented to the user.

Some embodiments of the invention may include determining if a user lies within one or more delivery areas of a supplier. (Delivery areas May be defined by suppliers using factors other than proximity of the supplier to the user, including, but not limited to those features that may be used to define a region, as discussed above.) A supplier may have different delivery areas having different delivery charges. In some of these embodiments, the user may have a location and a zone that includes the location. The zone is an area that may be defined by using any suitable method to determine high precision estimates of the coordinates of the location. After the coordinates are determined, the coordinates may be rounded or truncated to lower precision and used to represent the zone as a polygon. (The lower precision coordinates may be used as midpoints of line segments or endpoints of line segments forming a trapezoidal polygon (for rounding and truncating methods, respectively)). Another way to define a zone is to use pre-existing zones, e.g., United States Postal Service Zip Codes.

The first step in determining if the user is located within a delivery area is to test if the zone is within the delivery area. If the zone is within the delivery area, the user location is also within the delivery area. If the zone is outside of the delivery area, the location is also outside of the delivery area.

A zone may be partially within a delivery area and partially outside of the area. In this case, a polygon may be identified that is defined by an area of overlap between the delivery area and the zone. Any suitable technique may then be used to determine if the user location is in the overlapping polygon. If the user location lies within the overlap polygon, the user lies within the supplier delivery area. If the user location does not lie within the overlap polygon, the user is not located within the supplier delivery area.

The system may present the user with supplier information that includes delivery service information. Calculation of truncated coordinates, any necessary vertices of delivery areas, and the determination if a zone lies within or without a delivery area may be made by a system processor, or "geozoning engine." The system may then provide to a user a delivery attribute indicating delivery status (e.g., "Does Deliver," "Does not Deliver," "May Deliver" or "Delivers at cost of $X.XX", where $X.XX may be a delivery charge determined for the user's location). Taxation rates applicable to sales in a delivery area may be retrieved (e.g., from a database) for calculating amounts receivable in connection with an order or for accounting purposes.

In some embodiments, delivery information may be archived with supplier information for a given zone. For example, once a list of suppliers is associated with a given zone based on distance, convenience, or any other relevant factor, delivery information for each supplier in the list may be incorporated into the list. The list may then be stored in an optimized, compressed, or otherwise processed form. Subsequently, the system may rapidly provide the list to any user from the same zone.

For suppliers whose delivery area overlaps the zone, a user in the zone may receive a "May Deliver" attribute. The system may provide a function for locally calculating (e.g., in the user's access device, via a browser) delivery in accordance with the methods described above. The calculation may be performed automatically in the browser of a user's access device. Additional efficiency may be obtained by storing and transferring coordinates in a compressed format, for example, using a base-62 mathematical mapping.

FIG. 5 shows that user 10 may submit an order to a supplier 40 using system 1. System 1 may provide catalog information 82 to user 10. Catalog information 82 may include a list of suppliers that conform to criteria, which may specify proximity between supplier 40 and user 10.

FIG. 14 shows that server 480 may receive order information 434 from user 410. Order information 434 may include location information 481, which may specify the geographical address of user 410. If server 480 receives location information 481 corresponding to a location known to system 1, server 480 may retrieve a supplier list corresponding to the known location. In some embodiments, this may be accomplished by including a list identification code in a location data object. A location data object may be initialized with a location value when user 410 first accesses system 1. User 410 may have one or more locations, each of which has a corresponding list or list identification code. In such an embodiment, server 480 may use the list identification code directly to retrieve the corresponding supplier list.

If server 480 receives location information 481 corresponding to a location that is new to system 1, server 480 may pass location information 481 to geozoning engine 490. Geozoning engine 490 may use any suitable algorithm to convert location information 481 into geodetic coordinates.

FIG. 20 shows logic that an embodiment of the invention may use choose a supplier list for user 410 (as shown in FIG. 14). After user 410 chooses a location, server 480 determines if the location is new, or "known," to the ordering system (e.g., system 1 of FIG. 5). If the location is known, a supplier list may be retrieved from a web server (such as Internet Application server 104, shown in FIG. 1) using a list identification code. The retrieved list is then presented to the user. FIG. 14 shows server 480 transmitting a retrieved list in the form of compressed data file 482 back to user 410.

FIG. 20 also shows that if server 480 determines that a received location is new to system 1, server 480 may pass the new user location to geozoning engine 490. Geozoning engine 490 may use any suitable algorithm or utility to convert, or "geocode," the new user location into geodetic coordinates. By truncating the coordinates at a given number of significant figures, a trapezoidal region, or "zone," that circumscribes the new user location is defined. In some embodiments, new zones may be defined using U.S. Postal Service Zip Codes. If a supplier list associated with the zone resides in the system, the supplier list may then be retrieved.

If user 410 is a member of a group, the list retrieval process may be expedited. For example, FIG. 1 shows that users 10 may be members of Group X or Group Y. FIG. 20 shows that geozoning engine 490 determines if user 410 is a member of a group. If user 410 is a member of a group, geozoning engine 490 checks to see if the user and the group (which may itself be associated with a location) have a shared location in the user zone. If there is a shared location, geozoning engine 490 may take the existing supplier list identification code from a data object that includes attributes of the group, associate it with the new user location, and pass the supplier list identification code back to server 480. The list corresponding to the supplier list identification code may then be presented to the user.

When geozoning engine 490 determines that a user, such as user 410 shown in FIG. 14, is not a member of a group, a default list may be presented to user 410. Each zone served by system 1 (of FIG. 5) may be associated with a supplier list and a corresponding supplier list identification code. Geozoning engine 490 may associate the default supplier list identification code with the new user location, pass the default supplier list identification code to server 480. Server 480 may then present the corresponding list to the user.

FIGS. 21-23 show different relationships between a zone and a supplier's delivery area. A supplier list presented to a user may include suppliers that have fixed delivery areas. (For example, suppliers may be included in a default supplier list for a zone based on proximity to the zone. A supplier may have independent delivery criteria, however, or may not offer delivery service.) A delivery area may exclude, include, or overlap with a zone.

FIG. 21 shows a delivery area that excludes the zone of a user. Geozoning engine 490 may associate a "Doesn't deliver" attribute with such a supplier in supplier lists associated with the zone or circumscribed locations. When user 410 (as shown in FIG. 14) receives the list, the delivery attribute may help user 410 select an appropriate supplier.

FIG. 22 shows a zone completely circumscribed by a delivery area of a supplier. When this supplier is listed in a supplier list for the circumscribed zone, geozoning engine 490 may associate a "Does Deliver" attribute, and any delivery charge or sales tax information corresponding to the delivery area (sales tax information may include sales tax rate information and may include different rates for different types of supplies and services), with such a supplier.

FIG. 23 shows overlap area 950, which may be a polygonal overlap area, that may result when delivery area 970 partially overlaps zone 980. Geozoning engine 490 (as shown in FIG. 14) may associate a "May Deliver" attribute with a supplier when the supplier is included in a default list for zone 980, but whose delivery area 970 partially overlaps zone 980. The use of a "May Deliver" attribute enables an ordering system, such as system 1 as shown in FIG. 5, to maintain archives of preprocessed supplier lists with at least some delivery information. This data organization and transmission strategy decreases the response time of a file server, such as server 480 shown in FIG. 14.

Coordinates of vertices 960 of overlap area 950 and coordinates of location 990 may be transmitted to a user for local determination of whether location 990 lies within overlap area 950. If location 990 lies within overlap area 950, the supplier does deliver to the location. FIG. 14 shows that the local determination may be performed, for example, by distributed database engine 435 using data processing engine 440 in browser 420. In some embodiments, delivery charge or tax rate determinations for "May Deliver" suppliers may be performed locally.

FIG. 24 shows a flowchart of illustrative steps involved in implementing some embodiments of the of the present invention that may include providing a user with indications about the availability of delivery services for suppliers. The steps shown in FIG. 24 are only illustrative and may be performed in any suitable order. In practice, there may be additional steps or some of the steps may be deleted.

For clarity, the following discussion will describe the steps shown in FIG. 24 as being performed by "the system," which is intended to include any suitable e-commerce system, such as, for example, any non-on-line or on-line arrangement suitable for performing the steps.

The system may preprocess lists of suppliers in step 920. Preprocessing may involve gathering supplier information in step 922. Supplier information may include, for example, supplier names, addresses, delivery areas. The system may then divide a geographic region of users and suppliers into zones (step 924). A geographic region may be, for example, a major metropolitan area, a rural county, or any other cartographically definable region. In step 926, the system may generate zone default lists for each zone. A zone default list is a list of suppliers and supplier information for suppliers assigned to the zone. Suppliers may be assigned to zones on the basis of proximity between suppliers and users, marketing, distribution channels, or any other basis. A supplier may be assigned to more than one zone.

In step 928, the system may determine delivery attributes for each supplier on each zone default list. Delivery attributes may indicate whether or not the supplier delivers everywhere in the zone corresponding to the zone default list in which the supplier is included. If the zone falls entirely within the delivery area, the delivery attribute may be set to "Does Deliver." If the zone falls entirely outside of the delivery area, the delivery attribute may be set to "Does Not Delivery." If the zone and the delivery area overlap, the delivery attribute may be set to "May Deliver." In step 930, delivery information, including delivery attributes and related information, may be added to the zone default lists in connection with the respective suppliers.

If a delivery attribute is "Does Deliver" or "Does Not Deliver," the system may add the appropriate attribute to the zone default lists (step 932). If a delivery attribute is "May Deliver," the system may add the "May Deliver" attribute to the zone default lists (step 936). The system may determine coordinates defining the region of overlap between the zone and the delivery area (step 938) and add the coordinates to the zone default lists. Delivery attributes and coordinates may be added to the list in compressed form using bit-masking (for delivery attributes), truncation or rounding (for coordinates), and conversion to base-N digits (wherein N may be any integer).

In step 942, the system may receive an indication of a user location. In step 944, the system may provide the user with a zone default list corresponding to the user's indicated location. Step 944 may include presenting the list using features of a distributed database engine. In step 946, the system may download any data processing tools necessary for ascertaining whether suppliers with a "May Deliver" delivery attribute do or do not deliver. The data processing tools may be downloaded to a user's access device as compressed data objects. Data processing tools may be decompressed and activated using features of a distributed database engine.

In step 948, the data processing tools are used in the user's access device to ascertain, for each "May Deliver" supplier on the provided zone default list, if "May Deliver" suppliers deliver to the user's location or not. This determination may be made, for example, by determining if the user's location falls within the region of overlap encoded into the zone default list in step 940.

In step 949, the system may present the user with affirmative or negative indications that indicate whether or not a supplier on the zone default list delivers to the user's location. Step 949 may utilize the presentation engine features of the distributed database engine. Step 949 may include receiving a user indication of a selection of a supplier and presenting the user with a message such as "Delivers To You" or "Does Not Deliver To You."

Accounting Codes

Some embodiments of the present invention may include an accounting codes feature. In some of the embodiments, this feature is generally represented in steps 164, 165, and 182 of FIG. 4. Some embodiments of the accounting code feature are described in U.S. Provisional Patent Application No. 60/245,826, filed Nov. 3, 2000, and U.S. Provisional Patent Application No. 60/259,563, filed Jan. 2, 2001, (Attorney Docket No. ATG-6 PROV2), both of which are hereby incorporated herein in their entirety.

Accounting codes may be used in connection with an ordering system, such as ordering system 1 (as shown in FIG. 5), by users, administrative users, and any other users who need to track orders or associated billing information. Some aspects of this feature may involve providing users with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. In an on-line arrangement, access device 102, for example, may be used to run client-based applications. In non-on-line arrangements, personal computer 112, for example, may be used to run client-based applications.

Other aspects of this feature may involve additional processing, such as searching, grouping, calculating, generating reports, and communicating with other systems, or other types of processing. In on-line arrangements (as shown in FIG. 1), such processing may be performed by access device 102, Internet and application server 104, or database server 105, depending on, for example, the processing and storage capabilities of access device 102, the chosen implementation for the markup language documents used, the processing requirements of such operations, or other factors. In non-on-line arrangements (as shown in FIG. 2), such processing may be performed by personal computer 112, remote access device 113, application server 140, database server 105, or distributed among peer applications, depending on the chosen system implementation and the processing requirements of such operations.

For the sake of simplicity and not of limitation, the accounting codes feature will be illustrated herein in the context of an Internet-based system for providing restaurant information and opportunities to order food on-line. This feature of the invention may be used, however, in connection with the placement of orders for any type of services or merchandise. In particular, this feature will be illustrated using the example of providing restaurant information and ordering services to users 510 of Group X using illustrative system 501 as shown in FIG. 25. System 501 may be a simplified version of system 1, as shown in FIG. 5.

In the context of this feature of the invention, a group may be any organization or entity having member users that issue orders to vendors of merchandise, supplies, materials, or services, and in which the organization desires to track those orders according to the organization's activities, functions, affiliates, patrons, or clients. (Groups and relationships between groups and users are discussed above.)

Tracking orders and order patterns of users 510 can be important for increasing organizational efficiency and minimizing losses (including those due to error and fraud). Some embodiments of this feature may provide systems and methods for increasing organizational efficiency and for minimizing losses in connection with the placement of orders. Accordingly, some embodiments of this feature may provide systems and methods for identifying orders (or portions of orders) and relating them to associated information using accounting codes.

When user 510 places an on-line order, system 501 may prompt user 510 for any appropriate order information. Order module 525 in group X ordering site 524 may provide user 510 with a user interface features for exchanging information with system 501. The user interface features may be provided through presentation engine 450 of DDBE 435, as shown in FIG. 13.

Order data entry forms and accounting code fields may be provided to users 510 for entering expensing data in connection with orders. Expensing data may be in the form of accounting codes. A user may enter any appropriate accounting codes. System 501 may prompt user 510 to assign one or more accounting codes to a given order. Order expenses may be divided or split among multiple accounting codes according to cost, specific items or services, accounting code groups (in cases where codes are logically grouped according to organizational functions, e.g., client or department), any other accounting function or code, or a combination thereof.

Accounting codes may be stored with order information (which may include electronic transaction receipts). Order information may be saved and indexed, for example, in a database or other data-storage device. Some embodiments of the invention may provide reporting functions to search the stored order information. Reporting processes may be run using accounting engine 560. Accounting engine 560 may include a database for order and accounting information. Accounting engine 560 may receive order and accounting information from order server 530. Administrative user 511 may use administrative module 527 in Group X site 524 to submit requests for data, analysis, reports, or other information products to accounting engine 560. Reports and data may be returned to administrative user 511 using administration module 527, or any other means, which may include e-mail, fax, or postal service.

Administrative user 511, who may be a system administrator, organization accountant, or other designee of Group X, may request reports in connection with a variety of analyses. For example, system 501 may provide administrative user 511 reports for any given time period, order placement history, patterns, and costs associated with given users, accounting codes, suppliers, and projects.

Administrative user 511 may customize an expensing program for Group X interactively, using a administration module 527. For example, administrative user 511 may provide the names of expense codes (e.g., Client Code, Matter Code, User Code, and Project Code) and formatting parameters of the codes (e.g., the number or type of characters in a code). Administrative user 511 may provide to accounting engine 560, and may periodically update, a list of current and valid accounting codes. The list may be keyed in at web site 524 or uploaded to accounting engine 560 from a user access device. The accounting code list may be used to validate codes entered by users 510.

Administrative user 511 may activate an expense code validation process based on a list of valid and current expense codes. The validation process may run in accounting engine 560 (in connection with codes received by order server 530 from order module 525). After user 510 enters a code to expense an order, the code may be checked against the list of valid and current codes. If user 510 enters a code that is not included in the valid code list, user 510 may be informed that the codes are not listed. The company or service provider may choose to allow the user to enter the order using the invalid code or to change the code. If an order is placed using an unlisted or otherwise invalid code, the order may be flagged for later investigation and an electronic mail notification of the suspect transaction may be sent automatically to administrative user 511 or the Group X accounting department.

Administrative user 511 may provide text or other information to accounting engine 560 that describes Group X's order-expensing policies. The policy-oriented text, or any other text, may be presented to users 510 when they log in or enter accounting codes using order module 525. The text may be conveyed to order module 525 via order server 530 or by any other suitable server (not shown).

Administrative user 511 may provide a list of users and user identifiers to accounting engine 560 for validation of orders or transactions submitted by users 510. (User e-mail addresses may be used as user identifiers.) Administrative user 511 may associate each user with one or more permission levels to control access to administrative and accounting functions of the accounting site and to enforce order-expensing policies. (Each permission level may have a corresponding set of order-expensing rules or restrictions. Order expensing rules may impose restrictions based on order-related information including, but not limited to, user position (e.g., partner, associate, or assistant), time of day, and expense code. For example, a rule established at the associate permission level may state that associates can expense $25.00 for dinners between 7:00 p.m. and 1:00 a.m. during weekdays. Another rule may limit the amount that may be expensed for a particular client for a food order.

Using Group X expensing rule information, accounting engine may, via order server 530 or another server, display warnings to user 510 at the time an order is assembled using order module 525. A warning may be keyed to one or more elements of the order (e.g., the permission level or position of user 510, the time of day, or the expense codes chosen by user 510). Administrative user 511 may place special limitations on users' expensing privileges in accordance with Group X policy or expensing rules. For example, a user's privilege to order via a house account can be turned off in response to abuse by the user.

Users 510 may be enabled to enter a Group X account number for a given restaurant to charge a food order to the corresponding house account. Restaurant account charges and project, client, and matter expense codes associated with the order may be stored by system 501 and accessed by or transferred to administrative user 511 for subsequent accounting, reconciliation, and billing tasks. (For example, at the discretion of administrative user 511, user 510 may charge a personal order to a house account and enter his user identification number and/or an appropriate expense code so Group X can subsequently bill user 510.) When a house account is not available, user 510 may pay the restaurant for the order using, for example, cash, a personal credit card, or a credit card owned by Group X for either a personal order or a Group X order.

In some embodiments of this feature of the invention, system 501 may provide a company with a bill consolidating all charges to house accounts made by users of a user group during a given billing period. Accordingly, for all of those restaurants holding house accounts for the group, the group would receive a single bill and make a single payment, for example, to the system 501 or a service provider that provides system 501 to users.

When an order is submitted to system 501 by user 510, order information, including project, client, matter, and expense splitting codes and information are stored in a database on any suitable storage medium. Subsequently, they may be accessed by administrative user 511 for accounting purposes.

Accounting engine 560, which may include an expense reporting engine (not shown), may generate reports that include any information associated with a given order, including the full text of the order. The expense reporting engine may provide summary reports or detail reports. The reports may be viewed, printed, or downloaded in any suitable format. Accounting data may be accessed by administrative user 511 or other authorized users and reports may be generated 24 hours a day.

A report may list any set of users 510 selected by administrative user 511. Such a set may include all users 510 in Group X, a single user 510, or any subset of users 510 that is useful for Group X accounting purposes or other purposes. Similarly, the system may generate reports based on any set or subset of any of the order information elements. For example, a report may show only those orders placed with a particular restaurant, at a particular time of day, or having a particular total. (Tools for generating these reports are not shown).

Reports may include an order identifier ("order I.D."). The order I.D. may be a unique number that may be used throughout the system to identify, access, group, and file orders. The order I.D. may be assigned to an order by order module 525 at the time an order is created. The detailed report also displays any adjustments that may have been made to an order total. Adjustments may be made by administrative user 511 to reconcile accounting discrepancies or correct errors. Reports may highlight ordering activity that violates company rules, exceeds predetermined threshold spending values for a given category of spending, or uses invalid or outdated expense codes.

Some embodiments of the accounting codes feature of the invention may be implemented in connection with a DDBE (Distributed Database Engine) using data objects within a layered system architecture to input, store, index, sort, display, and output order information. Major layers may include a database or data object layer for storing data objects, a presentation layer for providing a user interface, and a translation layer for moving information between the data object and presentation layers.

Each type of object may include attributes that are necessary for processing information associated with that object. For example, a group may be represented by a group object that has attributes including user identifiers and valid expense codes. A user may be represented by a user object that has attributes including position (e.g., partner, associate, clerk). A food order may be represented by an order object that has attributes including menu items, total amount, and the identifier of the user who placed the order. Order module 525 may use an order engine data object. Data objects may be stored in an object layer or database layer within an user's local browser.

Some embodiments may include an expensing rule processing module that applies expensing rules to order-related data objects to enforce organization expensing policies. Functions based on organization expensing rules operate on attributes of relevant data objects and may be evaluated to determine if an order is in compliance with the rules. Rule specific functions may be coded using C-like syntax (e.g., JavaScript).

Expensing rule functions may be stored in a web or database server within system 501 and transferred to a user's local browser where they may be stored in an object layer of a database. The expensing rule processing module may activate functions and may evaluate them based on the values of predetermined data object attributes. Function activation and evaluation may be localized in the translation layer and function output may be channeled to a user via the presentation layer.

FIG. 26 shows a general flowchart of illustrative steps involved in using some embodiments of the accounting codes feature of the present invention. In particular, FIG. 26 shows steps involved in processing accounting codes associated with a user who is a member of a group. The steps shown in FIG. 26 are only illustrative and may be performed in any suitable order. In practice, there may be additional steps or some of the steps may be deleted.

For clarity, the following discussion will describe the steps shown in FIG. 26 as being performed by "the system," which is intended to include any suitable e-commerce system, such as, for example, any non-on-line or on-line arrangement suitable for performing the steps.

In step 562, the system may receive an indication from a user that an order, which may have been entered using a user access device, is in final form and that the user is ready to make payment arrangements. Payment may be made either on-line (e.g., by credit card, or house account) or off-line (e.g., by cash or C.O.D.).

In step 564, the system may receive an indication from the user that the user desires to use accounting codes to keep track of expenses connected with the order. If the user does not want to track the expenses, the process proceeds to final steps of the process, in which the order may be stored, submitted to a supplier, and reported to an administrative user.

If the user elects to use accounting codes to track the expenses, the system may present the user with group expensing policy information (step 566). The system may provide hotlinks to details about group expensing policies or rules that govern the use of accounting codes for users (steps 568 and 570, respectively).

In step 572, the system may prompt the user for accounting codes (e.g., client codes, matter codes, project codes, employee codes, any other relevant codes, or any combination thereof). In step 574, the system may receive an indication from the user to split the order expenses between two or more accounting codes. If the system receives an indication to split an order in step 574, the system may receive an indication of a splitting method in step 576. Splitting methods may include percentage splits (e.g., a percentage of the order may be charged to each accounting code), amount splits (e.g., a selected number of dollars, pounds sterling, francs, etc., may be charged to each accounting code), or sub-order splits (e.g., the system may receive indications of which items in the order are to be charged to each accounting code).

The system may receive any accounting codes associated with the order in step 578. In step 580, the system may perform validity testing on any submitted codes by comparing the codes to codes listed in a system database by an administrative user. If the codes are deemed invalid (e.g., a submitted code is not found in the database or a submitted code is found in the database, but is inactive), the system may issue a warning to the user in step 582. The system may issue notices to an administrative user or other authorized individual. If the accounting code is found to be valid in step 580, the system may check if the prospective transaction is permitted, according to group rules, in step 584. Group rules may include criteria related to user authority or permission level, time of day, day of week, cost of order, budgetary restrictions, user usage history, or any other criteria or combination of criteria. In step 586, the system may issue warnings or messages similar to those of step 582. Steps 582 and 586 may loop back to steps 580 and 584, respectively, when warnings are required to be issued. Users may be provided with the ability to bypass or override warnings in some of those embodiments.

In step 588, the system may store order information including information related to the user, any supplies ordered, billing information, and accounting codes, if any, in a database. In step 590, the order may be submitted to a user-selected supplier. Any accounting codes may be submitted to the supplier with the order for subsequent accounting purposes. In step 592, the system may report order information, which may include accounting codes, to an administrative user. A report, which may be customized by the administrative user, may be made by the system upon the request of the administrative user.

Graphical Custom Order

Some embodiments of the invention may include systems and methods for using an electronic communication network for placing a graphical custom order for items with a supplier. In some of the embodiments, this feature is generally represented in step 163 of FIG. 4. Items may include consumer products, electronics, automobiles, automobile accessories, sporting equipment, industrial equipment, clothing, food items, and any other items that may be customized. If items are food items, they may include restaurant menu items, grocery items, specialty food items, or other food items. Some embodiments of graphical custom ordering are described in U.S. Provisional Patent Application No. 60/191,359, filed Mar. 22, 2000, which is hereby incorporated herein in its entirety.

In some embodiments, a food ordering service or system may electronically receive selections of items and corresponding options, extras, customized features, or personalized features from a user using an access device. The user may manipulate graphical features of a display to make the selections. The graphical features may be manipulated by a user input device such as a mouse, joy stick, keyboard, remote control, or other cursor-control device.

The cursor icon may be converted from a default graphic into a graphical representation of a selected option and positioned near, in, or on a selected item. In response to a subsequent indication from the user, another graphical representation of the selected may be displayed in position in, or as part of, the selected item. The cursor icon may then be reconverted into a default cursor graphic. By transforming the cursor icon in this way, the display illustrates for the user that the user picked up the option from one part of the display, dragged it to the selected item, and placed it in or on the item. The process may be repeated for each item and for each option the user selects. Text corresponding to the user's selection may also be displayed.

At any point during the assembly of a virtual food item that is to be cooked, the ordering service may receive a request from the user to view an image of the item, as modified by any or all options, in its cooked state. The system may then display a graphical representation of the completed or partially completed food item in its cooked state.

One example of a graphical custom order according to the principles of some embodiments of the invention is a graphical custom order for a pizza. The user may be presented with a virtual menu including graphical representations of pizza. The user may then select a pizza by clicking on a corresponding graphical representation. The user may then be presented with a graphical representation of a basic pizza or with an outline or schematic framework of a pizza. The user may then select elements of the pizza. Selectable elements may include dough and dough options, cheese and cheese options, sauce and sauce options, toppings and topping options, crust and crust options, size and size options, and any other pizza options (e.g., seasonings, condiments, cooking instructions).

Dough options may include plain dough, sourdough, whole wheat dough, multiple grain dough, and dough with special additives (including, e.g., sprouted grains). Pan-style dough, deep-dish style dough, or any other form of dough may be included as options.

Cheese options may include cheese types (e.g., Parmesan, mozzarella, or any other type of cheese or combination of cheese types) and amounts of each selected cheese.

Sauce options may include sauce types and amount of each type. Sauce types may include tomato sauce, clam sauce, or any other type of sauce.

Crust options may include selections of a desired degree of crust crispiness (or softness).

Topping options may include, for each topping, a pizza coverage fraction (i.e., what fraction of the pizza a giving topping should cover) and a topping amount (e.g., a lot or a little).

Pizza size options may include, for example, options for small, medium, or large pizzas, but sizes may be represented in terms of pizza diameter or thickness.

Some embodiments may provide systems and methods for dividing or sectioning a pizza. This may facilitate custom ordering. The ordering system may electronically receive indications to divide a pizza into more than one section. The system may then receive an indication of one or more of the sections onto which an option is to be applied or distributed. The system may further receive an indication to distribute the option or topping to the selected section.

The system may display a graphical representation of available options. The system may record the selection of an option by including a hotlink in the graphical representation of the option. The hotlink may cause an order data object to record the option. The hotlink may convey appropriate commands to the browser display to modify or replace the cursor graphic with a graphical representation of the option. Selected sections may be graphically transformed to include the option when the cursor is dragged to one or more such section.

The order data object may be updated at the time the option is "dragged" to or "dropped" on a selected section of the pizza or at the time the user confirms a completed pizza order.

Some embodiments of the invention may include systems and methods for custom order decomposition. Custom order decomposition involves graphically decomposing a pizza into simple components when an order is submitted to a supplier. Custom order decomposition may facilitate order fulfillment. After a graphical representation of a pizza is assembled by a user, the ordering system may receive an indication from the user to order the pizza. The ordering system may divide the pizza into layers or partial layers of a given option or attribute and present layer information textually and graphically to a supplier when the order is submitted to the supplier. A partial layer may include, for example, a layer of a given topping to be distributed over only a specified section of the pizza. The supplier, for example, a pizza chef, may then assemble a pizza in accordance with the order one layer at a time. The pizza chef may assemble a pizza having all the layers and partial layers, deposited in a prescribed order, and the resulting pizza may thus match the graphically designed pizza.

FIG. 27 is a generalized flow chart showing steps involved in illustrative graphical custom order 1100 in connection with an on-line ordering system. In step 1105, the system may receive an indication an item from a user. For example, the system may display a graphical representation of the item and the user may select the item by clicking on the graphical representation. In another suitable approach, the user may click on a textual link to the item. Any other suitable approach for prompting a user to select an item may be used. In step 1110, the system may display a graphical representation of the selected item or an outline or schematic framework of the item.

For example, the system may display a circle or a three-dimensional disc if the item is a pizza. If the item is a sandwich, a layered framework may be presented that allows the user to "fill in" bread, sandwich fillings, and condiments. If the item is a flower arrangement, the system may display a vase that allows the user to fill in the flowers one stem or stalk at a time. If the item is a fruit basket, the system may display a basket that allows the user to fill in pieces of fruit or other food items.

In step 1115, the system may display graphical representations of options, which may be preselected options, for "integration" into the selected item. In step 1120, the system may display an active button to allow the user to divide the selected item into sections or subsections. For example, a pizza may have wedge-shaped sections, a sandwich may have slab-shaped sections arranged in a stack, and a salad platter may have polygonal sections or cells. In step 1125, the system may receive an indication to divide the selected item. If the user indicates that the selected item should be divided, the system may divide the display of the selected item into sections. The user may indicate finer degrees of sectioning by repeated clicks on the active button. The user may highlight a displayed section and indicate subdivisioning of the displayed section.

After the selected item is divided into sections, step 1130 shows that the system may receive an indication from the user to activate a section for applying an option. For example, a user may click on a quarter section of a pizza for subsequent application of a topping. The system may highlight the selected quarter section of the pizza. If, in step 1125, no indication to divide the item is received, graphical custom order 1100 may skip step 1130 and proceed directly to step 1135.

After an item or section of an item has been selected for the application of an option, the system may receive an indication of an option selection from the user in step 1135. For example, the user may click on a graphical representation of an option displayed in step 1115. When the user clicks on the option, the system may convert the cursor graphic to a graphical representation of the option.

In step 1140, the system may receive an indication of the application of an option to an item or section. For example, the user may drag the representation of an option to a position on top of the item or selection and up-click the mouse button. The system may respond by displaying the item or section as it would appear when modified by the dragged option (step 1145).

In step 1150, the system may receive an indication from the user to finalize the order. If the order is to be finalized, the display of the item, with any option selected, may be transformed into a cooked version of the item (step 1160). For example, a pizza may appear to have shredded cheese during virtual assembly, but would appear to have melted cheese after cooking. Displays of items that do not require cooking may be left in an "uncooked" state. After finalization, the item and any selected options may be recorded in a data object corresponding to the order. The system may transform displays of other items into final form. For example, if a user selects an automobile wheel and a tire, the system may illustrate the tire as mounted on the wheel and use animation or video to illustrate the tire as it is inflated.

In step 1150, the user may choose to select additional options for the selected item, section, or sub-section. The user may also choose to create new divisions in the item. Accordingly graphical custom order 1100 may reiterate from step 1125. In step 1161, the item, as modified by any options, may be added to the order.

FIG. 28 shows a general flow chart for illustrative steps involved in custom order decomposition. In step 1170, the system may receive an indication from a user to submit an order for a custom item to a supplier. The system may submit the order to the supplier in step 1172 by an suitable means, including, but not limited to, fax and e-mail. The system may provide the supplier with textual description 1174. The system may provide the supplier with graphically decomposed order 1176. Graphically decomposed order 1176 may decompose an order into easily comprehensible components to simplify the process of assembling the item.

FIG. 29 shows graphically decomposed order 1180 as an example of graphically decomposed order 1176 when the selected item is pizza and there are several selected options. The system may decompose the custom pizza into layers that correspond to each option and show the distribution of the option across the surface of the pizza. Layer 1 may be an option for thin sourdough. Outline 1182 shows that the options associated with layer one cover the entire pizza. Outlines 1184 and 1186, and 1188 show that layers 2,3, and 4 (regular pizza sauce, mozzarella cheese, and mushrooms, respectively) also cover the entire pizza. Layers 5 and 6 (olives and green peppers, respectively), cover only selected sections of the pizza as shown by outlines 1190 and 1192.

The pizza can be assembled by adding one layer at a time in numerical order. When options are applied to limited sections of the pizza, the outlines may give the relative orientations of the limited sections. For example, outlines 1190 and 1192 correspond to layers having ½ coverage by olives and ¾ coverage by green peppers.

In some embodiments of the invention, client-side user interface functionality for graphical custom orders or order information formatting functionality for custom order decomposition (as shown, for example, in FIGS. 27 and 28-29, respectively) may be provided by downloading special functions to the user's browser. Providing special functions may be accomplished, for example, using some or all of the DDBE principles illustrated in FIG. 18*a*.

In some embodiments of the graphical custom order, for example involving pizza, the code used to present a customized pizza and associated options may not be necessary for every menu. Accordingly, a function used to present a pizza menu using graphical custom order features may involve one or more specialized functions.

Group Ordering System

In some embodiments of the invention, systems and methods for placing group orders with suppliers via an ordering system may be provided. In some of these embodiments, this feature is generally represented in steps 154, 156, and 164 of FIG. 4. A group order may be an order that is placed by a group of users of the ordering system. The group order may be initiated by a host user who submits an order, accompanied by a list of invitee users (hereinafter, "invitees") to the ordering system. The system may forward invitations, which may be electronic invitations (e.g., e-mail invitations) to the invitees. The invitation may identify a supplier proposed by the host user. Some embodiments of group ordering are described in U.S. Provisional Patent Application No. 60/191,359, filed Nov. 3, 2000, which is hereby incorporated herein in its entirety.

Alternatively, the system may suggest a supplier or suppliers that satisfy certain criteria that may be stated by the host user or by one or more of the invitees. One or more preliminary invitations may poll invitees for requirements regarding timing of delivery, pricing, or type of supplies that are desired. If the invitation is for an event that is to take place at the supplier's location, invitee requirements the event time may be polled in a preliminary invitation.

For example, a host user may initiate a group order for a lunch meeting at a restaurant within 5 blocks of a downtown office building on a given date and within a given time range, but one of the invitees may be invited to select the time, while another may be invited to select the restaurant. The ordering system may poll the invitees whose input is required, obtain confirmation from the host user, and distribute complete invitations, which may include deadlines for response, to each member of the group.

After complete invitations are distributed, invitees may respond by sending an RSVP back to the system indicating, for example, an acceptance, a rejection, or that a delayed RSVP is forthcoming. The invitations may include a hotlink to the selected supplier's catalog and invitees may place orders directly with the supplier.

If an order is placed in connection with a deadline, a time-sensitive delivery, or a scheduled event, invitee orders may be cached by the system and submitted to the supplier as a unified group order. The group order may be submitted to the supplier as a series of partial orders. The manner in which orders are submitted to the supplier and the submission of an order or orders may be subject to confirmation by the host user. The host user may receive, or have system permissions to view, order status information indicating which, if any invitees, have placed orders for inclusion in a group order.

FIG. 30 shows group order holding bin 731, email engine 732, and group order status engine 733, each of which may be included as modules that interact with, or are components of, order server 730. Order server 730 may be part of an on-line ordering system such as system 1 (as shown in FIG. 5) that may be implemented using database server 105 and Internet and application server 104 (as shown in FIG. 1).

Host user 710 may submit an unverified request to initiate a group order to request filter 704. Request filter 704 may process the unverified request into a verified request. The verified request may include any system, user, or order state variables necessary to identify the request as a group order request or to specify permission levels for user 710. The verified request may include any other variables that may be necessary for order server 730 to process the request. Request filter 704 may format the verified request as necessary for proper processing by order server 730.

According to some embodiments, host user 710 may initiate a group order in connection with an order placed in accordance with methods described elsewhere in this document. A group order may be placed using, for example, a user interface having displays or data entry screens similar to those illustrated in FIGS. 33 and 35-67. Order server 730 may receive an indication from host user 710 that the order should be processed as a group order.

Order server 730 may receive, via the verified request, indications of invitees 711 that host user 710 desires to include in the group order, a deadline for receipt of an RSVP from an invitee 711, a time or time frame for an order event (e.g., a time or range of times for picking up supplies, meeting at a restaurant, or meeting at a designated location to receive delivery from a supplier), and a deadline for placing an order. Invitees 711 may be identified by any suitable identification code, including, but not limited to, a login name, an e-mail address, or a given name.

When the verified request for a group order includes a request for an individual order for host user 710, order server 730 may direct host user order information to group order holding in 731. Group order holding bin 731 may hold the individual host user order while waiting for the submission of corresponding orders from invitees 711. When the verified request for a group order includes a request to issue one or more invitations, order server 730 may direct invitation information (e.g., information specifying invitees, supplier, or particulars relating to an event) to e-mail engine 732.

E-mail engine 732 may send email invitations to invitees 711 identified by identification codes in the verified request. When identification codes other than e-mail addresses are used, email engine 732 may search for and find corresponding e-mail addresses using a system database server, such as database server 105 (shown in FIG. 1). Database server 105 may use a user variable identifying user 710 as member of a group or as a user of a given location that is also linked to a user variable corresponding to an invitee.

Invitees 711 may be provided with a hotlink to an ordering site for submitting an order to order server 730. State variables of the invitation, which may be sent by e-mail engine 732 in accordance with the verified request, may automatically identify each of invitees 711 to order server 730 as an invitee of the group order. Any orders placed by invitees 711, therefore, may be held in group order holding bin 731 and associated with the individual order placed by host user 710.

Group order holding bin 731 may assemble orders from invitees 711 and host user 710 into a single group order for issuance to a supplier. Assembly and issuance of the group order may be initiated by an instruction from host user 710.

Group orders may include accounting code attributes as described above. In some embodiments, accounting codes may be input by host user 710 and invitees 711 at the time their respective orders are submitted to order server 730. In these embodiments, order server 730 may communicate accounting code information to an accounting engine, such as accounting engine 60 shown in FIG. 5, for later analysis by authorized system users.

Invitees 711 may send an RSVP, which may be a hotlink RSVP, to host user 710. RSVPs may be sent to host user 710 or to group order status engine 733. Group order status engine 733 may track the status of all RSVPs received and all orders placed in connection with the group order. Group order status information may be presented to host user 710 via email or by presenting group order status a web page that host user 710 is permitted to view.

In some embodiments, host user 710 may view group order status information using a push engine as described above. When a group order in group order holding bin 731 is deemed sufficiently complete by host user 710, order server 730 may receive a "SEND GROUP ORDER" request from host user 710.

In other embodiments, host user 710 may request a group order without placing an individual order. Accordingly, host user 710 may request an "incomplete" group order and complete the group order at a later time. For example, host user 710 may request an incomplete group order and delay placing an individual order until receiving a response from invitees 711. If a favorable response is received from invitees 711, host user 710 may complete the order by directly accessing the incomplete order in order server 730. Alternatively, host user 710 may place an order as an invitee via a self-addressed invitation requested in connection with the incomplete group order.

If inadequate or an unfavorable response is received, host user 710 may send a request to order server 730 that the group order be canceled. E-mail engine 732 may send suitable cancellation notifications to invitees 711.

Credit Card Pricing

Some embodiments of the invention may include systems and methods for reducing the risk of bad debt that may accrue to a provider of an on-line ordering system or service. In some of the embodiments, this feature is generally represented in steps 172 and 174 of FIG. 4. An on-line ordering system or service provider may agree with a supplier that the provider will facilitate a sale of supplies or services by a supplier to a system or service user. In turn, the supplier may agree to pay a commission (e.g., a percentage of the value of the sale or a fixed fee per sale) to the provider. Credit card pricing is described in U.S. Provisional Patent Application No. 60/191,359, filed Mar. 22, 2000, which is hereby incorporated herein in its entirety.

Bad debt may accrue when a supplier fails to pay the provider a commission for a sale facilitated by the provider. When a user uses a credit card to pay for supplies or services ordered from a supplier, he may do so on-line by providing credit card information to fulfill any requirements for billing information presented by the provider. The system may receive the credit card information, which may include an explicit or implicit instruction to the supplier, the provider, or both to seek payment from the user's financial institution in compensation for the supplies or services provided.

The provider may receive user credit card information, including credit card account number, the name of the credit card account holder, and the credit card expiration date using any suitable electronic data collection means. The provider may then submit a credit card claim or payment instruction to the user's financial institution and receive funds corresponding to the claim, but reduced by a service charge imposed by the financial institution.

The service charge may be a discounted service charge based on a high volume of credit card claims presented by the service provider. The discounted service charge may not be available to an individual supplier if the individual supplier does not generate a sufficient number of credit card transactions.

The provider may then pay the supplier the original claim amount reduced by the service charge and any commission or additional service charge upon which the provider and the supplier have agreed. The provider may deduct outstanding receivables due from the supplier in connection with other orders (which may have been untrappable or voluntarily untrapped). Accordingly, the provider may be virtually guaranteed that a commission on the credit card order will be received.

The provider and the supplier may further agree that the provider may wait a predetermined period of time before the provider pays the supplier. The "floating" funds, received by the provider, but not yet paid the supplier, may be used by the provider to generate additional funds. The provider may keep some or all of the additional funds or may pass all or a portion of the funds to the supplier.

For example, if a supplier submits a credit card claim, c, directly to a financial institution, the supplier may receive a direct payment, $P_{supp/direct}$, given by $$P_{supp/direct}=c-cm_{direct}, \tag{1}$$

where m* is a non-discounted service charge rate. For example, m* may be 2%. If the provider submits claim c to the financial institution, the provider may receive a payment, $P_{prov}$, given by $$P_{prov}=c-cm_{discount}, \tag{2}$$

where $m_{discount}$ may be less than $m_{direct}$, $P_{prov}$ may thus be greater than $P_{supp/direct}$.

The provider may then make a delayed payment, $P_{supp/delay}$, to the supplier given by $$P_{supp/delay}=c-c(q_{prov}+n), \tag{3}$$

where $q_{prov}$, is a service charge rate imposed on the supplier by the provider in exchange for processing the credit card payment and n is a commission rate. For example, $q_{prov}$ may be 1.5% and n may be 5%.

The net gain (excluding any tax effects) to the provider, $G_{prov}$, in connection with such a transaction may thus be $$G_{prov}=c(q_{prov}-m_{discount})+cn \quad (4)$$

The next gain (excluding any tax effects) to the supplier, $G_{supp}$, after a commission is paid at rate n to the provider, may thus be:

$$G_{supp/delay}=c(1-q_{prov})-cn \quad (5)$$

when the supplier receives a delayed payment for claim c from the provider; and $$G_{supp/direct}=c(1-m_{direct})-cn \quad (6)$$

when the supplier submits claim c directly to the user's financial institution.

According to the principles of some of these embodiments, the supplier may benefit from having the provider process the credit card claim to the extent that $q_{prov}$ is less than $m_{direct}$ (equations (5) and (6)). Additional benefit may be conferred by the provider to the supplier by setting $q_{prov}$ less than $m_{discount}$ (equation (4)). The cost of the additional benefit may be offset by investing the payment to the provider $P_{prov}$ (equation (2)) for a fixed period of time before making payment $P_{delay}$ to the supplier.

When a supplier makes a combination of cash and credit card transactions through the on-line service, the provider may have a risk of non-payment of commissions for cash sales. Using the method described above for credit card claim processing, the risk associated with cash sales can be mitigated. (Cash sales, for the purposes of the credit card pricing feature of the invention, may include all sales using payment methods other than credit card.) If the provider processes all credit card claims, only a certain portion of total sales (including cash and credit card sales) must be made by credit card to mitigate all risk associated with cash sales.

For example, at the end of a given billing cycle in which cash and credit card transactions are made, and in which all credit card transactions are processed by the provider, the supplier may owe the provider a debt, $D_{supp}$, given by $$D_{supp}=Xn, \quad (7)$$

where X is total cash sales. In return, the provider may owe the supplier a debt, $D_{prov}$, given by $$D_{prov}=K-K(n+q_{prov}), \quad (8)$$

where K is total credit card sales. Accordingly, the risks of unpaid debt are offset when $$D_{supp}=D_{prov}, \quad (9)$$

Using equations (7)-(9), the risks are offset when $$X = K\left(\frac{1}{n} - 1 - \frac{q_{prov}}{n}\right). \quad (10)$$

The fraction of total sales, $F_K$, represented by credit card sales is $$F_K = \frac{K}{K+S}. \quad (11)$$

Using equations (10) and (11), the fraction of sales that must be made by credit card and processed by the provider to mitigate the risk of bad debt is $$F_0 = \frac{n}{1-q_{prov}}. \quad (12)$$

Risk may be mitigated when the provider processes (or "traps") only a fraction of the credit card orders. Using the principles described above, the fraction of all credit card sales that the provider must trap, $F_{TO}$, to mitigate against the risk of bad debt is given by $$F_{TO} = \frac{n(X+K_{supp})}{K_{Total}(1-n-q_{prov})}, \quad (13)$$

where $K_{supp}$ is the amount of credit card sales processed by the supplier and $K_{Total}$ is the sum of credit card sales processed by the supplier and the provider.

FIG. 31 shows possible illustrative interactions among user 1010, service provider 1000, supplier 1040, and financial institution 1099. User 1010 may submit an order to service provider 1000, e.g., via ordering system 1001. Ordering system 1001 may forward the order to supplier 1040. Supplier 1040 may then fulfill the order by providing supplies and/or services to user 1010. Order 1080 may include billing information. When billing information includes a credit card payment instruction, service provider 1000 may route claim 1084 to financial institution 1099. Financial institution 1099 may then remit first amount 1086 to service provider 1000. Service provider 1000 may then remit third amount 1088 to supplier 1040. Third amount 1088 may be sufficiently less than first amount to ensure that service provider 1000 receives any commission due from supplier 1040 in connection with order 1080.

The payment of third amount 1088 to supplier 1040 may be sufficiently delayed with respect to receipt of first amount 1086 from financial institution 1099 that third amount 1088 may be used to generate investment income. Investment income may be generated, for example, via investment account 1098 of service provider 1000.

FIG. 32 shows a flowchart of illustrative steps involved in implementing some embodiments of the credit card pricing logic of the present invention. The steps shown in FIG. 32 are only illustrative and may be performed in any suitable order. In practice, there may be additional steps or some of the steps may be deleted. Some of the steps shown in FIG. 32 involve providing users with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. In an on-line arrangement, access device 102, for example, may be used to run client-based applications. In non-on-line arrangements, personal computer 112, for example, may be used to run client-based applications.

Other steps illustrated in FIG. 32 may involve additional processing, such as searching, grouping, calculating, and communicating with other systems, or other types of processing. In on-line arrangements (as shown in FIG. 1), such processing may be performed by access device 102, Internet and application server 104, or database server 105, depending on, for example, the processing and storage capabilities of access device 102, the chosen implementation for the markup language documents used, the processing requirements of such operations, or other factors. In non-on-line arrangements (as shown in FIG. 2), such processing may be performed by personal computer 112, remote access device 113, application server 140, database server 105, or distributed among peer applications, depending on the chosen system implementation and the processing requirements of such operations.

For clarity, the following discussion will describe the steps shown in FIG. 32 as being performed by "the system," which is intended to include any suitable e-commerce system, such as, for example, any non-on-line or on-line arrangement suitable for performing the steps.

The system may receive an order from a user in step 1030. The system may determine what method of payment the user has chosen (e.g., cash, credit card, debit card, house account, 30 day net, or any other method of payment). Some methods of payment involve using credit extended by a third party (e.g., credit card or debit card). These methods are referred to herein as "Third Party Credit." Other methods of payment involve only the user and the supplier (e.g., cash, house account, 30 day net). These methods are referred to herein as "Non-Third Party Credit".

In step 1032, orders to be paid for using Non-Third Party Credit are forwarded directly to the supplier for collection from the user (step 1034). Orders that involve Third Party Credit are analyzed in step 1036. If passing the Third Party Credit claim to the supplier can be done without allowing the fraction of trapped credit card sales to decline below $F_{TO}$, as defined in equation 13, the Third Party Credit claim may be passed to the supplier at step 1034. Otherwise, the Third Party Credit claim may be trapped in step 1038.

In step 1040, the system may submit the trapped Third Party Credit claim to the user's financial institution (a "Third Party Creditor"). The system may receive a first amount (equal to the claim reduced by any service charges) from the financial institution or Third Party Creditor in step 1042. In step 1044, the system may invest the first amount to generate additional funds (which may be used to offset any financing service charges by the Third Party Creditor). In step 1046, the system may remit a third amount (equal to the claim reduced by any service charges and/or commissions) to the supplier.

User Interface

FIGS. 33 and 34 show a flowcharts of illustrative steps involved in operating the e-commerce systems of the present inventions. The steps shown in FIG. 33, and any other flowcharts described herein, are only illustrative and may be performed in any suitable order. In practice, there may be additional steps or some of the steps may be deleted.

At step 6005, the system may receive an indication of the preferred user location. This location may be selected from a pre-determined list, generated by the user, selected from a restricted selection, generated randomly or based on one or more suitable criterion by the system, or generated by the user or system in any other manner. Following receipt of the location indication, step 6010 may proceed.

At step 6010, the user may be provided with a list of suppliers. The list of suppliers may be generated based on some or no relation to the location indicated in step 6005. The list of suppliers may be provided to the user by the system, by some other system based on electronic data transfer, or in any suitable manner. Following provision of the supplier list, the system may receive indication "A" from a user directing that step 6015 may proceed. In step 6010, step 6016, or step 6020, the system may receive indication "B" from a user, indicating that the user wishes to follow path 6017 back to step 6005 and possibly indicate a different location. In step 6010, step 6016, or step 6020, the system may receive indication "C" from a user, indicating that the user wishes to follow path 6012 back to step 6010 and possibly receive a different list of suppliers.

At step 6015, the system may receive an indication of the supplier or suppliers preferred by the user. The user may indicate suppliers from the list of suppliers, suppliers not on the list of suppliers, suppliers stored elsewhere electronically, or any other supplier. The system may, if desired, reject one or more of the preferred suppliers as indicated by the user. Following user selection of preferred suppliers, step 6016 may proceed.

At step 6016, the system may provide the user with information about suppliers. The information may or may not be associated with the preferred suppliers selected by the user. The information about the suppliers may be presented to the user in any suitable format. After presentation of this information, the system may receive user indication "A" directing that step 6020 may proceed. In step 6016 or step 6020, the system may receive indication "D" from a user, indicating that the user wishes to follow path 6018 back to step 6005 and possibly indicate a different selected supplier.

At step 6020, the system may provide the user catalog information. The catalog information may or may not be associated with the preferred suppliers selected by the user. The catalog information may be presented to the user in any suitable format. The catalog information may be presented in multiple levels, each having more depth of information than the last. Following provision of the catalog information, the system may receive user indication "A" directing that step 6025 may proceed. In step 6020, the system may receive indication "E" from a user, indicating that the user wishes to follow path 6019 back to step 6016 and possibly receive information about a different selected supplier. In step 6020, the system may receive indication "F" from a user, indicating that the user wishes to follow path 6021 back to step 6020 and possibly receive different catalog information.

At step 6025, the system may receive an indication of one or more desired products from the user. The desired products may be selected from the catalog, entered dynamically by the user, or selected from any other suitable source.

FIG. 34 shows a set of steps that may be used when entering information into the system. It may be desirable to associate certain types of data within the system. For instance, it may be desirable to associate one or more suppliers with one or more companies, so that users having access to the company sites for those companies may be allowed to place orders with the associated suppliers. Likewise, it may be desirable to keep certain suppliers disassociated with certain companies so that users within the company cannot order from a particular supplier or group of suppliers. Similarly, when using a particular company's order site, it may be desirable to users to be associated with certain departments or locations that are associated with the company, so as to simplify the ordering process. The steps of the flowchart shown in FIG. 34 may, for instance, be accomplished through use of the illustrative displays shown in FIGS. 68-79 and 93-106. These steps need not be performed in any particular order. As shown, either step 6120 or step 6110 may be performed prior to any other steps. However, in reality, any of steps 6140, 6130, or 6150 may be performed prior to the performance of either or both of steps 6110 and 6120.

At step 6110 a one or more lists, each composed of one or more suppliers are created within the system. Following step 6110, step 6112 may or may not be taken. Step 6112 may involve the creation of one or more catalogs associated with one or more of the suppliers. It is possible that one or more catalogs may be associated with one or more suppliers. For example, a catalog in the form of a menu may be associated with a supplier that is a restaurant, enabling the system to show users information about a restaurant's menu.

Step 6120 may be performed simultaneously with, prior to, or after performance of step 6110. Step 6120 may involve the creation of one or more lists of one or more companies, schools, groups, or any other type of suitable organization (hereinafter in the description of this drawing, "companies" will be used) that may have some level of access to the system. Following step 6120, step 6122 may or may not be taken. Step 6122 may involve the creation of certain system permissions specific to one or more companies in one or more of the lists created in step 6120, assignment of certain system permissions to one or more companies, deletion of certain system permissions relating to one or more companies, or any other suitable changing of permissions for companies.

Following step 6120, steps 6130, 6140, and 6150 may or may not be taken. Steps 6130, 6140, and 6150 may be taken simultaneously in any combination, or in any order, with the possibility of two steps being taken simultaneously prior to or subsequent to the third step being taken. It is possible that one or more of steps 6130, 6140, and 6150 will not be taken.

At step 6130, a list of one or more departments may be created for one or more of the companies in one or more of the lists created in step 6120. Following step 6130, step 6132 may or may not be taken. Step 6132 may involve the creation of certain system permissions specific to one or more departments in one or more of the lists created in step 6130, assignment of certain system permissions to one or more departments, deletion of certain system permissions relating to one or more departments, or any other suitable changing of permissions for departments. For example, a company may have departments that have different procuring processes, thereby necessitating different system permissions.

At step 6140, a list of one or more locations may be created for one or more of the companies in one or more of the lists created in step 6120. For example, many companies have locations in multiple cities, or even multiple locations within one city. In this example, if multiple locations are stored in the system, the system may be better prepared to handle orders from users that may be associated with the same company, but who require delivery at different locations.

At step 6150, a list of one or more users may be created for one or more of the companies in one or more of the lists created in step 6120. Following step 6150, step 6152 may or may not be taken. Step 6152 may involve the creation of certain system permissions specific to one or more users in one or more of the lists created in step 6120, assignment of certain system permissions to one or more users, deletion of certain system permissions relating to one or more users, or any other suitable changing of permissions for users. For example, it may be desirable to have many users who have permission to order food, while having a smaller number of users who have the ability to view accounting details, edit reporting functions, handle customer service, or any other system function that may be performed based on user indications.

Following steps 6120 and 6110, step 6160 may be taken. In step 6160, one or more suppliers or lists of suppliers may be associated with one or more companies or lists of companies. This association may allow one or more users within companies to order from the associated suppliers. For example, a company may have a policy that requires ordering from a select supplier or group of suppliers. In this example, being able to associate suppliers with companies would help to reduce problems with orders from improper suppliers.

Following steps 6160 and 6140, step 6162 may be taken. In step 6162, one or more suppliers or lists of suppliers that has been associated with one or more companies or lists of companies may be associated with one or more locations. This association may allow one or more users located at the associated locations to order from the associated suppliers. For example, this might be desired if certain suppliers of a company are ordered from by users at some company locations, but not by users at other company locations.

Following steps 6140 and 6150, step 6168 may be taken. In step 6168, one or more users or lists of users may be associated with one or more locations or lists of locations. This association may allow one or more users to order from the suppliers associated with the locations created in step 6140. This might be useful, for example, if a company has multiple suppliers associated with it, but certain users in the company are at locations where only a subset of the suppliers associated with the company may be ordered from.

Following steps 6140 and 6130, step 6164 may be taken. In step 6164, one or more locations or lists of locations may be associated with one or more departments or lists of departments. This association may allow one or more users that have been associated with the departments created in step 6130 to order from the suppliers associated with the locations created in step 6140. This might be useful, for instance, when a company has one or more departments that have multiple locations. In this example, if users were associated with one department, the users may be able to order from different subsets of suppliers depending on the specific user's location and the suppliers associated with that location.

Following steps 6130 and 6150, step 6166 may be taken. In step 6166, one or more users may be associated with one or more departments or lists of departments. This association may allow one or more users to order from the suppliers associated with the locations of the departments created in step 6130.

FIGS. 35-109 show illustrative displays that may be generated by the system for providing various features of some embodiments of the present invention. Displays may be generated using any suitable approach. For example, internet and application server 104 may provide one or more pages to access devices 102 using one or more suitable protocols (e.g., the HyperText Transfer Protocol (HTTP) and Transmission Control Protocol/Internet Protocol (TCP/IP)). The pages may be defined using, for example, any suitable markup language (e.g., HyperText Markup Language (HTML), Dynamic HyperText Markup Language (DHTML), pages defined using the Extensible Markup Language (XML), JavaServer Pages (JSP), Active Server Pages (ASP), or any other suitable approaches). The pages may include scripts, computer code, or subsets of computer code, that define mini-programs (e.g., Perl scripts, Java applets, Enterprise JavaBeans (EJB), or any other suitable approaches). The system may be designed using suitable modular approaches such as, for example, Java 2 Platform—Enterprise Edition (J2EE), Component Object Model (COM), Distributed Component Object Model (DCOM), or any other suitable approach.

FIG. 35 shows an illustrative display 2000. Illustrative display 2000 may be displayed at the beginning of an order process or other electronic transaction. Illustrative display 2000, as well as other displays described herein, may include header 2018, side bar 2038, and contain content area 2010.

Header 2018 may be used as a general navigational tool within the system 1. Header 2018 may provide a user with ways to access high level system information. Side bar 2038, as well as side bars 2138, 2238, 2338, and 2538, may provide a user with navigational or process information and choices relating to the specific process that a user is involved in at any given time. Content area 2010, as well as content areas 2110, 2210, 2310, 2410, and 2510, display, information relevant to the specific step within a process that a user is currently involved in.

Header 2018 may include, for example, a logo of a service provider (e.g., Service Provider Logo), a name of a company, web-site, or web-site sponsor (e.g., Company Name), a logo 2022 (e.g., Company Logo), and links 2016. The logo 2022 may include any suitable passive or interactive text, graphics, audio, video, animation, or other suitable content. Links 2016 may be selected by users in connection with functions indicated by the labels of links 2016. For example, links 2016 may be selected by users for the purpose of accessing information about system 1, viewing favorite past or present orders, reviewing order history, reviewing information about service provider credits, contacting the service provider, gaining access to help information, or accessing any other system feature or information.

Side bar 2038 may include one or more tabs 2012. The system may receive user indications through tabs 2012 about steps involved in placing orders. For example, the system may receive a user indication leading to the display of specific information in display area 2028, through tabs 2012. Tabs 2012 may show specific information about user locations, selected businesses or individuals, order totals, confirmation codes, or any relevant information.

Display area 2028 may include user location information 2014. Location information 2014 may, for example, be displayed in the form of a table, list, radio buttons, data entry field, or any other suitable user interface feature. Location information 2014 may include zero, one, or a plurality of locations. Location information 2014 may be specific to a user, general for all users, selected based on user supplied criteria, or compiled using any suitable method. A user may select a desired location from the displayed location information 2014. Side bar 2038 may also include one or more interactive features 2020. Interactive features 2020 may include buttons, check boxes, radio buttons, data entry fields, drop down lists, menus, or any suitable feature. The system may receive user indications about the flow of the order process, through interactive features 2020. For instance, interactive features 2020 may allow a user to progress forward or backward in an order process, cancel an order, save order information, restart an order, continue or hold an order process, or make any other suitable indications.

Content area 2010 may include information about a service provider, vendors, available services, menu items, one or more links 2024 to information, one or more images 2026, or any other suitable content.

FIG. O2 shows illustrative display 2100. As part of display 2100, the system may provide a list of suppliers, relating in some way to the user's chosen location, to be chosen from. In this example, illustrative display 2100 shows a list of restaurants geographically related to the customer's chosen location titled "jd office". User's choice of "Sushi Connection" caused the system to display information about that restaurant in content area 2110. Illustrative display 2100, as well as other displays described herein, may include header 2018, side bar 2138, and content area 2110.

Display area 2128 may display information about suppliers that may or may not be accessible using the system. In illustrative display 2100, the suppliers shown are restaurants. Display area 2128 may list one or more suppliers in list 2040. Display area 2128 may include search/sort feature 2030. Feature 2030 may include one or more input features 2032 with which users may indicate criteria for narrowing or expanding list 2040 of suppliers. Users may use input devices 2032 to search, sort, or both by, for example, cuisine type, product type, service type, name, price, food quality, product quality, speed of service, business type, or any suitable search or sort criteria relevant to a type of supplier. The searching and sorting criteria may be appropriately modified for suppliers other than restaurants. For example, a clothing supplier might be searched or sorted by type of clothing, gender, season specific clothing, etc.

Display area 2128 may include one or more selection features 2034. The system may receive input from a user, through selection features 2034. For example, this input may include selection of a particular business or person about which information should be displayed, selection of multiple businesses or persons that might be compared or about which a list might be prepared for other uses, prompts indicating that the user wishes to view another list of one or more businesses or users, or input relating to any suitable purpose.

Features of the illustrative display 2100 may have the capability to display additional information relating to that feature or another feature in response to user input. Additional information May be placed in display box 2036 or may be displayed in any manner suitable for the information desired. For example, display box 2036 shows information relating to one of the restaurants related to a single selection feature 2034. A user may indicate that display box 2036 is desired. In another suitable approach, display box 2036 may be generated based on pre-determined and/or random system events, such as business openings or closings, special deals or promotions, or any suitable regular or random event.

Content area 2110 may contain, for example, supplier information and a interactive feature 2120. Supplier information may include the name, address, and contact information for one or more suppliers; hours of operation; types of payment accepted; minimum order amounts; information about delivery, ordering, or eating options; customer ratings relating to food, service, or product quality, speed of delivery, service, or other ratings; a description of the cuisine type, actual dishes, eating environment, delivery distances; or any relevant information about the suppliers. The system, through interactive feature 2120, may accept user indications to change the information displayed. In this example, the system, through interactive feature 2120, may accept user indications that the user wishes to view the menu for the selected supplier.

FIG. 37 shows illustrative display 2200. Illustrative display 2200 may be viewed and used as part of an order process, wherein a user has selected a location and restaurant. Illustrative display 2200 may be used to display a catalog of goods and a list of goods to be included in an order. In this example, a restaurant menu and food order are displayed.

In illustrative display 2200, side bar 2238 may include order list 2202 and other information related to ordering supplier goods or services. Order list 2202 may include one or more order items 2204. For each order item 2204, order list 2202 may include one or more quantity modifiers 2208 through which the system may accept user input relating to the desired quantity of order item 2204, one or more item cancellation modifiers 2214 through which the system may receive user indications that removing a specific item 2204 or group of items 2204 from order list 2202 is desirable, one or more expansion features 2206 through which the system may receive user input indicating that the user wishes to view more specific information, information indicating cost and desired quantity of item 2204, and any other relevant information. Side bar 2238 may also include one or more interactive features 2216.

Content area 2210 may include information about products or services provided by one or more suppliers. Content area 2210 may also include one or more catalog features 2220, one or more interactive features 2218, one or more search data fields 2224, one or more search execution features 2226, one or more catalog section features 2230, one or more lists 2240.

The system may receive user input relating to products or services about which a user desires more information, through catalog features 2220. Catalog features 2220 may be generated using user input received in search data field 2224. In FIG. 37, catalog feature 2220 allows a user to view information from a restaurant menu. Catalog features 2220 for restaurants may allow users to view breakfast, lunch, dinner, carry-out, delivery, dine-in, or any other type of menu or service provided by restaurants.

In this example, the system may accept user indications that the user wishes to view general information about the selected supplier, through interactive feature 2218.

Search data fields 2224 may receive user input relating to specific products or services of selected supplier. This input may be used to limit the data displayed in part or all of illustrative display 2200. The user information in search data field 2224 may be used when search execution feature 2226 receives a user indication that specific data should be displayed.

The system may receive user indications that a specific section of the supplier catalog should be displayed, through catalog section features 2230. Catalog section features 2230 may be generic or specific to a catalog feature 2220. In the example shown, catalog section features 2230 allow users to choose parts of a restaurant menu (e.g., appetizer, noodle soup, beverages, sushi, sashimi, sushi platter, mixed platter, roll, a la carte, sushi chef's recommendations and party platters). Catalog section features 2230 may allow the catalog of supplier goods and services to be divided in any manner.

List 2240 may display specific goods or services that are related to the specific catalog features 2220 and/or catalog section features 2230 indicated by the user. List 2240 may display a default selection of goods or services or a selection based on user information entered into search data field 2224. As shown, list 2240 displays a portion of a restaurant menu. List 2240 may include one or more list features 2242. List features 2242 may display information relating to a specific good, service, or combination of goods and/or services. List features 2242 may include one or more of option features 2244, special information features 2246, and/or order features 2248. The system may receive user indications through option features 2244 when a specific good or service can be prepared or performed in more than one manner. As shown, option features 2244 allow a user to select either white rice or brown rice as part of a shrimp tempura platter. Option features 2244 may be any suitable feature for receiving user indications, including check boxes, radio buttons, buttons, drop-down lists, or menus. The system may receive user input about a good or service being ordered, through special information features 2246. A user may indicate through a special information feature 2246 that a non-standard good or service is desired. For instance, a user might request that soy sauce or duck sauce be mixed with a menu item. The system may receive any relevant user indications, through special information features 2246. The system may receive user indications that the goods and/or services represented by a specific list feature 2242 should be added to the user order and indicated in order list 2202, through order features 2248.

FIG. 38 shows illustrative display 2300. Illustrative display 2300 may provide information relating to an order that is almost complete. Using illustrative display 2300, a user may have the ability to change order information to suit the user's payment, delivery, and other relevant preferences with respect to the order to be placed.

In illustrative display 2300, side bar 2338 may include order and user information. This information may be provided for user reference prior to completing an order. Information may be displayed by one or more personal information features 2324, one or more order option features 2322, and/or any other suitable information display feature. The system may receive user input regarding one or more persons to whom an order is to be related, through personal information feature 2324. The system May receive user input regarding one or more addresses to which an order should be sent, through personal information feature 2324.

Side bar 2338 may also include one or more interactive features 2020.

Content area 2310 may display information about user orders. These orders may be current, future, or past orders. Order information may include any information needed and/or relevant for order fulfillment. Content area 2310 may include print feature 2312. Print feature 2312 may allow users to print, save, or otherwise memorialize one or more copies of one or more orders.

FIG. 39 shows illustrative display 2400. The system may provide illustrative display 2400 to a user for record keeping purposes. In this example, illustrative display 2400 shows a list 2412 of past orders 2414, one of which is expanded into a history detail area 2418, showing accounting details for that order. Illustrative display 2400, as well as other displays described herein, may contain sidebar 2038, header 2018, and display area 2410. Illustrative display 2400 may be used to show order history, accounting data, or any information relevant to users when accessing accounts.

Display area 2410 may display any set or subset of data relevant to user accounts, purchases, orders, and/or any other user activity. Data may be displayed using any suitable display mechanism, including but not limited to tables, lists, graphical displays and the like.

Display area 2410 may contain one or more input features 2416. The system may receive user indications relating to any relevant information, including account codes, client codes, prices, percentages, notes, or any other accounting information, through input features 2416. Display area 2410 may include one or more interactive features 2020 for receiving indications of user intent.

FIG. 40 shows an illustrative display 2500. Illustrative display 2500 may be used by a user for record keeping purposes. In this example, a list of past orders placed by "Doe, John" has been displayed. Illustrative display 2500 may display any set or subset of orders that is suitable for the user. Illustrative display 2500, as well as other displays described herein, may contain side bar 2538, header 2018, and content area 2510. Illustrative display 2500 may be used to show order history, accounting data, or any information relevant to users when accessing accounts.

Content area 2510 may display any set or subset of data relevant to user accounts, purchases, orders, and/or any other user activity. Data may be displayed using any suitable display mechanism, including but not limited to tables, lists, graphical displays and the like.

Side bar 2538 may contain one or more sorting regions 2536. Sorting regions 2536 may contain one or more sort features 2534. The system may receive user indications regarding types of information to be displayed in content area 2510, through sort features 2534. For example, the system may receive indications of dates; user, client, project, employee, order, cost, tip, and/or payment type information; and/or any information upon which relevant data may be sorted, through sort features 2534. The system may receive user input indicating that data should be sorted with a multiple level sort mechanism using more than one field to sort upon, through sort features 2534.

Sorting regions 2536 may also contain one or more limiting features 2530. The system may receive user input indicating that some or all information should be excluded from the information displayed in content area 2510, through limiting features 2530. Limiting features 2530 may, for example, allow users to indicate dates; user, client, project, employee, order, cost, tip, and/or payment type information; and/or any information which may be used to exclude relevant data from display in content area 2510.

FIG. 41 shows illustrative display 3100. Illustrative display 3100 may be the first display seen by the user when accessing the system 1. The system may receive user indications of suitable information for logging into the system 1 through illustrative display 3100. Illustrative display 3100, as well as other displays described herein, may include header 3102, display area 3110, and any other suitable elements.

Header 3102 may include logo 3104. Header 3102 may display any relevant text or information, such as company names and service provider logos.

Display area 3110 may include instructional and/or informational text. Display area 3110 may also include sign-in area 3112. Sign-in area 3112 may include one or more user data features 3114, one or more user control features 3118, and any relevant descriptive text or information. The system may receive user indications of information needed for signing-in to the system, through user data features 3114. The system may receive user indications relating to signing-in, through user control features 3118. User input may include indications to sign-in, request information regarding forgotten passwords, request information about changing passwords, and/or any other suitable indications.

FIG. 42 shows illustrative display 3100, wherein user indications have been entered in user data features 3114. In this example, a user has entered "jdoe@acme.com" into one user data feature 3114 and a password disguised as "******" into another user data feature 3114. Following this entry of user input, the user may select the user control feature 3118 with the text "SIGN IN". Alternately, a user might select any of the other user control features 3118** to change a password, recover a lost password, or perform other relevant actions.

FIG. 43 shows illustrative display 3200. The system may provide display 3200, for example, after user selects a location using illustrative display 2000. Illustrative display 3200 may display a list of suppliers near users location. Illustrative display 3200 might also give a welcome message to the customer and/or provide the customer with some suggestions of preferred suppliers or other relevant information. In this example, illustrative display 3200 shows a list of 12 restaurants, a welcome message, and images of a restaurant and a menu item. Illustrative display 3200, as well as other displays described herein, may contain header 2018, side bar 2138, and display area 2010.

FIG. 44 shows illustrative display 3200. In this example, display box 2036 has been included. Display box 2036 may be included when a user has indicated that more information about a particular supplier is desired. In this example, a user has moved the cursor over a selection feature 2034 which displays the text, "3. Abe's Kosher Style". In response to that user input, display box 2036 has been provided with additional information about the supplier named "Abe's Kosher Style".

FIG. 45 shows illustrative display 2100. The system may provide display 2100, for example, after a user has indicated that viewing information about one of the suppliers listed in list 2040 of side bar 2138 is desired. In this example, user has indicated that viewing information about "Abe's Kosher Style" is desired. This user indication prompted the system 1 to display suitable information relating to the selected supplier (e.g., a restaurant named "Abe's Kosher Style"). Interactive feature 2120 may be present in content area 2110. Interactive feature 2120 may receive user indications that viewing supplier product information is desirable. In this example, the system may receive user indications that viewing a restaurant menu is desirable, through interactive feature 2120.

Figure 46:
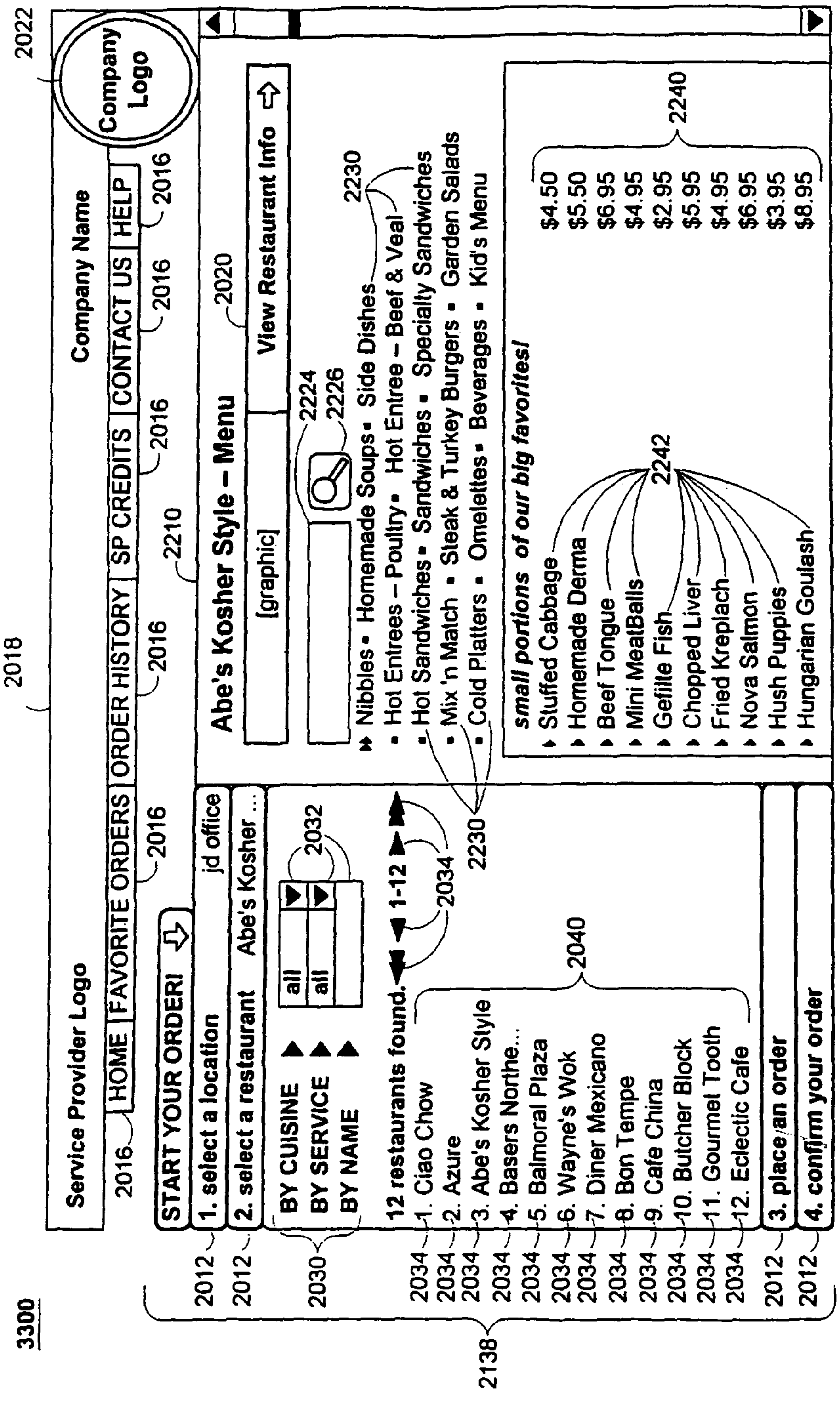

FIG. 46 shows illustrative display 3300. The system may provide display 3300, for example, when a user has indicated that viewing supplier product information is desirable. In this example, a user has indicated that viewing a restaurant menu for a restaurant named "Abe's Kosher Style" is desirable. Illustrative display 3300, as well as other displays described herein, may include side bar 2138, header 2018, and content area 2210.

Figure 47:
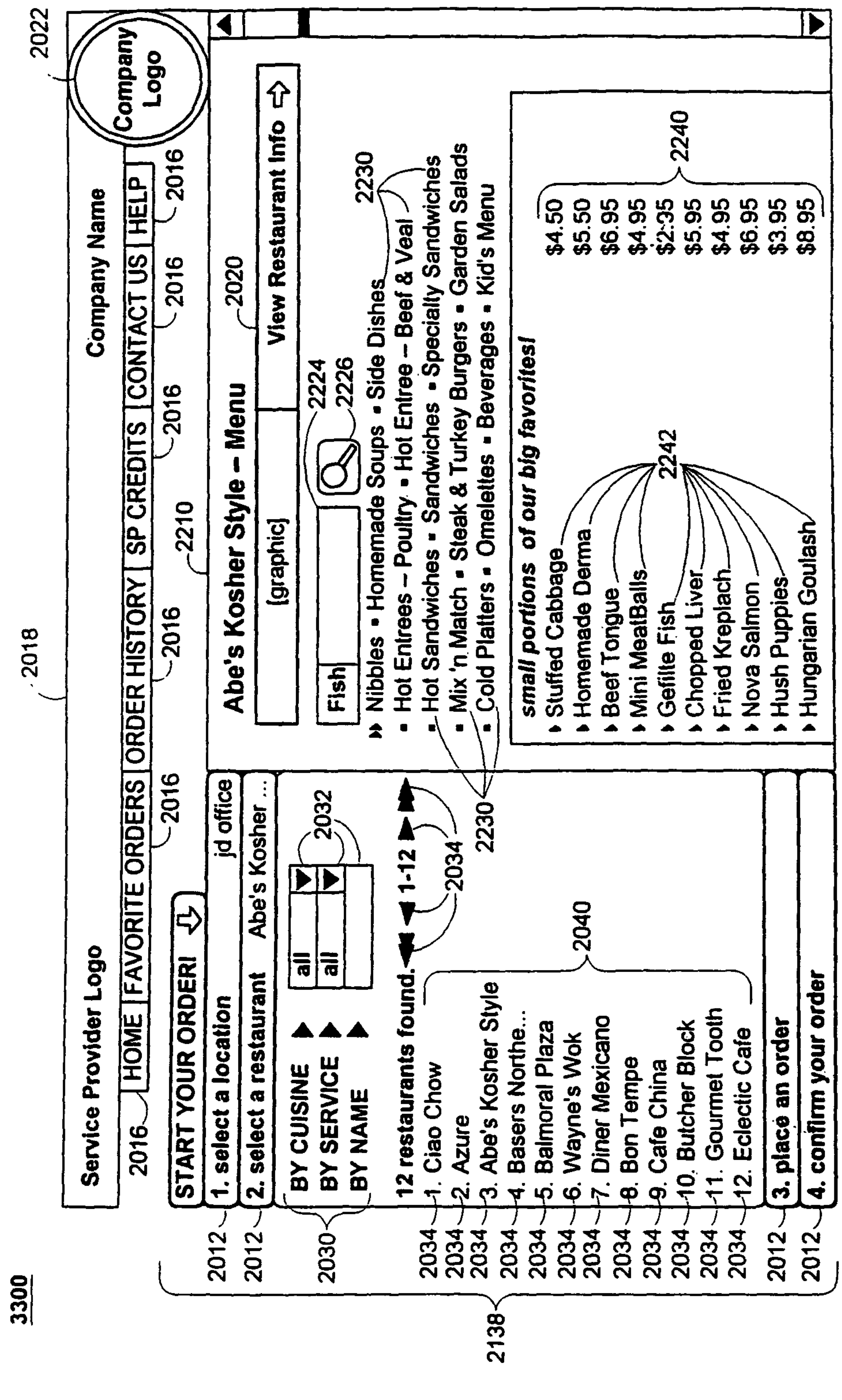

FIG. 47 shows illustrative display 3300. In this example, a user has typed "Fish" into search data field 2224. Typing "Fish" into search data field 2224 will allow a user to search for all products (e.g., menu items) that contain the characters "fish" as part of their name, description, or other stored data. User indications to execute a search for "fish" may be received by the system, through search execution feature 2226.

Figure 48:
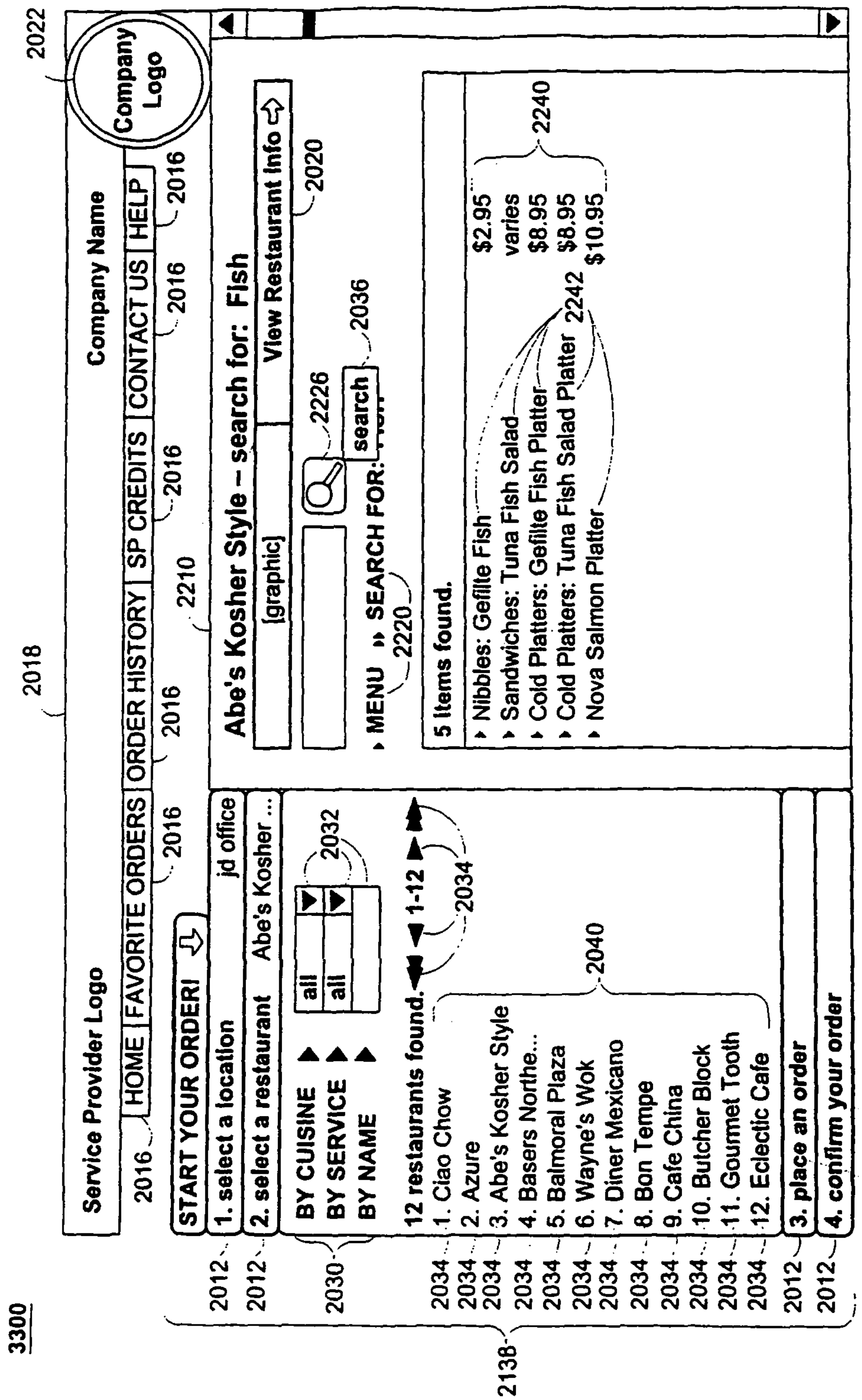

FIG. 48 shows illustrative display 3300. In this example, content area 2210 is displaying list 2240 which is populated with several list features 2242 that have been retrieved in response to a user search for the characters "fish", as shown in FIG. 47. Many of the list features 2242 in the list 2240 include the characters "fish" in their names. However, "Nova Salmon Platter" might have "fish" in its description or other stored data. In FIG. 48, display box 2036 is shown in display area 2210, with the text "search". Display box 2036 has been generated based on user input indicating that more information about the purpose of search execution feature 2226 is desired. One catalog feature 2220 (bearing text "SEARCH FOR: FISH") has been generated using user input received in search data field 2224. The list features 2242 have been retrieved from various portions of the catalog.

Figure 49:
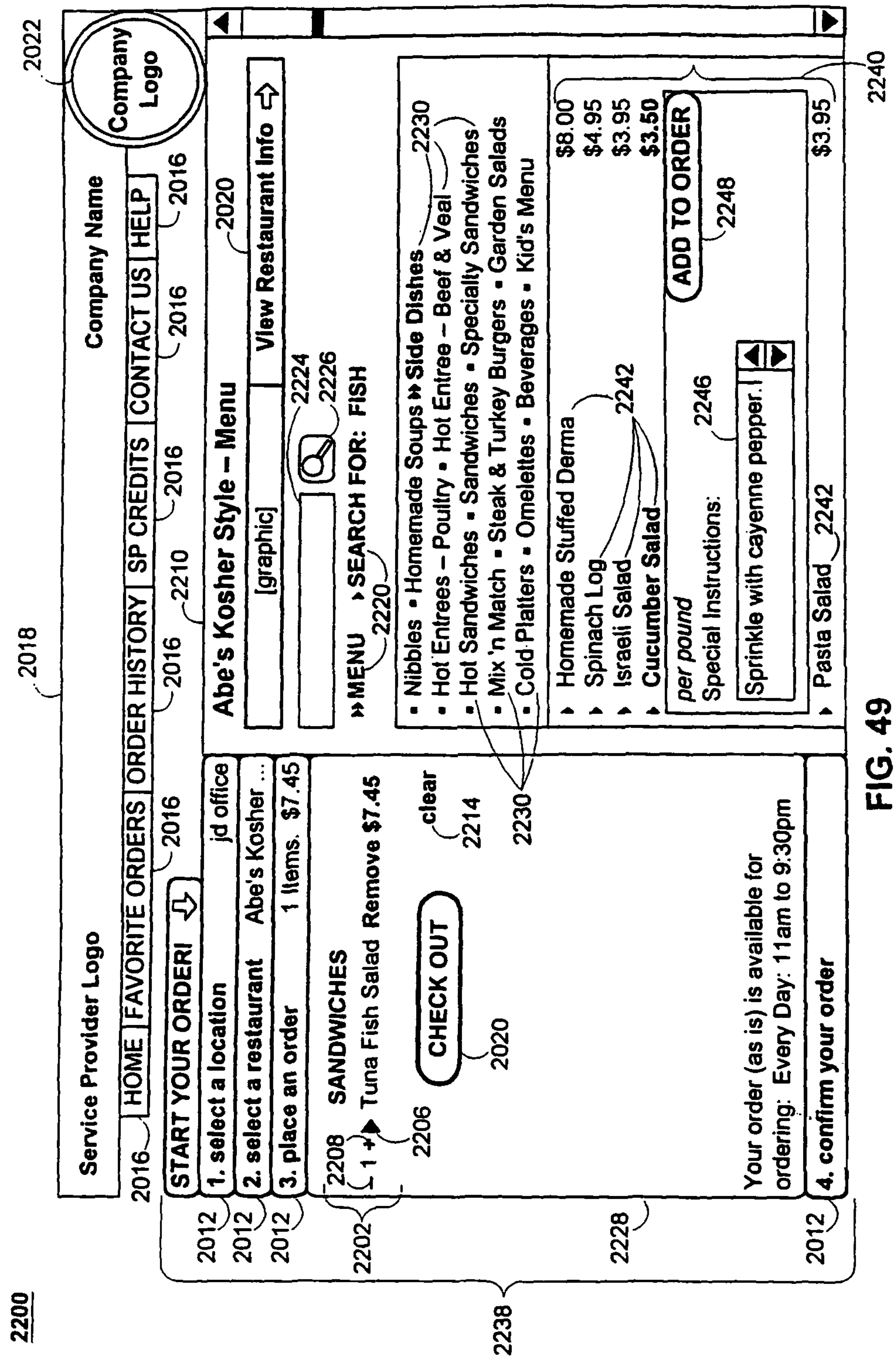

FIG. 49 shows illustrative display 2200. In this example, display area 2228 shows that user has indicated that list feature 2242 titled "Tuna Fish Salad" (from the list 2240 as shown in FIG. 48) should be included in order list 2202. In response to that user indication, the system placed order item 2204 in order list 2202. Content area 2210 shows that the user has indicated that special instructions should be entered for list feature 2242 titled "Cucumber Salad." Special instructions of "Sprinkle with cayenne pepper." have been entered in special information feature 2246 by the user. If the user decides to create an order item 2204 based on list feature 2242 titled "Cucumber Salad", the special instructions entered in special information feature 2246 will be conveyed into order list 2202 with the appropriate order item 2204.

Figure 50:
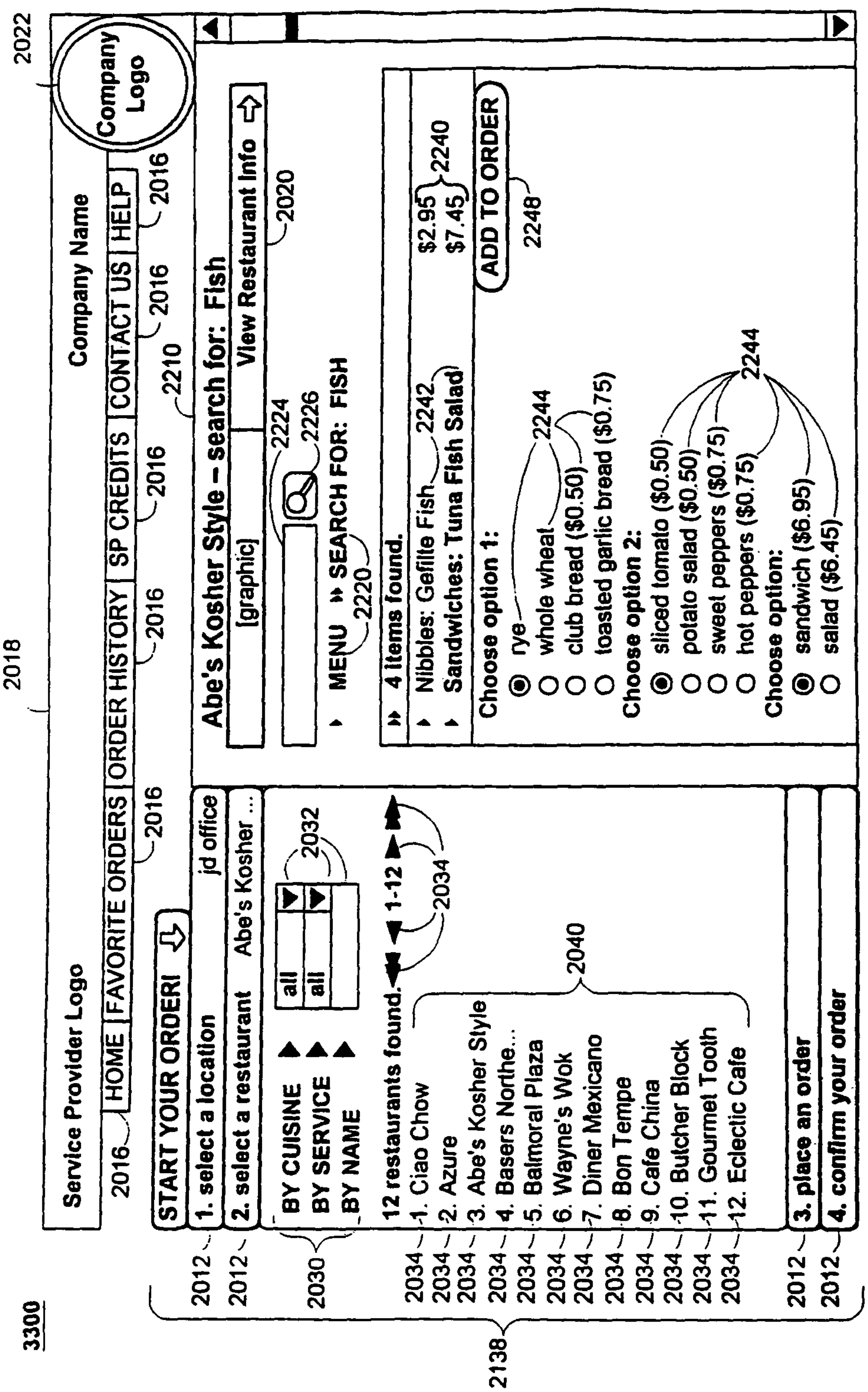

FIG. 50 shows illustrative display 3300. In this example, relating back to display list 2240 as shown in FIG. 48, the user has indicated that an option selection is desired for list feature 2242 titled "Sandwiches: Tuna Fish Salad" before information about this list feature 2242 will be transferred to order list 2202. User has several option features 2244 with which choices may be made. Option features 2244 shown under "Choose option 1:" allow the user to indicate a desired type of bread (e.g., rye, whole wheat, club bread, toasted garlic bread). The option features 2244 for club bread and toasted garlic bread also indicate that an additional cost will be incurred by the user if club bread or toasted garlic bread is chosen. Option features 2244 shown under "Choose option 2:" allow the user to indicate a desired condiment (e.g., sliced tomato, potato salad, sweet peppers, hot peppers). Option features 2244 shown under "Choose option 3:" allow the user to indicate a desired meal style (e.g., sandwich, salad). User has indicated, using option features 2244, that "rye", "sliced tomato" and "sandwich" are desired.

Figure 51:
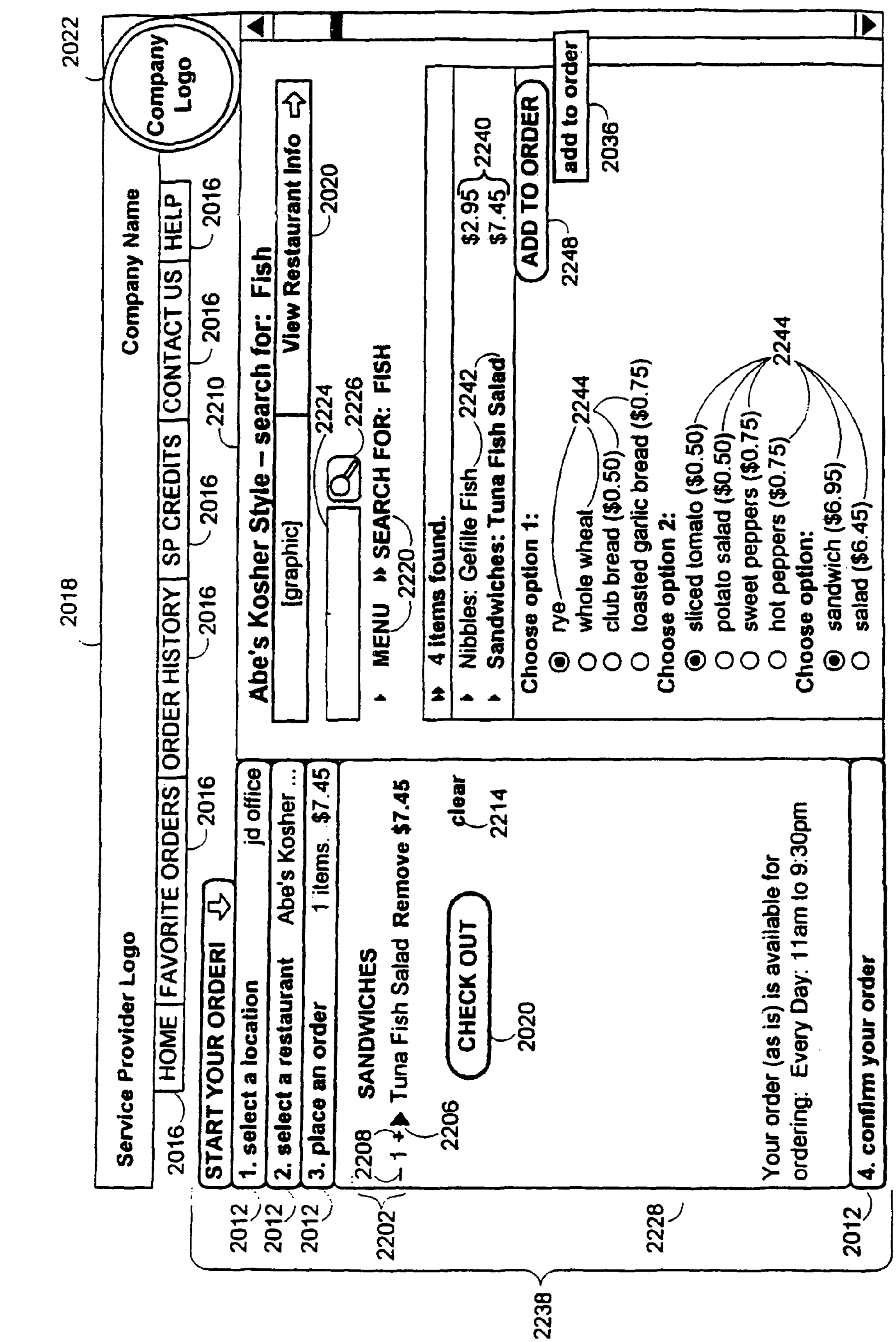

FIG. 51 shows illustrative display 2200. In this example, user has indicated, using order feature 2248, that list feature 2242 titled "Sandwiches: Tuna Fish Salad" should be added to the order. In response to this indication, the system 1 has added order item 2204 titled "Tuna Fish Salad" to order list 2202. Additionally, display box 2036 has been provided in response to a user indication that more information about order feature 2248 was desired.

Figure 52:
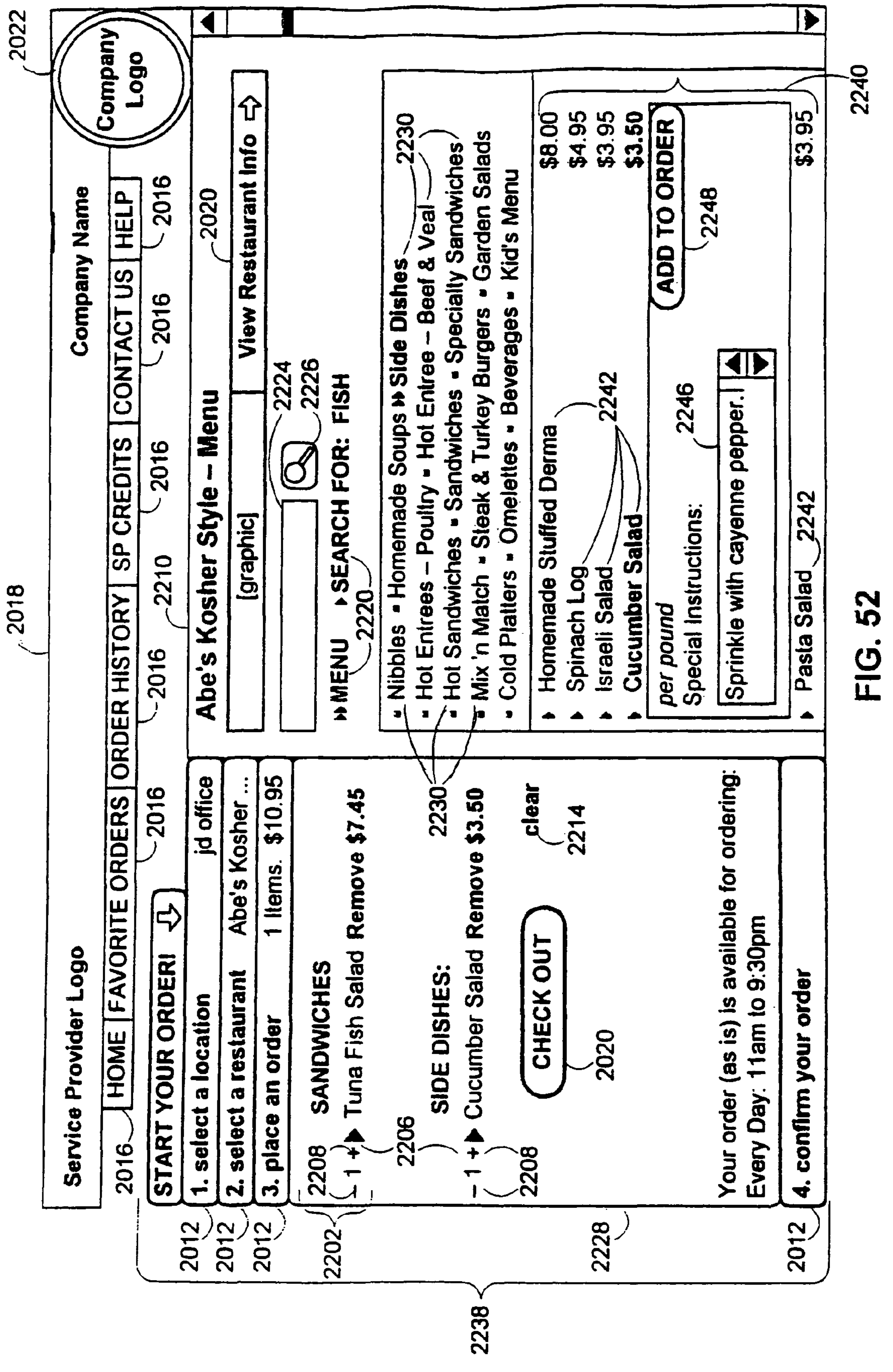

FIG. 52 shows illustrative display 2200. In this example, user has made an indication to order feature 2248 which has resulted in the addition of order item 2204 titled "Cucumber Salad" to order list 2202. Prior to that indication, order item 2204 titled "Tuna Fish Salad" was already in the order list 2202, as shown in FIG. 51. A user indication reading "Sprinkle with cayenne pepper." can be seen in special information feature 2246. The information "Sprinkle with cayenne pepper." will be transferred to order list 2202 as part of the content of order item 2204 titled "Cucumber Salad."

Figure 53:
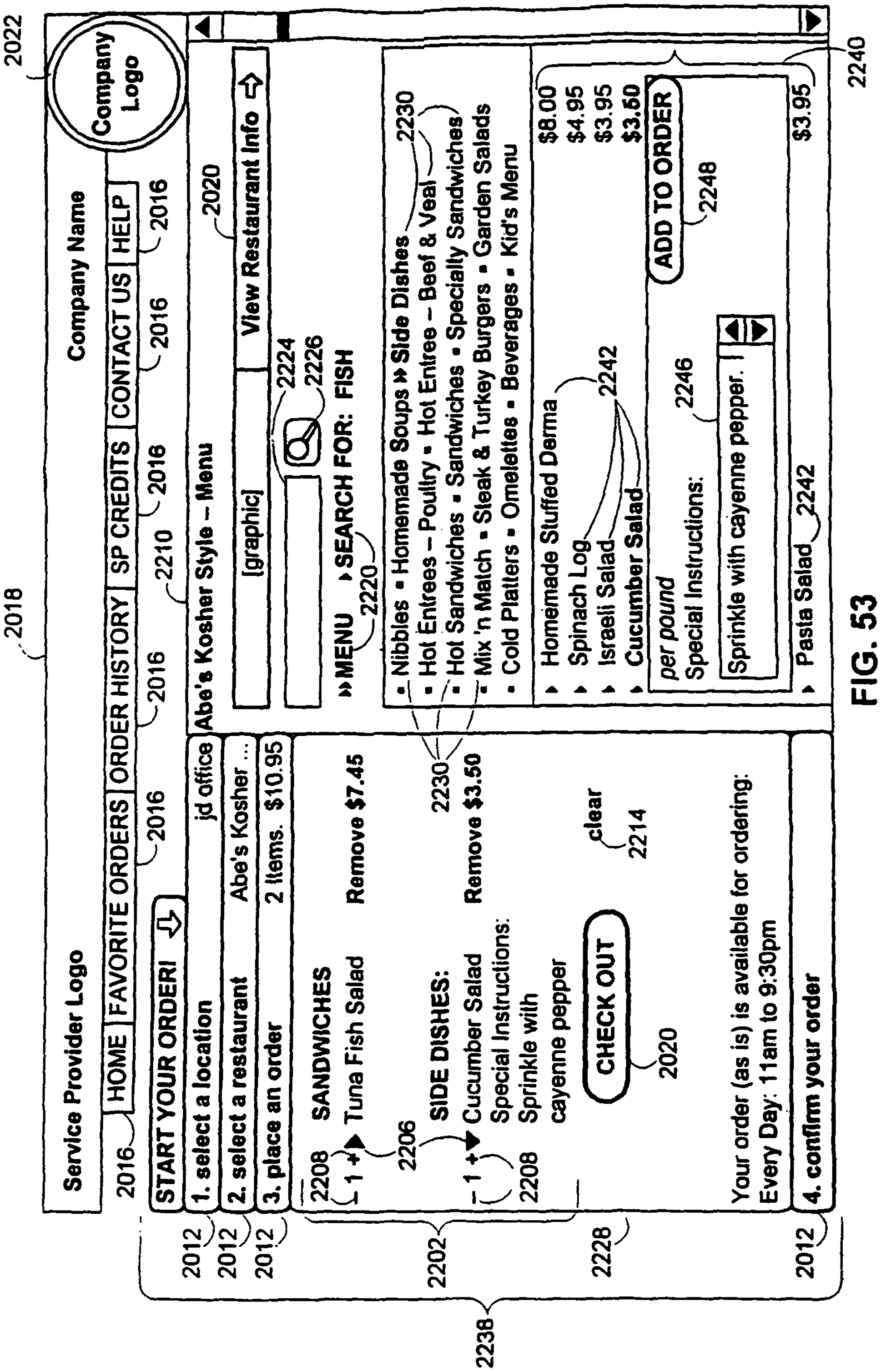

FIG. 53 shows illustrative display 2200. In this example, user has made an indication to the system, through expansion feature 2206 of order item 2204 titled "Cucumber Salad". This indication has resulted in a display of additional information (i.e. Special instructions: Sprinkle with cayenne pepper).

Figure 54:
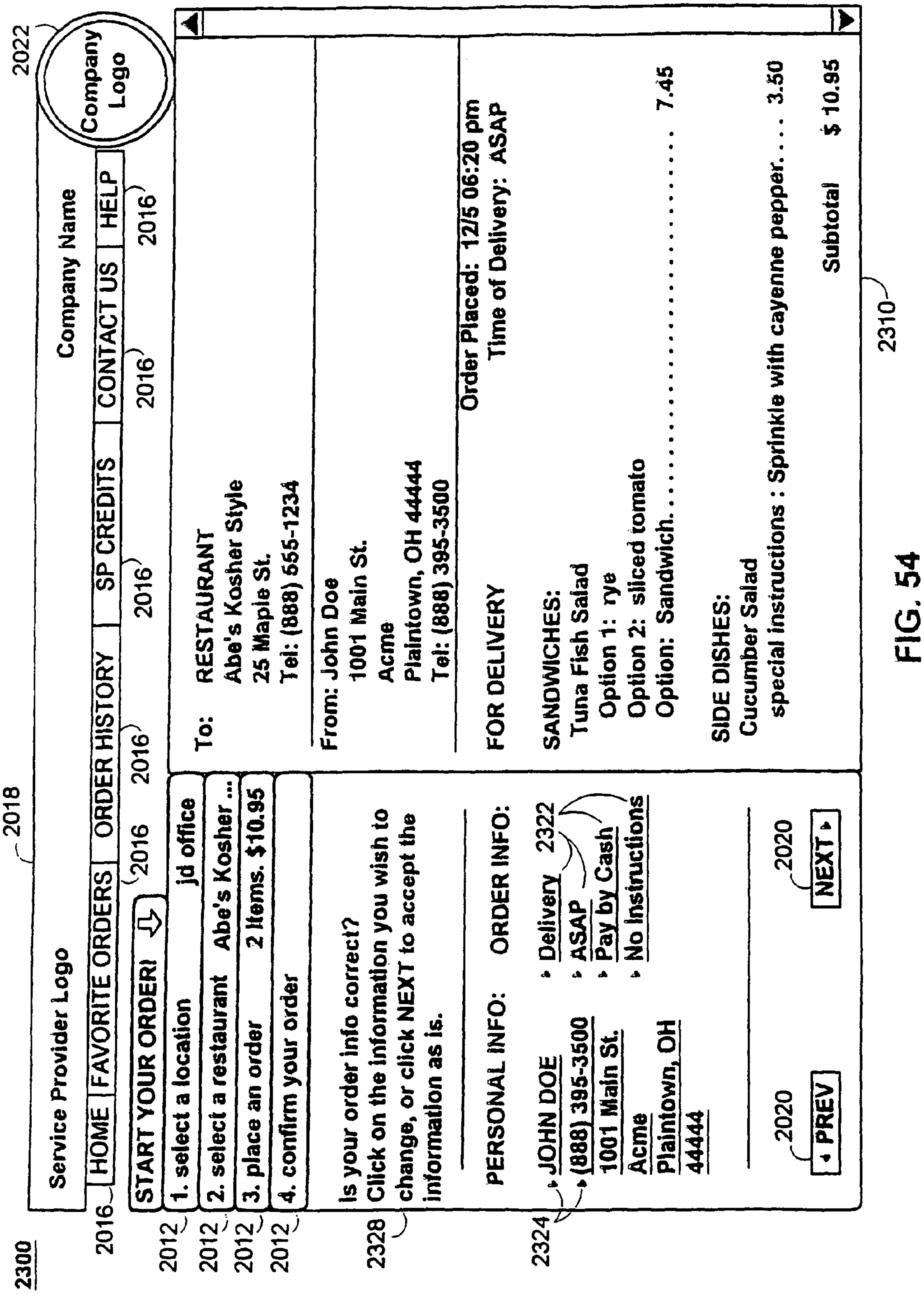

FIG. 54 shows illustrative display 2300. To view illustrative display 2300, the system may receive a user indication to proceed, through interactive feature 2020 titled "CHECK OUT" of illustrative display 2200, as shown in FIG. 53. The information associated with personal information features 2324 and order option features 2322 may be reflected as a mock-up of the order which may be displayed in content area 2310. This information may be gathered from user choices made throughout the order process. For example, the user indications made while viewing illustrative display 2200 and illustrative display 3300 may be reflected in content area 2310. In this example, a Tuna Fish Salad Sandwich with rye bread and sliced tomato costing $7.45 and three pounds of Cucumber Salad costing $3.50 are displayed as a result of user indications made in illustrative display 2200 and illustrative display 3300. The information shown in content area 2310 may also relate to the information shown in side bar 2238 as drawn in FIG. 53. Display area 2328 contains option features 2302. In this example, interactive features 2020 receive user indications of desired order process flow. Interactive features 2020, as shown in this example, allow a user to proceed to the next, or backtrack to the previous step in the order process.

Figure 55:
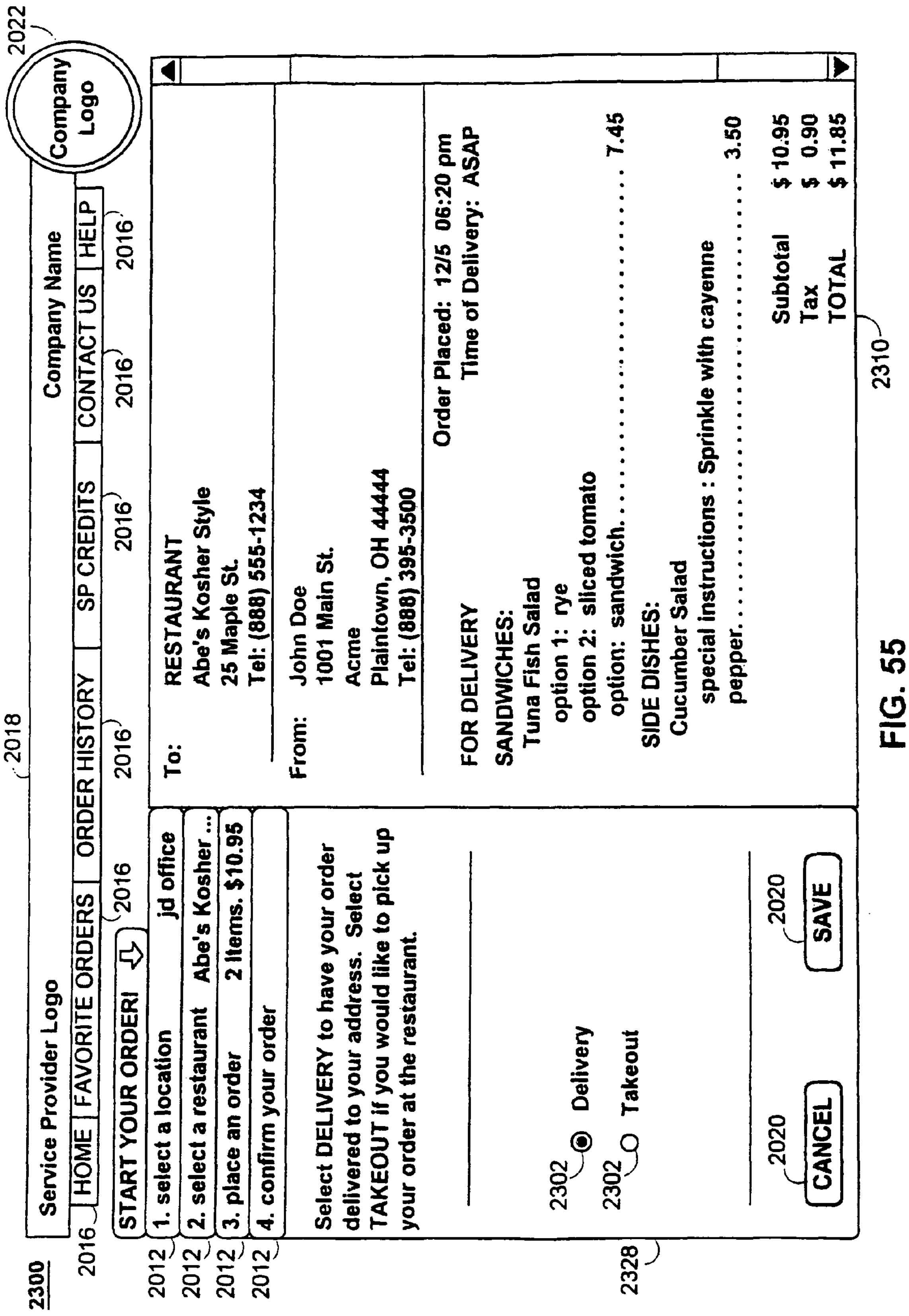

FIG. 55 shows illustrative display 2300. In this example, illustrative display 2300 shows the next step in the order process. Illustrative display 2300, as shown in this example, may be provided upon receipt of user input, for example, through interactive features 2020 as shown in FIG. 54. The system may receive user indications relating to choices that users may or may not be required to make when ordering, through option features 2302. The system may receive user indications relating to any relevant choices that a user may make regarding an order, through option features 2302. In this example, option features 2302 allow user to select "Delivery" or "Takeout" for the current order. The system may allow users to indicate any information that may be desired when placing an order, through option features 2302. User indications to the system through option features 2302 may be used to modify information displayed in content area 2310. In this example, interactive features 2020 are shown with the labels "Cancel" and "Save". The system may receive user indications about order flow, data storage or deletion, and/or any other appropriate system functions, through interactive features 2020 with these labels.

Figure 56:
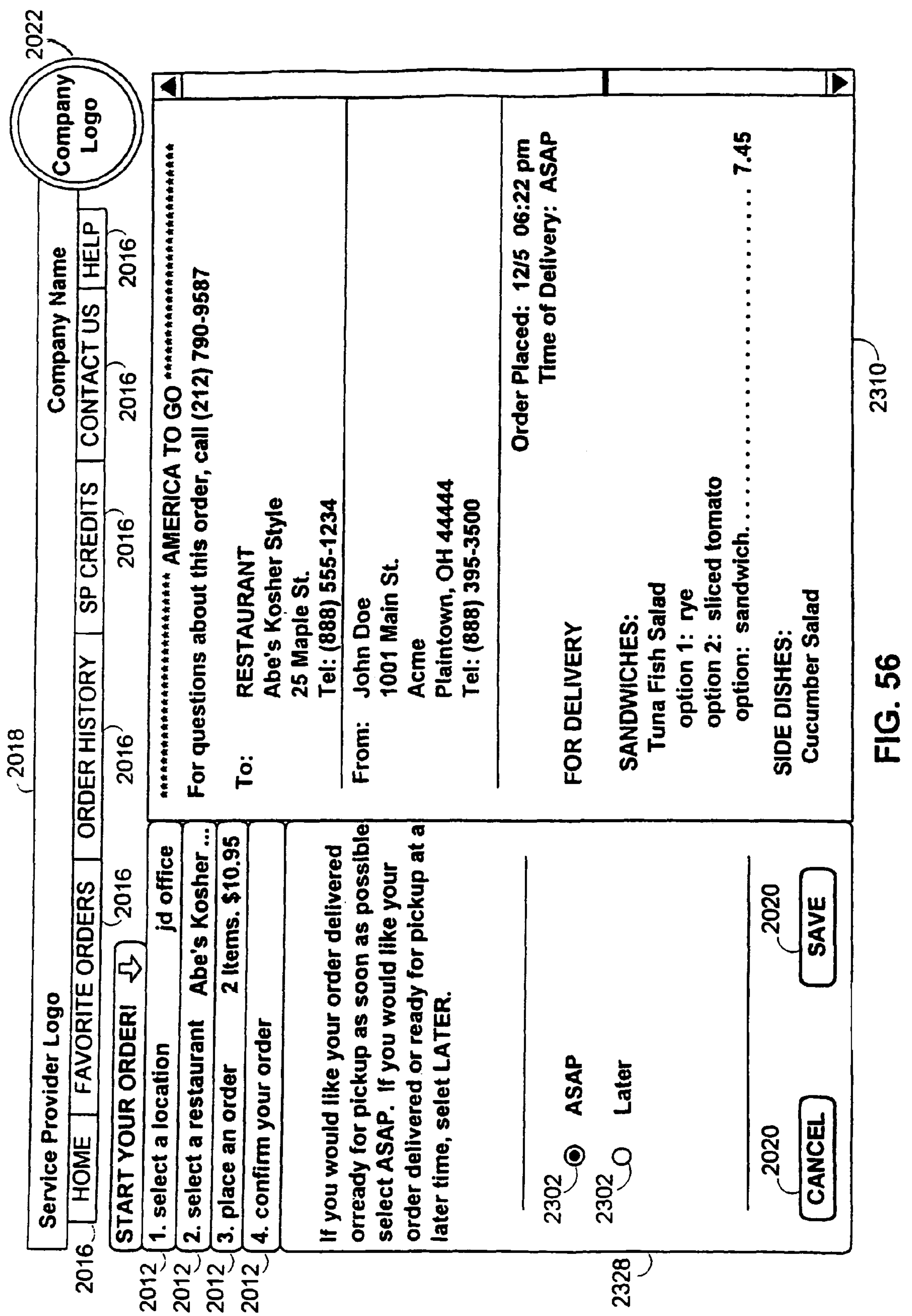

FIG. 56 shows illustrative display 2300. This example shows some other choices that a user may be presented with as part of the order process. As shown, option features 2302 allow user to select "ASAP" or "Later" as a delivery option for the current order.

Figure 57:
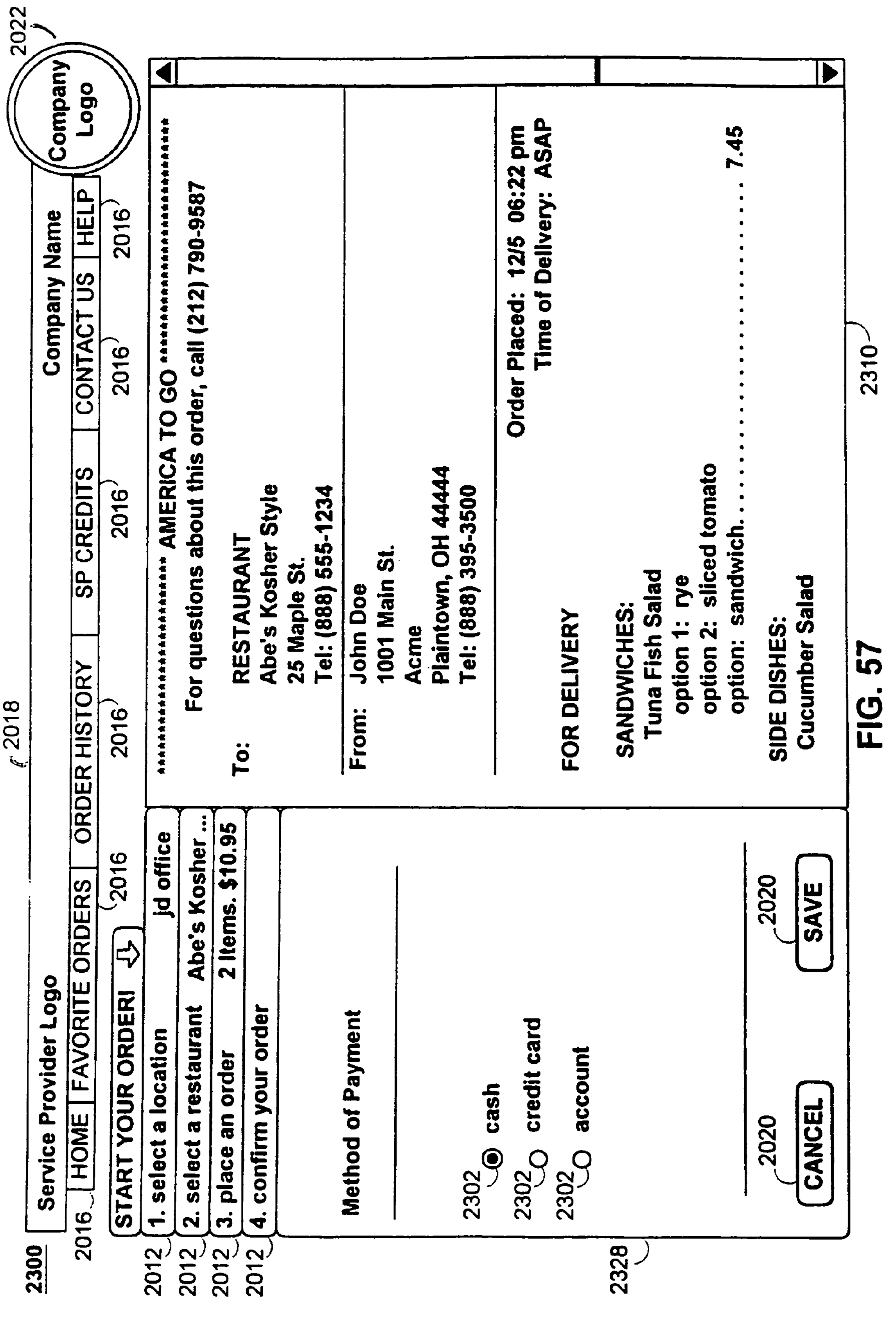

FIG. 57 shows illustrative display 2300. This example shows some other choices that a user may be presented with as part of the order process. As shown, option features 2302 allow user to select "cash", "credit card" or "account" as a payment method for the current order.

Figure 58:
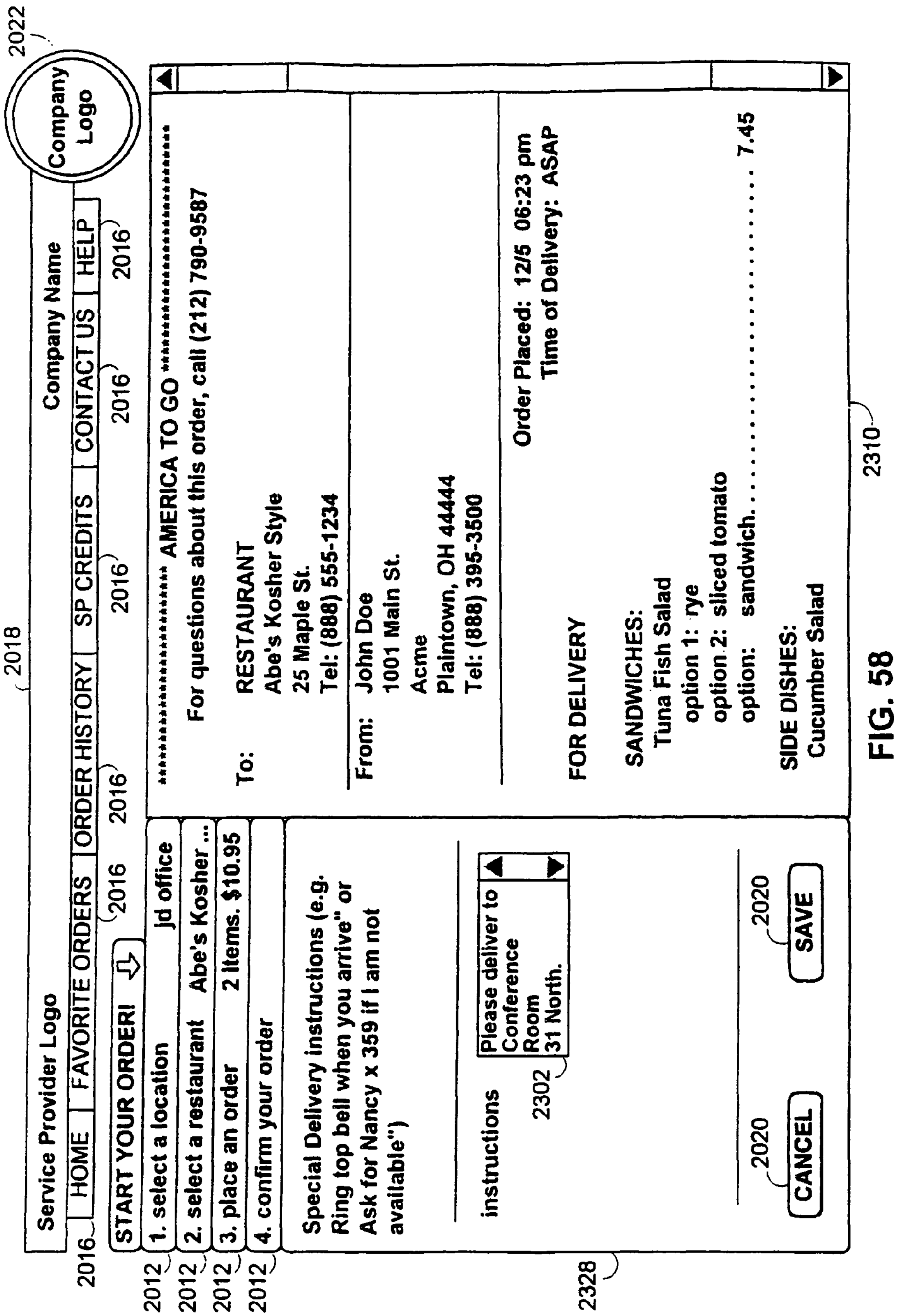

FIG. 58 shows illustrative display 2300. This example shows another possibility for receiving user choices regarding an order. As shown, option feature 2302 allows user to type instructions for the current order, rather than making a choice of preset options. As shown, a user indication of "Please deliver to Conference Room 31 North." has been entered into option feature 2302.

Figure 59:
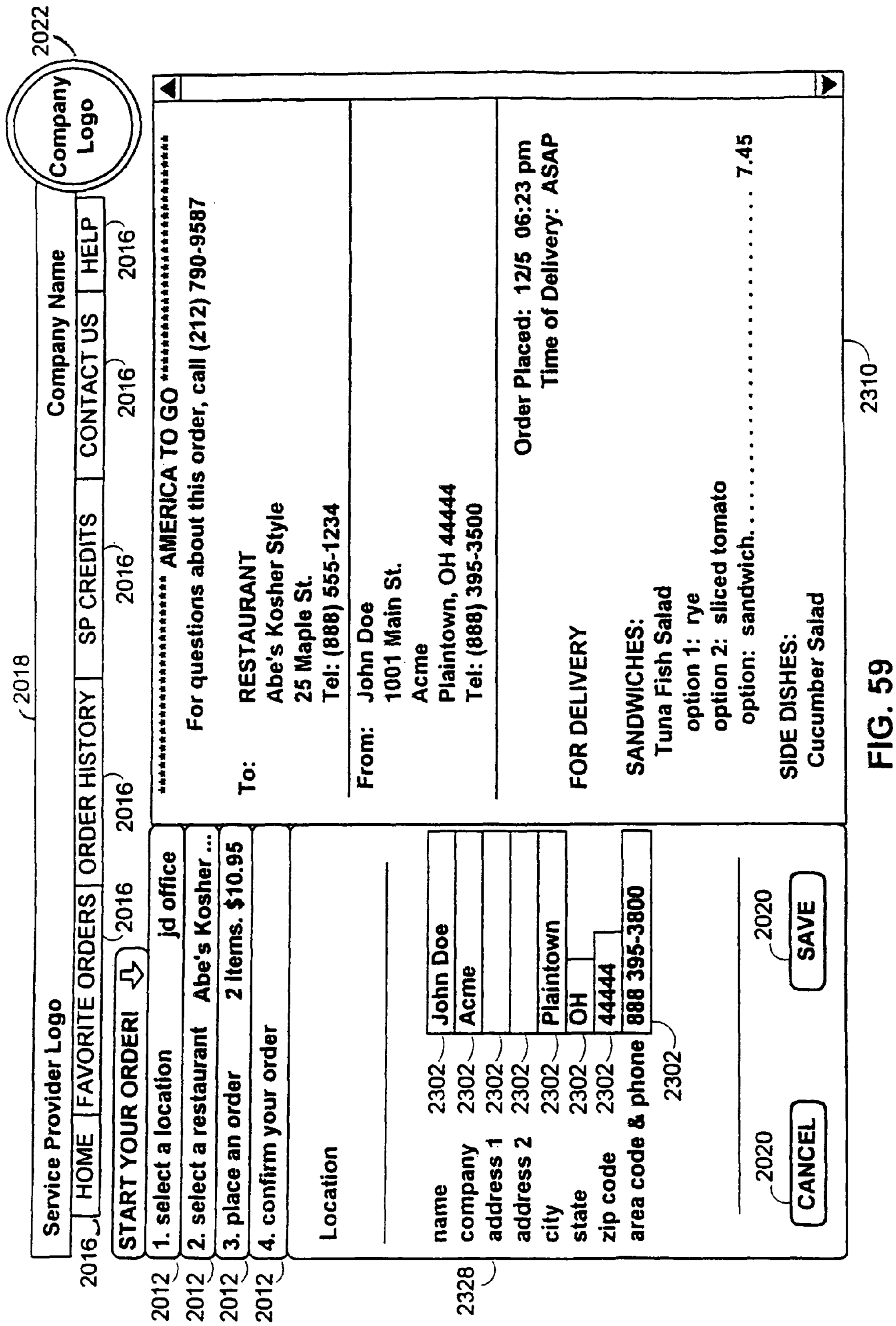

FIG. 59 shows illustrative display 2300. This example shows yet another example of possible ways to receive user indications of choices made during the order process. As shown, option features 2302 allow user to type instructions for the current order. As shown, user indications of "John Doe", "Acme", "Plaintown", "OH", "44444", and "888 395-3800" have been entered into option features 2302, as location information for the current order.

Figure 60:
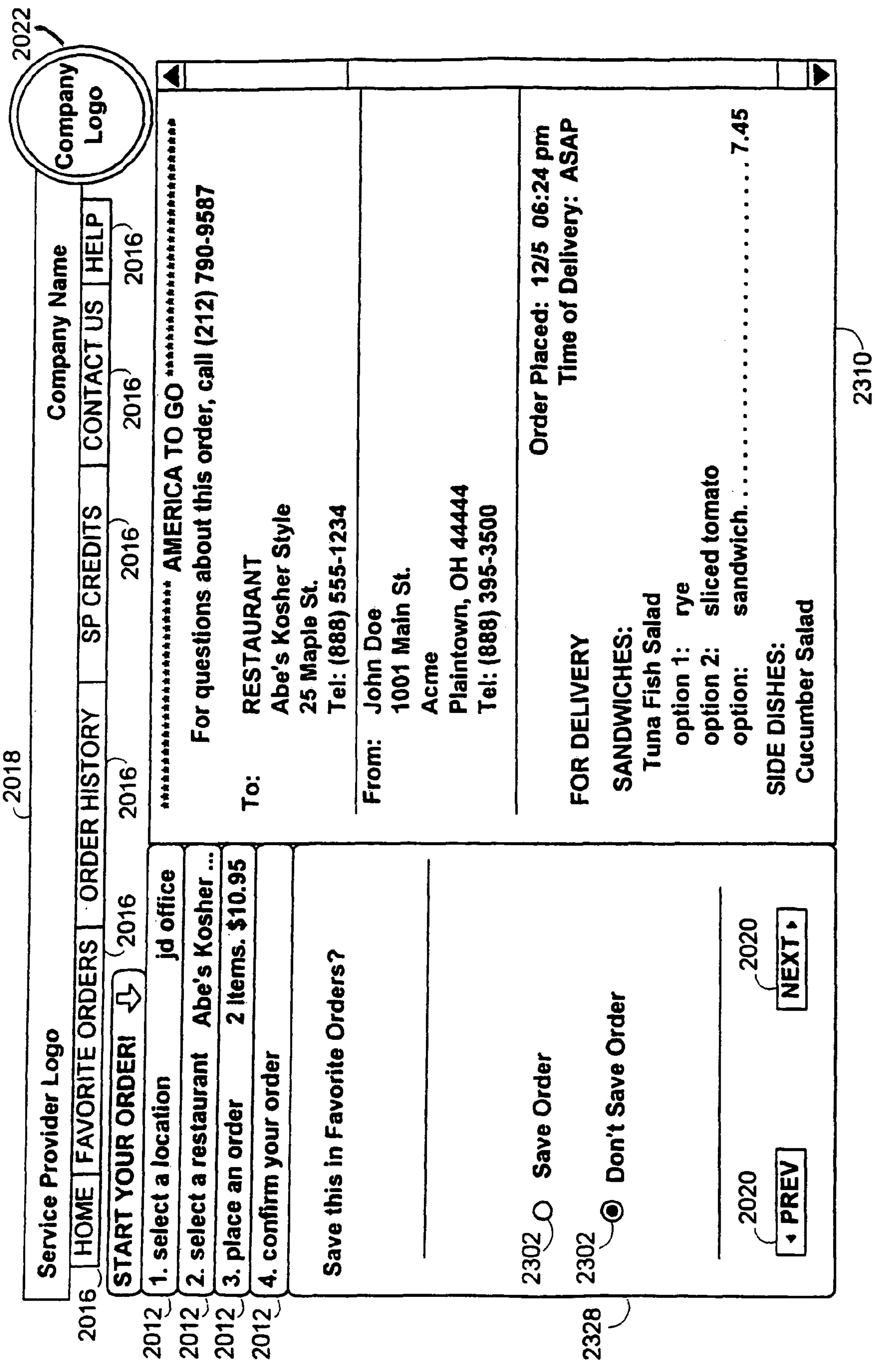

FIG. 60 shows illustrative display 2300. As shown, option features 2302 allow user to select "Save Order" or "Don't Save Order". User indications, in this example, allow a user the choice of whether to store information relating to the current order for future use.

Figure 61:
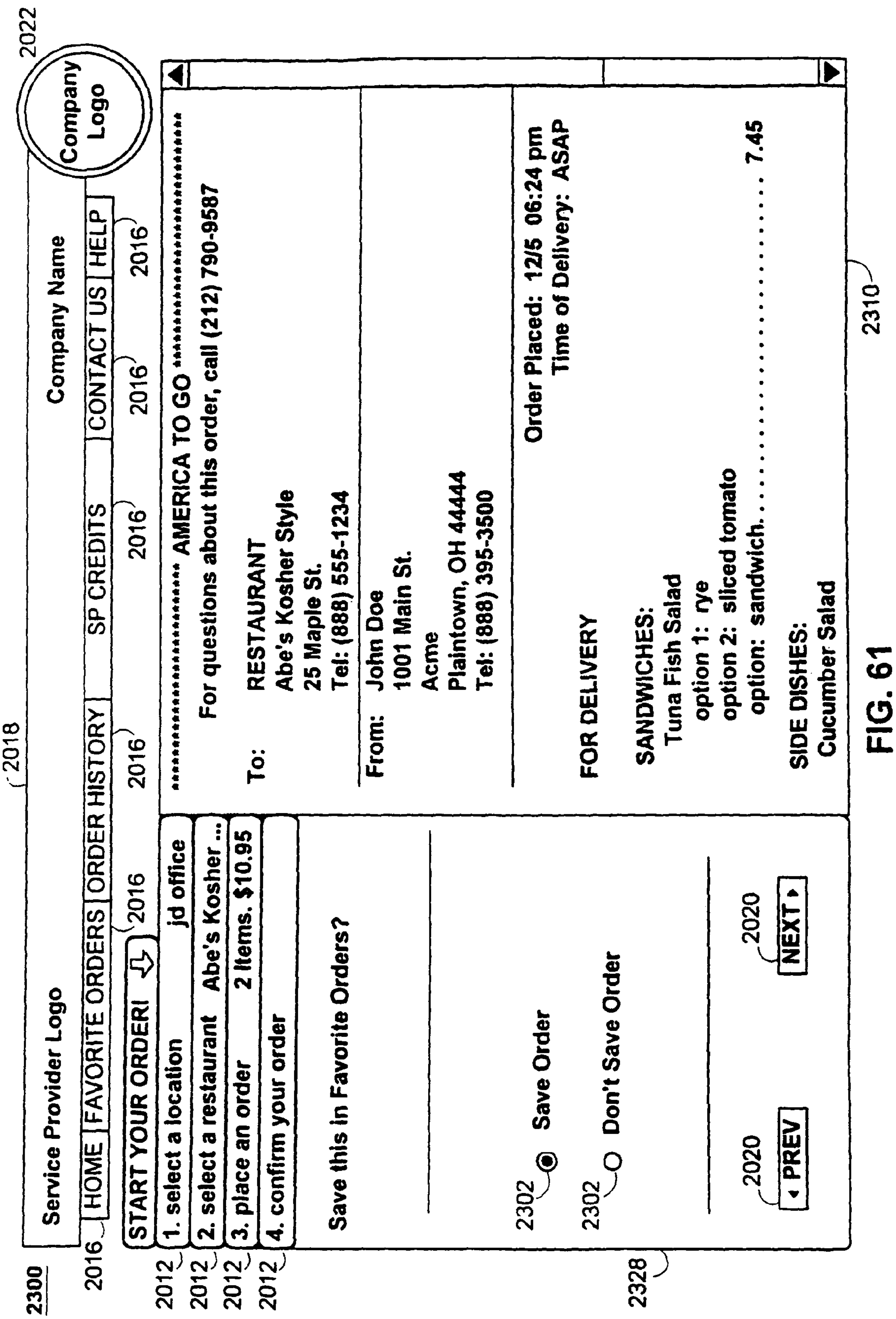

FIG. 61 shows illustrative display 2300. As shown, the user has indicated that the choice titled "Save Order" in option feature 2302 is desired.

Figure 62:
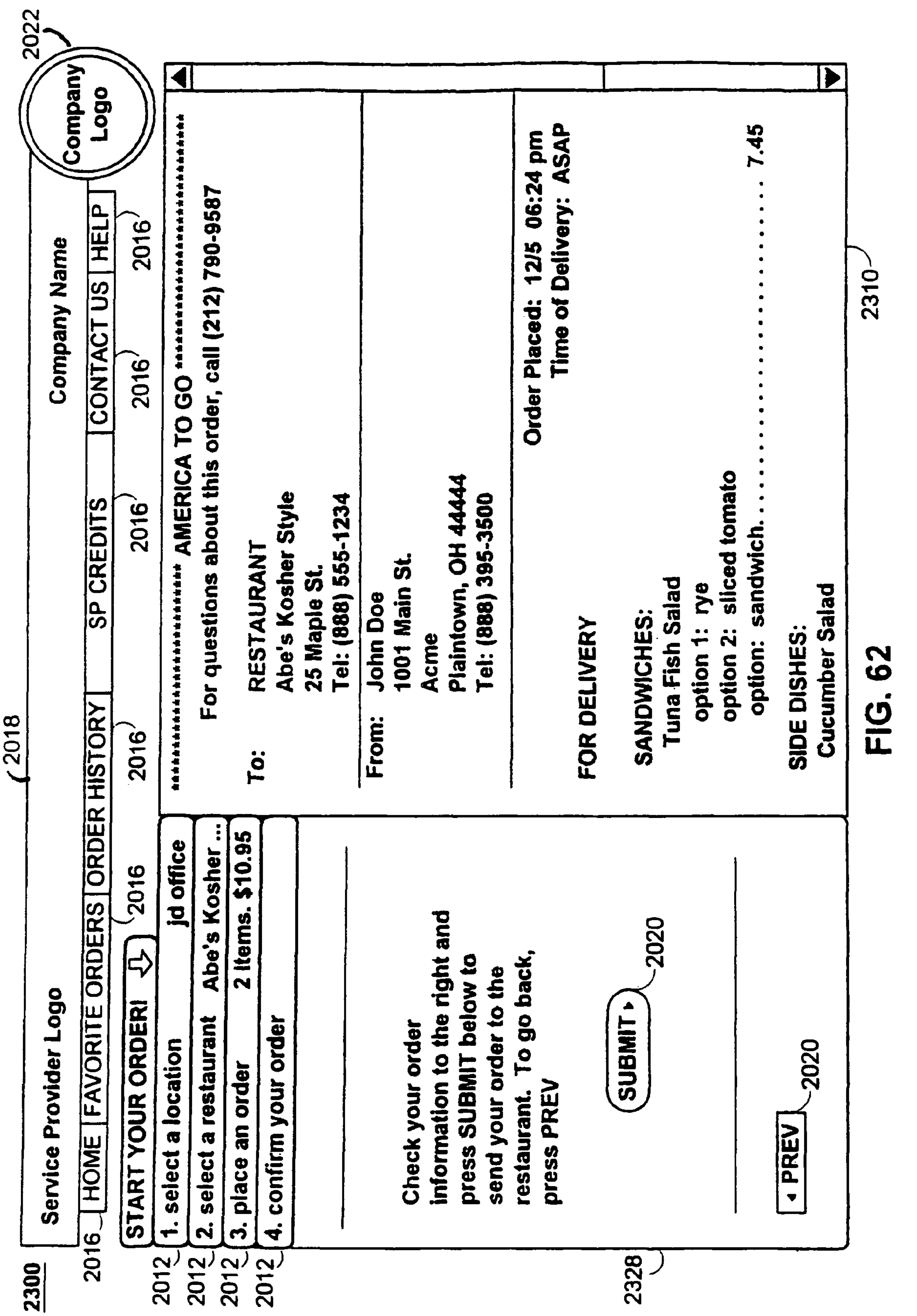

FIG. 62 shows illustrative display 2300 with interactive features 2020. In this example, interactive features 2020 may, for instance, receive user indications of either "SUBMIT" or "Prev". The interactive feature 2020 titled "SUBMIT" may allow the user to submit an order to a supplier. If the user indicates that "SUBMIT" is desired, the system may show display box 3900 as shown in FIG. 67.

Figure 63:
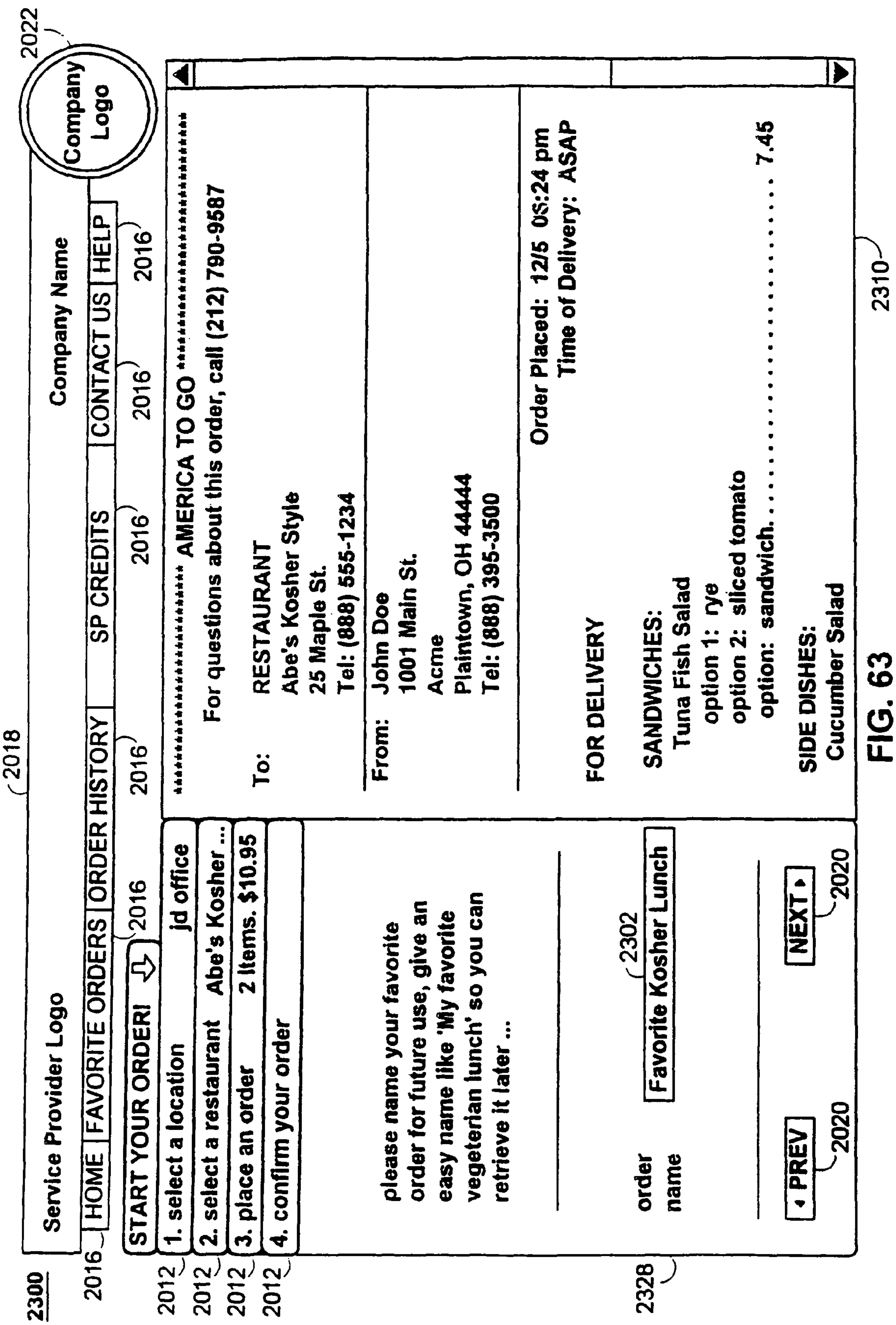

FIG. 63 shows illustrative display 2300. This example shows a variation of the type of user indication that option features 2302 may receive wherein a user may indicate a desired name for an order that the user wishes to store for possible future reference. As shown, option feature 2302 allows user to type instructions for the current order. A user indication of "Favorite Kosher Lunch" has been entered into option feature 2302. Illustrative display 2300, as shown in FIG. 63 may be displayed after a user indication of "Save Order" is entered into option feature 2302 as shown in FIG. 61.

FIG. 64 shows illustrative display 3400. In this example, display 3400 shows a list 2040 of favorite orders associated with selection features 2034. A user may indicate to the system via a particular selection feature 2034 that one of the favorite orders is desired, rather than the order that is shown in content area 2310. A user may choose to view illustrative display 3400 and select a favorite order prior to viewing any restaurant menus. Illustrative display 3400, as well as other displays described herein, may contain header 2018, side bar 2138, and content area 2310. List 2040 may contain selection features 2034, information features 2042 and any other information as desired. The system may receive user indications, through information features 2042, that a user wishes to view or download information.

FIG. 65 shows illustrative display 2600. The system may provide display 2600 in response to a user indication. For example, display 2600 may be provided after link 2016 titled "Order History" receives a user indication that viewing past orders is desirable. This user indication may be received by any of the illustrative displays that contain one or more links 2016, if appropriate. Illustrative display 2600 may be provided based on any other appropriate user indication, system function, or for any other suitable purpose. In this example, illustrative display 2600 contains a history list 2412 composed of history items 2414. Each history item 2414 may correspond to a past order placed by a user. History items 2414 may be associated with any data relevant to the past orders. Illustrative display 2600, as well as other displays described herein, may include side bar 2138, header 2018, and content area 2410.

FIG. 66 shows illustrative display 2700. In this example, illustrative display 2700 shows information relating to promotions that the service provider may have with the goal of increasing business. Illustrative display 2700 may be provided after link 2016 titled "SP Credits" receives a user indication that viewing information regarding service provider credits is desirable. This user indication may be received by the system, through any of the illustrative displays that contain one or more links 2016, if appropriate. Illustrative display 2700 may be provided based on any other appropriate user indication, system function, or for any other suitable purpose. Illustrative display 2700, as well as other displays described herein, may include side bar 2138, header 2018, and display area 2610. Display area 2610 may include information about service provider credits, awards, promotions, one or more links to information, one or more images 2026, or any other suitable content.

FIG. 67 shows display box 2800. Display box 2800 may be used to display any suitable information to the user. In this example, the system may receive user indications to confirm whether an order should be sent to a supplier, through display box 2800. Display box 2800 may include one or more interactive features 2020, and any suitable text, images, and/or other content. The system may receive user indications of intent to complete an order, cancel an order, or take any other appropriate steps in an order process, through interactive features 2020.

FIGS. 68-109 show illustrative displays that the system may provide to an administrator, customer service person, or other suitable non-customer individuals or groups. For simplicity, in the descriptions of FIGS. 68-109, the term administrative user will be used to describe the person accessing the interface.

FIG. 68 shows illustrative display 3500. Illustrative display 3500 allows the administrative user to login to the system. Illustrative display 3500 may contain header 2018 and sign in area 3112.

FIG. 69 shows illustrative display 3600. Illustrative display 3600 may be used as a general menu for administrative users. Administrative users may indicate preferences using illustrative display 3600. Illustrative display 3600, as well as other displays described herein, may contain header 2018 and content area 3610.

In this example, content area 3610 shows a menu which may be available to an administrative user after logging into the system 1. Content area 3610 may contain one or more interactive features 2020. The system may receive administrative user indications about illustrative displays that an administrative user wishes to view, actions an administrative user wishes the system 1 to take, or any other appropriate indication, through interactive features 2020.

FIG. 70 shows illustrative display 3700. Illustrative display 3700 may be used to show a list of suppliers. In this example, illustrative display 3700 shows a list of restaurants that the administrative user may view by making an indication to the system, through interactive feature 2020 titled "Restaurants Edit, Import, Delete and Administrate Restaurants" as shown in FIG. 69. In this example, the administrative user may add, change any stored information relating to, and/or delete any restaurants listed in the system 1. Illustrative display 3700, as well as other displays described herein, may include content area 3710.

Content area 3710 may include one or more input features 3732. The system may receive administrative user indications of desired criteria to be used in searching for particular records in the system 1, through input features 3732. The system may receive indications of IDs, names, addresses, cities, zip codes, phone numbers, sort methods, or any other relevant indications, through input features 3732. In example, the administrative user typed "Café" into the input feature 3732 titled "Name" and selected "UID" in the input feature 3732 titled "Sort By".

Content area 3710 may include search feature 3734. The system may receive administrative user indications that performing a search is desired, through search feature 3734. Upon receipt of the appropriate indication by the system, through search feature 3734, the system 1 may perform a search for relevant restaurants. The system 1 may use any of the indications in input features 3732 in performing the search. In this example, the criterion "Café" was used in the search, and the results all have the characters "café" within the returned data.

Content area 3710 may include list 3740. List 3740 may include list features 3742. List features 3742 may include item features 3744. List features 3742 may include any relevant data relating to the restaurants stored in the system, including ID, name, address, city, state, zip code, phone number, and any other relevant data. In this example, list 3740 contains several list features 3742, each relating to a restaurant stored in the system that has the characters "café" stored as part of its relevant data.

Content area 3710 may include data modification features 3736. The system may receive administrative user indications relating to adding to, editing, deleting from or any other suitable action regarding the stored restaurant information, through data modification features 3736. In this example, data modification features 3736 allow an administrative user to "ADD NEW RESTAURANT" or "IMPORT RESTAURANT (FROM ACCESS) . . . ".

Figure 71:
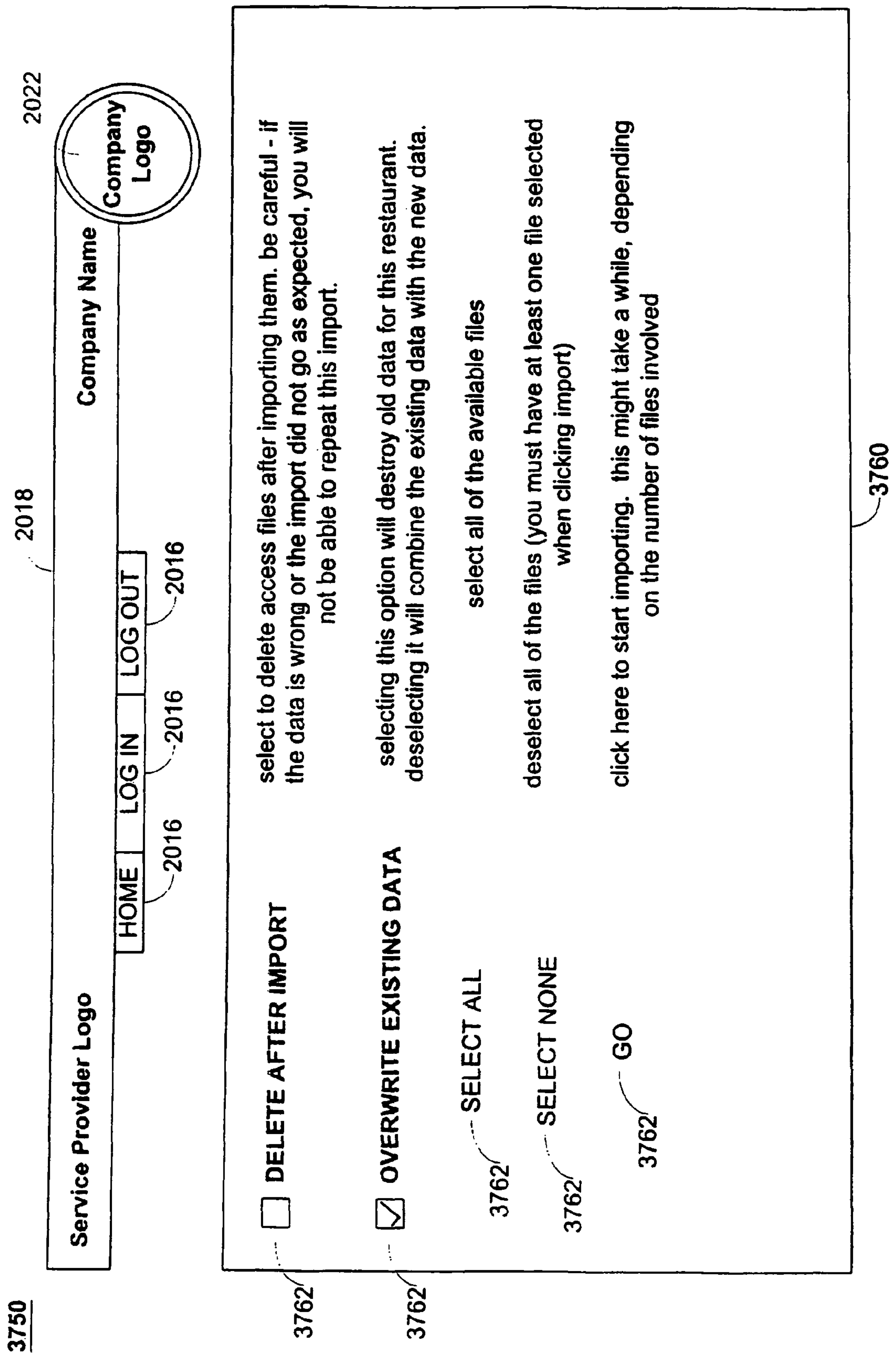

FIG. 71 shows illustrative display 3750. Illustrative display 3750 may be generated after an administrative user makes the proper indication with respect to data modification feature 3736 titled "IMPORT RESTAURANT (FROM ACCESS) . . . " as shown in FIG. 70, or after the administrative user makes any other proper indication that viewing illustrative display 3750 is desired. Illustrative display 3750 may be used as to guide the administrative user through the steps of importing data from any appropriate source into the system 1. In this example, illustrative display 3750 may allow the administrative user to import data regarding restaurants from files formatted for Microsoft® Access® software.

Illustrative display 3750, as well as any illustrative display described herein, may contain header 2018 and content area 3760. Content area 3760 may contain interactive features 3762. The system may receive any appropriate administrative user indications relating to importing data into the system 1 or any other appropriate indications, through interactive features 3762.

Figure 72:
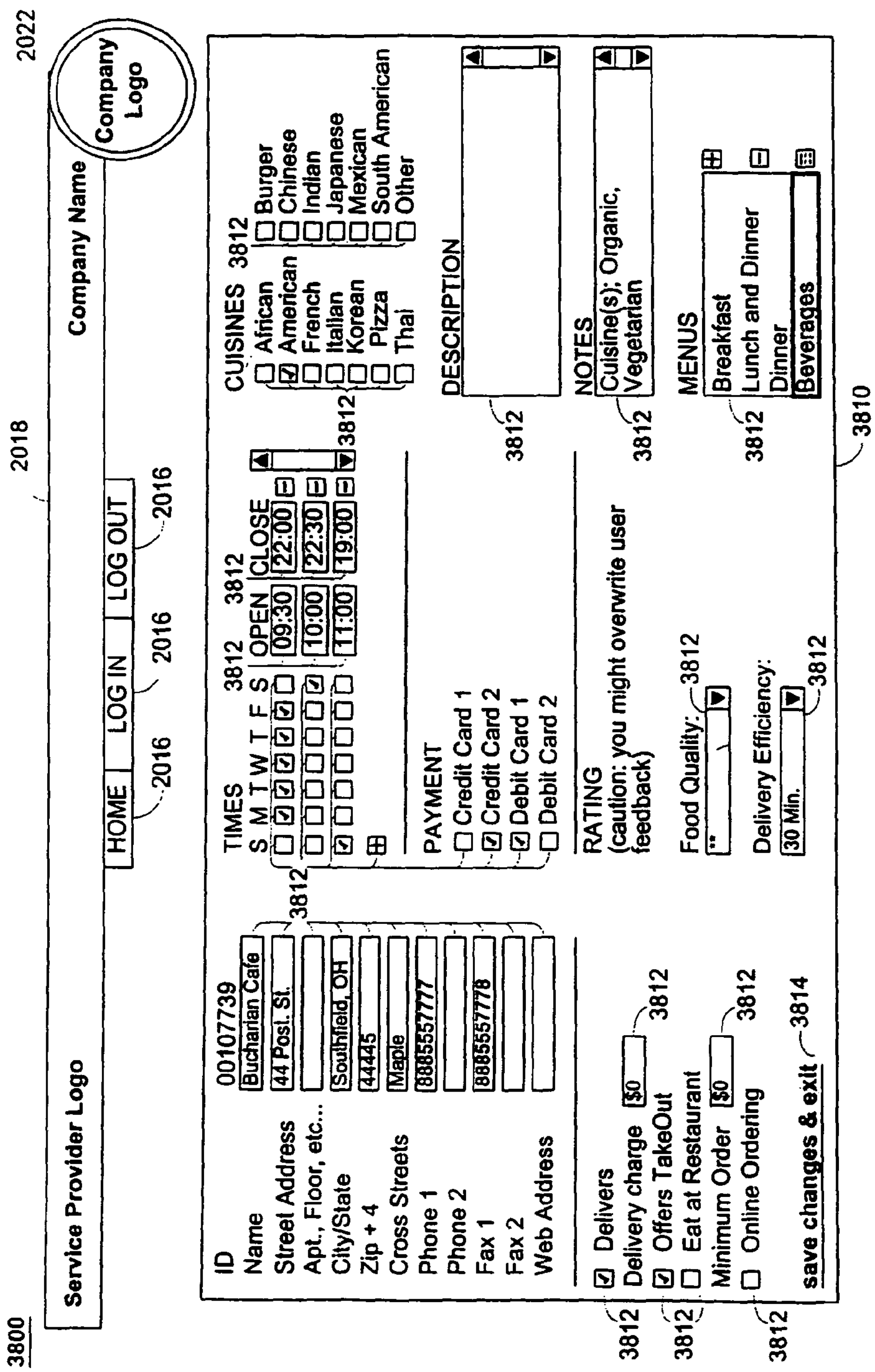

FIG. 72 shows illustrative display 3800. Illustrative display 3800 may be viewed and used as part of the process of storing supplier data in the system 1. In this example, illustrative display 3800 may be used to input and store information about restaurants. Illustrative display 3800 may be provided by the system 1 upon a suitable administrative user indication to data modification feature 3736 titled "ADD NEW RESTAURANT . . . " as shown in FIG. 70, to item feature 3744 titled "EDIT . . . " as shown in FIG. 70, to an interactive feature 3736 as shown in FIG. 71, upon any other suitable administrative user indication, or upon any suitable system 1 event. Illustrative display 3800, as well as any display described herein, may include content area 3810.

Content area 3810 may include option features 3812. The system may receive administrative user input relating to any suitable information about suppliers, through option features 3812. In this example, the system may receive information about restaurant location and contact information, hours of operation, cuisine types, types of dining service offered, payment methods, ratings, menus, and other relevant information, through option features 3812. In this example, administrative user has entered "Bucharian Café", "44 Post. St.", "Southfield, Ohio", "44445", "Maple", "8885557777", and "8885557778" in option features 3812 in the contact information area; check marks in various boxes and opening and closing times in the hours of operation area; a check mark in option feature 3812 titled "American" and "Cuisine(s); Organic, Vegetarian" in an option feature 3812 titled "NOTES", both in the cuisine type section; and check marks in option features 3812 titled "Delivers" and "Offers Take-Out" in the type of dining service area.

Content area 3810 may include one or more execution features 3814. The system may receive administrative user indications, through execution features 3814. Administrative user indications to the system, through execution features 3814, may prompt the system 1 to store supplier data, change supplier data, delete supplier data, or perform any other suitable function.

Figure 73:
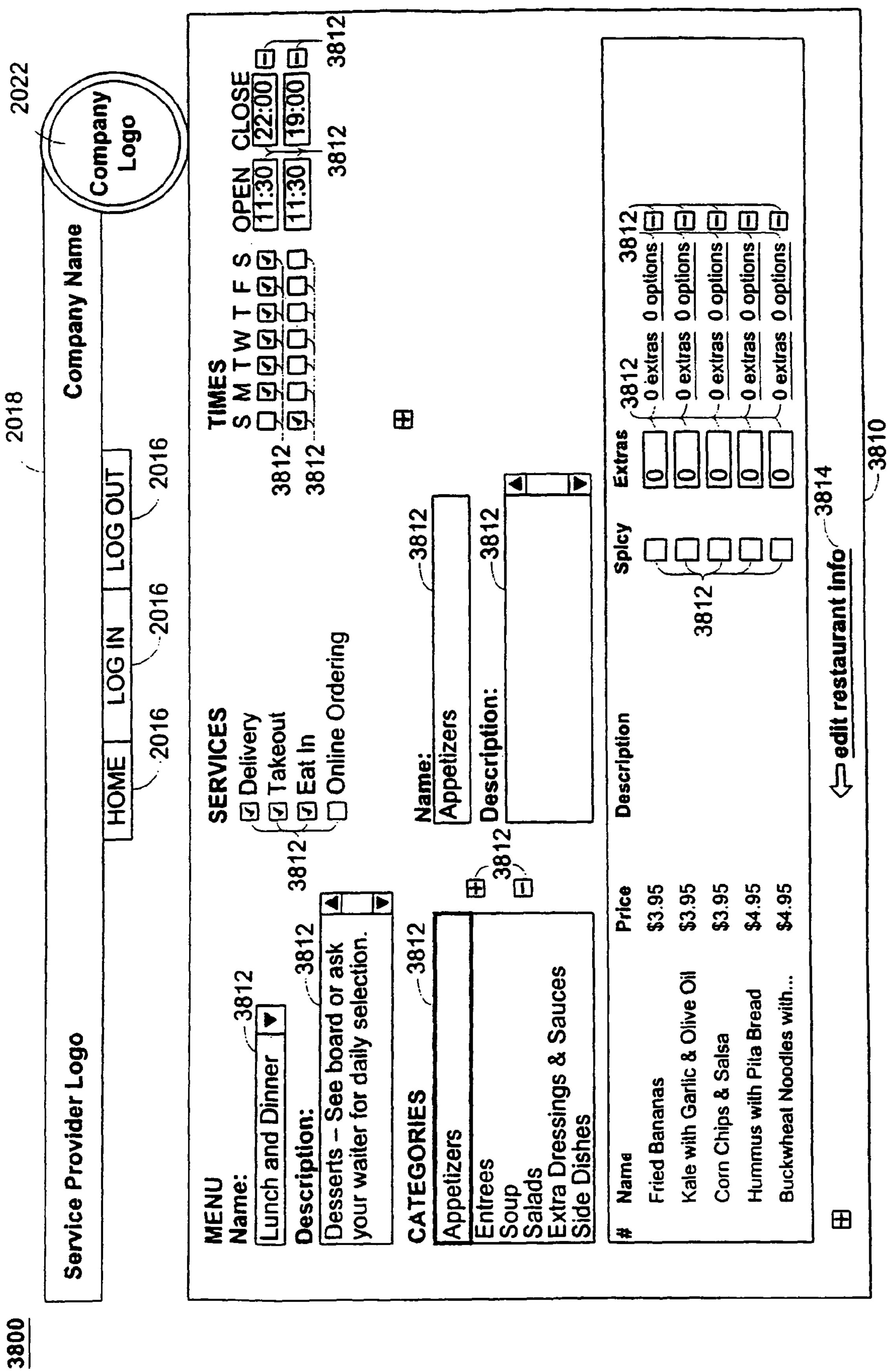

FIG. 73 shows illustrative display 3800. In this example, the administrative user may enter information about the menu of a restaurant, including menu name, description, types of dining services, available days and times, categories, and individual menu items. Administrative users may view illustrative display 3800, as shown in this display, after making a suitable indication to the system, through an execution feature 3814 as shown in FIG. 72.

Figure 74:
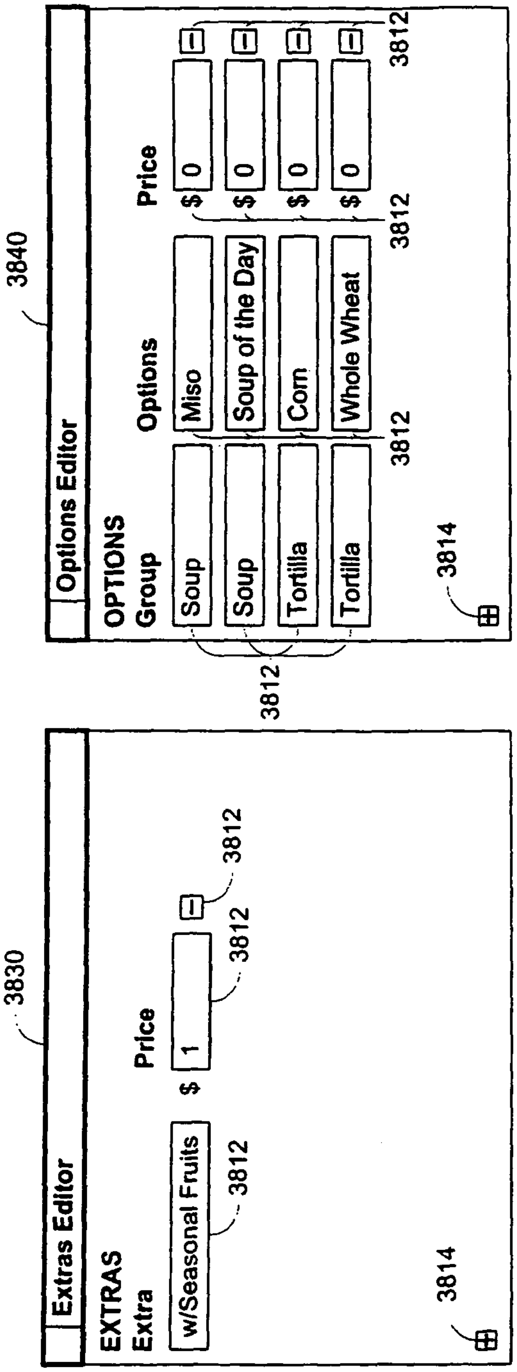

FIG. 74 shows display boxes 3830 and 3840. In this example, display box 3830 is shown as an "Extras Editor" wherein administrative users may input relevant data relating to extra items that may be included with a restaurant menu item. Administrative user has entered "w/Seasonal Fruits" and "1" into the option features 3812 titled "Extra" and "Price", indicating that a user may order a particular menu item with seasonal fruits for an additional price of $1. In this example, display box 3840 is shown as an "Options Editor" wherein administrative users may input relevant data relating to options that may be allowed with a restaurant menu item. Administrative user has entered "Soup", "Miso", "0", "Soup", "Soup of the Day", "0", "Tortilla", "Corn", "0", "Tortilla", "Whole Wheat", and "0" into option features 3812 titled "Group", "Options", and "Price", indicating that a user has a choice of miso soup or soup of the day and a choice of corn or whole wheat tortilla with a particular menu item for no additional cost.

Display boxes 3830 and 3840 may include option features 3812 and execution features 3814.

FIG. 75 shows illustrative display 3850. In this example, illustrative display 3850 shows the names of several lists of restaurants. An administrative user may use this information to add a list of restaurants to the system 1 or to select one or more lists of restaurants that the administrative user wishes to view, edit, or delete. An administrative user may view illustrative display 3850 after making the appropriate indication to interactive feature 2020 titled "Lists Edit and Administrate Restaurant Lists (zones)" as shown in FIG. 69. Illustrative display 3850 may include content area 3860.

Content area 3860 may include list 3870. List 3870 may include list items 3874. Each list item 3874 may represent a list of suppliers accessible through the system 1. List items 3874 may include list features 3872. The system may receive indications that an administrative user prefers to edit, delete, add, or modify in any suitable way the associated list item 3874, through list features 3872. Content area 3860 may include one or more interactive features 3876. In this example, the system may receive administrative user indications that the administrative user wishes to add an additional list item 3874 to list 3870, through interactive feature 3876. The system may receive any suitable administrative user indications, through interactive features 3876.

FIG. 76 shows illustrative display 3880. In this example, illustrative display 3880 may allow an administrative user to input a name for a new list of restaurants to be included as a list item 3874 in list 3870. Illustrative display 3880 may be viewed and used by an administrative user that makes the proper indications to interactive feature 3876 titled "ADD NEW LIST" as shown in FIG. 75. Illustrative display 3880 may include content area 3890.

Content area 3890 may include input features 3892 and interactive features 3894. The system may receive any suitable administrative user indications, through input features 3892. In this example, input feature 3892 has received the administrative user input "New". The system may receive any suitable administrative user indications, through interactive features 3894. In this example interactive feature 3894 may receive an administrative user indication that the administrative user wishes to proceed to the next step in the process of adding a new list item 3874 to list 3870.

FIG. 77 shows illustrative display 3900. In this example, illustrative display 3900 may allow an administrative user to view one or more lists 3920 of restaurants and to select a sublist 3930 of restaurants to be included as part of the stored data for a list item 3874. Illustrative display 3900 may be viewed and used by an administrative user after the administrative user makes suitable indications to the system, through interactive feature 3894 as shown in FIG. 76. Illustrative display 3900 may include display area 3910.

Display area 3910 may include one or more interactive features 3912, one or more lists 3920, and one or more sublists 3930. The system may receive any suitable administrative user indications, including indications to add one or more list items 3922 to sublist 3930 as a sublist item 3932, select all list items 3922, select none of list items 3922, remove one or more sublist items 3932 from sublist 3930, select all sublist items 3932, select none of sublist items, continue to the next step in the process of adding a list item 3874, or any other suitable indications, through interactive features 3912.

List 3920 may contain one or more list items 3922. Sublist 3930 may contain one or more sublist items 3932. List items 3922 and sublist items 3932 may display any relevant information relating to specific suppliers, including ID numbers, names, etc. The system may receive any suitable administrative user indications, through list items 3922 and sublist items 3932. The system may receive administrative user indications of selection or deselection prior to receipt of administrative user indications by interactive features 3912, through list items 3922 and sublist items 3932.

FIG. 78 shows illustrative display 4000. In this example, illustrative display 4000 shows the names of several corporate sites. An administrative user may use this information to add a corporate site to the system 1 or to select one or more corporate sites that the administrative user wishes to view, edit, or delete. An administrative user may view illustrative display 4000 after making the appropriate indication to interactive feature 2020 titled "Sites Configure and Maintain corporate sites" as shown in FIG. 69. Illustrative display 4000 may include content area 4010.

Content area 4010 may include list 4020. List 4020 may include list items 4024. Each list item 4024 may represent a corporate site accessible through the system 1. List items 4024 may include list features 4022. The system may receive indications that an administrative user prefers to edit, delete, add, or modify in any suitable way an associated list item 4024, through list features 4022. Content area 4010 may include one or more interactive features 4026. In this example, the system may receive administrative user indications that the administrative user wishes to add an additional list item 4024 to list 4020, through interactive feature 4026. The system may receive any suitable administrative user indications, through interactive features 4026.

FIG. 79 shows illustrative display 4050. In this example, illustrative display 4050 shows some of the relevant data stored in the system 1 relating to a service provider site. Illustrative display 4050 provides administrative users with means to edit such data. Illustrative display 4050 may be provided upon receipt of appropriate administrative user indications by the appropriate list feature 4022 titled "EDIT" as shown in FIG. 78 or by any other appropriate administrative user indication or system 1 event. Illustrative display 4050, as well as other displays described herein, may include header 2018 and content area 4060.

Content area 4060 may include interactive features 4062 and input features 4064. The system may receive any suitable administrative user indications, through interactive features 4062. In this example, the system may receive administrative user indications of "Back to sites list without editing", through interactive features 4062. The system may receive administrative user indications directing that the administrative user wishes to view illustrative display 4000, through the interactive feature 4062 titled "Back to sites list without editing". The system may receive any suitable administrative user indications, through input features 4064. In this example, the system may receive administrative user indications that gDebugSubmit, gAnonUserLogin, gUserEditName, gUserEditLocation, gUserEditUser, gUserEditTime, gUserEditService, and gUserEditPayment are desirable parts of the relevant data to be stored in relation to a site named "atg", through input features 4064.

FIG. 80 shows illustrative display 4050. In this example, illustrative display 4050 shows some of the relevant data to be stored in input features 4064 and interactive feature 4062 titled "edit site". The system may receive administrative user indications directing that the data displayed in input features 4064 be stored for future use, through interactive feature 4062 titled "edit company".

FIG. 81 shows illustrative display 4100. In this example, illustrative display 4100 shows information and features that an administrative user may use when functioning in a customer service role to help users with orders. Illustrative display 4100, as well as other displays described herein, may contain header 2018 and content area 4110.

Content area 4100 may contain attention items 4112, interactive features 4114, and counter display features 4116. Attention item 4112 may be used to display any relevant information regarding one or more user orders that may or may not be problematic in any relevant form. In this example, attention item 4112 displays information regarding order ID, date, time, restaurant, company, customer, customer phone number, whether the order needs attention, and the release status. The system may receive any relevant administrative user indications, including indications regarding text to search for, places to be searched, date ranges to be searched, whether a date range should be searched, preferred execution of a search of orders, and recall of the previous search, through interactive features 4114. One or more counter display features 4116 may be used to display counts or quantities of relevant information. In this example, counter display features show the number of orders needing attention, age (in minutes) of the oldest order needing attention, the number of orders not needing attention, and the number of orders being worked on.

Figure 82:
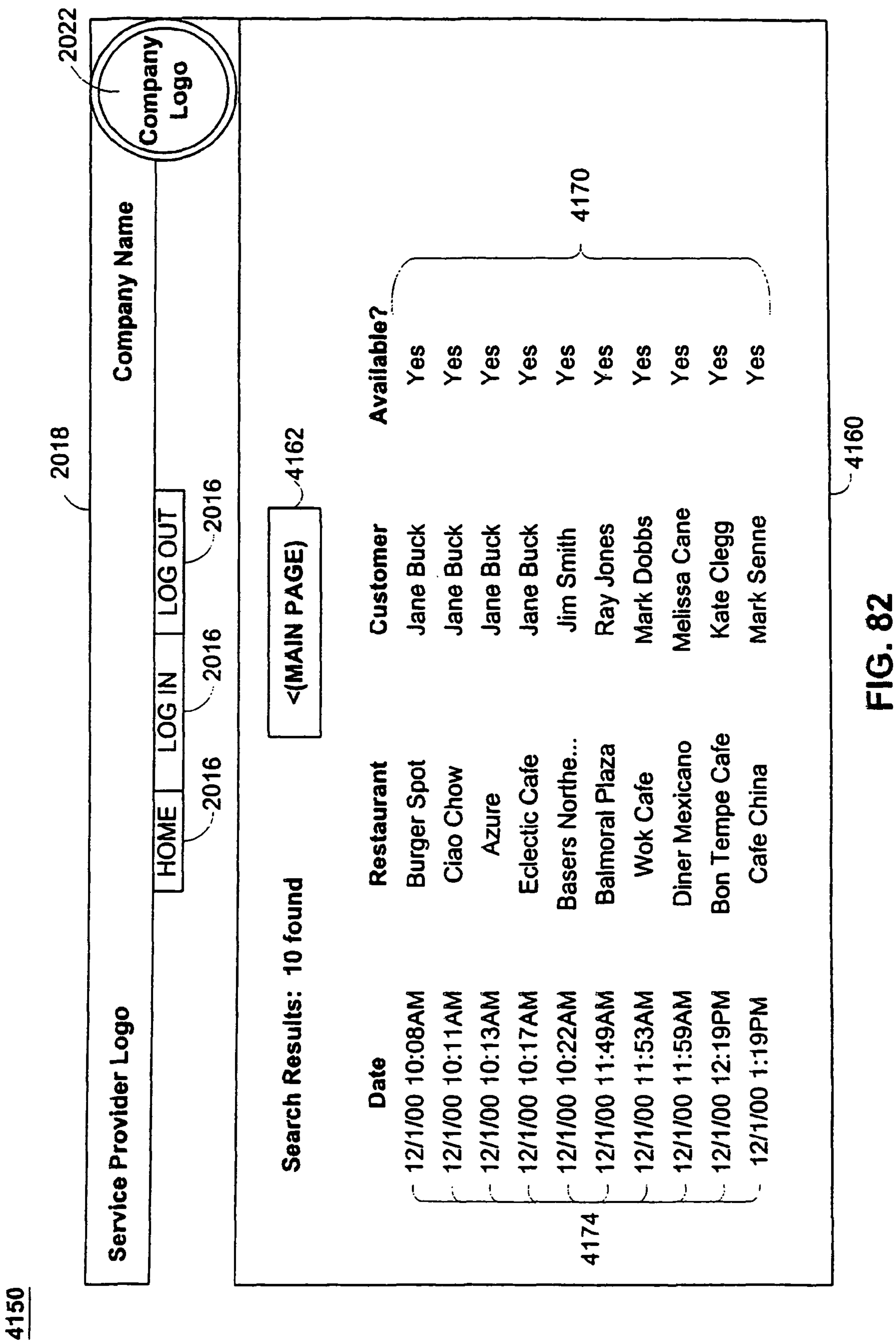

FIG. 82 shows illustrative display 4150. In this example, illustrative display 4150 shows a list 4170 of recent orders associated with order items 4174. Illustrative display 4150, as well as other displays described herein, may include header 2018 and content area 4160. Illustrative display 4150 may be viewed upon receipt of appropriate administrative user indications by interactive features 4114 titled "SEARCH ORDERS" or "(last search)" as shown in FIG. 81.

Content area 4160 may include list 4170 and interactive features 4162. List 4170 may include list items 4174. In this example, list items 4174 show data relevant to orders, including dates, restaurants, customers, and whether the order is available for customer service. List items 4174 may include any information relevant to any order. The system may receive any relevant administrative user indications, through interactive features 4162. The system may receive administrative user indications showing a preference to view illustrative display 4100, through interactive feature 4162, as shown in FIG. 82.

Figure 83:
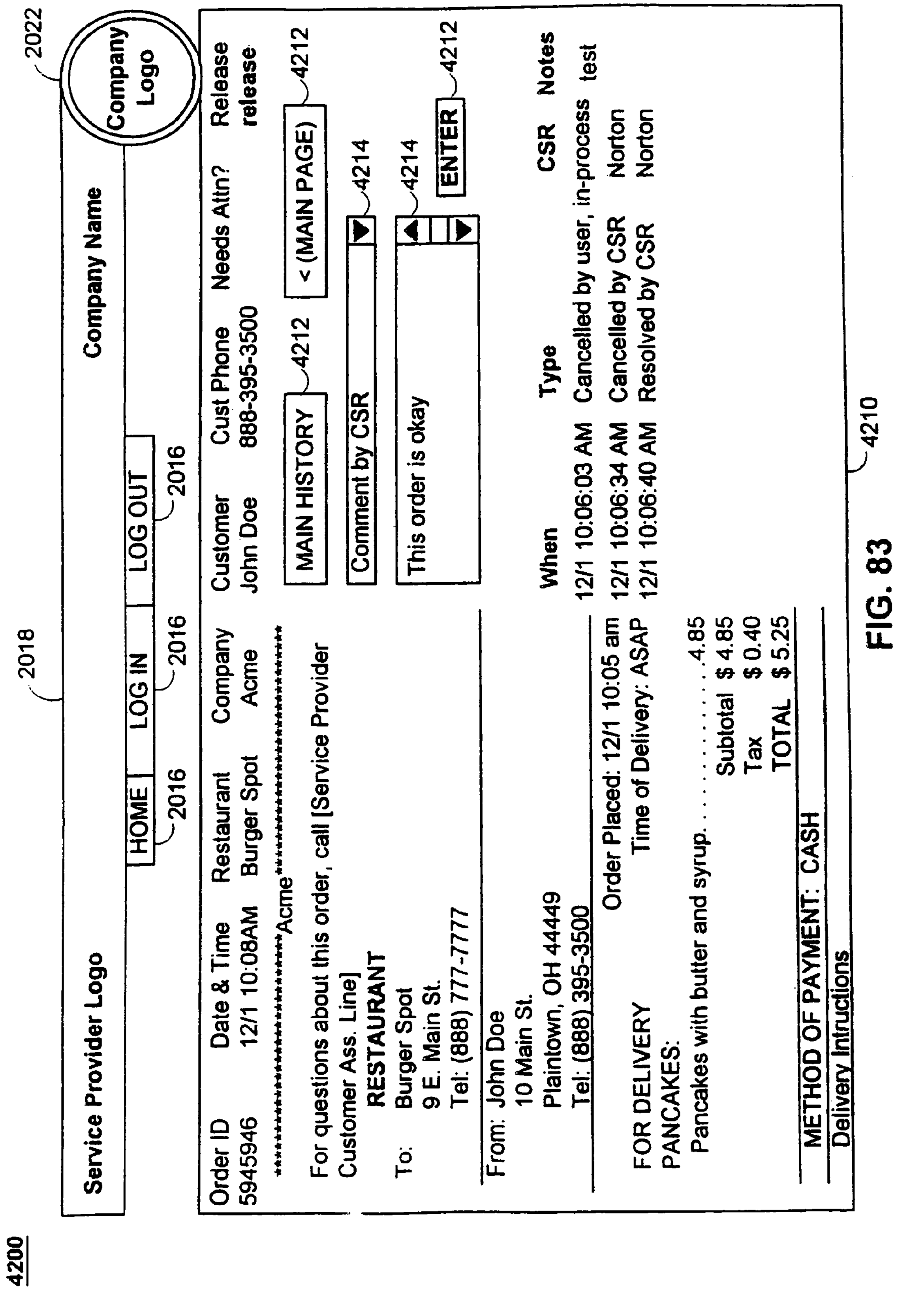

FIG. 83 shows illustrative display 4200. Illustrative display 4200 may be viewed by administrative users acting in a customer service role. Illustrative display 4200 may show information relating to one or more orders that an administrative user is taking action in reference to. In this example, illustrative display 4200 shows information relating to an order placed with Burger Spot restaurant by John Doe for pancakes. Illustrative display 4200, as well as other displays described herein, may include header 2018 and content area 4210.

Content area 4210 may include input features 4214 and interactive features 4212. The system may receive any input by an administrative user regarding the order for which information is being displayed in content area 4210, through input features 4214. In this example, the system may receive input of "Comment by CSR" and "This order is okay", through input features 4214. The system may receive any suitable administrative user indications, including indications to enter data, provide illustrative display 4150, provide illustrative display 4100, or any other suitable indications, through interactive features 4212.

Figure 84:
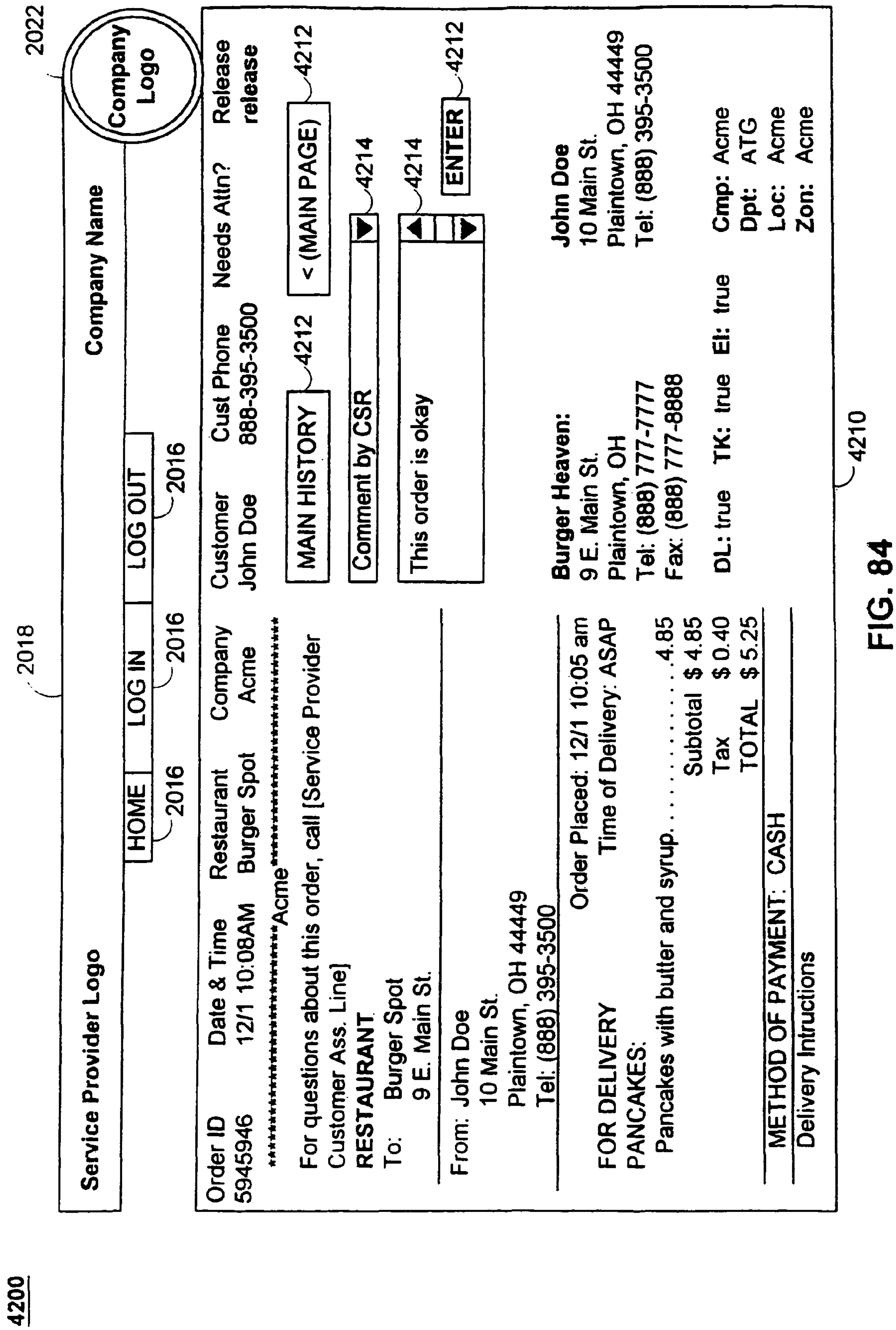

FIG. 84 shows illustrative display 4200. In this example, different data is shown in the lower right portion of content area 4210.

FIG. 85 shows illustrative display 4250. Illustrative display 4250 may be used as a general menu for administrative users. Administrative users using illustrative display 4250 may be responsible for monitoring usage by users associated with one or more specific companies or organizations that have access to the system 1 Administrative users may indicate preferences using illustrative display 4250. Illustrative display 4250, as well as other displays described herein, may contain header 2018 and content area 4260.

In this example, content area 4260 shows a menu which may be available to an administrative user after logging into the system 1. Content area 4260 may contain one or more interactive features 2020. The system may receive administrative user indications about illustrative displays that an administrative user wishes to view, actions an administrative user wishes the system 1 to take, or any other appropriate indication, through interactive features 2020.

FIG. 86 shows illustrative display 4300. In this example, illustrative display 4300 shows a list 4320 of order events relating to one or more orders placed by users of the system 1. An administrative user may view illustrative display 4300 after suitable administrative user indications are received by interactive feature 2020 titled "Order Events Report" as shown in FIG. 85 or based on any other suitable administrative user indication or system 1 event. Illustrative display 4300, as well as any other display described herein, may contain header 2018 and content area 4310.

Content area 4310 may contain list 4320 and interactive features 4326. List 4320 may contain one or more list items 4324. In this example, list items 4324 display data regarding order numbers, order deadlines, event times, order ages, customers, restaurants, event types, customer service representatives, and notes. List items 4324 may display any data relevant to an order, customer, customer service representative, supplier, or any other relevant data. The system may receive any suitable administrative user indications, through interactive features 4326. In this example, the system may receive administrative user indications of month, day, year, "GO" and "PRINT REPORT", through interactive features 4326. The system may receive administrative user indications and allow the administrative user to view a list 4320 corresponding to any relevant date, through interactive features 4326 titled month, day, year, and "GO". The system may receive administrative user indications directing that a printed version of list 4320 be prepared, through interactive feature 4326 titled "PRINT REPORT".

FIG. 87 shows illustrative display 4350. In this example, illustrative display 4350 shows a list 4370 of customer service reports relating to one or more orders placed by users of the system 1. An administrative user may view illustrative display 4350 after suitable administrative user indications are received by the system, through interactive feature 2020 titled "Customer Service Report" as shown in FIG. 85 or based on any other suitable administrative user indication or system 1 event. Illustrative display 4350, as well as any other display described herein, may contain header 2018 and content area 4360.

Content area 4360 may contain list 4370 and interactive features 4376. List 4370 may contain one or more list items 4374. In this example, list items 4374 display data regarding locations, restaurants, customers, totals, times, dates, and comments/issues. List items 4374 may display any data relevant to an order, user, administrative user, supplier, or any other relevant data. The system may receive any suitable administrative user indications, through interactive features 4376. In this example, the system may receive administrative user indications of month, day, year, "GO" and "PRINT", and "Include cancelled orders", through interactive features 4376. The system may receive administrative user indications and allow the administrative user to view a complete or partial list 4370 corresponding to any range of relevant dates, through interactive features 4376 titled "FROM:", "TO:", "Include canceled orders" and "GO". The system may receive administrative user indications directing that a printed version of list 4370 be prepared, through interactive feature 4376 titled "PRINT".

FIG. 88 shows illustrative display 4400. In this example, illustrative display 4400 shows a list 4420 of restaurants available to a site of a department of a company having access to the system 1. An administrative user may view illustrative display 4400 after suitable administrative user indications are received by the system, through interactive feature 2020 titled "Restaurant List" as shown in FIG. 85 or based on any other suitable administrative user indication or system 1 event. Illustrative display 4400, as well as any other display described herein, may contain header 2018 and content area 4410.

Content area 4410 may contain list 4420 and interactive features 4426. List 4420 may contain one or more list items 4424. In this example, list items 4424 display data regarding restaurant UIDs, restaurant names, street addresses, phone numbers, and facsimile numbers. List items 4424 may display any data relevant to a supplier or any other relevant data. The system may receive any suitable administrative user indications, through interactive features 4426. In this example, the system may receive administrative user indications of site, "Include Restaurant UID", "Include Other Info", "Get Restaurant List", "Download Report", and "PRINT", through interactive features 4426. The system may receive administrative user indications and allow the administrative user to view a list 4420 corresponding to any relevant site, through interactive features 4426 titled "Select a Site:", "Include Restaurant UID", "Include Other Info", and "Get Restaurant List". The system may receive administrative user indications directing that a printed version of list 4420 be prepared, through interactive feature 4426 titled "PRINT". The system may receive administrative user indications that an electronic version of the information in list 4420 should be stored, through interactive feature titled "Download Report".

FIG. 89 shows illustrative display 4450. In this example, illustrative display 4450 shows a list 4470 of average order sizes and average daily total order amounts by company. An administrative user may view illustrative display 4450 after suitable administrative user indications are received by the system, through interactive feature 2020 titled "Report Manager" as shown in FIG. 85 or based on any other suitable administrative user indication or system 1 event. Illustrative display 4450, as well as any other display described herein, may contain header 2018 and content area 4460.

Content area 4460 may contain list 4470, one or more selection features 4478, and interactive features 4476. List 4470 may contain one or more list items 4474. In this example, list items 4474 display data regarding company names, average order size, and average daily order totals. List items 4474 may display any data relevant to a supplier or any other relevant data. The system may receive administrative user indications that viewing a specific report, including reports titled "Average Orders", "Customers by Company", "Order Events (by date)", "Orders By Customer", "Orders By Restaurant (Details)", "Orders By Restaurant (Summary)", "Restaurant Search", through selection feature 4478 or any other relevant reports. Upon receipt of such indications, list 4470 may be provided anew with the information desired by administrative user. The system may receive any suitable administrative user indications, through interactive features 4476. In this example, the system may receive administrative user indications of "Start Date:", "End Date:", "Include Cancelled Orders:", "Notes:", "RUN REPORT", and "PRINT", through interactive features 4476. The system may receive administrative user indications and allow the administrative user to view a list 4470 corresponding to any relevant report indicated to selection feature 4478, through the interactive features 4476 titled "Start Date:", "End Date:", "Include Cancelled Orders:", "Notes:", and "RUN REPORT". The system may receive administrative user indications directing that a printed version of list 4470 be prepared, through interactive feature 4476 titled "PRINT". In this example, administrative user has indicated to selection feature 4478 that "Average Orders" is desired, and indicated to interactive features 4476 that a start date of "Jun. 19, 2000" and an end date of "Dec. 1, 2000" is desired, thereby generating the shown list 4470 by making the proper indications to interactive feature 4476 titled "RUN REPORT".

FIG. 90 shows illustrative display 4500. In this example, illustrative display 4500 shows a list 4520 of reports available to the administrative user. An administrative user may view illustrative display 4500 after suitable administrative user indications are received by the system, through interactive feature 2020 titled "SQL Preparation" as shown in FIG. 85 or based on any other suitable administrative user indication or system 1 event. Illustrative display 4500, as well as any other display described herein, may contain header 2018 and content area 4510.

Content area 4510 may contain list 4520 and interactive features 4526. List 4520 may contain one or more list items 4524. In this example, list items 4524 display the names of relevant reports. List items 4524 may display any data relevant to a report or any other relevant data. Each list item 4524 may contain one or more item features 4522. The system may receive administrative user indications that a specific action should be taken with respect to the report represented by the associated list item 4524, through item features 4522. In this example, the system may receive administrative user indications that the administrative user desires to edit or delete the report, through the associated item feature 4522. The system may receive any suitable administrative user indications, through interactive features 4526. In this example, the system may receive administrative user indications of "Go to Report Manager", report name, and "add new report", through interactive features 4526. The system may receive administrative user indications and allow the administrative user add a new report as a list item 4524, through interactive features 4526 titled "add new report" and the interactive feature 4526 that is not titled. The system may receive administrative user indications directing that the administrative user wishes to view illustrative display 4450, through interactive feature 4526 titled "Go to Report Manager".

FIG. 91 shows illustrative display 4550. In this example, illustrative display 4550 shows a table 4570 of information relating to a reporting capability of the system 1 titled "Average Orders" with a UID of "6015516". Illustrative display 4550 may be viewed by an administrative user upon receipt of appropriate administrative user indications by an item feature 4522 titled "EDIT" as shown in FIG. 90 or any other appropriate administrative user indication. In this example, the administrative user has made the appropriate indication to the system, through item feature 4522 titled "EDIT" that is associated with the list item titled "Average Orders" as shown in FIG. 90. Illustrative display 4550, as well as other displays described herein, may include header 2018 and content area 4560.

Content area 4560 may contain table 4570 and interactive features 4576. Table 4570 may contain interactive feature 4572 and display area 4574. The system may receive administrative user indications that the administrative user wishes to edit part or all of the displayed information or any other relevant information associated with the displayed information, through interactive feature 4572. Display area 4574 may display SQL queries or any other relevant data. Interactive features 4576 may receive any suitable administrative user indications. In this example, the system may receive administrative user indications of "Go to Report Manager" and "Back to reports list without editing", through interactive features 4576. The system may receive administrative user indications directing that the administrative user wishes to view illustrative display 4500, through the interactive feature 4576 titled "Back to reports list without editing". The system may receive administrative user indications directing that the administrative user wishes to view illustrative display 4450, through interactive feature 4576 titled "Go to Report Manager".

FIG. 92 shows a representative SQL query 4575. Query 4575 and/or any other relevant data or database queries may be displayed in display area 4574, edited when appropriate administrative user indications are received by interactive feature 4572, deleted when the appropriate administrative user indications are received by the appropriate item feature 4522 titled "DELETE" as shown in FIG. 90, executed when the appropriate indications are received by selection feature 4478 and interactive feature 4476 titled "RUN REPORT" as shown in FIG. 89, or used or modified in any suitable fashion when any appropriate administrative user indication is made. Query 4575 may be used to retrieve a three column list with column titles "Acme", "Average Order Size", "Average Daily Total" from a group of four tables in a relational database based on specified criteria and having data grouped by a specified data element.

FIG. 93 shows illustrative display 4600. In this example, illustrative display 4600 shows the names of several companies or other suitable organizations. An administrative user may use this information to add a company to the system 1 or to select one or more companies that the administrative user wishes to view, edit, or delete. An administrative user may view illustrative display 4600 after making the appropriate indication to the system, through interactive feature 2020 titled "Companies Add, Delete, and Edit Companies, Departments, Customer and Locations" as shown in FIG. 69. Illustrative display 4600 may include content area 4610.

Content area 4610 may include list 4620. List 4620 may include list items 4624. Each list item 4624 may represent a company that has access to the system 1. List items 4624 may include list features 4622. The system may receive indications that an administrative user prefers to edit, delete, add, or modify in any suitable way the associated list item 4624, through list features 4622. Content area 4610 may include one or more interactive features 4626. In this example, the system may receive administrative user indications that the administrative user wishes to add an additional list item 4624 to list 4620 or input the name of a list item 2624, through interactive feature 4626. The system may receive any suitable administrative user indications, through interactive features 4626.

FIG. 94 shows illustrative display 4650. In this example, illustrative display 4650 shows some of the relevant data stored in the system 1 for a participating company or organization. Illustrative display 4650 provides administrative users with means to edit such data. Illustrative display 4650 may be provided upon receipt of appropriate administrative user indications by the system, for example, through appropriate list feature 4622 titled "EDIT" as shown in 93 or by any other appropriate administrative user indication or system 1 event. Illustrative display 4650, as well as other displays described herein, may include header 2018 and content area 4660.

Content area 4660 may include interactive features 4662 and input features 4664. Interactive features 4662 may receive any suitable administrative user indications. In this example, interactive features 4662 may receive administrative user indications of "Go to departments list" and "Back to companies list without editing". The system may receive administrative user indications directing that the administrative user wishes to view illustrative display 4600, through interactive feature 4662 titled "Back to companies list without editing". The system may receive administrative user indications directing that the administrative user wishes to view illustrative display 4700, through interactive feature 4662 titled "Go to departments list". The system may receive any suitable administrative user indications, through input features 4664. In this example, through input features 4664, the system has received administrative user indications that "Acme", "WWW", "25", "1001 6th Ave.", "4th Floor", "Plaintown", "Ohio", "USA", and "44444" are parts of the relevant data to be stored in relation to a company named "Acme".

FIG. 95 shows illustrative display 4650. In this example, illustrative display 4650 shows some of the relevant data to be stored in input features 4664 and interactive feature 4662 titled "edit company". The system may receive administrative user indications directing that the data displayed in input features 4664 be stored for future use, through interactive feature 4662 titled "edit company".

FIG. 96 shows illustrative display 4700. In this example, illustrative display 4700 shows the names of several departments of companies or other suitable organizations. An administrative user may use this information to add a department to the system 1 or to select one or more departments that the administrative user wishes to view, edit, or delete. An administrative user may view illustrative display 4700 after making the appropriate indication to list feature 4622 titled "DEPARTMENTS", interactive feature 4662 titled "Go to departments list", or any other appropriate indication. Illustrative display 4700 may include content area 4710.

Content area 4710 may include list 4720. List 4720 may include list items 4724. Each list item 4724 may represent a department of a company or organization that has access to the system 1. List items 4724 may include list features 4722. The system may receive indications that an administrative user prefers to edit, delete, add, or modify in any suitable way the associated list item 4724, through list features 4722. Content area 4710 may include one or more interactive features 4726. In this example, interactive feature 4726 may receive administrative user indications that the administrative user wishes to add an additional list item 4724 to list 4720, input the name of a list item 4624, or view the list 4620 of companies. The system may receive any suitable administrative user indications, through interactive features 4726.

FIG. 97 shows illustrative display 4750. In this example, illustrative display 4750 shows some of the relevant data stored in the system 1 for a department of a participating company or organization. Illustrative display 4750 provides administrative users with means to edit such data. Illustrative display 4750 may be provided upon receipt of appropriate administrative user indications to the system, for example, through list feature 4722 titled "EDIT" as shown in FIG. 96, interactive feature 4726 titled "add new department" as shown in FIG. 96, interactive feature 4826 titled "back to department list without editing" as shown in FIG. 99, or by any other appropriate administrative user indication or system 1 event. Illustrative display 4750, as well as other displays described herein, may include header 2018 and content area 4760.

Content area 4760 may include interactive features 4762 and input features 4764. The system may receive any suitable administrative user indications, through interactive features 4762. In this example, the system may receive administrative user indications of "Back to companies list", "Go to customers list", and "Back to department list without editing", through interactive features 4762. The system may receive administrative user indications directing that the administrative user wishes to view illustrative display 4700, through interactive feature 4762 titled "Back to department list without editing". The system may receive administrative user indications directing that the administrative user wishes to view illustrative display 4600, through interactive feature 4762 titled "Back to companies list". The system may receive administrative user indications directing that the administrative user wishes to view illustrative display 4800, through interactive feature 4762 titled "Go to customers list". The system may receive any suitable administrative user indications, through input features 4764. In this example, input features 4764 have received administrative user indications that "Acme", "25", "1001 6th Ave.", "4th Floor", "Plaintown", "Ohio", "USA", and "44444" are parts of the relevant data to be stored in relation to a the "ACME Legal" department of a company named "Acme".

FIG. 98 shows illustrative display 4750. In this example, illustrative display 4750 shows some of the relevant data to be stored in input features 4764 and interactive feature 4762 titled "edit department". The system may receive administrative user indications directing that the data displayed in input features 4764 be stored for future use, through interactive feature 4762 titled "edit department".

FIG. 99 shows illustrative display 4800. In this example, illustrative display 4800 shows the names of several users within departments of companies or other suitable organizations. An administrative user may use this information to add a user to the system 1 or to select one or more users that the administrative user wishes to view, edit, or delete. An administrative user may view illustrative display 4800 after making the appropriate indication to list feature 4722 titled "CUSTOMERS", interactive feature 4762 titled "Go to customers list", or any other appropriate indication. Illustrative display 4800 may include content area 4810.

Content area 4810 may include list 4820. List 4820 may include list items 4824. Each list item 4824 may represent a user that has access to the system 1. List items 4824 may include list features 4822. The system may receive indications that an administrative user prefers to edit, delete, add, or modify in any suitable way the associated list item 4824, through list features 4822. Content area 4810 may include one or more interactive features 4826. In this example, the system may receive administrative user indications that the administrative user wishes to add an additional list item 4824 to list 4820, input relevant data regarding a list item 4824, view the list 4720 of departments or view the list 4620 of companies, through interactive features 4826. The system may receive any suitable administrative user indications, through interactive features 4826.

FIG. 100 shows illustrative display 4900. In this example, illustrative display 4900 shows the names of several locations of departments of companies or other suitable organizations. An administrative user may use this information to add a location to the system 1 or to select one or more locations that the administrative user wishes to view, edit, or delete. An administrative user may view illustrative display 4900 after making the appropriate indication to list feature 4822 titled "LOCATIONS", interactive feature 4762 titled "Back to locations list without editing", or any other appropriate indication. Illustrative display 4900 may include content area 4910.

Content area 4910 may include list 4920. List 4920 may include list items 4924. Each list item 4924 may represent a location of a company or organization that has access to the system 1. List items 4924 may include list features 4922. The system may receive indications that an administrative user prefers to edit, delete, add, or modify in any suitable way the associated list item 4924, through list features 4922. Content area 4910 may include one or more interactive features 4926. In this example, the system may receive administrative user indications that the administrative user wishes to add an additional item 4924 to list 4920, input relevant data regarding a list item 4924, view the list 4820 of users, view the list 4720 of departments or view the list 4620 of companies, through interactive features 4926. The system may receive any suitable administrative user indications, through interactive features 4926.

FIG. 101 shows illustrative display 4950. In this example, illustrative display 4950 shows some of the relevant data stored in the system 1 for a location of a department of a participating company or organization. Illustrative display 4950 provides administrative users with means to edit such data. Illustrative display 4950 may be provided upon receipt of appropriate administrative user indications, for example, to list feature 4922 titled "EDIT" as shown in FIG. 100, interactive feature 4926 titled "add new location" as shown in FIG. 100, or by any other appropriate administrative user indication or system 1 event. Illustrative display 4950, as well as other displays described herein, may include header 2018 and content area 4960.

Content area 4960 may include interactive features 4962 and input features 4964. The system may receive any suitable administrative user indications, through interactive features 4962. In this example, the system may receive administrative user indications of "Back to companies list", "Back to customers list", and "Back to departments list", and "Back to locations list without editing", through interactive features 4962. The system may receive administrative user indications directing that the administrative user wishes to view illustrative display 4900, through interactive feature 4962 titled "Back to locations list without editing". The system may receive administrative user indications directing that the administrative user wishes to view illustrative display 4600, through interactive feature 4962 titled "Back to companies list". The system may receive administrative user indications directing that the administrative user wishes to view illustrative display 4700, through interactive feature 4962 titled "Back to departments list". The system may receive administrative user indications directing that the administrative user wishes to view illustrative display 4800, through interactive feature 4962 titled "Back to customers list". The system may receive any suitable administrative user indications, through input features 4964. In this example, input features 4964 have received administrative user indications that "Acme", "Acme", "1001 6th Ave.", "Suite 421 (4th Fl.)", "Plaintown", and "Ohio" are parts of the relevant data to be stored in relation to a the "Acme" location of the "ACME Legal" department of a company named "Acme".

FIG. 102 shows illustrative display 4950. In this example, illustrative display 4950 shows some of the relevant data to be stored in input features 4964 and interactive feature 4962 titled "edit location". The system may receive administrative user indications directing that the data displayed in input features 4964 be stored for future use, through interactive feature 4962 titled "edit location".

FIG. 103 shows illustrative display 5000. In this example, illustrative display 5000 shows the names and some related data for several administrative users (or operators). An administrative user may use this information to add another administrative user to the system 1 or to select one or more administrative users that the administrative user wishes to view, edit, or delete. An administrative user may view illustrative display 5000 after making the appropriate indication to interactive feature 2020 titled "Operators Add, Delete and Edit Operators/Permissions" as shown in FIG. 69, or any other appropriate indication. Illustrative display 5000 may include content area 5010.

Content area 5010 may include list 5020. List 5020 may include list items 5024. Each list item 5024 may represent an administrative users. List items 5024 may include list features 5022. The system may receive indications that an administrative user prefers to edit, delete, add, or modify in any suitable way the associated list item 5024, through list features 5022. Content area 5010 may include one or more interactive features 5026. In this example, the system may receive administrative user indications that the administrative user wishes to add an additional list item 5024 to list 5020, or input relevant data regarding a list item 5024, through interactive features 5026. The system may receive any suitable administrative user indications, through interactive features 5026.

FIG. 104 shows illustrative display 5050. In this example, illustrative display 5050 shows some of the relevant data stored in the system 1 for an administrative user (or operator). Illustrative display 5050 provides administrative users with means to edit such data. Illustrative display 5050 may be provided upon receipt of appropriate administrative user indications, for example, to list feature 5022 titled "EDIT" as shown in FIG. 103, interactive feature 5026 titled "add new operator and/or new group" as shown in FIG. 103, or by any other appropriate administrative user indication or system 1 event. Illustrative display 5050, as well as other displays described herein, may include header 2018 and content area 5060.

Content area 5060 may include interactive features 5062 and input features 4964. The system may receive any suitable administrative user indications, through interactive features 5062. In this example, the system may receive administrative user indications of "Back to operators list", "Go to customers list", and "edit operator", through interactive features 5062. The system may receive administrative user indications directing that the administrative user wishes to view illustrative display 5000, through interactive feature 5062 titled "Back to operators list". The system may receive administrative user indications directing that the administrative user wishes to view illustrative display 4800, through interactive feature 5062 titled "Go to customers list". The system may receive administrative user indications directing that the data displayed in input features 4964 be stored for future use, through interactive feature 5062 titled "edit operator". The system may receive any suitable administrative user indications, through input features 4964. In this example, the system, through input features 4964 has received administrative user indications that "jackf", a password indicated as "********", "Jack", "Fine", and "jfine@mail.com" are parts of the relevant data to be stored in relation to a the operator titled "jackf".

FIG. 105 shows illustrative display 5100. In this example, illustrative display 5100 may allow an administrative user to view one or more lists 5120 of administrative user permissions levels and to select a sublist 5130 of administrative user permissions levels to be included as part of the stored data for a list item 5024. Illustrative display 5100 may be viewed and used by an administrative user after the administrative user makes suitable indications to list feature 5022 titled "PERMISSIONS" as shown in FIG. 103, or any other suitable indication. Illustrative display 5100 may include display area 5110.

Display area 5110 may include one or more interactive features 5112, one or more lists 5120, and one or more sublists 5130. The system may receive any suitable administrative user indications, including indications to add one or more list items 5122 to sublist 5130 as a sublist item 5132, select all list items 5122, select none of list items 5122, remove one or more sublist items 5132 from sublist 5130, select all sublist items 5132, select none of sublist items, perform customized extra editing, or any other suitable indications, through interactive features 5112.

List 5120 may contain one or more list items 5122. Sublist 5130 may contain one or more sublist items 5132. List items 5122 and sublist items 5132 may display any relevant information relating to specific administrative user permissions. The system may receive any suitable administrative user indications, through list items 5122 and sublist items 5132. The system may receive administrative user indications of selection or deselection prior to receipt of administrative user indications by interactive features 5112, through list items 5122 and sublist items 5132.

FIG. 106 shows illustrative display 5200. In this example, illustrative display 5200 may allow an administrative user to view one or more lists 5220 of administrative user groups and to select a sublist 5230 of administrative user groups to be included as part of the stored data for a list item 5024. Illustrative display 5200 may be viewed and used by an administrative user after the administrative user makes suitable indications to the system, through list feature 5022 titled "GROUPS" as shown in FIG. 103, or any other suitable indication. Illustrative display 5200 may include display area 5210.

Display area 5210 may include one or more interactive features 5212, one or more lists 5220, and one or more sublists 5230. The system may receive any suitable administrative user indications, including indications to add one or more list items 5222 to sublist 5230 as a sublist item 5232, select all list items 5222, select none of list items 5222, remove one or more sublist items 5232 from sublist 5230, select all sublist items 5232, select none of sublist items, perform customized extra editing, or any other suitable indications, through interactive features 5212.

List 5220 may contain one or more list items 5222. Sublist 5230 may contain one or More sublist items 5232. List items 5222 and sublist items 5232 may display any relevant information relating to specific administrative user groups. The system may receive any suitable administrative user indications, through list items 5222 and sublist items 5232. The system may receive administrative user indications of selection or deselection prior to receipt of administrative user indications by interactive features 5212, through list items 5222 and sublist items 5232.

FIG. 107 shows illustrative display 5300. In this example, illustrative display 5300 gives an administrative user some information relating to expense reporting, while also receiving administrative user indications about preferred expense reports based on orders placed by users. Illustrative display 5300 may be provided upon receipt of appropriate administrative user indications by the system, for example, through interactive feature 2020 titled "Accounting Expense Reporting Engine" as shown in FIG. 69. Illustrative display 5300, as well as other displays described herein, may contain header 2018, content area 5310, and control box 5320. Content area 5310 may include any suitable informational content, lists, or any other suitable features.

The system may receive administrative user indications directing the type of expense report that the administrative user wishes to view, through control box 5320. Control box 5320 may include date area 5330, summary area 5340, detail area 5350, and any other relevant features.

Date area 5330 may include one or more interactive features 5332. The system may receive administrative user indications of a desirable date or date range to be used when compiling a list, through interactive features 5332.

Summary area 5340 may include one or more interactive features 5342. The system may receive administrative user indications regarding desired methods of searching, sorting, or compiling data, or any other relevant indications, through interactive features 5342. The system may receive administrative indications that displaying a summary style expense report is desirable, through interactive features 5342.

Detail area 5350 may include one or more interactive features 5352. The system may receive administrative user indications regarding desired methods of searching, sorting, or compiling data, or any other relevant indications, through interactive features 5352. The system may receive administrative user indications that displaying a detail style expense report is desirable, through interactive features 5352.

FIG. 108 shows illustrative display 5300. In this example, content area 5310 shows an example summary expense report including data regarding customer names, client codes, order quantities, and total cost. Illustrative display 5300 as shown in FIG. 108 may be provided upon receipt of appropriate administrative user indications, for example, through interactive feature 5342 titled "Show". The summary expense report is displayed as list 5420. The individual expense items are displayed as list items 5424.

FIG. 109 shows illustrative display 5300. In this example, content area 5310 shows an example detailed expense report including data regarding employee names, client codes, matter codes, dates, times, order IDs, total costs, tips, and adjustments. Illustrative display 5300 as shown in FIG. 109 may be provided upon receipt of appropriate administrative user indications by the system, for example, through interactive feature 5352 titled "Show". The summary expense report is displayed as list 5520. The individual expense items are displayed as list items 5524.

Thus, an e-commerce system for ordering supplies or services from suppliers is provided. In some embodiments, standards for placing orders and registering catalog information in a database may be provided. Orders may be received from internal or external ordering sites. Supplier information may be made available to the internal or external sites. Systems and methods for placing orders, preprocessing supplier information using geographic information, conducting data searches and analyses locally on user access devices, continuously updating displays of browser frames, tracking orders using accounting codes, placing graphical custom orders, submitting graphical orders to suppliers, placing group orders, reducing risks associated with delinquent accounts receivable, or combinations thereof may be provided. It will be understood that the foregoing is only illustrative of the principles of the invention and that various modifications can be made by those skilled in the art without departing from the scope and spirit of the invention.

What is claimed is:

1. A method for receiving and identifying data objects in a client browser using functions, said browser communicating with a server system via an electronic communication network, said method comprising:

transferring at least one data object and at least one function from said server system to said browser; and identifying at least a first of said at least one data object using said function, the function identifying the first data object based partially on geographic coordinates of a user or group of users by utilizing a process comprising defining a delivery area associated with the first data object, defining a polygonal zone associated with the user location, and comparing the polygonal zone and the delivery area;

wherein the comparing of the polygonal zone and the delivery area comprises determining whether the polygonal zone associated with the user location is fully within, partially within, or excluded from the delivery area associated with the first data object.

2. The method for receiving and identifying data objects of claim 1 wherein the first data object is a location data object.

3. The method for receiving and identifying data objects of claim 1 wherein the first data object identifies a list of service providers.

4. A method for receiving and identifying data objects in a client browser using functions, said browser communicating with a server system via an electronic communication network, said method comprising:

transferring at least one data object and at least one function from said server system to said browser; and identifying at least a first of said at least one data object using said function, the function including identifying the first data object based partially on geographic coordinates of a user or a group of users included in said at least one data object by utilizing a process comprising defining a delivery area associated with the first data object, defining a polygonal zone associated with the user location included in the data object, and comparing the polygonal zone and the delivery area;

wherein the comparing of the polygonal zone and the delivery area comprises determining whether the polygonal zone associated with the user location is fully within, partially within, or excluded from the delivery area associated with the first data object.

5. The method for receiving and identifying data objects of claim 4 wherein the at least one data object is a location data object.

6. The method for receiving and identifying data objects of claim 4 wherein the at least one data object identifies a list of service providers.

* * * * *